US008297377B2

(12) United States Patent
Zupanick

(10) Patent No.: US 8,297,377 B2
(45) Date of Patent: *Oct. 30, 2012

(54) METHOD AND SYSTEM FOR ACCESSING SUBTERRANEAN DEPOSITS FROM THE SURFACE AND TOOLS THEREFOR

(75) Inventor: Joseph A. Zupanick, Pineville, WV (US)

(73) Assignee: Vitruvian Exploration, LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/630,345

(22) Filed: Jul. 29, 2003

(65) Prior Publication Data

US 2004/0108110 A1 Jun. 10, 2004

Related U.S. Application Data

(60) Continuation-in-part of application No. 10/165,627, filed on Jun. 7, 2002, now Pat. No. 6,668,918, which is a continuation of application No. 09/789,956, filed on Feb. 20, 2001, now Pat. No. 6,478,085, which is a division of application No. 09/444,029, filed on Nov. 19, 1999, now Pat. No. 6,357,523, which is a continuation-in-part of application No. 09/197,687, filed on Nov. 20, 1998, now Pat. No. 6,280,000, application No. 10/630,345, which is a continuation-in-part of application No. 09/774,996, filed on Jan. 30, 2001, now Pat. No. 6,662,870, and a continuation-in-part of application No. 10/123,561, filed on Apr. 15, 2002, now Pat. No. 6,604,580, which is a division of application No. 09/773,217, filed on Jan. 30, 2001, now Pat. No. 6,425,448, and a continuation-in-part of application No. 09/885,219, filed on Jun. 20, 2001, now Pat. No. 6,561,288, which is a continuation of application No. 09/444,029, filed on Nov. 19, 1999, now Pat. No. 6,357,523, which is a continuation-in-part of application No. 09/197,687, filed on Nov. 20, 1998, now Pat. No. 6,280,000, (Continued)

(51) Int. Cl.
*E21B 7/04* (2006.01)

(52) U.S. Cl. ........................................ 175/61; 175/71

(58) Field of Classification Search .................... 175/25, 175/48, 61, 62, 65, 69, 71, 72
See application file for complete search history.

(56) References Cited

U.S. PATENT DOCUMENTS 54,144 A 4/1866 Hamar (Continued)

FOREIGN PATENT DOCUMENTS

AU 85/49964 A 11/1986

(Continued)

OTHER PUBLICATIONS

Tver, David. The Petroleum Dictionary, 1980 p. 221.*

(Continued)

*Primary Examiner* — John Kreck
(74) *Attorney, Agent, or Firm* — Fish & Richardson P.C.

(57) ABSTRACT

According to one embodiment, a system for accessing a subterranean zone from the surface includes a well bore extending from the surface to the subterranean zone, and a well bore pattern connected to the junction and operable to drain fluid from a region of the subterranean zone to the junction.

58 Claims, 86 Drawing Sheets

Related U.S. Application Data application No. 10/630,345, which is a continuation-in-part of application No. 10/046,001, filed on Oct. 19, 2001, now Pat. No. 6,681,855, and a continuation-in-part of application No. 10/079,794, filed on Feb. 19, 2002, now Pat. No. 6,988,566, and a continuation-in-part of application No. 10/004,316, filed on Oct. 30, 2001, now Pat. No. 7,048,049, and a continuation-in-part of application No. 10/160,425, filed on May 31, 2002, now Pat. No. 6,962,216, and a continuation-in-part of application No. 10/194,366, filed on Jul. 12, 2002, now Pat. No. 6,708,764, and a continuation-in-part of application No. 10/227,057, filed on Aug. 22, 2002, now abandoned, which is a continuation-in-part of application No. 09/774,996, filed on Jan. 30, 2001, now Pat. No. 6,662,870, application No. 10/630,345, which is a continuation-in-part of application No. 10/323,192, filed on Dec. 18, 2002, now Pat. No. 7,025,154, which is a continuation-in-part of application No. 09/788,897, filed on Feb. 20, 2001, now Pat. No. 6,732,792, which is a division of application No. 09/444,029, filed on Nov. 19, 1999, now Pat. No. 6,357,523, which is a continuation-in-part of application No. 09/197,687, filed on Nov. 20, 1998, now Pat. No. 6,280,000, application No. 10/630,345, which is a continuation-in-part of application No. 10/264,535, filed on Oct. 3, 2002, now Pat. No. 6,988,548, and a continuation-in-part of application No. 10/244,082, filed on Sep. 12, 2002, now Pat. No. 7,073, 595, and a continuation-in-part of application No. 09/769,098, filed on Jan. 24, 2001, now Pat. No. 6,598, 686, which is a continuation-in-part of application No. 09/696,338, filed on Oct. 24, 2000, now Pat. No. 6,454, 000, which is a continuation-in-part of application No. 09/444,029, filed on Nov. 19, 1999, now Pat. No. 6,357, 523, which is a continuation-in-part of application No. 09/197,687, filed on Nov. 20, 1998, now Pat. No. 6,280, 000, application No. 10/630,345, which is a continuation-in-part of application No. 10/003,917, filed on Nov. 1, 2001, which is a continuation-in-part of application No. 09/444,029, filed on Nov. 19, 1999,now Pat. No. 6,357,523, which is a continuation-in-part of application No. 09/197,687, filed on Nov. 20, 1998, now Pat. No. 6,280,000.

(56) References Cited

U.S. PATENT DOCUMENTS 274,740 A 3/1883 Douglass
526,708 A 10/1894 Horton
639,036 A 12/1899 Heald
1,189,560 A 7/1916 Gondos
1,285,347 A 11/1918 Otto
1,467,480 A 9/1923 Hogue
1,485,615 A 3/1924 Jones
1,488,106 A 3/1924 Fitzpatrick
1,520,737 A 12/1924 Wright
1,674,392 A 6/1928 Flansburg
1,777,961 A 10/1930 Capeliuschnicoff
2,018,285 A 10/1935 Schweitzer et al. ............ 166/21
2,069,482 A 2/1937 Seay .............................. 255/76
2,150,228 A 3/1939 Lamb ............................. 166/10
2,169,718 A 8/1939 Boll et al.
2,335,085 A 11/1943 Roberts ......................... 251/197
2,450,223 A 9/1948 Barbour .......................... 255/76
2,452,654 A 11/1948 Hayes et al.
2,490,350 A 12/1949 Grable ............................. 166/4
2,679,903 A 6/1954 McGowen, Jr. et al. .......... 166/1
2,726,063 A 12/1955 Ragland et al. ................ 255/1.8
2,726,847 A 12/1955 McCune et al. ............... 255/1.6
2,783,018 A 2/1957 Lytle .............................. 251/25
2,797,893 A 7/1957 McCune et al.
2,847,189 A 8/1958 Shook ............................ 255/76
2,911,008 A 11/1959 Du Bois .................. 137/625.31
2,934,904 A 5/1960 Hendrix
2,980,142 A 4/1961 Turak ........................ 137/637.3
3,135,293 A 6/1964 Hulsey
3,163,211 A 12/1964 Henley
3,208,537 A 9/1965 Scarborough .................. 175/53
3,347,595 A 10/1967 Dahms et al. ..................... 299/4
3,362,475 A 1/1968 Huitt et al.
3,385,382 A 5/1968 Canalizo et al.
3,406,766 A 10/1968 Henderson
3,443,648 A 5/1969 Howard ........................ 175/103
3,473,571 A 10/1969 Dugay ....................... 137/625.4
3,503,377 A 3/1970 Beatenbough et al. ....... 123/117
3,528,516 A 9/1970 Brown ......................... 175/267
3,530,675 A 9/1970 Turzillo ............................ 61/35
3,534,822 A * 10/1970 Campbell et al. ............... 175/69
3,578,077 A 5/1971 Glenn, Jr. et al.
3,582,138 A 6/1971 Loofbourow et al.
3,587,743 A 6/1971 Howard
3,647,230 A 3/1972 Smedley
3,684,041 A 8/1972 Kammerer, Jr. et al. ...... 175/267
3,687,204 A 8/1972 Marshall et al.
3,692,041 A 9/1972 Bondi .......................... 137/238
3,744,565 A 7/1973 Brown
3,757,876 A 9/1973 Pereau ......................... 175/267
3,757,877 A 9/1973 Leathers ...................... 175/269
3,759,328 A 9/1973 Ueber et al.
3,763,652 A 10/1973 Rinta
3,800,830 A 4/1974 Etter ....................... 137/625.41
3,809,519 A 5/1974 Garner ......................... 425/245
3,825,081 A 7/1974 McMahon ...................... 175/73
3,828,867 A 8/1974 Elwood .......................... 175/45
3,874,413 A 4/1975 Valdez .................... 137/625.47
3,887,008 A 6/1975 Canfield ...................... 166/267
3,902,322 A 9/1975 Watanabe ........................ 61/35
3,907,045 A 9/1975 Dahl et al. ...................... 175/45
3,934,649 A 1/1976 Pasini, III et al. ............ 166/254
3,957,082 A 5/1976 Fuson et al. ............ 137/625.41
3,961,824 A 6/1976 Van Eek et al. ................ 299/17
4,011,890 A 3/1977 Andersson ................ 137/625.4
4,020,901 A 5/1977 Pisio et al.
4,022,279 A 5/1977 Driver .......................... 166/271
4,030,310 A 6/1977 Schirtzinger
4,037,658 A 7/1977 Anderson .................... 166/272
4,060,130 A 11/1977 Hart
4,073,351 A 2/1978 Baum ............................ 175/14
4,089,374 A 5/1978 Terry ........................... 166/259
4,106,575 A 8/1978 Bunnelle
4,116,012 A 9/1978 Abe et al. ..................... 405/238
4,134,463 A * 1/1979 Allen ............................. 175/53
4,136,996 A 1/1979 Burns
4,137,975 A 2/1979 Pennock
4,151,880 A 5/1979 Vann
4,156,437 A 5/1979 Chivens et al. ............... 137/554
4,169,510 A 10/1979 Meigs ............................ 175/65
4,182,423 A 1/1980 Ziebarth et al.
4,189,184 A 2/1980 Green .............................. 299/8
4,220,203 A 9/1980 Steeman ...................... 166/271
4,221,433 A 9/1980 Jacoby ............................. 299/4
4,222,611 A 9/1980 Larson et al.
4,224,989 A 9/1980 Blount ......................... 166/250
4,226,475 A 10/1980 Frosch et al.
4,257,650 A 3/1981 Allen ............................... 299/2
4,278,137 A 7/1981 Van Eek ....................... 175/267
4,283,088 A 8/1981 Tabakov et al. ................... 299/2
4,296,785 A 10/1981 Vitello et al. ................ 141/105
4,296,969 A 10/1981 Willman
4,299,295 A 11/1981 Gossard ......................... 175/45
4,303,127 A 12/1981 Freel et al. .................... 166/266
4,305,464 A 12/1981 Masszi ......................... 166/370
4,312,377 A 1/1982 Knecht ................... 137/625.19
4,317,492 A 3/1982 Summers et al. ............... 175/79
4,328,577 A 5/1982 Abbott et al. ................... 370/84
4,333,539 A 6/1982 Lyons et al. .................... 175/61
4,356,866 A 11/1982 Savins
4,366,988 A 1/1983 Bodine .......................... 299/14

| | | | | |
|---|---|---|---|---|
| 4,372,398 | A | 2/1983 | Kuckes | 175/45 |
| 4,386,665 | A | 6/1983 | Dellinger | 175/61 |
| 4,390,067 | A | 6/1983 | Willman | 166/245 |
| 4,396,075 | A | 8/1983 | Wood et al. | |
| 4,396,076 | A | 8/1983 | Inoue | 175/265 |
| 4,397,360 | A | 8/1983 | Schmidt | 175/61 |
| 4,401,171 | A | 8/1983 | Fuchs | 175/267 |
| 4,407,376 | A | 10/1983 | Inoue | 175/267 |
| 4,415,205 | A | 11/1983 | Rehm et al. | |
| 4,417,829 | A | 11/1983 | Berezoutzky | |
| 4,422,505 | A | 12/1983 | Collins | |
| 4,437,706 | A | 3/1984 | Johnson | 299/7 |
| 4,442,896 | A | 4/1984 | Reale et al. | 166/278 |
| 4,458,767 | A | 7/1984 | Hoehn, Jr. | |
| 4,463,988 | A | 8/1984 | Bouck et al. | |
| 4,494,616 | A | 1/1985 | McKee | 175/67 |
| 4,502,733 | A | 3/1985 | Grubb | |
| 4,512,422 | A | 4/1985 | Knisley | 175/99 |
| 4,519,463 | A | 5/1985 | Schuh | 175/61 |
| 4,527,639 | A | 7/1985 | Dickinson, III et al. | 175/61 |
| 4,532,986 | A | 8/1985 | Mims et al. | 166/50 |
| 4,533,182 | A | 8/1985 | Richards | |
| 4,536,035 | A | 8/1985 | Huffman et al. | |
| 4,544,037 | A | 10/1985 | Terry | 166/369 |
| 4,558,744 | A | 12/1985 | Gibb | 166/335 |
| 4,565,252 | A | 1/1986 | Campbell et al. | 175/269 |
| 4,573,541 | A | 3/1986 | Josse et al. | 175/78 |
| 4,599,172 | A | 7/1986 | Gardes | 210/314 |
| 4,600,061 | A | 7/1986 | Richards | 175/62 |
| 4,603,592 | A | 8/1986 | Siebold et al. | |
| 4,605,067 | A | 8/1986 | Burton, Jr. | |
| 4,605,076 | A | 8/1986 | Goodhart | 175/61 |
| 4,611,855 | A | 9/1986 | Richards | 299/2 |
| 4,618,009 | A | 10/1986 | Carter et al. | 175/267 |
| 4,638,949 | A | 1/1987 | Mancel | 239/307 |
| 4,646,836 | A | 3/1987 | Goodhart | 166/303 |
| 4,651,836 | A * | 3/1987 | Richards | 175/62 |
| 4,662,440 | A | 5/1987 | Harmon et al. | |
| 4,674,579 | A | 6/1987 | Geller et al. | 175/45 |
| 4,676,313 | A | 6/1987 | Rinaldi | |
| 4,702,314 | A | 10/1987 | Huang et al. | 166/245 |
| 4,705,109 | A | 11/1987 | Ledent et al. | |
| 4,705,431 | A | 11/1987 | Gadelle et al. | 405/267 |
| 4,715,440 | A | 12/1987 | Boxell et al. | 166/100 |
| 4,718,485 | A | 1/1988 | Brown et al. | |
| RE32,623 | E | 3/1988 | Marshall et al. | |
| 4,727,937 | A | 3/1988 | Shum et al. | |
| 4,753,485 | A | 6/1988 | Goodhart | |
| 4,754,808 | A | 7/1988 | Harmon et al. | |
| 4,754,819 | A | 7/1988 | Dellinger | 175/61 |
| 4,756,367 | A | 7/1988 | Puri et al. | 166/263 |
| 4,763,734 | A | 8/1988 | Dickinson et al. | 175/61 |
| 4,773,488 | A | 9/1988 | Bell et al. | 175/61 |
| 4,776,638 | A | 10/1988 | Hahn | |
| 4,830,105 | A | 5/1989 | Petermann | 166/241 |
| 4,832,122 | A | 5/1989 | Corey et al. | |
| 4,836,611 | A | 6/1989 | El-Saie | 299/7 |
| 4,842,081 | A | 6/1989 | Parant | 175/23 |
| 4,844,182 | A | 7/1989 | Tolle | 175/215 |
| 4,852,666 | A | 8/1989 | Brunet et al. | 175/61 |
| 4,883,122 | A | 11/1989 | Puri et al. | 166/248 |
| 4,889,186 | A | 12/1989 | Hanson et al. | |
| 4,978,172 | A | 12/1990 | Schwoebel et al. | 299/12 |
| 5,016,709 | A | 5/1991 | Combe et al. | |
| 5,016,710 | A | 5/1991 | Renard et al. | 166/245 |
| 5,033,550 | A | 7/1991 | Johnson et al. | |
| 5,035,605 | A | 7/1991 | Dinerman et al. | 481/18 |
| 5,036,921 | A | 8/1991 | Pittard et al. | 166/298 |
| 5,040,601 | A | 8/1991 | Karlsson et al. | |
| 5,074,360 | A | 12/1991 | Guinn | 166/281 |
| 5,074,365 | A | 12/1991 | Kuckes | 175/40 |
| 5,074,366 | A | 12/1991 | Karlsson et al. | 175/76 |
| 5,082,054 | A | 1/1992 | Kiamanesh | 166/248 |
| 5,111,893 | A | 5/1992 | Kvello-Aune | 175/258 |
| 5,115,872 | A | 5/1992 | Brunet et al. | |
| 5,127,457 | A | 7/1992 | Stewart et al. | |
| 5,135,058 | A | 8/1992 | Millgard et al. | 175/71 |
| 5,148,875 | A | 9/1992 | Karlsson et al. | 175/62 |
| 5,148,877 | A | 9/1992 | MacGregor | |
| 5,165,491 | A | 11/1992 | Wilson | 175/62 |
| 5,168,942 | A | 12/1992 | Wydrinski | 175/50 |
| 5,174,374 | A | 12/1992 | Hailey | 166/55.8 |
| 5,193,620 | A | 3/1993 | Braddick | 166/382 |
| 5,194,859 | A | 3/1993 | Warren | 340/853.4 |
| 5,197,553 | A | 3/1993 | Leturno | 175/57 |
| 5,197,783 | A | 3/1993 | Theimer et al. | 299/17 |
| 5,199,496 | A | 4/1993 | Redus et al. | 166/366 |
| 5,201,817 | A | 4/1993 | Hailey | 175/269 |
| 5,207,271 | A | 5/1993 | Sanchez et al. | |
| 5,217,076 | A | 6/1993 | Masek | 166/303 |
| 5,226,495 | A | 7/1993 | Jennings, Jr. | |
| 5,240,350 | A | 8/1993 | Yamaguchi et al. | 405/143 |
| 5,242,017 | A | 9/1993 | Hailey | 166/55.8 |
| 5,242,025 | A | 9/1993 | Neill et al. | 175/26 |
| 5,246,273 | A | 9/1993 | Rosar | 299/4 |
| 5,255,741 | A | 10/1993 | Alexander | 166/278 |
| 5,271,472 | A | 12/1993 | Leturno | 175/107 |
| 5,287,926 | A | 2/1994 | Grupping | |
| 5,289,888 | A | 3/1994 | Talley | |
| 5,301,760 | A | 4/1994 | Graham | 175/61 |
| 5,343,965 | A | 9/1994 | Talley et al. | |
| 5,355,967 | A * | 10/1994 | Mueller et al. | 175/65 |
| 5,363,927 | A | 11/1994 | Frank | 175/67 |
| 5,385,205 | A | 1/1995 | Hailey | 166/55.8 |
| 5,394,950 | A | 3/1995 | Gardes | 175/45 |
| 5,402,851 | A | 4/1995 | Baiton | 166/369 |
| 5,411,082 | A | 5/1995 | Kennedy | 166/181 |
| 5,411,085 | A | 5/1995 | Moore et al. | 166/242 |
| 5,411,088 | A | 5/1995 | LeBlanc et al. | 166/265 |
| 5,411,104 | A * | 5/1995 | Stanley | 175/65 |
| 5,411,105 | A | 5/1995 | Gray | 175/69 |
| 5,431,220 | A | 7/1995 | Lennon et al. | 166/55.7 |
| 5,431,482 | A | 7/1995 | Russo | |
| 5,435,400 | A * | 7/1995 | Smith | 175/61 |
| 5,447,416 | A | 9/1995 | Wittrisch | 417/442 |
| 5,450,902 | A | 9/1995 | Matthews | 166/268 |
| 5,454,419 | A | 10/1995 | Vloedman | 166/277 |
| 5,458,209 | A | 10/1995 | Hayes et al. | 175/61 |
| 5,462,116 | A | 10/1995 | Carroll | 166/249 |
| 5,462,120 | A | 10/1995 | Gondouin | 166/380 |
| 5,469,155 | A | 11/1995 | Archambeault et al. | 340/853.4 |
| 5,477,923 | A | 12/1995 | Jordan, Jr. et al. | 66/313 |
| 5,485,089 | A | 1/1996 | Kuckes | 324/346 |
| 5,494,121 | A | 2/1996 | Nackerud | 175/263 |
| 5,499,687 | A | 3/1996 | Lee | 175/317 |
| 5,501,273 | A | 3/1996 | Puri | 166/252.5 |
| 5,501,279 | A | 3/1996 | Garg et al. | 166/372 |
| 5,520,252 | A | 5/1996 | McNair | |
| 5,584,605 | A | 12/1996 | Beard et al. | 405/128 |
| 5,613,242 | A | 3/1997 | Oddo | 588/17 |
| 5,615,739 | A | 4/1997 | Dallas | 166/306 |
| 5,653,286 | A | 8/1997 | McCoy et al. | 166/105.5 |
| 5,664,911 | A | 9/1997 | Bridges et al. | |
| 5,669,444 | A | 9/1997 | Riese et al. | 166/263 |
| 5,676,207 | A | 10/1997 | Simon et al. | |
| 5,680,901 | A | 10/1997 | Gardes | 166/313 |
| 5,690,390 | A | 11/1997 | Bithell | 299/4 |
| 5,697,445 | A | 12/1997 | Graham | |
| 5,706,871 | A | 1/1998 | Anderson et al. | 141/59 |
| 5,720,356 | A | 2/1998 | Gardes | 175/62 |
| 5,727,629 | A | 3/1998 | Blizzard, Jr. et al. | 166/298 |
| 5,733,067 | A | 3/1998 | Hunt et al. | |
| 5,735,350 | A | 4/1998 | Longbottom et al. | 166/313 |
| 5,771,976 | A | 6/1998 | Talley | 166/370 |
| 5,775,433 | A | 7/1998 | Hammett et al. | 166/98 |
| 5,775,443 | A * | 7/1998 | Lott | 175/57 |
| 5,785,133 | A | 7/1998 | Murray et al. | 175/61 |
| 5,832,958 | A | 11/1998 | Cheng | 137/625.41 |
| 5,853,054 | A | 12/1998 | McGarian et al. | 175/267 |
| 5,853,056 | A | 12/1998 | Landers | 175/424 |
| 5,853,224 | A | 12/1998 | Riese | |
| 5,863,283 | A | 1/1999 | Gardes | 588/250 |
| 5,868,202 | A | 2/1999 | Hsu | 166/256 |
| 5,868,210 | A | 2/1999 | Johnson et al. | 175/40 |
| 5,879,057 | A | 3/1999 | Schwoebel et al. | 299/17 |
| 5,884,704 | A | 3/1999 | Longbottom et al. | 16/313 |
| 5,917,325 | A | 6/1999 | Smith | 324/326 |
| 5,934,390 | A | 8/1999 | Uthe | 175/67 |

| | | | | |
|---|---|---|---|---|
| 5,938,004 | A | 8/1999 | Roberts et al. | 198/812 |
| 5,941,307 | A | 8/1999 | Tubel | |
| 5,941,308 | A | 8/1999 | Malone et al. | 166/313 |
| 5,944,107 | A | 8/1999 | Ohmer | |
| 5,957,539 | A | 9/1999 | Durup et al. | 299/4 |
| 5,971,074 | A | 10/1999 | Longbottom et al. | 166/313 |
| 5,988,278 | A | 11/1999 | Johnson | |
| 5,992,524 | A | 11/1999 | Graham | |
| 6,012,520 | A | 1/2000 | Yu et al. | 166/245 |
| 6,015,012 | A | 1/2000 | Reddick | 166/313 |
| 6,019,173 | A | 2/2000 | Saurer et al. | |
| 6,024,171 | A | 2/2000 | Montgomery et al. | 166/308 |
| 6,030,048 | A | 2/2000 | Hsu | |
| 6,050,335 | A | 4/2000 | Parsons | 166/272.3 |
| 6,056,059 | A | 5/2000 | Ohmer | 166/313 |
| 6,062,306 | A | 5/2000 | Gano et al. | |
| 6,065,550 | A | 5/2000 | Gardes | 175/62 |
| 6,065,551 | A | 5/2000 | Gourley et al. | |
| 6,079,495 | A | 6/2000 | Ohmer | |
| 6,089,322 | A | 7/2000 | Kelley et al. | |
| 6,119,771 | A | 9/2000 | Gano et al. | 166/50 |
| 6,119,776 | A | 9/2000 | Graham et al. | |
| 6,135,208 | A | 10/2000 | Gano et al. | 166/313 |
| 6,170,571 | B1 | 1/2001 | Ohmer | |
| 6,179,054 | B1 | 1/2001 | Stewart | 166/105.5 |
| 6,189,616 | B1 | 2/2001 | Gano et al. | |
| 6,192,988 | B1 | 2/2001 | Tubel | |
| 6,199,633 | B1 | 3/2001 | Longbottom | |
| 6,209,636 | B1 | 4/2001 | Roberts et al. | 166/117.6 |
| 6,223,839 | B1 | 5/2001 | Fraim et al. | |
| 6,237,284 | B1 | 5/2001 | Erickson | |
| 6,244,340 | B1 | 6/2001 | McGlothen et al. | |
| 6,247,532 | B1 | 6/2001 | Ohmer | |
| 6,250,391 | B1 | 6/2001 | Proudfoot | |
| 6,263,965 | B1 | 7/2001 | Schmidt et al. | |
| 6,279,658 | B1 | 8/2001 | Donovan et al. | |
| 6,280,000 | B1 | 8/2001 | Zupanick | 299/12 |
| 6,283,216 | B1 | 9/2001 | Ohmer | |
| 6,318,457 | B1 | 11/2001 | Den Boer et al. | |
| 6,349,769 | B1 | 2/2002 | Ohmer | 166/313 |
| 6,357,523 | B1 | 3/2002 | Zupanick | 166/52 |
| 6,357,530 | B1 | 3/2002 | Kennedy et al. | 166/369 |
| 6,425,448 | B1 | 7/2002 | Zupanick et al. | 175/61 |
| 6,439,320 | B2 | 8/2002 | Zupanick | 166/313 |
| 6,450,256 | B2 | 9/2002 | Mones | 166/250.01 |
| 6,454,000 | B1 | 9/2002 | Zupanick | 166/243 |
| 6,457,540 | B2 | 10/2002 | Gardes | 175/62 |
| 6,470,978 | B2 | 10/2002 | Trueman et al. | |
| 6,478,085 | B2 | 11/2002 | Zupanick | 166/50 |
| 6,491,101 | B2 | 12/2002 | Ohmer | |
| 6,497,556 | B2 | 12/2002 | Zupanick | 417/85 |
| 6,554,063 | B2 | 4/2003 | Ohmer | |
| 6,557,628 | B2 | 5/2003 | Ohmer | |
| 6,561,288 | B2 | 5/2003 | Zupanick | 175/69 |
| 6,564,867 | B2 | 5/2003 | Ohmer | |
| 6,566,649 | B1 | 5/2003 | Mickael | 250/269.3 |
| 6,571,888 | B2 | 6/2003 | Comeau | 175/61 |
| 6,575,235 | B2 | 6/2003 | Zupanick | 166/50 |
| 6,575,255 | B1 | 6/2003 | Rial et al. | |
| 6,577,129 | B1 | 6/2003 | Thompson | 324/338 |
| 6,581,455 | B1 | 6/2003 | Berger et al. | |
| 6,581,685 | B2 | 6/2003 | Burgess et al. | |
| 6,585,061 | B2 | 7/2003 | Radzinski | 175/45 |
| 6,590,202 | B2 | 7/2003 | Mickael | 250/269.4 |
| 6,591,903 | B2 | 7/2003 | Ingle | 166/50 |
| 6,591,922 | B1 | 7/2003 | Rial et al. | |
| 6,595,301 | B1 | 7/2003 | Diamond et al. | |
| 6,595,302 | B1 | 7/2003 | Diamond et al. | |
| 6,598,686 | B1 | 7/2003 | Zupanick | 175/62 |
| 6,604,580 | B2 | 8/2003 | Zupanick | 166/245 |
| 6,604,910 | B1 | 8/2003 | Zupanick | 417/36 |
| 6,607,042 | B2 | 8/2003 | Hoyer et al. | 175/38 |
| 6,636,159 | B1 | 10/2003 | Winnacker | 340/854.3 |
| 6,639,210 | B2 | 10/2003 | Odom et al. | 250/269.6 |
| 6,644,422 | B1 | 11/2003 | Rial et al. | |
| 6,646,441 | B2 | 11/2003 | Thompson et al. | |
| 6,653,839 | B2 | 11/2003 | Yuratich et al. | 324/355 |
| 6,662,870 | B1 | 12/2003 | Zupanick | 166/245 |
| 6,668,918 | B2 | 12/2003 | Zupanick | 166/50 |
| 6,679,322 | B1 | 1/2004 | Zupanick | 166/50 |
| 6,681,855 | B2 | 1/2004 | Zupanick | 166/50 |
| 6,688,388 | B2 | 2/2004 | Zupanick | 166/50 |
| 6,722,452 | B1 | 4/2004 | Rial et al. | |
| 6,758,279 | B2 | 7/2004 | Moore et al. | |
| RE38,642 | E | 11/2004 | Gondouin | |
| 6,923,275 | B2 * | 8/2005 | Gardes | 175/61 |
| 6,968,893 | B2 | 11/2005 | Rusby et al. | |
| 7,387,165 | B2 | 6/2008 | Lopez de Cardenas et al. | |
| 7,543,648 | B2 | 6/2009 | Hill et al. | |
| 2002/0043404 | A1 | 4/2002 | Trueman et al. | |
| 2002/0050358 | A1 | 5/2002 | Algeroy | 166/313 |
| 2002/0074120 | A1 | 6/2002 | Scott | 166/313 |
| 2002/0074122 | A1 | 6/2002 | Kelly et al. | 166/313 |
| 2002/0096336 | A1 | 7/2002 | Zupanick et al. | |
| 2002/0108746 | A1 | 8/2002 | Zupanick | 166/50 |
| 2002/0117297 | A1 | 8/2002 | Zupanick | 166/50 |
| 2002/0189801 | A1 | 12/2002 | Zupanick | 166/50 |
| 2003/0062198 | A1 | 4/2003 | Gardes | 175/61 |
| 2003/0066686 | A1 | 4/2003 | Conn | 175/57 |
| 2003/0075334 | A1 | 4/2003 | Haugen et al. | 166/313 |
| 2003/0106686 | A1 | 6/2003 | Ingle et al. | 166/245 |
| 2003/0164253 | A1 | 9/2003 | Trueman et al. | |
| 2003/0221836 | A1 | 12/2003 | Gardes | |
| 2003/0234120 | A1 | 12/2003 | Paluch et al. | |
| 2004/0007353 | A1 | 1/2004 | Stave | |
| 2004/0007389 | A1 | 1/2004 | Zupanick | 175/61 |
| 2004/0007390 | A1 | 1/2004 | Zupanick | 175/61 |
| 2004/0011560 | A1 | 1/2004 | Rial et al. | |
| 2004/0031609 | A1 | 2/2004 | Zupanick | |
| 2004/0033557 | A1 | 2/2004 | Scott et al. | |
| 2004/0060351 | A1 | 4/2004 | Gunter et al. | |
| 2004/0140129 | A1 | 7/2004 | Gardes | |
| 2004/0159436 | A1 | 8/2004 | Zupanick | |
| 2004/0226719 | A1 | 11/2004 | Morgan et al. | |
| 2005/0133219 | A1 | 6/2005 | Zupanick | |
| 2005/0189117 | A1 | 9/2005 | Pringle et al. | |
| 2005/0252689 | A1 | 11/2005 | Gardes | |
| 2005/0257962 | A1 | 11/2005 | Zupanick | |
| 2006/0000607 | A1 | 1/2006 | Surjaatmadja et al. | |
| 2006/0096755 | A1 | 5/2006 | Zupanick | |
| 2008/0060571 | A1 | 3/2008 | Zupanick | |
| 2008/0060799 | A1 | 3/2008 | Zupanick | |
| 2008/0060804 | A1 | 3/2008 | Zupanick | |
| 2008/0060805 | A1 | 3/2008 | Zupanick | |
| 2008/0060806 | A1 | 3/2008 | Zupanick | |
| 2008/0060807 | A1 | 3/2008 | Zupanick | |
| 2008/0066903 | A1 | 3/2008 | Zupanick | |
| 2008/0149349 | A1 | 6/2008 | Hiron et al. | |
| 2008/0245525 | A1 | 10/2008 | Rivas et al. | |
| 2009/0084534 | A1 | 4/2009 | Zupanick | |

FOREIGN PATENT DOCUMENTS

| | | | |
|---|---|---|---|
| CA | 2 278 735 | | 1/1998 |
| CA | 2210866 | | 1/1998 |
| CN | 2248254 | Y | 2/1997 |
| CN | 1174587 | A | 2/1998 |
| CN | 1191586 | | 8/1998 |
| DE | CH 653 741 | | 1/1986 |
| DE | 197 25 996 | A1 | 1/1998 |
| EP | 0 819 834 | A1 | 1/1998 |
| EP | 0 875 661 | A1 | 11/1998 |
| EP | 0 952 300 | A1 | 10/1999 |
| EP | 1 316 673 | A2 | 6/2003 |
| FR | 964503 | | 8/1950 |
| GB | 442008 | | 1/1936 |
| GB | 444484 | | 3/1936 |
| GB | 651468 | | 4/1951 |
| GB | 893869 | | 4/1962 |
| GB | 2 255 033 | | 10/1992 |
| GB | 2297 988 | | 8/1996 |
| GB | 2347157 | | 8/2002 |
| RU | 2097536 | C1 | 11/1997 |
| RU | 2136566 | C1 | 9/1999 |
| RU | 2176311 | C2 | 11/2001 |
| RU | 2179234 | C1 | 2/2002 |
| RU | 2205935 | C1 | 6/2003 |
| SU | 750108 | | 6/1975 |
| SU | 876968 | | 10/1981 |

| | | | |
|---|---|---|---|
| SU | 1448078 | A1 | 3/1987 |
| SU | 1448078 | A1 | 12/1988 |
| SU | 1770570 | A1 | 3/1990 |
| SU | 1709076 | A1 | 1/1992 |
| UA | 37720 | A | 5/2001 |
| WO | 94/21889 | | 9/1994 |
| WO | WO 94/28280 | | 12/1994 |
| WO | WO 97/21900 | | 6/1997 |
| WO | WO 98/25005 | | 6/1998 |
| WO | WO 98/35133 | | 8/1998 |
| WO | WO 99/60248 | | 11/1999 |
| WO | 00/31376 | | 6/2000 |
| WO | WO 00/79099 | | 12/2000 |
| WO | WO 01/44620 | | 6/2001 |
| WO | WO 02/18738 | | 3/2002 |
| WO | WO 02/059455 | | 8/2002 |
| WO | WO 03/061238 | | 8/2002 |
| WO | WO 03/038233 | | 5/2003 |
| WO | WO 03/102348 | | 12/2003 |
| WO | WO 2004/035984 | A1 | 4/2004 |
| WO | WO 2005/003509 | A1 | 1/2005 |

OTHER PUBLICATIONS

Declaration under 37 CFR 1.131, part of U.S. Appl. No. 10/372,522. Dated Jan. 31, 2005. 2 pages.*

Notification of Transmittal of the International Search Report or the Declaration (PCT Rule 44.1) mailed Feb. 9, 2004 (6 pages) re International Application No. PCT/US 03/28138, Sep. 9, 2003.

Notification of Transmittal of the International Search Report or the Declaration (PCT Rule 44.1) mailed Feb. 27, 2004 (9 pages) re International Application No. PCT/US 03/30126, Sep. 23, 2003.

Fletcher, "Anadarko Cuts Gas Route Under Canadian River Gorge," Oil and Gas Journal, pp. 28-30, Jan. 25, 2004.

Translation of selected pages of Kalinin, et al., "Drilling Inclined and Horizontal Well Bores," Nedra Publishers, Moscow, 1997, 15 pages.

Translation of selected pages of Arens, V.Zh., "Well-Drilling Recovery of Minerals," Geotechnology, Nedra Publishers, Moscow, 7 pages, 1986.

Examiner of Record, Office Action Response regarding the Interpretation of the three Russian Patent Applications listed above under Foreign Patent Documents (9 pages).

McCray and Cole, "Oil Well Drilling and Technology," University of Oklahoma Press, pp. 315-319, 1959.

Berger and Anderson, "Modern Petroleum;" Penn Well Books, pp. 106-108, 1978.

Arfon H. Jones et al., A Review of the Physical and Mechanical Properties of Coal with Implications for Coal-Bed Methane Well Completion and Production, Rocky Mountain Association of Geologists, pp. 169-181, 1988.

Howard L. Hartman, et al.; "SME Mining Engineering Handbook;" Society for Mining, Metallurgy, and Exploration, Inc.; pp. 1946-1950, 2nd Edition, vol. 2, 1992.

Dave Hassan, Mike Chernichen, Earl Jensen, and Morley Frank; "Multi-lateral technique lowers drilling costs, provides environmental benefits", Drilling Technology, pp. 41-47, Oct. 1999.

Gopal Ramaswamy, "Production History Provides CBM Insights," Oil & Gas Journal, pp. 49, 50 and 52, Apr. 2, 2001.

Weiguo Chi and Luwu Yang, "Feasibility of Coalbed Methane Exploitation in China," Horizontal Well Technology, p. 74, Sep. 2001.

Nackerud Product Description, Harvest Tool Company, LLC, 1 page, Received Sep. 27, 2001.

Gopal Ramaswamy, "Advanced Key for Coalbed Methane," The American Oil & Gas Reporter, pp. 71 & 73, Oct. 2001.

Joseph C. Stevens, Horizontal Applications For Coal Bed Methane Recovery, Strategic Research Institute, pp. 1-10 (slides), Mar. 25, 2002.

R.J. "Bob" Stayton, "Horizontal Wells Boost CBM Recovery", Special Report: Horizontal & Directional Drilling, The American Oil & Gas Reporter, pp. 71-75, Aug. 2002.

P. Jackson and S. Kershaw, Reducing Long Term Methane Emissions Resulting from Coal Mining, Energy Convers. Mgmt, vol. 37, Nos. 6-8, pp. 801-806, 1996.

Susan Eaton, "Reversal of Fortune", New Technology Magazine, pp. 30-31, Sep. 2002.

James Mahony, "A Shadow of Things to Come", New Technology Magazine, pp. 28-29, Sep. 2002.

Documents Received from Third Party, Great Lakes Directional Drilling, Inc., (12 pages), Received Sep. 12, 2002.

Robert W. Taylor and Richard Russell, Multilateral Technologies Increase Operational Efficiencies in Middle East, Oil & Gas Journal, pp. 76-80, Mar. 16, 1998.

Adam Pasiczynk, "Evolution Simplifies Multilateral Wells", Directional Drilling, pp. 53-55, Jun. 2000.

Steven S. Bell, "Multilateral System with Full Re-Entry Acccss Installed", World Oil, p. 29, Jun. 1996.

Pascal Breant, "Des Puits Branches, Chez Total : les puits multi drains", Total Exploration Production, pp. 1-5, Jan. 1999.

Chi, Weiguo, "*A Feasible Discussion on Exploitation Coalbed Methane through Horizontal Network Drilling in China*", SPE 64709, Society of Petroleum Engineers (SPE International), 4 pages, Nov. 7, 2000.

Chi, Weiguo, "*Feasibility of Coalbed Methane Exploitation in China*", synopsis of paper SPE 64709, 1 page, Nov. 7, 2000.

Ian D. Palmer et al., "*Coalbed Methane Well Completions and Stimulations*", Chapter 14, pp. 303-339, Hydrocarbons from Coal, Published by the American Association of Petroleum Geologists, 1993.

Zupanick, U.S. Appl. No. 10/264,535, "Method and System for Removing Fluid From a Subterranean Zone Using an Enlarged Cavity", Aug. 15, 2003.

Notification of Transmittal of the International Search Report or the Declaration (PCT Rule 44.1) mailed Nov. 6, 2003 (8 pages) re International Application No. PCT/US 03/21626, Jul. 11, 2003.

Notification of Transmittal of the International Search Report or the Declaration (PCT Rule 44.1) mailed Nov. 5, 2003 (8 pages) re International Application No. PCT/US 03/21627, Jul. 11, 2003.

Notification of Transmittal of the International Search Report or the Declaration (PCT Rule 44.1) mailed Nov. 4, 2003 (7 pages) re International Application No. PCT/US 03/21628, Jul. 11, 2003.

Notification of Transmittal of the International Search Report or the Declaration (PCT Rule 44.1) mailed Dec. 5, 2003 (8 pages) re International Application No. PCT/US 03/21750, Jul. 11, 2003.

Notification of Transmittal of the International Search Report or the Declaration (PCT Rule 44.1) mailed Dec. 19, 2003 (8 pages) re International Application No. PCT/US 03/28137, Filed Sep. 9, 2003.

Notification of Transmittal of the International Search Report or the Declaration (PCT Rule 44.1) mailed Feb. 4, 2004 (8 pages) re International Application No. PCT/US 03/26124, Filed Sep. 9, 2003.

Smith, Maurice, "*Chasing Unconventional Gas Unconventionally*," CBM Gas Technology, New Technology Magazine, Oct./Nov. 2003, pp. 1-4.

Gardes, Robert "*A New Direction in Coalbed Methane and Shale Gas Recovery*," (to the best of Applicants' recollection, first received at The Canadian Institute Coalbed Methane Symposium conference on Jun. 16 and Jun. 17, 2002), 1 page of conference flyer, 6 pages of document.

Gardes, Robert, "*Under-Balance Multi-Lateral Drilling for Unconventional Gas Recovery*," (to the best of Applicants' recollection, first received at The Unconventional Gas Revolution conference on Dec. 9, 2003), 4 pages of conference flyer, 33 pages of document.

Boyce, Richard "*High Resolution Selsmic Imaging Programs for Coalbed Methane Development*," (to the best of Applicants' recollection, first received at The Unconventional Gas Revolution conference on Dec. 10, 2003), 4 pages of conference flyer, 24 pages of document.

Mark Mazzella and David Strickland, "*Well Control Operations on a Multiwell Platform Blowout*," WorldOil.com—Online Magazine Article, vol. 22, Part I—pp. 1-7, and Part II—pp. 1-13, Jan. 2002.

Vector Magnetics LLC, Case History, California, May 1999, "*Successful Kill of a Surface Blowout*," pp. 1-12.

Cudd Pressure Control, Inc, "*Successful Well Control Operations-A Case Study: Surface and Subsurface Well Intervention on a Multi-Well Offshore Platform Blowout and Fire*," pp. 1-17, http://www.cuddwellcontrol.com/literature/successful/successful_well.htm, 2000.

R. Purl, et al., "*Damage to Coal Permeability During Hydraulic Fracturing*," pp. 109-115 (SPE 21813), 1991.
U.S. Dept. of Energy—Office of Fossil Energy, "*Multi-Seam Well Completion Technology: Implications for Powder River Basin Coalbed Methane Production*," pp. 1-100, A-1 through A10, Sep. 2003.
U.S. Dept. of Energy—Office of Fossil Energy, "*Powder River Basin Coalbed Methane Development and Produced Water Management Study*," pp. 1-111, A-1 through A14, Sep. 2003.
Zupanick, U.S. Patent Application, entitled "Method and System for Underground Treatment of Materials," U.S. Appl. No. 10/142,817, May 8, 2002.
Zupanick, U.S. Patent Application, entitled "Multi-Well Structure for Accessing Subterranean Deposits," U.S. Appl. No. 09/788,897, Feb. 20, 2001.
Zupanick, U.S. Patent Application, entitled "Slant Entry Well System and Method," U.S. Appl. No. 10/004,316, Oct. 30, 2001.
Zupanick, U.S. Patent Application, entitled "Undulating Well Bore", U.S. Appl. No. 10/194,366, Jul. 12, 2002.
Zupanick, U.S. Patent Application, entitled "Accelerated Production of Gas from a Subterranean Surface", U.S. Appl. No. 10/246,052, Sep. 17, 2002.
Zupanick, U.S. Patent Application, entitled "Ramping Well Bores", U.S. Appl. No. 10/194,367, Jul. 12, 2002.
Zupanick, U.S. Patent Application, entitled "System and Method for Subterranean Access", U.S. Appl. No. 10/227,057, Aug. 22, 2002.
Zupanick, U.S. Patent Application, entitled "Method and System for Controlling Pressure in a Dual Well System", U.S. Appl. No. 10/244,082, Sep. 12, 2002.
Zupanick, U.S. Patent Application, entitled "Wellbore Sealing System and Method," U.S. Appl. No. 10/194,368, Jul. 12, 2002.
Zupanick, U.S. Patent Application, entitled "Wellbore Sealing System and Method," U.S. Appl. No. 10/194,422 Published, Jul. 12, 2002.
Zupanick, U.S. Patent Application, entitled "Three-Dimensional Well System for Accessing Subterranean Zones," U.S. Appl. No. 10/244,083, Sep. 12, 2002.
Zupanick, U.S. Patent Application, entitled "Method of Drilling Lateral Wellbores from a Slant Well Without Utilizing a Whipstock", U.S. Appl. No. 10/267,426, Oct. 8, 2002.
Zupanick, U.S. Patent Application, entitled "Method and System for Circulating Fluid in a Well System", U.S. Appl. No. 10/323,192, Dec. 18, 2002.
Zupanick, U.S. Patent Application, entitled "Method and System for Removing Fluid from a Subterranean Zone Using and Enlarged Cavity", U.S. Appl. No. 10/264,535, Oct. 3, 2002.
Zupanick, U.S. Patent Application, entitled Method and System for Controlling the Production Rate . . . , U.S. Appl. No. 10/328,408, Dec. 23, 2002.
Rial, U.S. Patent Application, entitled Method and System for Accessing a Subterranean Zone from a Limited Surface Area, U.S. Appl. No. 10/188,141, Jul. 1, 2002.
Rial, U.S. Patent Application, entitled "Method and System for Recirculating Fluid in a Well System," U.S. Appl. No. 10/457,103, Jun. 5, 2003.
Zupanick, U.S. Patent Application, entitled "Wellbore Sealing System and Method," U.S. Appl. No. 10/406,037 Published, Jul. 12, 2002.
B. Goktas et al., "*Performances of Openhole Completed and Cased Horizontal/Undulating Wells in Thin-Bedded, Tight Sand Gas Reservoirs*," SPE 65619, Society of Petroleum Engineers, Oct. 17-19, 2000 (7 pages).
Balbinski, E.F., "*Prediction of Offshore Viscous Oil Field Performance*," European Symposium on Improved Oil Recovery, Aug. 18-20, 1999, 10 pages.
Notification of Transmittal of the International Search Report or the Declaration (PCT Rule 44.1) (3 pages) and International Search Report (7 pages) re International Application No. PCT/US 03/04771 mailed Jul. 4, 2003.
Notification of Transmittal of the International Search Report or the Declaration (PCT Rule 44.1) (3 pages) and International Search Report (5 pages) re International Application No. PCT/US 03/21891 mailed Nov. 13, 2003.
Notification of Transmittal of the International Search Report or the Declaration (PCT Rule 44.1) (3 pages) and International Search Report (4 pages) re International Application No. PCT/US 03/38383 mailed Jun. 2, 2004.
Kalinin, et al., Translation of Selected Pages from Ch. 4, Sections 4.2 (p. 135), 10.1 (p. 402), 10.4 (pp. 418-419), "*Drilling Inclined and Horizontal Well Bores*," Moscow, Nedra Publishers, 1997, 4 pages.
Jet Lavanway Exploration, "*Well Survey*," Key Energy Surveys, Nov. 2, 1997, 3 pages.
Precision Drilling, "*We Have Roots in Coal Bed Methane Drilling*," Technology Services Group, Published on or before Aug. 5, 2002, 1 page.
U.S. Dept. of Energy, "*New Breed of CBM/CMM Recovery Technology*," Jul. 2003, 1 page.
Ghiselin, Dick, "*Unconventional Vision Frees Gas Reserves*," Natural Gas Quarterly, Sep. 2003, 2 pages.
CBM Review, World Coal, "*US Drilling into Asia*," Jun. 2003, 4 pages.
Skrebowski, Chris, "*US Interest in North Korean Reserves*," Petroleum, Energy Institute, Jul. 2003, 4 pages.
Pauley, Steven, U.S. Patent Application entitled "Multi-Purpose Well Bores and Method for Accessing a Subterranean Zone From the Surface," U.S. Appl. No. 10/715,300, filed Nov. 17, 2003 (34 pages).
Seams, Douglas, U.S. Patent Application entitled "Method and System for Extraction of Resources from a Subterranean Well Bore," U.S. Appl. No. 10/723,322, filed Nov. 26, 2003 (40 pages).
Zupanick, U.S. Patent Application entitled "Slant Entry Well System and Method," U.S. Appl. No. 10/749,884, filed Dec. 31, 2003 (28 pages).
Zupanick, U.S. Patent Application entitled "Method and System for Accessing Subterranean Deposits from the Surface," U.S. Appl. No. 10/761,629, filed Jan. 20, 2004 (38 pages).
Zupanick, U.S. Patent Application entitled "Method and System for Testing a Partially Formed Hydrocarbon Well for Evaluation and Well Planning Refinement," U.S. Appl. No. 10/769,221, filed Jan. 30, 2004 (34 pages).
Platt, "Method and System for Lining Multilateral Wells," U.S. Appl. No. 10/772,841, filed Feb. 5, 2004 (30 pages).
Zupanick, "System and Method for Directional Drilling Utilizing Clutch Assembly," U.S. Appl. No. 10/811,118, filed Mar. 25, 2004 (35 pages).
Zupanick et al., "Slot Cavity," U.S. Appl. No. 10/419,529, filed Apr. 21, 2003 (44 pages).
Zupanick, "System and Method for Multiple Wells from a Common Surface Location," U.S. Appl. No. 10/788,694, filed Feb. 27, 2004 (26 pages).
Field, T.W., "*Surface to In-seam Drilling—The Australian Experience*," Undated, 10 pages.
Drawings included in CBM well permit issued to CNX stamped Apr. 15, 2004 by the West Virginia Department of Environmenal Protection (5 pages).
Website of Mitchell Drilling Contractors, "*Services: Dymaxion—Surface to In-seam*," http://www.mitchell drilling.com/dymaxion.htm, printed as of Jun. 17, 2004, 4 pages.
Website of CH4, "About Natural Gas—Technology," http://www.ch4.com.au/ng_technology.html, copyright 2003, printed as of Jun. 17, 2004, 4 pages.
Thomson, et al., "*The Application of Medium Radius Directional Drilling for Coal Bed Methane Extraction*," Lucas Technical Paper, copyrighted 2003, 11 pages.
U.S. Department of Energy, DE-FC26-01NT41148, "*Enhanced Coal Bed Methane Production and Sequestration of CO2 in Unmineable Coal Seams*" for Consol, Inc., accepted Oct. 1, 2001, 48 pages.
U.S. Department of Energy, "*Slant Hole Drilling*," Mar. 1999, 1 page.
Desai, Praful, et al., "*Innovative Design Allows Construction of Level 3 or Level 4 Junction Using the Same Platform*," SPE/Petroleum Society of CIM/CHOA 78965, Canadian Heavy Oil Association, 2002, pp. 1-11.
Bybee, Karen, "*Advanced Openhole Multilaterals*," Horizontal Wells, Nov. 2002, pp. 41-42.
Bybee, Karen, "*A New Generation Multilateral System for the Troll Olje Field*," Multilateral/Extended Reach, Jul. 2002, 2 pages.

Emerson,, A.B., et al., "*Moving Toward Simpler, Highly Functional Multilateral Completions*," Technical Note, Journal of Canadian Petroleum Technology, May 2002, vol. 41, No. 5, pp. 9-12.
Moritis, Guntis, "*Complex Well Geometries Boost Orinoco Heavy Oil Producing Rates*," XP-000969491, Oil & Gas Journal, Feb. 28, 2000, pp. 42-46.
Themig, Dan, "*Multilateral Thinking*," New Technology Magazine, Dec. 1999, pp. 24-25.
Smith, R.C., et al., "*The Lateral Tie-Back System: The Ability to Drill and Case Multiple Laterals*," IADC/SPE 27436, Society of Petroleum Engineers, 1994, pp. 55-64, plus Multilateral Services Profile (1 page) and Multilateral Services Specifications (1 page).
Notification of Transmittal of the International Search Report or the Declaration (PCT Rule 44.1) (3 pages) and International Search Report (4 pages) re International Application No. PCT/US 03/13954 mailed Sep. 1, 2003.
Logan, Terry L., "*Drilling Techniques for Coalbed Methane*," Hydrocarbons From Coal, Chapter 12, Copyright 1993, Title Page, Copyright Page, pp. 269-285.
Hanes, John, "*Outbursts in Leichhardt Colliery: Lessons Learned*," International Symposium-Cum-Workshop on Management and Control of High Gas Emissions and Outbursts in Underground Coal Mines, Wollongong, NSW, Australia, Mar. 20-24, 1995, Title page, pp. 445-449.
Williams, Ray, et al., "*Gas Reservoir Properties for Mine Gas Emission Assessment*," Bowen Basin Symposium 2000, pp. 325-333.
Brown, K., et al., "*New South Wales Coal Seam Methane Potential*," Petroleum Bulletin 2, Department of Mineral Resources, Discovery 2000, Mar. 1996, pp. i-viii, 1-96.
Fipke, S., et al., "*Economical Multilateral Well Technology for Canadian Heavy Oil*," Petroleum Society, Canadian Institute of Mining, Metallurgy & Petroleum, Paper 2002-100, to be presented in Calgary Alberta, Jun. 11-13, 2002, pp. 1-11.
PowerPoint Presentation entitled, "Horizontal Coalbed Methane Wells," by Bob Stayton, Computalog Drilling Services, date is believed to have been in 2002.
Denney, Dennis, "*Drilling Maximum-reservoir-Contact Wells in the Shaybah Field*," SPE 85307, pp. 60, 62-63, Oct. 20, 2003.
Notification of Transmittal of the International Search Report and the Written Opinion of the International Searching Authority, or the Declaration (3 pages), International Search Report (5 pages) and Written Opinion of the International Searching Authority (6 pages) re International Application No. PCT/US2004/012029 mailed Sep. 22, 2004.
Brunner, D.J. and Schwoebel, J.J., "Directional Drilling for Methane Drainage and Exploration in Advance of Mining," REI Drilling Directional Underground, World Coal, 1999, 10 pages.
Thakur, P.C., "A History of Coalbed Methane Drainage From United States Coal Mines," 2003 SME Annual Meeting, Feb. 24-26, Cincinnati, Ohio, 4 pages.
U.S. Climate Change Technology Program, "Technology Options for the Near and Long Term," 4.1.5 Advances in Coal Mine Methane Recovery Systems, pp. 162-164.
Notification of Transmittal of the International Search Report and the Written Opinion of the International Searching Authority, or the Declaration (3 pages), International Search Report (3 pages) and Written Opinion of the International Searching Authority (7 pages) re International Application No. PCT/US2004/017048 mailed Oct. 21, 2004.
Gardes, Robert, "Multi-Seam Completion Technology," Natural Gas Quarterly, E&P, Jun. 2004, pp. 78-81.
Baiton, Nicholas, "Maximize Oil Production and Recovery," Vertizontal Brochure, 4 pages.
Dreiling, Tim, McClelland, M.L. and Bilyeu, Brad, "Horizontal & High Angle Air Drilling in the San Juan Basin, New Mexico," Dated on or about Mar. 6, 2003, pp. 1-11.
Fong, David K., Wong, Frank Y., and McIntyre, Frank J., "An Unexpected Benefit of Horizontal Wells on Offset Vertical Well Productivity in Vertical Miscible Floods," Canadian SPE/CIM/CANMET Paper No. HWC94-09, paper to be presented Mar. 20-23, 1994, Calgary, Canada, 10 pages.
Fischer, Perry A., "What's Happening in Production," World Oil, Jun. 2001, p. 27.
Website of PTTC Network News vol. 7, 1st Quarter 2001, Table of Contents, http://www.pttc.org/../news/v7n1nn4.htm printed Apr. 25, 2003, 3 pages.
Cox, Richard J.W., "Testing Horizontal Wells While Drilling Underbalanced," Delft University of Technology, Aug. 1998, 68 pages.
McLennan, John, et al., "Underbalanced Drilling Manual," Gas Research Institute, Chicago, Illinois, GRI Reference No. GRI-97/0236, copyright 1997, 502 pages.
The Need for a Viable Multi-Seam Completion Technology for the Powder River Basin, Current Practice and Limitations, Gardes Energy Services, Inc., Believed to be 2003 (8 pages).
Langley, Diane, "Potential Impact of Microholes Is Far From Diminutive," JPT Online, http://www.spe.org/spe/jpt/jps, Nov. 2004 (5 pages).
Consol Energy Slides, "Generating Solutions, Fueling Change," Presented at Appalachian E&P Forum, Harris Nesbitt Corp., Boston, Oct. 14, 2004 (29 pages).
Notification of Transmittal of the International Search Report and the Written Opinion of the International Searching Authority, or the Declaration (3 pages), International Search Report (3 pages), and Written Opinion of the International Searching Authority (5 pages) re International Application No. PCT/US2004/024518 mailed Nov. 10, 2004.
Schenk, Christopher J., "Geologic Definition and Resource Assessment of Continuous (Unconventional) Gas Accumulations—the U.S. Experience," Website, http://aapg.confex.com/...//, printed Nov. 16, 2004 (1 page).
U.S. Department of Interior, U.S. Geological Survey, "Characteristics of Discrete and Basin-Centered Parts of the Lower Silurian Regional Oil and Gas Accumulation, Appalachian Basin: Preliminary Results From a Data Set of 25 oil and Gas Fields," U.S. Geological Survey Open-File Report 98-216, Website, http://pubs.usgs.gov/of/1998/of98-216/introl.htm, printed Nov. 16, 2004 (2 pages).
Zupanick, J., "Coalbed Methane Extraction," 28th Mineral Law Conference, Lexington, Kentucky, Oct. 16-17, 2003 (48 pages).
Zupanick, J., "CDX Gas—Pinnacle Project," Presentation at the 2002 Fall Meeting of North American Coal Bed Methane Forum, Morgantown, West Virginia, Oct. 30, 2002 (23 pages).
Lukas, Andrew, Lucas Drilling Pty Ltd., "Technical Innovation and Engineering Xstrata—Oaky Creek Coal Pty Limited," Presentation at Coal Seam Gas & Mine Methane Conference in Brisbane, Nov. 22-23, 2004 (51 pages).
Field, Tony, Mitchell Drilling, "Let's Get Technical—Drilling Breakthroughs in Surface to In-Seam in Australia," Presentation at Coal Seam Gas & Mine Methane Conference in Brisbane, Nov. 22-23, 2004 (20 pages).
The Official Newsletter of the Cooperative Research Centre for Mining Technology and Equipment, CMTE News 7, "Tight-Radius Drilling Clinches Award," Jun. 2001, 1 page.
Listing of 174 References received from Third Party on Feb. 16, 2005 (9 pages).
Gardes Directional Drilling, "Multiple Directional Wells From Single Borehole Developed," Reprinted from Jul. 1989 edition of Offshore, Copyright 1989 by PennWell Publishing Company (4 pages).
"Economic Justification and Modeling of Multilateral Wells," Economic Analysis, Hart's Petroleum Engineer International, 1997 (4 pages).
Mike Chambers, "Multi-Lateral Completions at Mobil Past, Present, and Future," presented at the 1998 Summit on E&P Drilling Technologies, Strategic Research Institute, Aug. 18-19, 1998 in San Antonio, Texas (26 pages).
David C. Oyler and William P. Diamond, "Drilling a Horizontal Coalbed Methane Drainage System From a Directional Surface Borehole," PB82221516, National Technical Information Service, Bureau of Mines, Pittsburgh, PA, Pittsburgh Research Center, Apr. 1982 (56 pages).
P. Corlay, D. Bossie-Codreanu, J.C. Sabathier and E.R. Delamaide, "Improving Reservoir Management With Complex Well Architectures," Field Production & Reservoir Management, World Oil, Jan. 1997 (5 pages).

Eric R. Skonberg and Hugh W. O'Donnell, "Horizontal Drilling for Underground Coal Gasification," presented at the Eighth Underground Coal Conversion Symposium, Keystone, Colorado, Aug. 16, 1982 (8 pages).
Gamal Ismail, A.S. Fada'q, S. Kikuchi, H. El Khatib, "Ten Years Experience in Horizontal Application & Pushing the Limits of Well Construction Approach in Upper Zakum Field (Offshore Abu Dhabi)," SPE 87284, Society of Petroleum Engineers, Oct. 2000 (17 pages).
Gamal Ismail, H. El-Khatib—Zadco, Abu Dhabi, UAE, "Multi-Lateral Horizontal Drilling Problems & Solutions Experienced Offshore Abu Dhabi," SPE 36252, Society of Petroleum Engineers, Oct. 1996 (12 pages).
C.M. Matthews and L.J. Dunn, "Drilling and Production Practices to Mitigate Sucker Rod/Tubing Wear-Related Failures in Directional Wells," SPE 22852, Society of Petroleum Engineers, Oct. 1991 (12 pages).
H.H. Fields, Stephen Krickovic, Albert Sainato, and M.G. Zabetakis, "Degasification of Virgin Pittsburgh Coalbed Through a Large Borehole," RI-7800, Bureau of Mines Report of Investigations/1973, United States Department of the Interior, 1973 (31 pages).
William P. Diamond, "Methane Control for Underground Coal Mines," IC-9395, Bureau of Mines Information Circular, United States Department of the Interior, 1994 (51 pages).
Technology Scene Drilling & Intervention Services, "Weatherford Moves Into Advanced Multilateral Well Completion Technology" and "Productivity Gains and Safety Record Speed Acceptance of UBS," *Reservoir Mechanics*, Weatherford International, Inc., 2000 Annual Report (2 pages).
"A Different Direction for CBM Wells," *W Magazine*, 2004 Third Quarter (5 pages).
Snyder, Robert E., "What's New in Production," *WorldOil Magazine*, Feb. 2005, [printed from the intemet on Mar. 7, 2005], http://www.worldoil.com/magazine/MAGAZINE_DETAIL.asp?ART_ID=2507@MONTH_YEAR (3 pages).
Nazzal, Greg, "Moving Multilateral Systems to the Next Level, Strategic Acquisition Expands Weatherford's Capabilities," 2000 (2 pages).
Bahr, Angie, "Methane Draining Technology Boosts Safety and Energy Production," Energy Review, Feb. 4, 2005, Website: www.energyreview.net/storyviewprint.asp, printed Feb. 7, 2005 (2 pages).
Molvar, Erik M., "Drilling Smarter: Using Directional Drilling to Reduce Oil and Gas Impacts in the Intermountain West," Prepared by Biodiversity Conservation Alliance, Report issued Feb. 18, 2003, 34 pages.
King, Robert F., "Drilling Sideways—A Review of Horizontal Well Technology and Its Domestic Application," DOE/EIA-TR-0565, U.S. Department of Energy, Apr. 1993, 30 pages.
Santos, Helio, SPE, Impact Engineering Solutions and Jesus Olaya, Ecopetrol/ICP, "*No-Damage Drilling: How to Achieve this Challenging Goal?*," SPE 77189, Copyright 2002, presented at the IADC/SPE Asia Pacific Drilling Technology, Jakarta, Indonesia, Sep. 9-11, 2002, 10 pages.
Santos, Helio, SPE, Impact Engineering Solutions, "*Increasing Leakoff Pressure with New Class of Drilling Fluid*" SPE 78243, Copyright 2002, presented at the SPE/ISRM Rock Mechanics Conference in Irving, Texas, Oct. 20-23, 2002, 7 pages.
Franck Labenski, Paul Reid, SPE, and Helio Santos, SPE, Impact Solutions Group, "*Drilling Fluids Approaches for Control of Wellbore Instability in Fractured Formations*," SPE/IADC 85304, Society of Petroleum Engineers, Copyright 2003, presented at the SPE/IADC Middle East Drilling Technology Conference & Exhibition in Abu Chabi, UAE, Oct. 20-22, 2003, 8 pages.
P. Reid, SPE, and H. Santos, SPE, Impact Solutions Group, "*Novel Drilling, Completion and Workover Fluids for Depleted Zones: Avoiding Losses, Formation Damage and Stuck Pipe*," SPE/IADC 85326, Society of Petroleum Engineers, Copyright 2003, presented at the SPE/IADC Middle East Drilling Conference & Exhibition in Abu Chabi, UAE, Oct. 20-22, 2003, 9 pages.
Craig C. White and Adrian P. Chesters, NAM; Catalin D. Ivan, Sven Maikranz and Rob Nouris, M-I L.L.C., "*Aphron-based drilling fluid: Novel technology for drilling depleted formations*," World Oil, Drilling Report Special Focus, Oct. 2003, 6 pages.
U.S. Environmental Protection Agency, "Directional Drilling Technology," prepared for the EPA by Advanced Resources International under Contract 68-W-00-094, Coalbed Methane Outreach Program (CMOP), Website: http://search.epa.gov/s97is.vts, printed Mar. 17, 2005, 13 pages.
Logan, Terry L., "Horizontal Drainhole Drilling Techniques Used in Rocky Mountain Coal Seams," *Geology and Coal-Bed Methane Resources of the Northern San Juan Basin*, Colorado and New Mexico, published by Rocky Mountain Association of Geologists, 1988, cover and pp. 133-142.
Leazer, Clint, and Marquez, Michael R., "Short-Radius Drilling Expands Horizontal Well Applications," *Petroleum Engineer International*, cover, news highlights page, and pp. 21, 23-24 and 26, Apr. 1995.
"Meridian Tests New Technology," *Western Oil World*, cover, table of contents and p. 13, Jun. 1990.
Dreiling, Tim, McClelland, M.L. and Bilyeu, Brad, "Horizontal & High Angle Air Drilling in the San Juan Basin, New Mexico," Believed to be dated Apr. 1996, pp. 1-11.
Robert E. Snyder, "Drilling Advances," World Oil, Oct. 2003, 1 page.
Daniel J. Brunner, Jeffrey J. Schwoebel, and Scott Thomson, "Directional Drilling for Methane Drainage & Exploration in Advance of Mining," Website: http://www.advminingtech.com.au/Paper4.htm, printed Apr. 6, 2005, Copyright 1999, Last modified Aug. 7, 2002 (8 pages).
Karen Bybee, highlights of paper SPE 84424, "Coalbed-Methane Reservoir Simulation: An Evolving Science," by T.L. Hower, JPT Online, Apr. 2004, Website: http://www.spe.org/spe/jpt/jsp/jptpapersynopsis/0,2439,1104_11038_2354946_2395832,00.html, printed Apr. 14, 2005, 4 pages.
Kevin Meaney and Lincoln Paterson, "Relative Permeability in Coal," SPE 36986, Society of Petroleum Engineers, Copyright 1996, pp. 231-236.
Calendar of Events—Conference Agenda, Fifth Annual Unconventional Gas and Coalbed Methane Conference, Oct. 22-24, 2003, in Calgary Alberta, Website: http://www.csug.ca/cal/calc0301a.html, printed Mar. 17, 2005, 5 pages.
Tom Engler and Kent Perry, "Creating a Roadmap for Unconventional Gas R&D," Gas TIPS, Fall 2002, pp. 16-20.
CSIRO Petroleum—SIMEDWin, "Summary of SIMEDWin Capabilities," Copyright 1997-2005, Website: http://www.dpr.csiro.au/ourcapabilities/petroleumgeoengineering/reservoirengineering/projects/simedwin/assets/simed/index.html, printed Mar. 17, 2005, 10 pages.
Solutions From the Field, "Coalbed Methane Resources in the Southeast," Copyright 2004, Website: http://www.pttc.org/solutions/sol_2004/537.htm, printed Mar. 17, 2005, 7 pages.
Jeffrey R. Levine, Ph.D., "Matrix Shrinkage Coefficient," Undated, 3 pages.
G. Twombly, S.H. Stepanek, T.A. Moore, Coalbed Methane Potential in the Waikato Coalfield of New Zealand: A Comparison With Developed Basins in the United States, 2004 New Zealand Petroleum Conference Proceedings, Mar. 7-10, 2004, pp. 1-6.
R.W. Cade, "Horizontal Wells: Development and Applications," Presented at the Fifth International Symposium on Geophysics for Mineral, Geotechnical and Environmental Applications, Oct. 24-28, 1993 in Tulsa, Oklahoma, Website: http://www.mgls.org/93Sym/Cade/cade.html, printed Mar. 17, 2005, 6 pages.
Solutions From the Field, "Horizontal Drilling, A Technology Update for the Appalachian Basin," Copyright 2004, Website: http://www.pttc.org/solutions/sol_2004/535.htm, printed Mar. 17, 2005, 6 pages.
R. Purl, J.C. Evanoff and M.L. Brugler, "Measurement of Coal Cleat Porosity and Relative Permeability Characteristics," SPE 21491, Society of Petroleum Engineers, Copyright 1991, pp. 93-104.
Peter Jackson, "Drilling Technologies for Underground Coal Gasification," IMC Geophysics Ltd., International UCG Workshop—Oct. 2003 (20 pages).
Notification of Transmittal of the International Search Report and the Written Opinion of the International Searching Authority, or the Declaration (3 pages), International Search Report (3 pages) and Written Opinion of the International Searching Authority (5 pages) re International Application No. PCT/US2005/002162 mailed Apr. 22, 2005.
Notification of Transmittal of the International Search Report and the Written Opinion of the International Searching Authority, or the Declaration (3 pages), International Search Report (3 pages) and Written Opinion of the International Searching Authority (5 pages) re International Application No. PCT/US2005/005289 mailed Apr. 29, 2005.
Notification of Transmittal of the International Search Report and the Written Opinion of the International Searching Authority, or the Declaration (3 pages), International Search Report (5 pages) and Written Opinion of the International Searching Authority (5 pages) re International Application No. PCT/US2004/036616 mailed Feb. 24, 2005.
Notification of Transmittal of International Preliminary Examination Report (1 page) and International Preliminary Examination Report (3 pages) for International Application No. PCT/US03/13954 mailed Apr. 14, 2005.
Notification of Transmittal of International Preliminary Examination Report (1 page) and International Preliminary Examination Report (5 pages) mailed Jan. 18, 2005 and Written Opinion (8 pages) mailed Aug. 25, 2005 for International Application No. PCT/US03/30126.
Notification of Transmittal of the International Search Report or the Declaration (3 pages) and International Search Report (5 pages) mailed Nov. 10, 2000 for International Application No. PCT/US99/27494.
Notification of Transmittal of International Preliminary Examination Report (1 page) and International Preliminary Examination Report (6 pages) mailed Apr. 2, 2001 and Written Opinion (7 pages) mailed Sep. 27, 2000 for International Application No. PCT/US99/27494.
Notification of Transmittal of the International Search Report or the Declaration (3 pages) and International Search Report (5 pages) mailed Jun. 6, 2002 for International Application No. PCT/US02/02051.
Notification of Transmittal of the International Search Report or the Declaration (3 pages) and International Search Report (6 pages) mailed Mar. 13, 2003 for International Application No. PC/US02/33128.
Notification of Transmittal of International Preliminary Examination Report (1 page) and International Preliminary Examination Report (3 pages mailed Apr. 22, 2004 and Written Opinion (6 pages) mailed Sep. 4, 2003 for International Application No. PCT/US02/33128.
Notes on Consol Presentation (by P. Thakur) made at IOGA PA in Pittsburgh, Pennsylvania on May 22, 2002 (3 pages).
Notification of Transmittal of the International Preliminary Report of Patentability (1 page) and International Preliminary Report on Patentability (12 pages) mailed Jan. 9, 2006 for International Application No. PCT/US2004/036616.
Notification Concerning Transmittal of International Preliminary Report on Patentability (Chapter 1 of the Patent Cooperation Treaty) (1 page), International Preliminary Report on Patentability (1 page), and Written Opinion of the International Searching Authority (7 pages) mailed Dec. 22, 2005 for International Application No. PCT/US2004/017048.
European Search and Examination Report, completed Dec. 5, 2005 for Application No. EP 05020737, 5 pages.
P.C. Thakur and W.N. Poundstone, "Horizontal Drilling Technology for Advance Degasification," Society of Mining Engineers of AIME, Preprint No. 79-113, For presentation at the 1979 AIME Annual Meeting, New Orleans, Lousiana, Feb. 18-22, 1979, Engineering Societies Library stamp dated Feb. 5, 1980, 11 pages.
Notification Concerning Transmittal of International Preliminary Report on Patentability (1 page), International Preliminary Report on Patentability (1 page), and Written Opinion of the International Searching Authority (5 pages) mailed Feb. 9, 2006 for International Application No. PCT/US2004/024518.
Wang Weiping, "*Trend of Drilling Technology Abroad*," Petroleum Drilling and Production Technology, 1995 (vol. 17), Issue 6, www.cnki.net, 8 pages, translation, original in Chinese.
Rennick, et al., "*Demonstration of Safety Plugging of Oil Wells Penetrating Appalachian Coal Mines*," Bureau of Mines Coal Mine Health and Safety Research Program, Technical Progress Report—56, U.S. Department of the Interior, Jul. 1972, 25 pages.
George N. Aul and Joseph Cervik, "*Grouting Horizontal Drainage Holes in Coalbeds*," RI 8375, Bureau of Mines Report of Investigations, U.S. Department of the Interior, 1979, 21 pages.
Paul J. Componation, et al., "*Cleaning Out, Sealing and Mining Through Wells Penetrating Areas of Active Coal Mines in Northern West Virginia*," MESA Information Report 1052, U.S. Department of the Interior, 1977, 26 pages.
George S. Rice, "*Notes on the Prevention of Dust and Gas Explosions in Coal Mines*," Technical Paper 56, Bureau of Mines, Department of the Interior, copyright 1913, 12 pages.
George S. Rice, et al., "*Oil and Gas Wells Through Workable Coal Beds*," Bulletin 65, Petroleum Technology 7, Bureau of Mines, Department of the Interior, copyright 1913, 54 pages.
Notification of Transmittal of the International Preliminary Report on Patentability (1 page) and International Preliminary Report on Patentability (8 pages) for International Application No. PCT/US2005/002162 mailed May 3, 2006.
D. Nathan Meehan, "*Technology Vital for Horizontal Well Success*," Oil & Gas Journal, Dec. 11, 1995, 8 pages.
B.A. Tarr, A.F. Kuckes and M.V. Ac, "*Use of New Ranging Tool to Position a Vertical Well Adjacent to a Horizontal Well*," SPE Drilling Engineering, Jun. 1992, 7 pages.
William J. McDonald, Ph.D., John H. Cohen, and C. Mel Hightower, "*New Lightweight Fluids for Underbalanced Drilling*," believed to be on or about 1998, 10 pages.
Philip C. Crouse, "*Application and Needs for Advanced Multilateral Technologies and Strategies*," Website: www.netl.doe.gov/publications/proceedings/97/97ng/ng97_pdf/NG2-5.pdf; Believed to be on or about 1997, 9 pages.
Dan Themig, "*Multi-Laterals Providing New Options*," The American Oil & Gas Reporter, V. 39, No. 7, Jul. 1996, 4 pages.
Daniel D. Gleltman, "*Integrated Underbalanced Directional Drilling System*," Interim Report for Period of Performance Oct. 1, 1995-Feb. 14, 1996, DOE FETC Contract DE-AC21-95MC31103, Mar. 1997, 23 pages.
J.D. Gallivan, n. R. Hewitt, M. Olsen, J.M. Peden, D. Tehrani and A.A.P. Tweedie, "*Quantifying the Benefits of Multi-Lateral Producing Wells*," SPE 30441, Society of Petroleum Engineers, Inc., Copyright 1995, 7 pages.
C.A. Ehlig-Economides, G.R. Mowat and C. Corbett, "*Techniques for Multibranch Well Trajectory Design in the Context of a Three-Dimensional Reservoir Model*," SPE 35505, Society of Petroleum Engineers, Copyright 1996, 8 pages.
Stephen R. Dittoe, Albertus Retnanto, and Michael J. Economides, "*An Analysis of Reserves Enhancement in Petroleum Reservoirs with Horizontal and Multi-Lateral Wells*," SPE 37037, Society of Petroleum Engineers, Copyright 1996, 9 pages.
D.L. Boreck and M.T. Strever, "*Conservation of Methane from Colorado's Mined/Minable Coal Beds: A Feasibility Study*," Open-File Report 80-5, Colorado Geological Survey, Department of Natural Resources, Denver, Colorado, Oct. 1980, 101 pages.
B.G. kta and T. Ertekin, "*Implementation of a Local Grid Refinement Technique in Modeling Slanted, Undulating Horizontal and Multi-Lateral Wells*," SPE 56624, Society of Petroleum Engineers, Copyright 1999, 10 pages.
W.H. Leach Jr., "*New Technology for CBM Production*," Oil and Gas Investor, Opportunities in Coalbed Methane, Dec. 2002, 6 pages.
David Wagman, "*CBM Investors Keep Their Guard Up*," Oil and Gas Investor, Opportunities in Coalbed Methane, Dec. 2002, 5 pages.
Stephen D. Schwochow, "*CBM: Coming to a Basin Near You*," Oil and Gas Investor, Opportunities in Coalbed Methane, Dec. 2002, 7 pages.
"*White Paper: Guidebook on Coalbed Methane Drainage for Underground Coal Mines*," paper prepared under U.S. Environmental Protection Agency Cooperative Agreement No. CX824467-01-0 with The Pennsylvania State University by Jan M. Mutmansky, Apr. 1999, 50 pages.
M.G. Zabetakis, Maurice Deul, and M.L. Skow, "*Methane Control in United States Coal Mines—1972*," Information Circular 8600, United States Department of the Interior, Bureau of Mines Information Circular/1973, 26 pages.

B. Goktas, "*A Comparative Analysis of the Production Characteristics of Cavity Completions and Hydraulic Fractures in Coalbed Methane Reservoirs*," Society of Petroleum Engineers, SPE 55600, Copyright 1999, 10 pages.
William P. Diamond and David C. Oyler, "*Drilling Long Horizontal Coalbed Methane Drainage Holes from a Directional Surface Borehole*," Society of Petroleum Engineers, SPE/DOE 8968, 1980, 6 pages.
Turgay Ertekin, Wonmo Sung, and Fred C. Schwerer, "*Production Performance Analysis of Horizontal Drainage Wells for the Degasification of Coal Seams*," Journal of Petroleum Technology, May 1988, 8 pages.
Patrick B. Tracy, "*Lateral Drilling Technology Tested on UCG Project*," IADC/SPE 17237, IADC/SPE Drilling Conference, Copyright 1988, 10 pages.
P.S. Sarkar and J.M. Rajtar, "*Transient Well Testing of Coalbed Methane Reservoirs With Horizontal Wells*," SPE 27681, Society of Petroleum Engineers, Copyright 1994, 9 pages.
R.A. Schraufnagel, D.G. Hill and R.A. McBane, "*Coalbed Methane—A Decade of Success*," SPE 28581, Society of Petroleum Engineers, Copyright 1994, 14 pages.
J.R. Kelafant, C.M. Boyer, and M.D. Zuber, "*Production Potential and Strategies for Coalbed Methane in the Central Appalachian Basin*," SPE 18550, Society of Petroleum Engineers, Copyright 1988, 8 pages.
Ian Palmer, John McLennan, and Mike Kutas, "*Completions and Stimulations for Coalbed Methane Wells*," SPE 30012, Society of Petroleum Engineers, Copyright 1995, 13 pages.
John E. Jochen and Bradley M. Robinson, "A*Survey of Horizontal Gas Well Activity*," SPE 35639, Society of Petroleum Engineers, Copyright 1996, 5 pages.
R.G. Jeffrey, J.R. Enever, J.H. Wood, J.P. Connors, S.K. Choi, K.T.A. Meaney, D.A. Casey, and R.A. Koenig, "*A Stimulation and Production Experiment in a Vertical Coal Seam Gas Drainage Well*," SPE 36982, Society of Petroleum Engineers, Copyright 1996, 7 pages.
Matt C. Rowan and Michael J. Whims, "*Multilateral Well Enhances Gas Storage Deliverability*," Oil & Gas Journal, Dec. 25, 1995, 4 pages.
Dan Themig, "*Planning and Evaluation are Crucial to Multilateral Wells*," Petroleum Engineer International, Jan. 1996, 3 pages.
Larry Comeau, Randy Pustanyk, Ray Smith and Ian Gilles, "*Lateral Tie-Back System Increases Reservoir Exposure*," World Oil, Jul. 1995, 5 pages.
J. Smith, M.J. Economides and T.P. Frick, "*Reducing Economic Risk in Areally Anisotropic Formations With Multiple-Lateral Horizontal Wells*," SPE 30647, Society of Petroleum Engineers, Copyright 1995, 14 pages.
Scott Thomson, Andrew Lukas, and Duncan McDonald, "*Maximising Coal Seam Methane Extraction through Advanced Drilling Technology*," Lucas, Technical Paper, Second Annual Australian Coal Seam & Mine Methane Conference, Feb. 19-20, 2003, 14 pages.
William P. Diamond and David C. Oyler, "*Directional Drilling for Coalbed Degasification in Advance of Mining*," Proceedings of the 2nd Annual Methane Recovery from Coalbeds Symposium, Apr. 18-20, 1979, 17 pages.
John L. Stalder, Gregory D. York, Robert J. Kopper, Carl M. Curtis and Tony L. Cole, and Jeffrey H. Copley, "*Multilateral-Horizontal Wells Increase Rate and Lower Cost Per Barrel in the Zuata Field*, Faja, Venezuela," SPE 69700, Society of Petroleum Engineers, Copyright 2001, 9 pages.
Brent Lowson, "*Multilateral-Well Planning*," Synopsis of SPE 39245, JPT, Jul. 1998, 4 pages.
A. Njaerheim, R. Rovde, E. Kvalc, S.A. Kvamme, and H.M. Bjoerneli, "*Multilateral Well in Low-Productivity Zones*," Synopsis of SPE 39356, JPT, Jul. 1998, 4 pages.
S.W. Bokhari, A.J. Hatch, A. Kyei, and O.C. Werngren, "*Improved Recovery from Tight Gas Sands with Multilateral Drilling*," Synopsis of SPE 38629, JPT, Jul. 1998, 4 pages.
S.K. Vij, S.L. Narasaiah, Anup Walia, and Gyan Singh, "*Adopting Multilateral Technology*," Synopsis of SPE 39509, JPT, Jul. 1998, 3 pages.
William P. Diamond, David C. Oyler, and Herbert H. Fields, "*Directionally Controlled Drilling to Horizontally Intercept Selected Strata, Upper Freeport Coalbed*, Green County, PA," Bureau of Mines Report of Investigations/1977, RI 8231, 1977, 25 pages.
David C. Oyler, William P. Diamond, and Paul W. Jeran, "*Directional Drilling for Coalbed Degasification*," Program Goals and Progress in 1978, Bureau of Mines Report of Investigations/1979, RI 8380, 1979, 17 pages.
United States Department of the Interior, "*Methane Control Research: Summary of Results*, 1964-80," Bureau of Mines Bulletin, Bulletin 687, 1988, 188 pages.
EPA, "*Identifying Opportunities for Methane Recovery at U.S. Coal Mines: Profiles of Selected Gassy Underground Coal Mines 1997-2001*," EPA Publication EPA 430-K-04-003, Jul. 2004, 202 pages.
Marshall DeLuca, "*Multilateral Completions on the Verge of Mainstream*," Offshore, Apr. 1997, 2 pages.
Bob Williams, "*Operators Unlocking North Slope's Viscous Oil Commerciality*," Oil & Gas Journal, Aug. 6, 2001, 5 pages.
James P. Oberkircher, "*The Economic Viability of Multilateral Wells*," IADC/SPE 59202, Society of Petroleum Engineers, Copyright 2000, 10 pages.
Jim Oberkircher, "*What is the Future of Multilateral Technology?*," World Oil, Jun. 2001, 3 pages.
Rick Von Flatern, "*Operators Are Ready For More Sophisticated Multilateral Well Technology*," Petroleum Engineer International, Jan. 1996, 4 pages.
Kyle S. Graves, "*Multiple Horizontal Drainholes Can Improve Production*," Oil & Gas Journal, OGJ Special, Feb. 14, 1994, 5 pages.
Guntis, Moritis, "*Sincor Nears Upgrading, Plateau Production Phase*," Oil & Gas Journal, Oct. 29, 2001, 1 page.
Guntis Moritis, "*Smart, Intelligent Wells*," Oil & Gas Journal, Apr. 2, 2001, 6 pages.
Craig Coull, "*Intelligent Completion Provides Savings for Snorre TLP*," Oil & Gas Journal, Apr. 2, 2001, 2 pages.
D.T. Vo and M.V. Madden, "*Performance Evaluation of Trilateral Wells: Field Examples*," SPE 28376, Society of Petroleum Engineers, copyright 1994, 16 pages.
Dean E. Gaddy, "*Pioneering Work, Economic Factors Provide Insights Into Russian Drilling Technology*," Oil & Gas Journal; Jul. 6, 1998, 3 pages.
"*Optimal Multilateral-Well Design for a Heavy-Oil Reservoir*," Synopsis of SPE 37554 by D.W. Boardman, JPT, Jul. 1997, 3 pages.
"*Multilateral-Well Completion-System Advances*," Synopsis of SPE 39125 by J.R. Longbottom et al., JPT, Jul. 1997, 3 pages.
"*Optimal Multilateral/Multibranch Completions*," Synopsis of SPE 38033 by Hironori Sugiyama et al., JPT, Jul. 1997, 5 pages.
"*Multilateral Experiences: IDD El Shargi North Dome Field (QATAR)*," Synopsis of SPE 37675 by J.R. Scofield et al., JPT, Jul. 1997, 3 pages.
"*Moving Toward the 'Intelligent Well'*," Synopsis of SPE 39126 by Clark E. Robison, JPT, Jul. 1997, 3 pages.
"*Short-Radius Laterals: An Operator's Experience*," Synopsis of SPE 37493 by C. Ellis et al., JPT, Jul. 1997, 3 pages.
"*Analyzing a Multilateral-Well Failure*," Synopsis of SPE 38268 by A. Ray Brister, JPT, Jul. 1997, 3 pages.
"*A New Concept for Multibranch Technology*," Synopsis of SPE 39123 by Mark Stracke et al., JPT, Jul. 1997, 3 pages.
"*Classification Clarifies Multilateral Options*," Synopsis of SPE 38493 by C. Hogg, JPT, Jul. 1997, 3 pages.
"*Infill Development With Multilateral-Well Technology*," Synopsis of SPE 38030 by Sau-Wai Wong et al., JPT, Jul. 1997, 3 pages.
Brad Califf and Denny Kerr, "*UPRC Completes First Quad-Lateral Well*," Petroleum Engineer International, Sep. 1993, 4 pages.
Jack Winton, "*Use of Multi-lateral Wells to Access Marginal Reservoirs*," Offshore, Feb. 1999, 3 pages.
J.R. Salas, P.J. Clifford and D.P. Jenkins, "*Brief: Multilateral Well Performance Prediction*," JPT, Sep. 1996, 3 pages.
Mike R. Chambers, "*Multilateral Technology Gains Broader Acceptance*," Oil & Gas Journal, Nov. 23, 1998, 5 pages.
S. Ikeda, T. Takeuchi, and P.C. Crouse, "*An Investigative Study on Horizontal Well and Extended Reach Technologies With Reported Problem Areas and Operational Practice in North America and Europe*," IADC/SPE 35054, Society of Petroleum Engineers, Copyright 1996, 8 pages.

Greg Nazzal, "*Extended-Reach Wells Tap Outlying Reserves*," World Oil, Mar. 1993, 8 pages.
Bambang Tjondrodiputro, Harry Eddyarso and Kim Jones, "*How ARCO Drills High-Angle Wells Offshore Indonesia*," World Oil, Mar. 1993, 11 pages.
S. Hovda, et al., "*World's First Application of a Multilateral System Combining a Cased and Cemented Junction With Fullbore Access to Both Laterals*," SPE 36488, Society of Petroleum Engineers, Copyright 1996, 15 pages.
Robert A. Gardes, "*Micro-annulus Under-balanced Drilling of Multilateral Wells*," Offshore, May 1996, 4 pages.
Brent Lowson, "*Phillips Multilateral Features Several Firsts for North Sea*," Offshore, Feb. 1997, 2 pages.
J.R. Scofield, B. Laney and P. Woodard, "*Field Experience With Multi-Laterals in the Idd El Shargi North Dome Field (Qatar)*," SPE/IADC 37675, Society of Petroleum Engineers, Copyright 1997, 11 pages.
Jeremy Beckman, "*Coiled Tubing, Reamer Shoes Push Through Barriers in North Sea Wells*," Offshore, Feb. 1997, 1 page.
C.H. Fleming, "*Comparing Performance of Horizontal Versus Vertical Wells*," World Oil, Mar. 1993, 7 pages.
Larry A. Cress and Stephen W. Miller, "*Dual Horizontal Extension Drilled Using Retrievable Whipstock*," World Oil, Jun. 1993, 9 pages.
Guntis Moritis, "*Heavy Oil Expansions Gather Momentum Worldwide*," Oil & Gas Journal, Aug. 14, 1995, 6 pages.
K.W. Hart and L.V. Jankowski, "*The Application of Slant Hole Drilling in Development of Shallow Heavy Oil Deposits*," The Journal of Canadian Petroleum Technology, Jan.-Feb. 1984, Montreal, 6 pages.
Jeff Smith and Bob Edwards, "*Slant Rigs Offer Big Payoffs in Shallow Drilling*," Oil & Gas Journal, Mar. 30, 1992, 3 pages.
Ravil Gabdullinovich Salikhov, Evgeny Fedyorovich Dubrovin, and Vladimir Vladimirovich Sledkov, "*Cluster and Dual-Lateral Drilling Technologies Optimize Russian Well Production*," Oil & Gas Journal, Nov. 24, 1997, 7 pages.
Dean E. Gaddy, "*Inland Barge to Allow Cluster Drilling in Nigeria*," Oil & Gas Journal, Aug. 30, 1999, 7 pages.
Cliff Hogg, "*Comparison of Multilateral Completion Scenarios and Their Application*," SPE 38493, Society of Petroleum Engineers, Copyright 1997, 11 pages.
S.W. Bokhari, A.J. Hatch, A. Kyei and O.C. Wemgren, "*Improved Recoveries in the Pickerill Field from Multilateral Drilling into Tight Gas Sands*," SPE 38629, Society of Petroleum Engineers, Copyright 1997, 15 pages.
J.R. Longbottom, Dana Dale, Kevin Waddell, Scott Bruha, and John Roberts, "*Development, Testing, and Field Case Histories of Multilateral Well Completion Systems*," SPE 36994, Society of Petroleum Engineers, Copyright 1996, 16 pages.
E.J. Antczak, D.G.L. Smith, D.L. Roberts, Brent Lowson, and Robert Norris, "*Implementation of an Advanced Multi-Lateral System With Coiled Tubing Accessibility*," SPE/IADC 37673, Society of Petroleum Engineers, Copyright 1997, 9 pages.
H. Azoba, O. Akinmoladun, H. Rothenhofer, D. Kent and N. Nawfal, "*World Record Dual- and Tri-lateral Wells*," SPE/IADC 39240, Society of Petroleum Engineers, Copyright 1997, 6 pages.
R.W. Taylor and Rick Russell, "*Case Histories: Drilling and Completing Multilateral Horizontal Wells in the Middle East*," SPE/IADC 39243, Society of Petroleum Engineers, Copyright 1997, 14 pages.
D.K. Triolo and R.A. Mathes, "*Review of a Multi-Lateral Drilling and Stimulation Program*," SPE/IADC 39242, copyright 1997, Society of Petroleum Engineers, 13 pages.
John H. Perry, Leonard J. Prosser, Jr., Joseph Cervik, "*Methane Drainage from the Mary Lee Coalbed, Alabama, Using Horizontal Drilling Techniques*," SPE/DOE 8967, Society of Petroleum Engineers, May 18, 1980, 6 pages.
Gerald L. Finfinger, Leonard J. Prosser, and Joseph Cervik, "*Influence of Coalbed Characteristics and Geology on Methane Drainage*," SPE/DOE 8964, Society of Petroleum Engineers, May 18, 1980, 6 pages.
Hilmer Von Schonfeldt, B. Rao Pothini, George N. Aul and Roger L. Henderson, "*Production and Utilization of Coalbed Methane Gas in Island Creek Coal Company Mines*," SPE/DOE 10817, Society of Petroleum Engineers, May 16, 1982, 10 pages.
Joseph Cervik, H.H. Fields, and G.N. Aul, "*Rotary Drilling Holes in Coalbeds for Degasification*," RI 8097, Bureau of Mines Reporting of Investigations, 1975, 26 pages.
D.G. Masszi and A.A. Kahil; "*Coal Demethanation Principles and Field Experience*," The Journal of Canadian Petroleum Technology, Jul.-Aug. 1982, 4 pages.
Tobias W. Goodman, Joseph Cervik, and George N. Aul, "*Degasification Study From an Air Shaft in the Beckley Coalbed*," RI 8675, Bureau of Mines Report of Investigations, 1982, 23 pages.
P.C. Thakur and H.D. Dahl, "*Horizontal Drilling—A Tool for Improved Productivity*," Mining Engineering, Mar. 1982, 3 pages.
P.C. Thakur and J.G. Davis II, "*How to Plan for Methane Control in Underground Coal Mines*," Mining Engineering, Oct. 1977, 5 pages.
A.B. Yost II and B.H. Javins, "*Overview of Appalachian Basin High-Angle and Horizontal Air and Mud Drilling*," SPE 23445, Society of Petroleum Engineers, Oct. 22, 1991, 14 pages.
Pramod C. Thakur, "*Methane Flow in the Pittsburgh Coal Seam*," Third International Mine Ventilation Congress, England, U.K., Jun. 13-19, 1984, 17 pages.
Chapter 10 by Pramod C. Thakur, "*Methane Control for Longwall Gobs*," Longwall-Shortwall Mining, State of the Art by R.V. Ramani, published by New York: Society of Mining Engineers of the American Institute of Mining, Metallurgical, and Petroleum Engineers, 1981, 7 pages.
Pramod C. Thakur, Stephen D. Lauer, and Joseph Cervik, "*Methane Drainge With Cross-Measure Boreholes on a Retreat Longwall Face*," Preprint No. 83-398, Society of Mining Engineers of AIME, for presentation at the SME-AIME Fall Meeting and Exhibit, Salt Lake City, Utah, Oct. 19-21, 1983, 14 pages.
Warren F. Dobson and Daniel R. Seelye, "*Mining Technology Assists Oil Recovery from Wyoming Field*," SPE 9418, Society of Petroleum Engineers of AIME, Copyright 1980, 7 pages.
T.L. Logan, J.J. Schwoebel and D.M. Horner, "*Application of Horizontal Drainhole Drilling Technology for Coalbed Methane Recovery*," SPE/DOE 16409, Society of Petroleum Engineers/U.S. Department of Energy, Copyright 1997, 12 pages.
Samuel O. Osisanya and Robert F. Schaffitzel, "*A Review of Horizontal Drilling and Completion Techniques for Recovery of Coalbed Methane*," SPE 37131, Society of Petroleum Engineers, Copyright 1996, 13 pages.
S.D. Joshi, "*A Review of Horizontal Well and Drainhole Technology*," SPE 16868, Society of Petroleum Engineers, Copyright 1987, 17 pages.
R. Bitto, a.B. Henderson and L. Broussard, "*Recent Case Histories of New Well Applications for Horizontal Drilling*," SPE 21262, Society of Petroleum Engineers, Copyright 1990, 12 pages.
M.R. Konopczynski, John Hughes and J.E. Best, "*A Novel Approach to Initiating Multi-Lateral Horizontal Wells*," SPE/1ADC 29385, Society of Petroleum Engineers, Copyright 1996, 11 pages.
Kelly Falk and Craig McDonald, "*An Overview of Underbalanced Drilling Applications in Canada*," SPE 30129, Society of Petroleum Engineers, Copyright 1995, 9 pages.
"*Evolution Toward Simpler, Less Risky Multilateral Wells*," World Oil, prepared from paper SPE/IADC 67825 by Adam Pasicznyk, Jun. 2001, 8 pages.
"*How Multilateral Boreholes Impact Ultimate Recovery Strategies*," Offshore, Jul. 1997, 6 pages.
"*Trilateral Horizontal Wells Add 10 Million bbl for Unocal*," Offshore, Dec. 1993, 2 pages.
Nicholas P. Chironis, "*New Borehole Techniques Offer Hope for Gassy Mines*," Coal Age, Jan. 1973, 4 pages.
A. Retnanto, T.P. Frick, C.W. Brand, and M.J. Economides, "*Optimal Configurations of Multiple-Lateral Horizontal Wells*," SPE 35712, Society of Petroleum Engineers, Copyright 1996, 8 pages.
T.L. Logan, "*Horizontal Drainhole Drilling Techniques Used for Coal Seam Resource Exploitation*," SPE 18254, Society of Petroleum Engineers, Copyright 1988, 13 pages.
David Hill, Eric Neme, Christine Enlig-Economides and Miguel Mollinedo, "*Reentry Drilling Gives New Life to Aging Fields*," Oilfield Review, Autumn 1996, 14 pages.
R.L. Thoms and R.M. Gehle, "*Feasibility of Controlled Solution Mining From Horizontal Wells*," Solution Mining Research Institute, Oct. 24-27, 1993, 8 pages.

"*World's First Trilateral Horizontal Wells on Stream*," Oil & Gas Journal, Nov. 29, 1993, 2 pages.
Margaret A. Adams, Jeanne L. Hewitt and Rodney D. Malone, "*Coalbed Methane Potential of the Appalachians*," SPE/DOE 10802, Society of Petroleum Engineers, Copyright 1982,10 pages.
F.C. Schwerer and A.M. Pavone, "*Effect of Pressure-Dependent Permeability on Well-Test Analyses and Long-Term Production of Methane From Coal Seams*," SPE/DOE/GRI 12857, Society of Petroleum Engineers, Copyright 1984, 10 pages.
Stephen Krickovic and J.D. Kalasky, "*Methane Emission Rate Study in a Deep Pocahontas No. 3 Coalbed Mine in Conjunction With Drilling Degasification Holes in the Coalbed*," RI-7703, Bureau of Mines Report of Investigations/1972, United States Department of the Interior, 1972, 15 pages.
H.H. Fields, Joseph Cervik, and T.W. Goodman, "*Degasification(and Production of Natural Gas From an Air Shaft in the Pittsburgh Coalbed*," RI-8173, Bureau of Mines Report of Investigations/1976, United States Department of the Interior, 1976, 28 pages.
Gerald L. Finfinger and Joseph Cervik, "*Drainage of Methane From the Overlying Pocahontas No. 4 Coalbed From Workings in the Pocahontas No. 3 Coalbed*," RI-8359, Bureau of Mines Report of Investigations/1979, United States Department of the Interior, 1979, 19 pages.
Gerald L. Fin finger and Joseph Cervik, "*Review of Horizontal Drilling Technology for Methane Drainage From U.S. Coalbeds*," IC-8829, Bureau of Mines Information Circular/1980, United States Department of the Interior, 1980, 24 pages.
Andre P. Jourdan and Guy A. Baron, "*Elf Drills 1,000 + Ft Horizontally*," Petroleum Engineer International, Sep. 1981, 4 pages.
P.F. Conti, "*Controlled Horizontal Drilling*," SPE/IADC 18708, Society of Petroleum Engineers, Copyright 1989, 6 pages.
Armando R. Navarro, "*Innovative Techniques Cut Costs in Wetlands Drilling*," OiL & Gas Journal, Oct. 14, 1991, 4 pages.
Victor M. Luhowy and Peter D. Sametz, "*Horizontal Wells Prove Effective in Canadian Heavy-Oil Field*," Oil & Gas Journal, Jun. 28, 1993, 6 pages.
D. Lane Becker, "*Project Management Improved Multiwell Shallow Gas Development*," Oil & Gas Journal, Oct. 16, 1995, 5 pages.
Mike R. Chambers, "*Junction Design Based on Operational Requirements*," Oil & Gas Journal, Dec. 7, 1998, 7 pages.
A.J. Branch, et al., "*Remote Real-Time Monitoring Improves Orinoco Drilling Efficiency*," Oil & Gas Journal, May 28, 2001, 6 pages.
D. Keith Murray, "*Deep Coals Hold Big Part of Resource*," The American Oil & Gas Reporter, May 2002, 8 pages.
Nestor Rivera, et al., "*Multilateral, Intelligent Well Completion Benefits Explored*," Oil & Gas Journal, Apr. 14, 2003, 10 pages.
Handbook on Coal Bed Methane Produced Water: Management and Beneficial Use Alternatives, prepared by ALL Consulting, Jul. 2003, 321 pages.
Nikola Maricic, "*Parametric and Predictive Analysis of Horizontal Well Configurations for Coalbed Methane Reservoirs in Appalachian Basin*," Thesis, West Virginia University, Department of Petroleum and Natural Gas Engineering, 2004, 162 pages.
Nikola Maricic, Shahab D. Mohaghegh, and Emre Artun, "*A Parametric Study on the Benefits of Drilling Horizontal and Multilateral Wells in Coalbed Methane Reservoirs*," SPE 96018, Society of Petroleum Engineers, Copyright 2005, 8 pages.
D.P. Schlick and J.W. Stevenson, "*Methane Degasification Experience at Jim Walter's*," Proceedings of the Twelfth Annual Institute on Coal Mining Health, Safety and Research, Aug. 25-27, 1981, 9 pages.
P.C. Thakur, "*Optimum Methane Drainage in Gassy Coal Mines*," 2003 SME Annual Meeting, copyright 2003 by SME, 4 pages.
Global Methane and the Coal Industry: A Two-Part Report on Methane Emissions from the Coal Industry and Coalbed Methane Recovery and Use, Coal Industry Advisory Board, International Energy Agency, copyright 1994, 72 pages.
Paul F. Conti and Michael Schumacher, "Solution Mining in the Nineties," Presented at the Fall 1991 meeting of the Solution Mining Research Institute, Oct. 27-30, 1991, 11 pages.
Notification of Transmittal of the International Preliminary Report on Patentability (1 page), International Preliminary Report on Patentability (7 pages) and Amended Sheets (10 pages for International Application No. PCT/US2004/012029 mailed Aug. 11, 2005.
Pratt et al., U.S. Patent Application entitled "Cavity Well System," U.S. Appl. No. 11/141,335, filed May 31, 2005, 19 pages.
Dreiling, Tim, McClelland, M.L., and Bilyeu, Brad, "Hoizontal and High Angle Air Drilling in the San Juan Basin, New Mexico," The Brief, published by Amoco and Chevron by Murphy Publishing, Inc., vol. 2, Issue 6, No. 54, Jun. 1996 (9 pages).
Notification of Transmittal of the International Preliminary Report on Patentability (1 page) and International Preliminary Report on Patentability (10 pages) for International Application No. PCT/US2006/021057 mailed Jul. 9, 2007.
William P. Diamond and David C. Oyler, "Effects of Stimulation Treatments on Coalbeds and Surrounding Strata: Evidence From Underground Observations," RI 9083, Bureau of Mines Report of Investigations, 1987 (53 pages).
W.P. Diamond and D.C. Oyler, "Recent Underground Observations of Intercepted Hydraulic Stimulations in Coalbed Methane Drainage Wells," Preprint No. 85-332, Society of Mining Engineers of AIME, SME-AIME Fall Meeting, Oct. 16-18, 1985 (12 pages).
William P. Diamond, "Underground Observations of Mined-Through Stimulation Treatments of Coalbeds," Methane From Coal Seams Technology, Jun. 1987 (11 pages).
W.P. Diamond, "Characterization of Fracture Geometry and Roof Penetrations Associated with Stimulation Treatments in Coalbeds," 1987 Coalbed Methane Symposium, Nov. 16-19, 1987 (11 pages).
C.M. McCulloch, Maurice Deul and P.W. Jeran, "Cleat in Bituminous Coalbeds," RI 7910, Bureau of Mines Report of Investigations, 1974 (28 pages).
B.E. Law, "The Relationship Between Coal Rank and Cleat Spacing: Implications for the Prediction of Permeability in Coal," Proceedings of the 1993 International Coalbed Methane Symposium, May 17-21, 1993 (7 pages).
C.T. Montgomery and R.E. Steanson, "Proppant Selection: The Key to Successful Fracture Stimulation," *Journal of Petroleum Technology*, Dec. 1985 (10 pages).
R.W. Veatch, Jr., "Overview of Current Hydraulic Fracturing Design and Treatment Technology—Part 2," Journal of Petroleum Technology, May 1983 (12 pages).
David D. Cramer, "The Unique Aspects of Fracturing Western U.S. Coalbeds," Journal of Petroleum Technology, Oct. 1992 (8 pages).
S.A. Holditch, J.W. Ely, R.H. Carter, and M.E. Semmelbeck, Coal Seam Stimulation Manual, Gas Research Institute, Contract No. 5087-214-1469, Apr. 1990 (265 pages).
Jack E. Nolde, "Coalbed Methane in Virginia," Virginia Minerals, Virginia Division of Mineral Resources, vol. 41, Feb. 1995 (7 pages).
C.H. Elder and Maurice Deul, "Degasification of the Mary Lee Coalbed Near Oak Grove, Jefferson County, Ala., by Vertical Borehole in Advance of Mining," RI 7968, U.S. Bureau of Mines, 1974 (23 pages).
Maureen Lorenzetti, "Policymakers eye frac regulation to protect groundwater," Oil & Gas Journal, Sep. 10, 2001, p. 40 (1 page).
Peter F. Steidl, "Foam Stimulation To Enhance Production From Degasification Wells in the Pittsburgh Coalbed," RI 8286, Bureau of Mines Report of Investigations, 1978 (11 pages).
David G. Hill, "Contribution of Unconventional Gas to U.S. Supply Continues to Grow," Gas Research Institute Gas TIPS, Fall 2001 (6 pages).
Vello A. Kuuskraa and Charles F. Brandenburg, "Coalbed Methane Sparks a New Energy Industry," Oil & Gas Journal, Week of Oct. 9, 1989 (8 pages).
Walter B. Ayers Jr. and Bruce S. Kelso, "Knowledge of Methane Potential for Coalbed Resources Grows, But Needs More Study," Oil & Gas Journal, Oct. 23, 1989 (6 pages).
John E. McElhiney, Robert A. Koenig and Richard A. Schraufnagel, "Evaluation of Coalbed-Methane Reserves Involves Different Techniques," Oil & Gas Journal, Week of Oct. 9, 1989 (8 pages).
Steven W. Lambert, Stanley L. Graves and Arfon H. Jones, "Warrior Basin Drilling, Stimulation Covered," Oil & Gas Journal, Week of Oct. 9, 1989 (7 pages).
Steven W. Lambert and Stanley L. Graves, "Production Strategy Developed," Oil & Gas Journal, Week of Oct. 9, 1989 (4 pages).
Terry L. Logan, Western Basins Dictate Varied Operations, Oil & Gas Journal, Week of Oct. 9, 1989 (7 pages).

Vello A. Kuuskra, Charles M. Boyer II, and Richard A. McBane, "Steps to Assess Resource Economics Covered," Oil & Gas Journal, Week of Oct. 9, 1989 (6 pages).
Richard A. Counts, "Ownership Questions Can Stymie Development of Coalbed Methane," Oil & Gas Journal, Week of Oct. 9, 1989 (6 pages).
Richard A. Schraufnagel, Richard A. McBane and Vello a. Kuuskraa, "Coalbed Methane Development Faces Technology Gaps," Oil & Gas Journal, Week of Oct. 9, 1989 (7 pages).
"US Coalbed Methane Resource Estimates, Issues Aired," Oil & Gas Journal, Sep. 24, 2001 (2 pages).
Dr. Charles R. Nelson, "Coalbed Methane Potential of the U.S. Rocky Mountain Region," Gas TIPS, Fall 2000 (9 pages).
Dr. Charles R. Nelson, "Changing Perceptions Regarding the Size and Production Potential of Coalbed Methane Resources," Gas TIPS, Summer 1999 (9 pages).
Ala. Coalbed Methane Production Hits Record, Coal Age, May 1998 (1 page).
Charles M. Boyer II, "Introduction," Gas Research Institute, Methane From Coal Seams Technology, Aug. 1993 (4 pages).
P.F. Steidl, "Evaluation of Induced Fractures Intercepted by Mining," Proceedings of the 1993 International Coalbed Methane Symposium, May 17-21, 1993 (12 pages).
W.P. Diamond, W.R. Bodden III, M.D. Zuber and R.A. Schraufnagel, "Measuring the Extent of Coalbed Gas Drainage After 10 Years of Production at the Oak Grove Pattern, Alabama," Proceedings of the 1989 Coalbed Methane Symposium, Apr. 17-20, 1989 (10 pages).
W.M. Merritts, W.N. Poundstone and B.A. Light, "Removing Methane (Degasification) From the Pittsburgh Coalbed in Northern West Virginia," Bureau of Mines RI 5977, 1962 (46 pages).
M.L. Skow, Ann G. Kim and Maurice Deul, "Creating a Safer Environment in U.S. Coal Mines," U.S. Bureau of Mines Impact Report, 1980 (56 pages).
Stephen W. Lambert, Michael A. Trevits, and Peter F. Steidl, "Vertical Borehole Design and Completion Practices Used to Remove Methane Gas From Mineable Coalbeds," U.S. Dept. Of Energy, 1980 (173 pages).
M.A. Trevits, S.W. Lambert, P.F. Steidl and C.H. Elder, "Methane Drainage Through Small-Diameter Vertical Boreholes," Chapter 9 in U.S. Bureau of Mines Bulletin B687 entitled Methane Control Research: Summary of Results, 1964-80, 1988 (25 pages).
C.M. Boyer II and S.R. Reeves, "A Strategy for Coalbed Methane Production Development Part III: Production Operations," Proceedings of the 1989 Coalbed Methane Symposium, Apr. 17-20, 1989 (5 pages).
R.A. Mills and J.W. Stevenson, "History of Methane Drainage at Jim Walter Resources, Inc.," Proceedings of the 1991 Coalbed Methane Symposium, May 13-16, 1991 (9 pages).
Richard A. Schraufnagel, "Coalbed Methane Production," Chapter 15 of Hydrocarbons from Coal, American Association of Petroleum Geologists, 1993 (21 pages).
Curtis H. Elder, "Effects of Hydraulic Stimulation on Coalbeds and Associated Strata," Bureau of Mines RI 8260, 1977 (25 pages).
A Guide to Coalbed Methane Reservoir Engineering, published by Gas Research Institute, GRI-94/0397, pp. 2.11-2.12, 1996 (3 pages).
Well Performance Manual, Schlumberger, pp. 3-1 and 3-2, Aug. 1993 (4 pages).
Michael Zuber, "Coalbed Methane Engineering Methods," The Society of Petroleum Engineers, Oct. 2006 (161 pages).
James V. Mahoney, P.B. Stubbs, F.C. Schwerer III and F.X. Dobscha, "Effects of a No-Proppant Foam Stimulation Treatment on a Coal-Seam Degasification Borehole," Journal of Petroleum Technology, Nov. 1981 (9 pages).
S.J. Jeu, T.L. Logan and R.A. McBane, "Exploitation of Deeply Buried Coalbed Methane Using Different Hydraulic Fracturing Techniques in the Piceance Basin, Colorado and San Juan Basin New Mexico," Society of Petroleum Engineers, SPE 18253, copyright 1988 (11 pages).
Stephen E. Laubach, Carol M. Tremain and Walter B. Ayers, Jr., "Coal Fracture Studies: Guides for Coalbed Methane Exploration and Development," Journal of Coal Quality, vol. 10, No. 3, Jul.-Sep. 1991 (8 pages).
*CNX Gas Corporation, et al.* v. *CDX Gas, LLC*, United States District Court, Western District of Pennsylvania (Pittsburgh), Civil Action No. 2:05-CV-1574-AJS, Civil Docket as of Oct. 24, 2007, 54 pages.
*CNX Gas Corporation, et al.* v. *CDX Gas, LLC*, United States District Court, Western District of Pennsylvania, Civil Action No. 05-CV-1574, Parties' Complaints and Answers, including Claims, Counterclaims and Affirmative Defenses, earliest dated Nov. 14, 2005, 506 pages.
*CNX Gas Corporation, et al.* v. *CDX Gas, LLC*, United States District Court, Western District of Pennsylvania, Civil Action No. 05-CV-1574, Parties' Filings on Claim Construction and Adopting Report and FRecommendation of special Master, including Briefs, Exhibits, Motions and Proposed Orders, earliest dated Mar. 16, 2006, 1,532 pages.
*CNX Gas Corporation, et al.* v. *CDX Gas, LLC*, United States District Court, Western District of Pennsylvania, Civil Action No. 05-CV-1574, Report and Recommendation and Order of Special Master, earliest dated Aug. 30, 2006, 28 pages, and Order of Court adopting report and recommendation of the Special Master as the opinion of the court, dated Oct. 13, 2006, 2 pages.
*CNX Gas Corporation, et al.* v. *CDX Gas, LLC*, United States District Court, Western District of Pennsylvania, Civil Action No. 05-CV-1574, Parties' Summary Judgment Filings on Entitlement of Asserted Claims of Patents-in-Suit to the Filing Date of '000 Patent, including Briefs, Exhibits, Motions, Proposed Orders and Statements of Undisputed Material Facts, earliest dated Jan. 5, 2007, 644 pages.
*CNX Gas Corporation, et al.* v. *CDX Gas, LLC*, United States District Court, Western District of Pennsylvania, Civil Action No. 05-CV-1574, Memorandum Opinion and Order of Court Re: Cross Motions for Partial Summary Judgment—Finding that the Asserted Claims of the Patent-in-Suit are Entitled to the filed of the '000 Patent and Order of Court, earliest dated Feb. 20, 2007, 4 pages.
*CNX Gas Corporation, et al.* v. *CDX Gas, LLC*, United States District Court, Western District of Pennsylvania, Civil Action No. 05-CV-1574, Parties' Discovery Responses, including Responses to Interrogatories and Responses to Requests for Admissions, earliest dated Jan. 18, 2006, 177 pages.
*CNX Gas Corporation, et al.* v. *CDX Gas, LLC*, United States District Court, Western District of Pennsylvania, Civil Action No. 05-CV-1574, Plaintiffs' Non-Infringement and Invalidity Contention Pursuant to LPR 3.4, including Attachment A with all Supplemental and updated Attachment A, dated Jan. 30, 2006, 934 pages.
Notification Concerning Transmittal of International Preliminary Report on Patentability (1 page), International Preliminary Report on Patentability (1 page), and Written Opinion (5 pages) for International Application No. PCT/US2005/005289 mailed Sep. 8, 2006.
Invitation to Pay Additional Fees (2 pages) and Annex to Form PCT/ISA/206 Communication Relating to the Results of the Partial International Search (3 pages) for International Application No. PCT/US2006/021057 mailed Sep. 11, 2006.
Kalinin, D. G., et al., Translation of Selected Pages, "Boring Direction and Horizontal Wells," Moscow, "Nedra", 1997, p. 11-12, 148-152 (15 pages).
Evaluation of Coalbed Methane Well Types in the San Juan Basin, prepared by Malkewicz Hueni Associates, Inc. for The Bureau of Land Management, Mar. 2004, 23 pages.
Chase, Robert William, "*Degasification of Coal Seams Via Vertical Boreholes: A Field and Computer Simulation Study*," Thesis in Petroleum and Natural Gas Engineering, Mar. 1980, 174 pages.
Shuck, L. Z. and Pasini III, J., "In Situ Gasification of Eastern Coals," presented at the proceedings of the Coal Processing and Conversion Symposium, Jun. 1-3, 1976, Morgantown, West Virginia, 16 pages.
Logan, Terry L., "Application of Medium Radius Horizontal Drainhole Drilling Technology for Underground Coal Gasification," presented at 13th Annual Underground Coal Gasification Symposium, Aug. 24-26, 1987, Laramie, Wyoming, 10 pages.
Lindblom, S. R. and Smith, V. E., "Rocky Mountain 1 Underground Coal Gasification Test," Hanna, Wyoming, Groundwater Evaluation, DOE Grant No. DE-FG21-88MC25038, Final Report, Jun. 10, 1988-Jun. 30, 1993, 5 pages.
Coal-Bed Methane: Potential and Concerns, U.S. Department of the Interior, U.S. Geological Survey, USGS Fact Sheet FS-123-00, Oct. 2000, 2 pages.

Horizontal and Multilateral Wells, Society of Petroleum Engineers, website: http://www.spe.org/spe/jsp/basic_pf/0,,1104_1714_1003974,00.html, printed Dec. 27, 2006, 5 pages.
Notification of Transmittal of the International Search Report and the Written Opinion of the International Searching Authority, or the Declaration (3 pages), International Search Report (7 pages), and Written Opinion of the International Searching Authority (7 pages) for International Application No. PCT/US2006/021057 dated Jan. 4, 2007.
Palmer, I. D., Mavor, M. J., Spitler, J. L. and Volz, R. F., "*Openhole Cavity Completions in Coalbed Methane Wells in the San Juan Basin*," Journal of Petroleum Technology, vol. 45, No. 11, Nov. 1993, 11 pages.
V.S. Orlov, et al., "*Methods for Simultaneous Segregated Production from Multiple Formations Using Single Well*," Series Petroleum Engineering, Moscow, Aurdiomeogi, 1976, translated pp. 6-11, 28-29 and 36-37, 15 pages.
Kalinin A.G., et al., "*Boring of Slanted and Horizontal Well Bores*," Moskva, Nedra 1997, pp. 453-458, Sections 11.2, 11.2.2, and 11.2.3, 10 pages.
Website: http://biz.yahoo.com/bw/080602/20080602006520.html?.v=1&printer=1, Press Release, CDX Gas Settles Patent Litigation With CNX Gas, Monday, Jun. 2, 2008, 5:00 p.m. ET, printed Jun. 4, 2008 (2 pages).
Communication of Partial European Search Report (1 page), Partial European Search Report (2 pages) , Lack of Unity of Invention Sheet B (2 pages) and Annex to the European Search Report (1 page) for Application No. EP 07 02 1409 dated Aug. 6, 2008.
T. Beims and C. Strunk, "*Capital, Technology Suppliers Pulling New Tricks From The Hat As Industry Hits High Gear*," The American Oil & Gas Reporter, Mar. 1997 (8 pages).
B. Campbell, "*Directional Driller Discovers Future in Technology*," The American Oil & Gas Reporter, Jul. 1991 (4 pages).
"*Economic Justification And Modeling of Multilateral Wells*," in "Multilateral Technology: Taking Horizontal Wells to the Next Level"—a supplement to Hart's Petroleum Engineer, International, 1997 (5 pages).
R. Gardes, "*New Radial Drilling Technology Applied To Recovering Cores*," The American Oil & Gas Reporter, Apr. 1993 (5 pages).
Gardes Energy Services, Inc., Map of Drilled Well Locations (1 page).
"*Gardes Drilling redefines improved recovery*," Improved Recovery Week, vol. 1, No. 21, Jul. 1992 (3 pages).
R. Gardes, "*Micro-Annulus Underbalanced Drilling of Multilaterals*," 4th Annual North American Conference on Coiled Tubing, Feb. 5-6, 1996 (23 pages).
R. Gardes, "*The Evolution of Horizontal Multi-Lateral Underbalanced Drilling Technology*," Society of Independent Professional Earth Scientists Newsletter, vol. 38, Aug. 2000 (3 pages).
R. Gardes, *Underbalanced Drilling of Multilateral Horizontal Wells*, 8th Annual International Conference on Horizontal Well Technologies & Applications, Sep. 9-11, 1996 (7 pages).
"*Lafayette firm set to do business with Soviet Union*," Advertiser, Lafayette, La, Aug. 1990 (1 page).
L. LeBlanc, "*Beyond extended-read, horizontal drilling?*," Drilling & Production, May 1992 (1 page).
"*Local firm signs contract to develop Soviet fields*," The Daily Advertiser, December (1 page).
"*History Repeats Itself Multilateral Technology Development Parallels That of Horizontal Wells*," in "Multilateral Technology: Taking Horizontal Wells to the Next Level"—a supplement to Hart's Petroleum Engineer International, (5 pages).
"*New Enabling Technologies Spur Multilateral Use*," in "Multilateral Technology: Taking Horizontal Wells to the Next Level"—a supplement to Hart's Petroleum Engineer International, (5 pages).
"*New tools, techniques reduce high-angle drilling costs*," Offshore, Nov. 1989 (3 pages).
R. Gardes, "*Micro-annulus under-balanced drilling of multilateral wells*," Offshore, May 1996 (4 pages).
"*Multiple directional wells from single borehole developed*," Offshore, reprint from Jul. 1989 (4 pages).
"*Soviet joint venture pace continues to sizzle*," Oil & Gas Journal, week of Jun. 25, 1990 (3 pages).
"*Operators Team Up To Climb Learning Curve Together*," in "Multilateral Technology: Taking Horizontal Wells to the Next Level"—a supplement to Hart's Petroleum Engineer International (4 pages).
"*Radial Coring Reduces Sample Contamination, Evaluates Old Wells*," Hart's Petroleum Engineer International, Jun. 1994 (4 pages).
"*The Fate of Award Winners Is A Credit To Their Judges*," Hart's Petroleum Engineer International, Apr. 1996 (3 pages).
S. R. Reeves and S. H. Stevens, "*$CO_2$ Sequestration*," World Coal, Dec. 2000 (4 pages).
"*Successful Completions Raise Operators' Confidence*," in "Multilateral Technology: Taking Horizontal Wells to the Next Level"—a supplement to Hart's Petroleum Engineer International (5 pages).
Johnson et al., "Underbalanced Drilling Design Maximizes Coal Bed Methane Recoveries", CDX Gas, Aug. 2008 (6 pages).
Morrish, Susan, "Extended European Search Report", European Application No. 07021409.3, mailed on Oct. 30, 2008 (8 pages).
The State Intellectual Property Office of the People's Republic of China, "Third Office Action", Application No. 200710152916.9, issued on Aug. 1, 2012 (4 pages).
The State Intellectual Property Office of the People's Republic of China, "The First Office Action", Chinese Appl. No. 99815570.5, dated Apr. 29, 2005 (6 pages).
Ron Weber, "Examination Report", Australian Appl. No. 2011200364, dated Dec. 22, 2011 (2 pages).
Jeffrey Butler, "Examination Report", Canadian Appl. No. 2,661,725, dated Jun. 6, 2011 (3 pages).

* cited by examiner

FIG. 24C
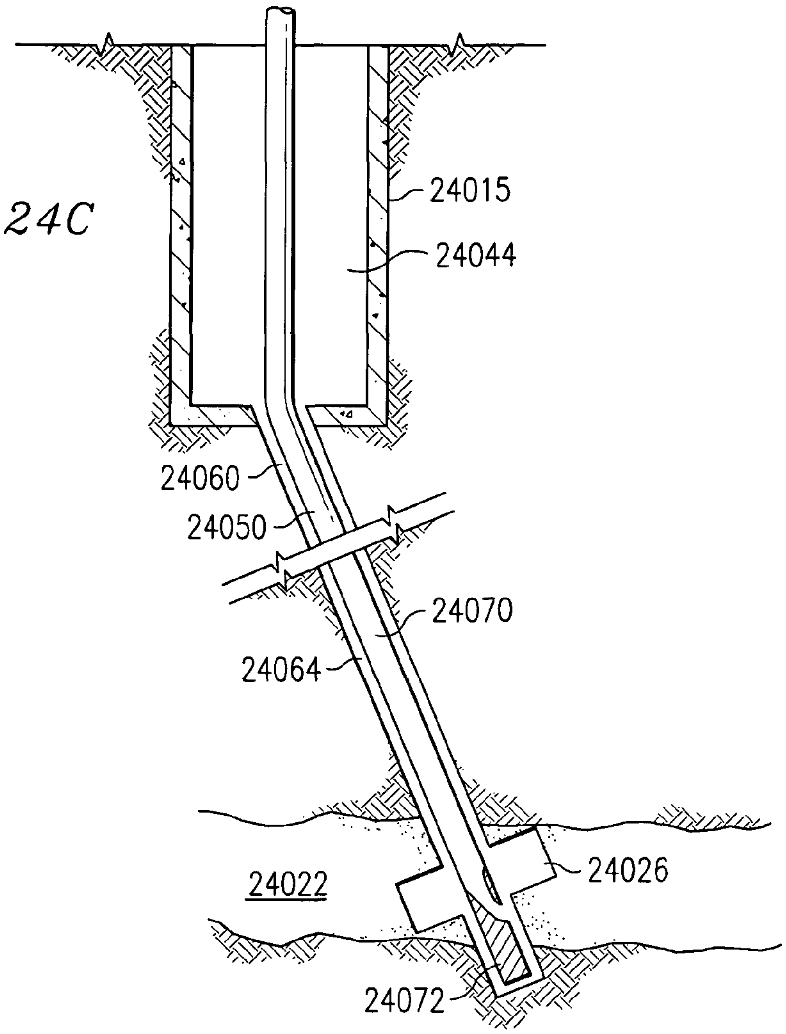
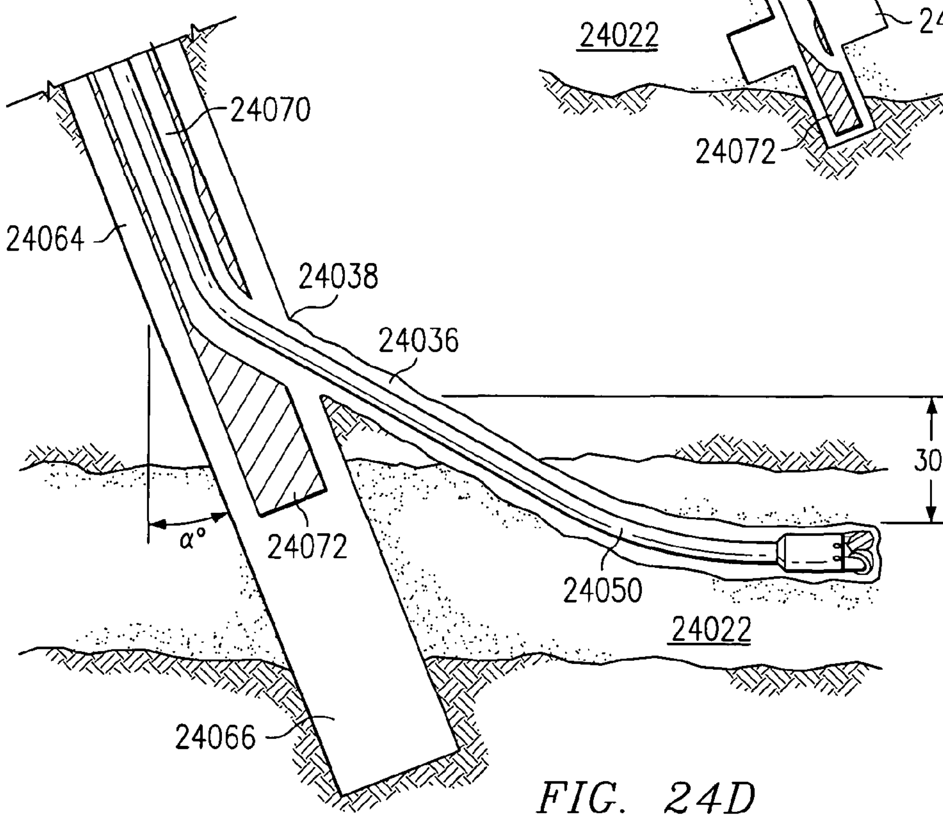
FIG. 24D

FIG. 50
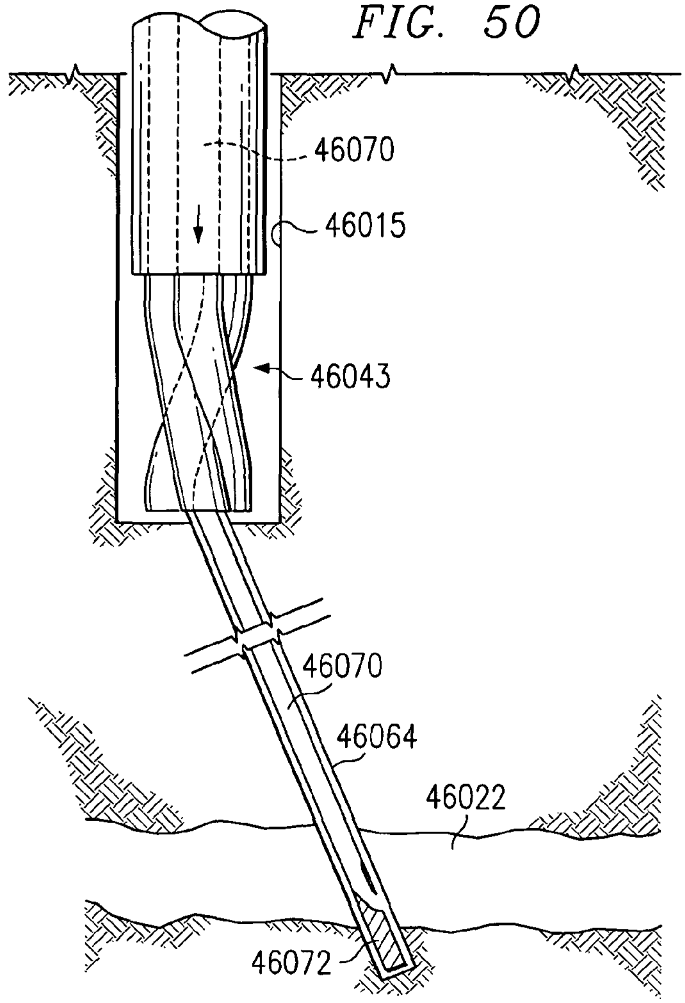
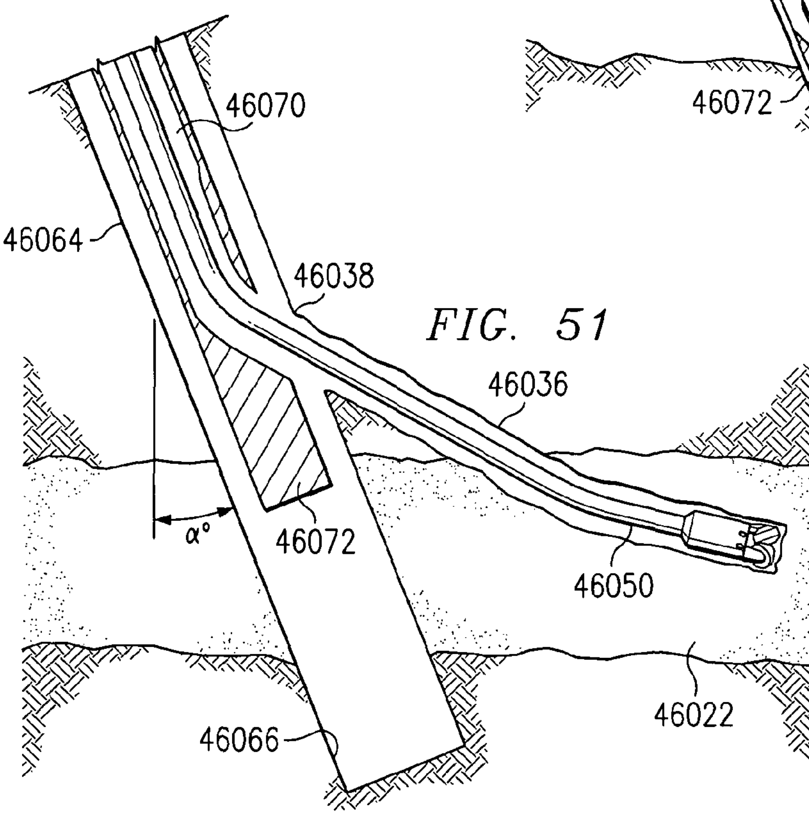
FIG. 51

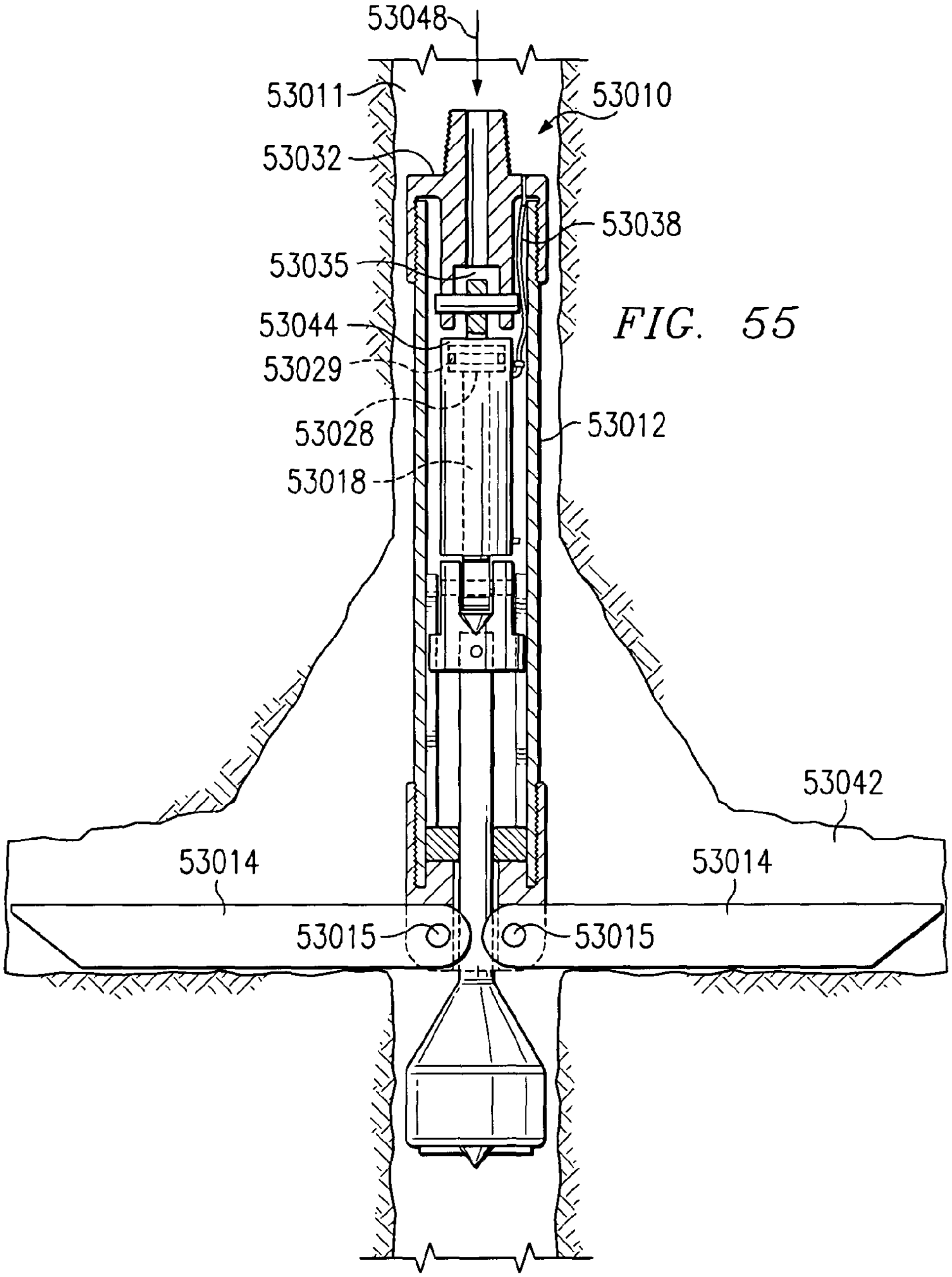
FIG. 55
FIG. 56
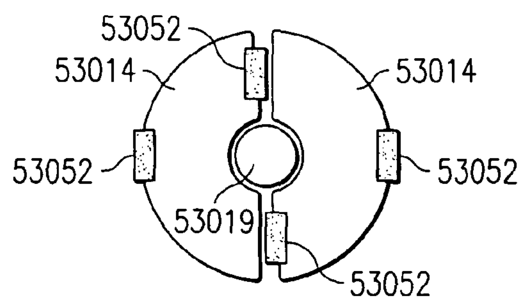

SIMULATED CUMULATIVE GAS PRODUCTION FOR A MULTILATERAL WELL AS A FUNCTION OF LATERAL SPACING

METHOD AND SYSTEM FOR ACCESSING SUBTERRANEAN DEPOSITS FROM THE SURFACE AND TOOLS THEREFOR

RELATED APPLICATIONS

This application is a continuation-in-part of U.S. application Ser. No. 10/165,627, entitled METHOD AND SYSTEM FOR ACCESSING SUBTERRANEAN DEPOSITS FROM THE SURFACE, filed Jun. 7, 2002, issued Dec. 30, 2003 as U.S. Pat. No. 6,668,918, which is a continuation of U.S. application Ser. No. 09,789,956, entitled METHOD AND SYSTEM FOR ACCESSING SUBTERRANEAN DEPOSITS FROM THE SURFACE, filed Feb. 20, 2001, issued Nov. 12, 2002 as U.S. Pat. No. 6,478,085, which is a divisional of U.S. application Ser. No. 09/444,029, entitled METHOD AND SYSTEM FOR ACCESSING SUBTERRANEAN DEPOSITS FROM THE SURFACE, filed Nov. 19, 1999, issued Mar. 19, 2002 as U.S. Pat. No. 6,357,523, which is a continuation-in-part of U.S. application Ser. No. 09/197,687, entitled METHOD FOR PRODUCTION OF GAS FROM A COAL SEAM USING INTERSECTING WELL BORES, filed Nov. 20, 1998, issued Aug. 28, 2001 as U.S. Pat. No. 6,280,000.

This application is also a continuation-in-part of U.S. application Ser. No. 09/774,996, entitled METHOD AND SYSTEM FOR ACCESSING SUBTERRANEAN DEPOSITS FROM THE SURFACE, filed Jan. 30, 2001, issued Dec. 16, 2003 as U.S. Pat. No. 6,662,870.

This application is also a continuation-in-part of U.S. application Ser. No. 10/123,561, entitled METHOD AND SYSTEM FOR ACCESSING SUBTERRANEAN ZONES FROM A LIMITED SURFACE AREA, filed Apr. 15, 2002, issued Aug. 12, 2003 as U.S. Pat. No. 6,604,580, which is: (i) a divisional of U.S. application Ser. No. 09/773,217, entitled METHOD AND SYSTEM FOR ACCESSING SUBTERRANEAN ZONES FROM A LIMITED SURFACE AREA, filed Jan. 30, 2001, issued Jul. 30, 2002 as U.S. Pat. No. 6,425,448 and (ii) a continuation-in-part of U.S. application Ser. No. 09/885,219, entitled METHOD AND SYSTEM FOR ACCESSING SUBTERRANEAN DEPOSITS FROM THE SURFACE, filed Jun. 20, 2001, issued May 13, 2003 as U.S. Pat. No. 6,561,288, which is a continuation of U.S. application Ser. No. 09/444,029, entitled METHOD AND SYSTEM FOR ACCESSING SUBTERRANEAN DEPOSITS FROM THE SURFACE, filed Nov. 19, 1999, issued Mar. 19, 2002 as U.S. Pat. No. 6,357,523, which is a continuation-in-part of U.S. application Ser. No. 09/197,687, entitled METHOD FOR PRODUCTION OF GAS FROM A COAL SEAM USING INTERSECTING WELL BORES, filed Nov. 20, 1998, issued Aug. 28, 2001 as U.S. Pat. No. 6,280,000.

This application is also a continuation-in-part of U.S. application Ser. No. 10/046,001, entitled METHOD AND SYSTEM FOR MANAGEMENT OF BY-PRODUCTS FROM SUBTERRANEAN ZONES, filed Oct. 19, 2001, issued Jan. 27, 2004 as U.S. Pat. No. 6,681,855.

This application is also a continuation-in-part of U.S. application Ser. No. 10/079,794, entitled ACOUSTIC POSITION MEASUREMENT SYSTEM FOR WELLBORE FORMATION, filed Feb. 19, 2002, issued Jan. 24, 2006 as U.S. Pat. No. 6,988,566.

This application is also a continuation-in-part of U.S. application Ser. No. 10/004,316, entitled SLANT ENTRY WELL SYSTEM AND METHOD, filed Oct. 30, 2001, issued May 23, 2006 as U.S. Pat. No. 7,048,049.

This application is also a continuation-in-part of U.S. application Ser. No. 10/160,425, entitled WEDGE ACTIVATED UNDERREAMER, filed May 31, 2002, issued Nov. 8, 2005 as U.S. Pat. No. 6,962,216.

This application is also a continuation-in-part of U.S. application Ser. No. 10/194,366, entitled UNDULATING WELL BORE, filed Jul. 12, 2002, issued Mar. 23, 2004 as U.S. Pat. No. 6,708,764.

This application is also a continuation-in-part of U.S. application Ser. No. 10/227,057, entitled SYSTEM AND METHOD FOR SUBTERRANEAN ACCESS, filed Aug. 22, 2002, now abandoned, which is a continuation-in-part of U.S. patent application Ser. No. 09/774,996, filed Jan. 30, 2001 entitled METHOD AND SYSTEM FOR ACCESSING A SUBTERRANEAN ZONE FROM A LIMITED SURFACE AREA, issued Dec. 16, 2003 as U.S. Pat. No. 6,662,870.

This application is also continuation-in-part of U.S. application Ser. No. 10/323,192, entitled METHOD AND SYSTEM FOR CIRCULATING FLUID IN A WELL SYSTEM, filed Dec. 18, 2002, issued Apr. 11, 2006 as U.S. Pat. No. 7,025,154, which is a continuation-in-part of U.S. application Ser. No. 09/788,897, entitled METHOD AND SYSTEM FOR ACCESSING SUBTERRANEAN DEPOSITS FROM THE SURFACE, filed Feb. 20, 2001, issued May 11, 2004 as U.S. Pat. No. 6,732,792, which is a divisional of U.S. application Ser. No. 09/444,029, entitled METHOD AND SYSTEM FOR ACCESSING SUBTERRANEAN DEPOSITS FROM THE SURFACE, filed Nov. 19, 1999, issued Mar. 19, 2002 as U.S. Pat. No. 6,357,523, which is a continuation-in-part of U.S. application Ser. No. 09/197,687, entitled METHOD FOR PRODUCTION OF GAS FROM A COAL SEAM USING INTERSECTING WELL BORES, filed Nov. 20, 1998, issued Aug. 28, 2001 as U.S. Pat. No. 6,280,000.

This application is also a continuation-in-part of U.S. application Ser. No. 10/264,535, entitled METHOD AND SYSTEM FOR REMOVING FLUID FROM A SUBTERRANEAN ZONE USING AN ENLARGED CAVITY, filed Oct. 3, 2002, issued Jan. 24, 2006 as U.S. Pat. No. 6,988,548.

This application is also a continuation-in-part of U.S. application Ser. No. 10/244,082, entitled METHOD AND SYSTEM FOR CONTROLLING PRESSURE IN A DUAL WELL SYSTEM, filed Sep. 12, 2002, issued Jul. 11, 2006 as U.S. Pat. No. 7,073,595.

This application is a continuation-in-part of U.S. application Ser. No. 09/769,098, entitled METHOD AND SYSTEM FOR ENHANCED ACCESS TO A SUBTERRANEAN ZONE, filed Jan. 24, 2001, issued Jul. 29, 2003 as U.S. Pat. No. 6,598,686, which is a continuation-in-part of U.S. Ser. No. 09/696,338, entitled CAVITY WELL POSITIONING SYSTEM AND METHOD, filed Oct. 24, 2000, issued Sep. 24, 2002 as U.S. Pat. No. 6,454,000, which is a continuation-in-part of U.S. application Ser. No. 09/444,029, entitled METHOD AND SYSTEM FOR ACCESSING SUBTERRANEAN DEPOSITS FROM THE SURFACE, filed Nov. 19, 1999, issued Mar. 19, 2002 as U.S. Pat. No. 6,357,523, which is a continuation-in-part of U.S. application Ser. No. 09/197,687, entitled METHOD FOR PRODUCTION OF GAS FROM A COAL SEAM USING INTERSECTING WELL BORES, filed Nov. 20, 1998, issued Aug. 28, 2001 as U.S. Pat. No. 6,280,000.

This application is also a continuation-in-part of U.S. application Ser. No. 10/003,917, entitled METHOD AND SYSTEM FOR SURFACE PRODUCT OF GAS FROM A SUBTERRANEAN ZONE, filed Nov. 1, 2001, pending, which is a continuation-in-part of U.S. application Ser. No. 09/444,029, entitled METHOD AND SYSTEM FOR ACCESSING SUBTERRANEAN DEPOSITS FROM THE SURFACE, filed Nov. 19, 1999, issued Mar. 19, 2002 as U.S. Pat. No. 6,357,523, which is a continuation-in-part of U.S.

application Ser. No. 09/197,687, entitled METHOD FOR PRODUCTION OF GAS FROM A COAL SEAM USING INTERSECTING WELL BORES, filed Nov. 20, 1998, issued Aug. 28, 2001 as U.S. Pat. No. 6,280,000.

TECHNICAL FIELD OF THE INVENTION

The present invention relates generally to the recovery of subterranean deposits, and more particularly to a method and system for accessing subterranean deposits from the surface and tools therefor.

BACKGROUND OF THE INVENTION

Subterranean deposits of coal contain substantial quantities of entrained methane gas limited in production in use of methane gas from coal deposits has occurred for many years. Substantial obstacles, however, have frustrated more extensive development and use of methane gas deposits in coal seams. The foremost problem in producing methane gas from coal seams is that while coal seams may extend over large areas of up to several thousand acres, the coal seams are fairly shallow in depth, varying from a few inches to several meters. Thus, while the coal seams are often relatively near the surface, vertical wells drilled into the coal deposits for obtaining methane gas can only drain a fairly small radius around the coal deposits. Further, coal deposits are not amendable to pressure fracturing and other methods often used for increasing methane gas production from rock formations. As a result, once the gas easily drained from a vertical well bore in a coal seam is produced, further production is limited in volume. Additionally, coal seams are often associated with subterranean water, which must be drained from the coal seam in order to produce the methane.

Horizontal drilling patterns have been tried in order to extend the amount of coal seams exposed to a drill bore for gas extraction. Such horizontal drilling techniques, however, require the use of a radiused well bore which presents difficulties in removing the entrained water from the coal seam. The most efficient method for pumping water from a subterranean well, a sucker rod pump, does not work well in horizontal or radiused bores.

A further problem for surface production of gas from coal seams is the difficulty presented by under balanced drilling conditions caused by the porousness of the coal seam. During both vertical and horizontal surface drilling operations, drilling fluid is used to remove cuttings from the well bore to the surface. The drilling fluid exerts a hydrostatic pressure on the formation which, if it exceeds the hydrostatic pressure of the formation, can result in a loss of drilling fluid into the formation. This results in entrainment of drilling finds in the formation, which tends to plug the pores, cracks, and fractures that are needed to produce the gas.

As a result of these difficulties in surface production of methane gas from coal deposits, the methane gas which must be removed from a coal seam prior to mining, has been removed from coal seams through the use of subterranean methods. While the use of subterranean methods allows water to be easily removed from a coal seam and eliminates under balanced drilling conditions, they can only access a limited amount of the coal seams exposed by current mining operations. Where longwall mining is practiced, for example, underground drilling rigs are used to drill horizontal holes from a panel currently being mined into an adjacent panel that will later be mined. The limitations of underground rigs limits the reach of such horizontal holes and thus the area that can be effectively drained. In addition, the degasification of a next panel during mining of a current panel limits the time for degasification. As a result, many horizontal bores must be drilled to remove the gas in a limited period of time. Furthermore, in conditions of high gas content or migration of gas through a coal seam, mining may need to be halted or delayed until a next panel can be adequately degasified. These production delays add to the expense associated with degasifying a coal seam.

Prior mining systems also generally require a fairly large and level surface area from which to work. As a result, prior mining systems and drilling technologies generally cannot be used in Appalachia or other hilly terrains. For example, in some areas the largest area of flat land may be a wide roadway. Thus, less effective methods must be used, leading to production delays that add to the expense associated with degasifying a coal seam.

Production of petroleum and other valuable materials from subterranean zones frequently results in the production of water and other by-products that must be managed in some way. Such by-product water may be relatively clean, or may contain large amounts of brine or other materials. These by-products are typically disposed of by simply pouring them at the surfaces or, if required by environmental regulations, hauling them off-site at great expense.

At any point in the drilling of a well bore its desired orientation may be vertical, horizontal or at any other orientation to achieve the positioning of the bore required by the incident application. Further, the incident application may require that the well bore remain within and/or aligned with one or more boundaries of a specific "target" geologic formation such as a stratum, seam or other delimited subterranean structure. In these cases, it is necessary to detect and measure the distance to the boundaries between the target formation and the adjacent formation(s) to allow guidance of the drilling process to keep the well bore within the target formation.

Well bores are typically formed by a drilling rig that rotates a drill string and thus a drill bit at the distal end of the drill string; or which rotates the drill string only to alter the direction of drilling, and the drill bit may in those cases be powered by, for example, a hydraulic or electric powered motor section located at or near the end of the drill string. The drill string may also include a bent section to facilitate steering and/or other rotation of the drill bit.

While the use of subterranean methods allows water to be easily removed from a coal seam and eliminates under-balanced drilling conditions, they can only access a limited amount of the coal seams exposed by current mining operations. Where longwall mining is practiced, for example, underground drilling rigs are used to drill horizontal holes from a panel currently being mined into an adjacent panel that will later be mined. The limitations of underground rigs limits the reach of such horizontal holes and thus the area that can be effectively drained. In addition, the degasification of a next panel during mining of a current panel limits the time for degasification. As a result, many horizontal bores must be drilled to remove the gas in a limited period of time. Furthermore, in conditions of high gas content or migration of gas through a coal seam, mining may need to be halted or delayed until a next panel can be adequately degasified. These production delays add to the expense associated with degasifying a coal seam.

Underreamers may be used to form an enlarged cavity in a well bore extending through a subterranean formation. The cavity may then be used to collect resources for transport to the surface, as a sump for the collection of well bore formation cuttings and the like or for other suitable subterranean exploration and resource production operations. Additionally, the cavity may be used in well bore drilling operations to provide an enlarged target for constructing multiple intersecting well bores.

One example of an underreamer includes a plurality of cutting blades pivotally coupled to a lower end of a drill pipe. Centrifugal forces caused by rotation of the drill pipe extends the cutting blades outwardly and diametrically opposed to each other. As the cutting blades extend outwardly, the centrifugal forces cause the cutting blades to contact the surrounding formation and cut through the formation. The drill pipe may be rotated until the cutting blades are disposed in a position substantially perpendicular to the drill pipe, at which time the drill pipe may be raised and/or lowered within the formation to form a cylindrical cavity within the formation.

Conventional underreamers, however, suffer several disadvantages. For example, the underreamer described above generally requires high rotational speeds to produce an adequate level of centrifugal force to cause the cutting blades to cut into the formation. An equipment failure occurring during high speed rotation of the above-described underreamer may cause serious harm to operators of the underreamer as well as damage and/or destruction of additional drilling equipment.

Additionally, density variations in the subsurface formation may cause each of the cutting blades to extend outwardly at different rates and/or different positions relative to the drill pipe. The varied positions of the cutting blades relative to the drill pipe may cause an out-of-balance condition of the underreamer, thereby creating undesired vibration and rotational characteristics during cavity formation, as well as an increased likelihood of equipment failure.

A common problem in producing methane gas from coal seams may be vertical separation of multiple thin layers of coal within a coal seam. Although coal seams may extend over large areas of up to several thousand acres, the depth of the multiple layers in the coal seam may vary from very shallow to very deep. Vertical wells drilled into the coal deposits for obtaining methane gas can only drain a fairly small radius of methane gas around the vertical well. Further, coal deposits are not amenable to pressure fracturing and other methods often used for increasing gas production from conventional rock formations. As a result, production of gas may be limited in volume. Additionally, coal seams are often associated with subterranean water, which must be drained from the coal seam in order to produce the methane.

One problem in producing methane gas from coal seams is that while coal seams may extend over large areas, up to several thousand acres, and may vary in depth from a few inches to many feet. Coal seams may also have a low permeability. Thus, vertical wells drilled into the coal deposits for obtaining methane gas can generally only drain a fairly small radius of methane gas in low and even medium permeability coal deposits. As a result, once gas in the vicinity of a vertical well bore is produced, further production from the coal seam through the vertical well is limited.

Another problem in producing methane gas from coal seams is subterranean water which must be drained from the coal seam in order to produce the methane. As water is removed from the coal seam, it may be replaced with recharge water flowing from other virgin areas of the coal seam and/or adjacent formations. This recharge of the coal seam extends the time required to drain the coal seam and thus prolongs the production time for entrained methane gas which may take five years, ten years, or even longer. When the area of the coal seam being drained is near a mine or other subterranean structure that reduces water and/or recharge water by itself draining water from the coal seam or in areas of high permeability, methane gas may be produced from the coal seam after a shorter period of water removal. For example, in Appalachia coal beds with a high permeability of ten to fifteen millidarcies have in four or five months been pumped down to the point where gas can be produced.

One problem of production of gas from coal seams may be the difficulty presented at times by over-balanced drilling conditions caused by low reservoir pressure and aggravated by the porosity of the coal seam. During both vertical and horizontal surface drilling operations, drilling fluid is used to remove cuttings from the well bore to the surface. The drilling fluid exerts a hydrostatic pressure on the formation which, when exceeding the pressure of the formation, can result in a loss of drilling fluid into the formation. This results in entrainment of drilling finds in the formation, which tends to plug the pores, cracks, and fractures that are needed to produce the gas.

Certain methods are available to drill in an under-balanced state. Using a gas such as nitrogen in the drilling fluid reduces the hydrostatic pressure, but other problems can occur as well, including increased difficulty in maintaining a desired pressure condition in the well system during drill string tripping and connecting operations.

Subterranean zones, such as coal seams, contain substantial quantities of entrained methane gas. Subterranean zones are also often associated with liquid, such as water, which must be drained from the zone in order to produce the methane. When removing such liquid, entrained coal fines and other fluids from the subterranean zone through pumping, methane gas may enter the pump inlet which reduces pump efficiency.

One problem of surface production of gas from coal seams may be the difficulty presented at times by over-balanced drilling conditions caused by the porosity of the coal seam. During both vertical and horizontal surface drilling operations, drilling fluid is used to remove cuttings from the well bore to the surface. The drilling fluid exerts a hydrostatic pressure on the formation which, if it exceeds the pressure of the formation, can result in a loss of drilling fluid into the formation. This results in entrainment of drilling finds in the formation, which tends to plug the pores, cracks, and fractures that are needed to produce the gas. Other problems include a difficulty in maintaining a desired pressure condition in the well system during drill string tripping and connecting operations.

BRIEF DESCRIPTION OF THE DRAWINGS

FIG. 24C illustrates an example system of an entry well bore and a slanted well bore;

FIG. 24D illustrates an example system of a slanted well bore and an articulated well bore;

FIG. 50 illustrates an example system of an entry well bore and a slanted well bore;

FIG. 51 illustrates an example system of a slanted well bore and an articulated well bore;

FIG. 55 is a diagram illustrating the underreamer of FIG. 1 in an extended position;

FIG. 56 is a cross-sectional view of FIG. 1 taken along line 56-56, illustrating the cutters of the example underreamer of FIG. 1;

DETAILED DESCRIPTION OF THE INVENTION

I. Well Types

Figure 5:
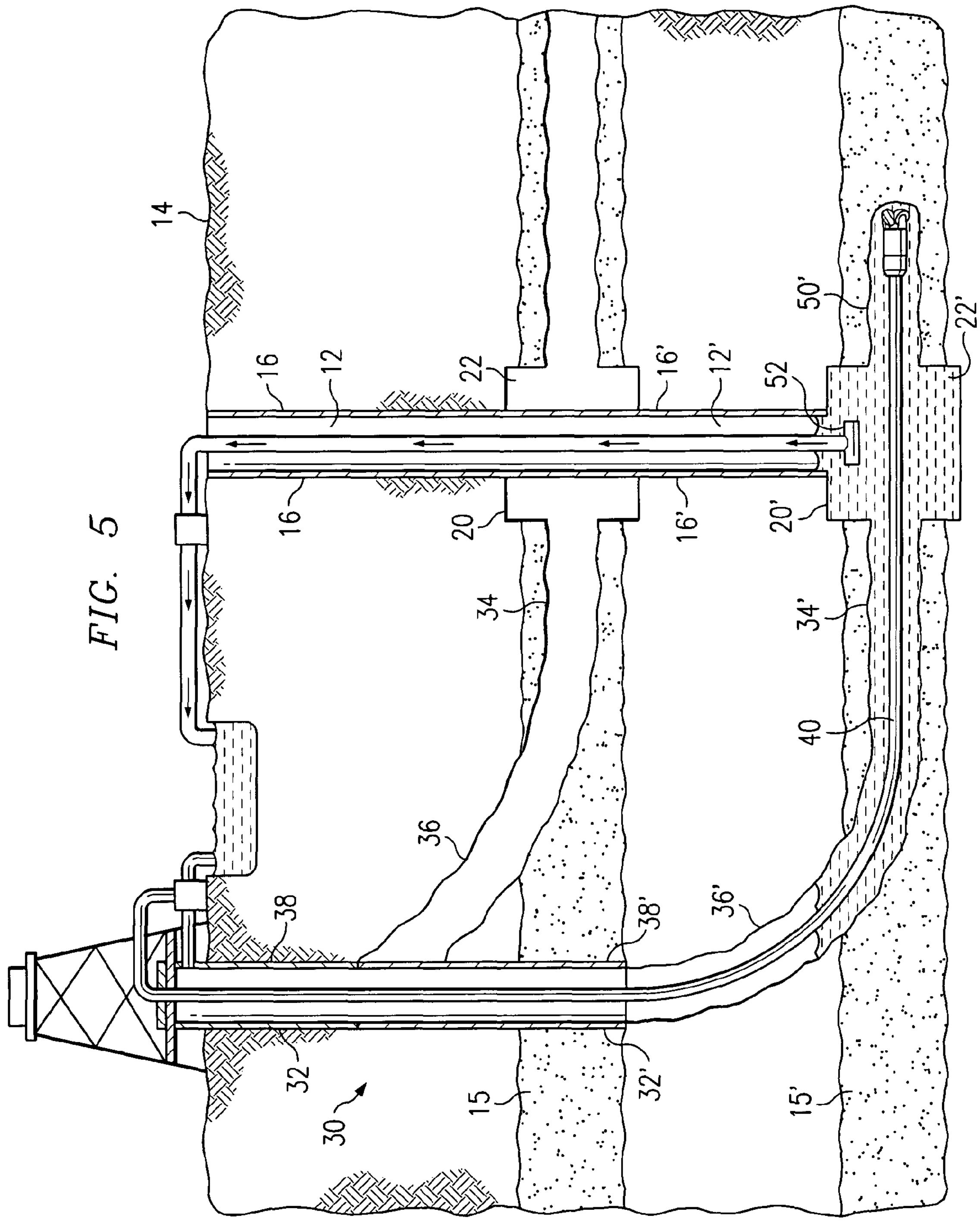
FIG. 5 is a cross-sectional diagram illustrating production of fluids from well bore patterns in dual subterranean zones through a well bore in accordance with another embodiment of the present invention.
Figure 6A:
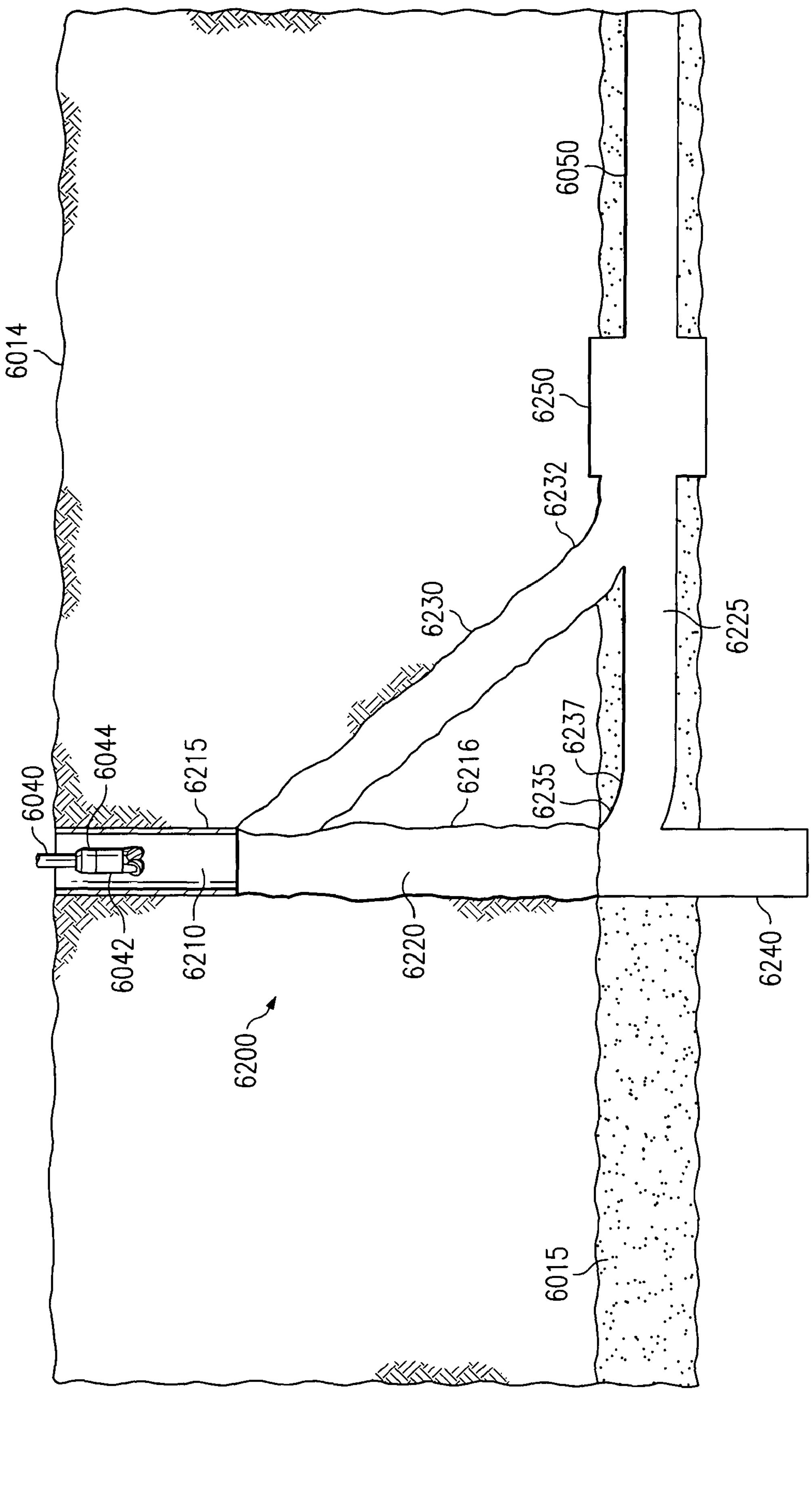
FIG. 6A is a cross-sectional diagram illustrating formation of a well bore pattern in a subterranean zone through an articulated surface well intersecting a cavity well at the surface in accordance with another embodiment of the present invention.
Figure 7:
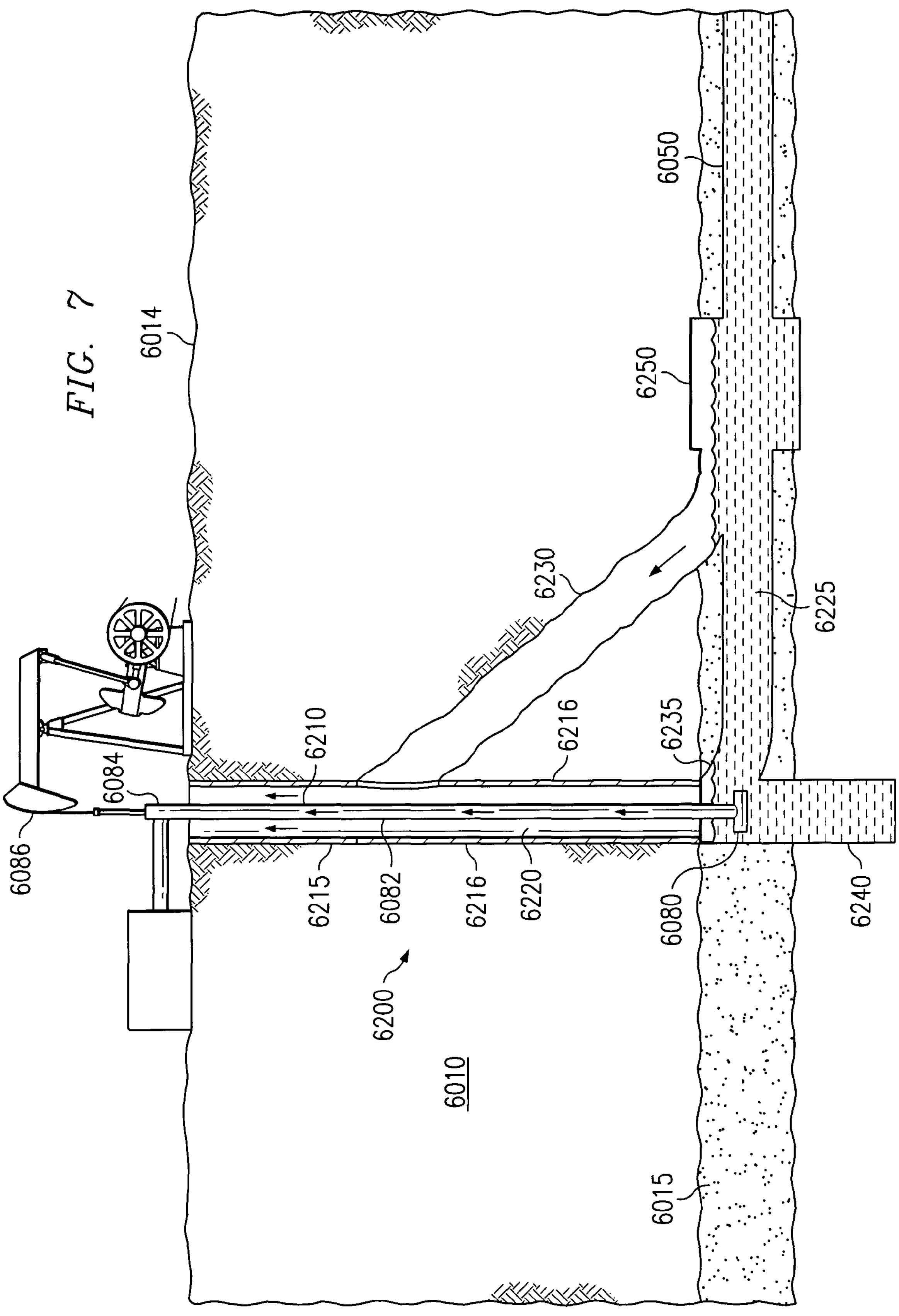
FIG. 7 is a diagram illustrating production of fluids from a well bore pattern in a subterranean zone through a well bore in accordance with another embodiment of the present invention.
Figure 8:
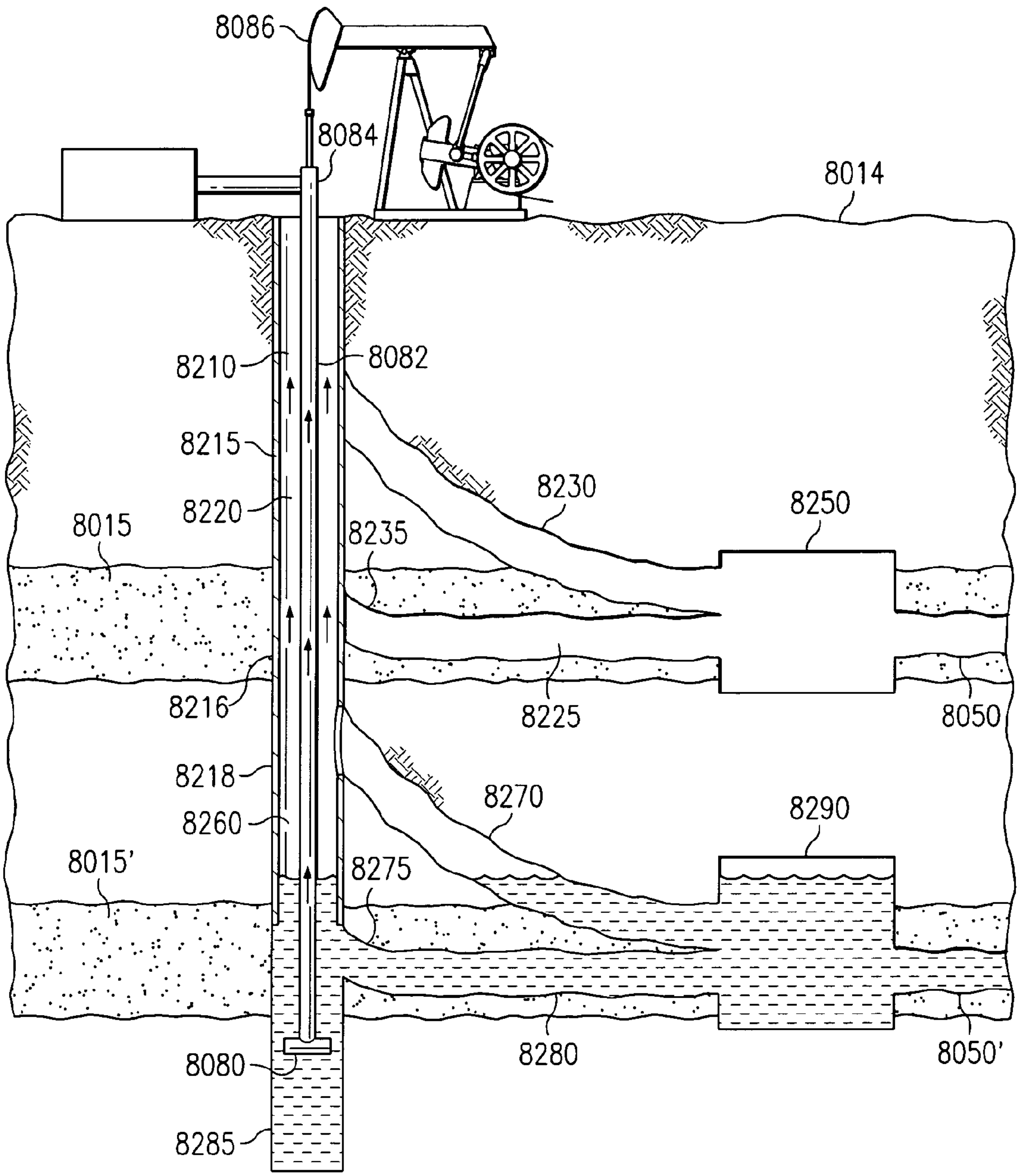
FIG. 8 is a diagram illustrating the production of fluids from well bore patterns in dual subterranean zones through a well bore in accordance with another embodiment of the present invention.
Figure 9:
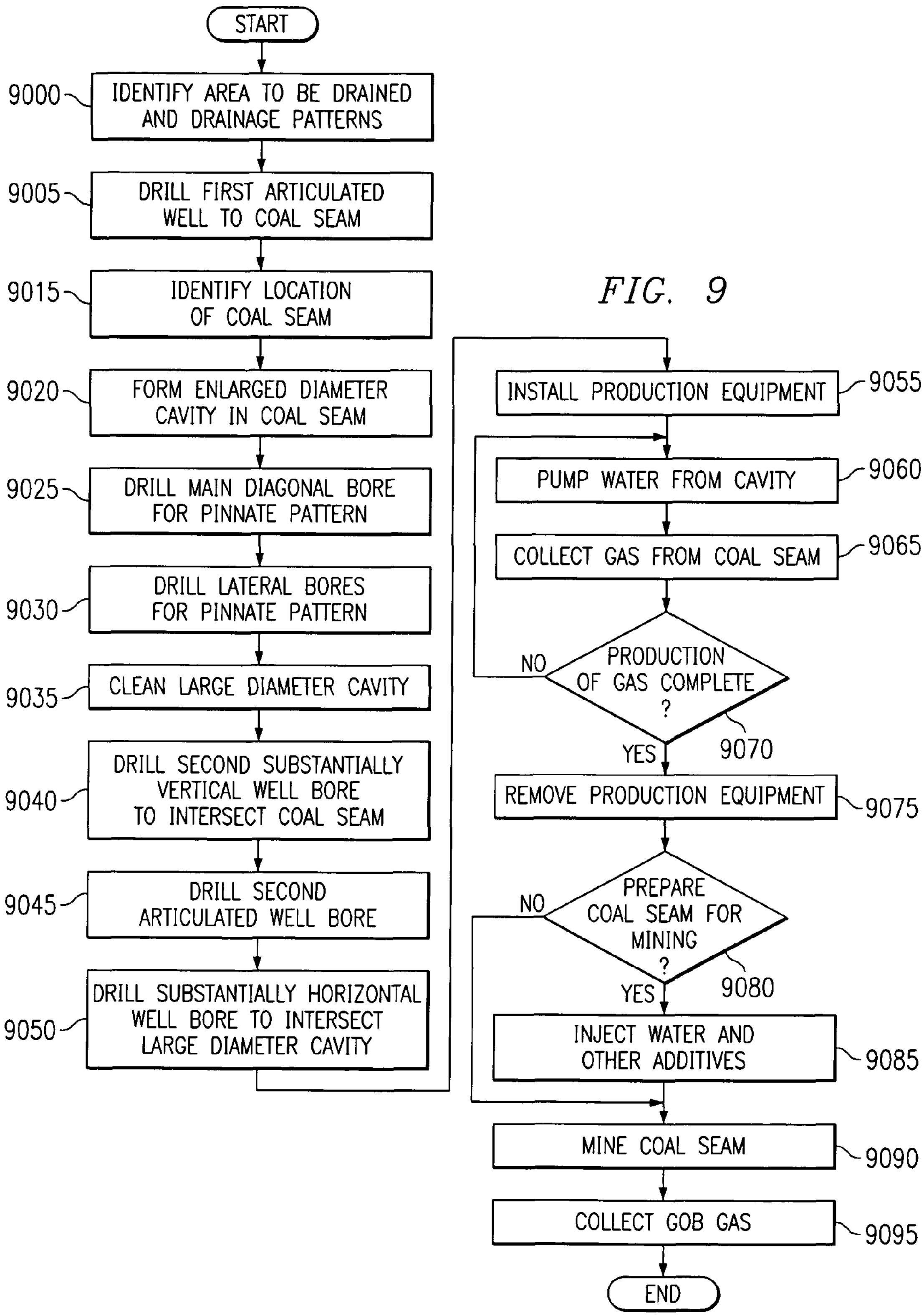
FIG. 9 is a flow diagram illustrating a method for preparing a coal seam for mining operations in accordance with another embodiment of the present invention.
Figure 22:
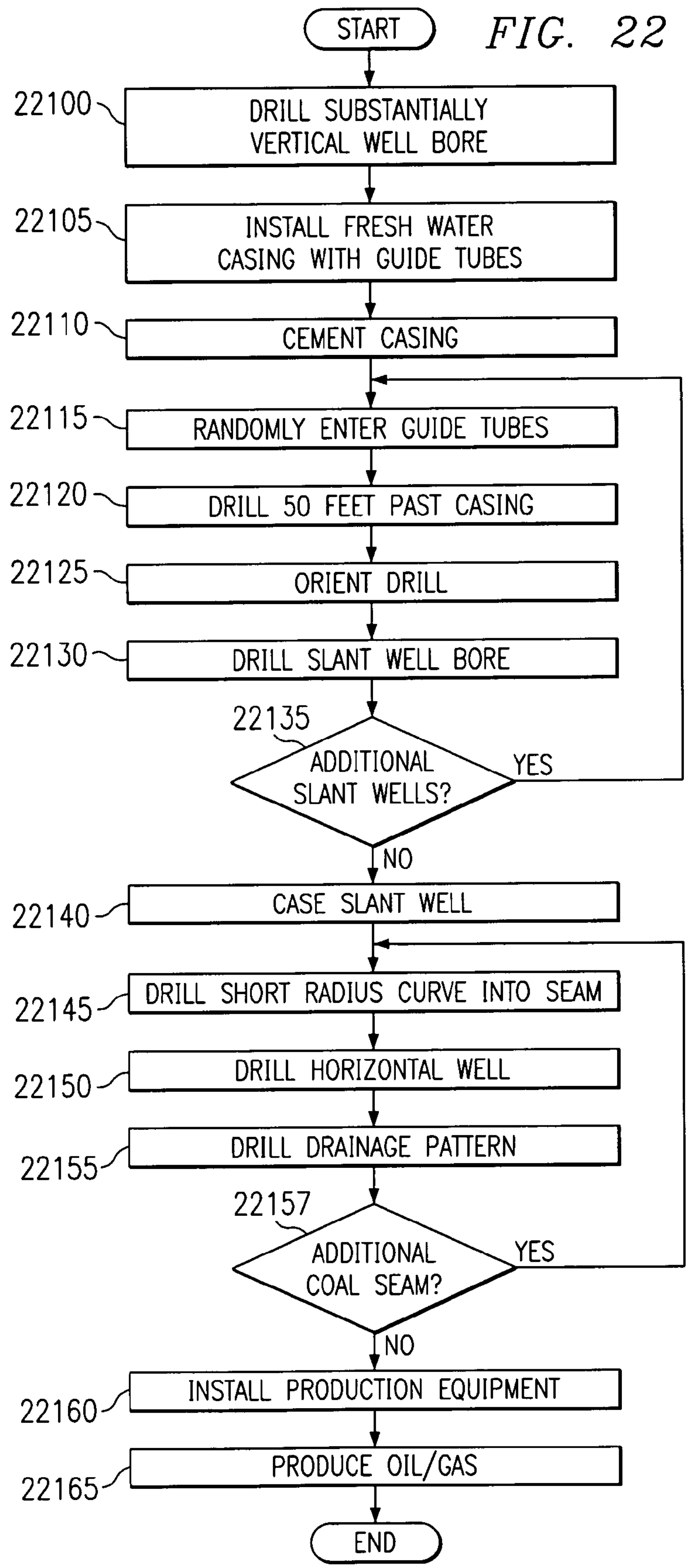
FIG. 22 illustrates an example method for producing water and gas from a subsurface formation.
Figure 23A:
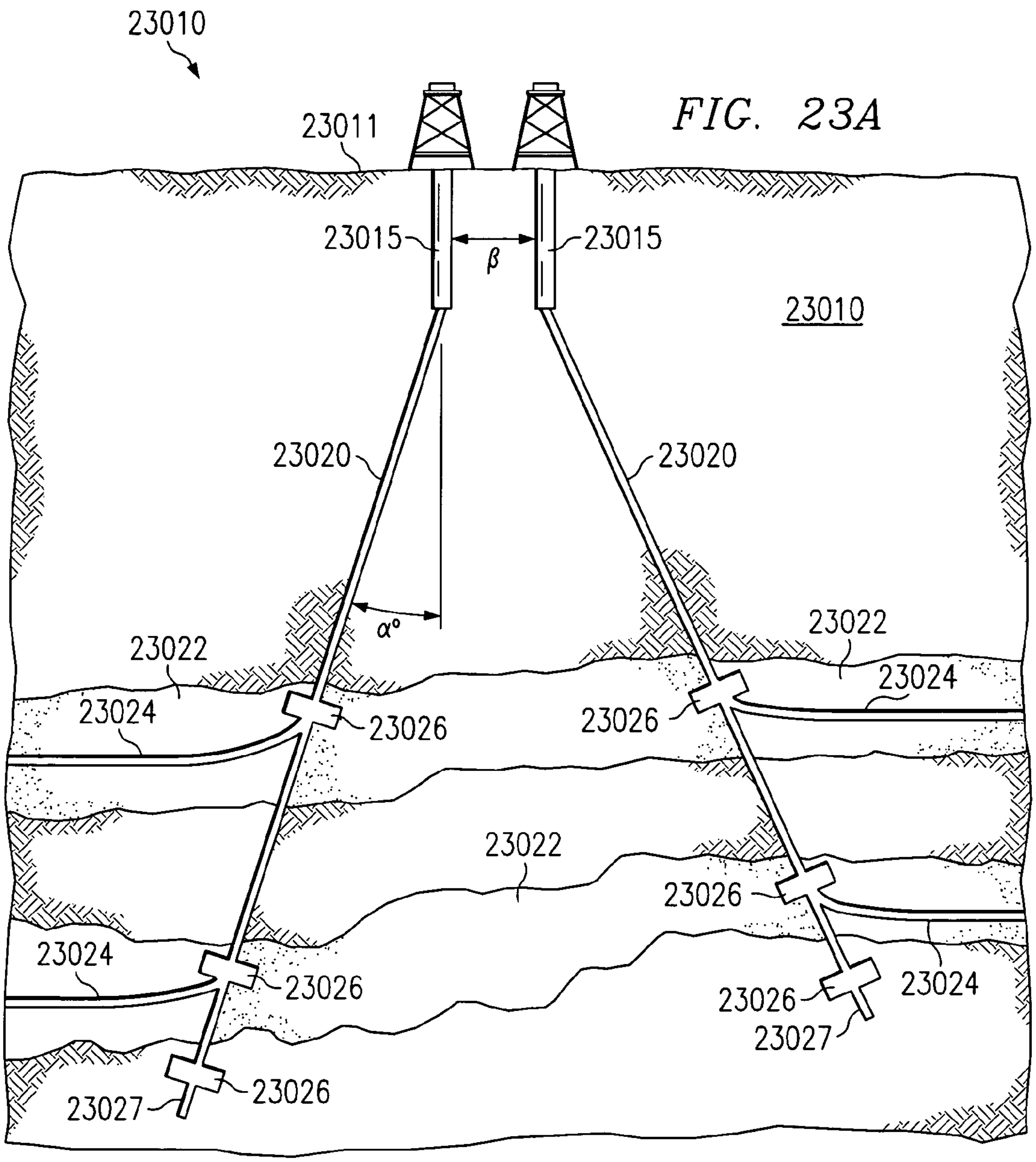
FIG. 23A illustrates an example slant well system for production of resources from a subterranean zone.

FIGS. 1 through 24 illustrate example types of wells that may be constructed according to the teachings of the invention. FIGS. 1 through 4 involve dual wells. FIG. 5 involves dual wells with dual zones. FIGS. 6A-7 involve a dual radius well. FIGS. 8-9 involve dual radius wells with dual zones. FIGS. 10-19 involve dual wells with an angled well. FIGS. 20-22 involve a slant well. FIGS. 23-24 involve slant wells with non-common surface wells, as well as pinnate patterns for other types of wells.

A. Dual Well

Figure 1:
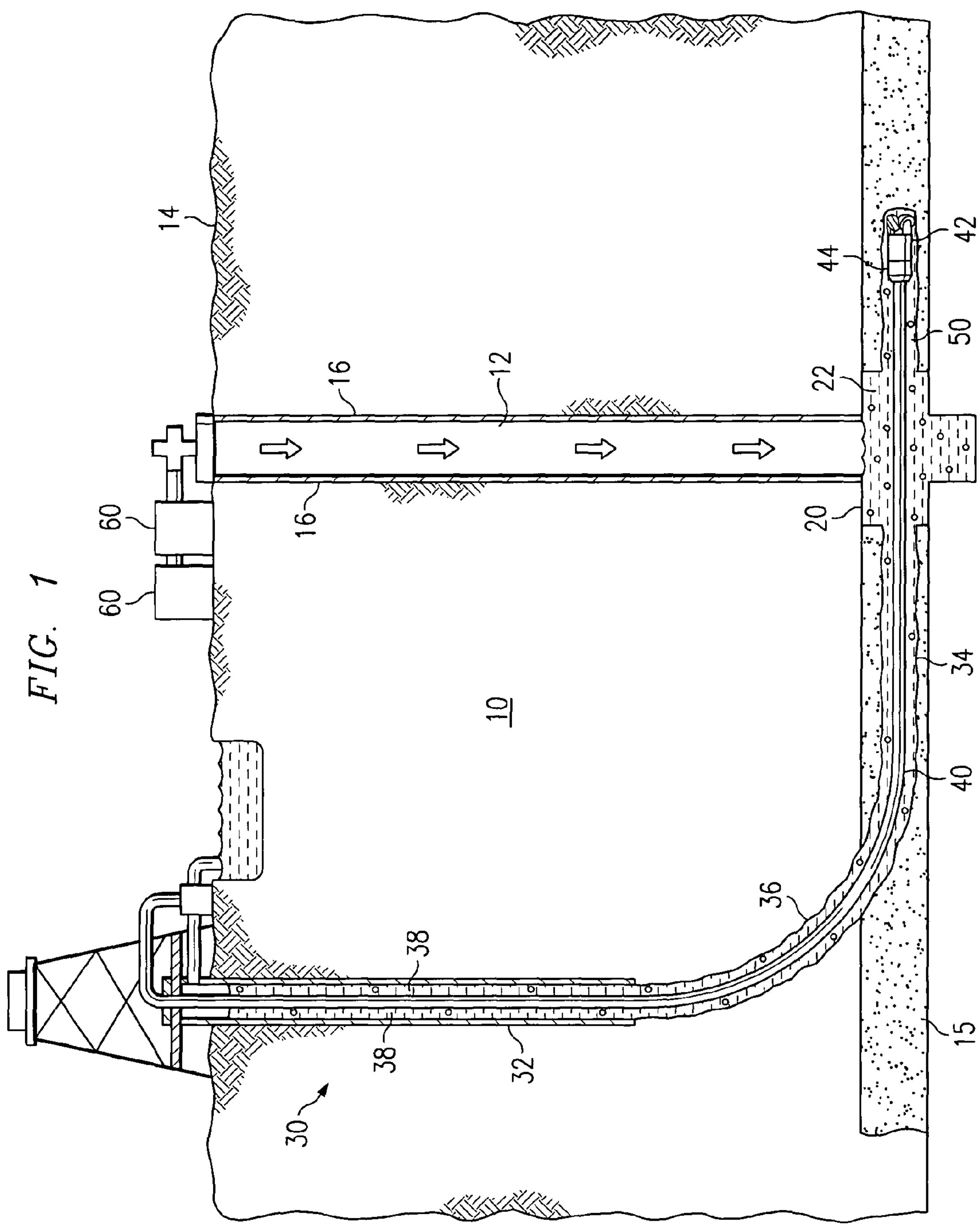
FIG. 1 is a cross-sectional diagram illustrating formation of a well bore pattern in a subterranean zone through an articulated surface well intersecting a cavity well in accordance with one embodiment of the present invention.

FIG. 1 illustrates formation of a dual well system 10 for enhanced access to a subterranean, or subsurface, zone from the surface in accordance with an embodiment of the present invention. In this embodiment, the subterranean zone is a tight coal seam having a medium to low permeability. It will be understood that other suitable types of zones and/or other types of low pressure, ultra-low pressure, and low porosity subterranean formations can be similarly accessed using the present invention to lower reservoir or formation pressure and produce hydrocarbons such as methane gas and other products from the zone. For example, the zone may be a shale or other carbonaceous formation.

Referring to FIG. 1, the system 10 includes a well bore 12 extending from the surface 14 to a target coal seam 15. The well bore 12 intersects, penetrates and continues below the coal seam 15. The well bore 12 may be lined with a suitable well casing 16 that terminates at or above the level of the coal seam 15. The well bore 12 is substantially vertical or non-articulated in that it allows sucker rod, Moineau and other suitable rod, screw and/or other efficient bore hole pumps or pumping system to lift fluids up the bore 12 to the surface 14. Thus, the well bore 12 may include suitable angles to accommodate surface 14 characteristics, geometric characteristics of the coal seam 15, characteristics of intermediate formations and may be slanted at a suitable angle or angles along its length or parts of its length. In particular embodiments, the well bore 12 may slant up to 35 degrees along its length or in sections but not itself be fully articulated to horizontal.

The well bore 12 may be logged either during or after drilling in order to closely approximate and/or locate the exact vertical depth of the coal seam 15. As a result, the coal seam 15 is not missed in subsequent drilling operations. In addition, techniques used to locate the coal seam 15 while drilling need not be employed. The coal seam 15 may be otherwise suitably located.

An enlarged cavity 20 is formed in the well bore 12 in or otherwise proximate to the coal seam 15. As described in more detail below, the enlarged cavity 20 provides a point for intersection of the well bore 12 by an articulated well bore used to form a horizontal multi-branching or other suitable subterranean well bore pattern in the coal seam 15. The enlarged cavity 20 also provides a collection point for fluids drained from the coal seam 15 during production operations and may additionally function as a gas/water separator and/or a surge chamber. In other embodiments, the cavity may be omitted and the wells may intersect to form a junction or may intersect at any other suitable type of junction.

The cavity 20 is an enlarged area of one or both well bores and may have any suitable configuration. In one embodiment, the cavity 20 has an enlarged radius of approximately eight feet and a vertical dimension that equals or exceeds the vertical dimension of the coal seam 15. In another embodiment, the cavity 20 may have an enlarged substantially rectangular cross section perpendicular to an articulated well bore for intersection by the articulated well bore and a narrow width through which the articulated well bore passes. In these embodiments, the enlarged cavity 20 may be formed using suitable under-reaming techniques and equipment such as a dual blade tool using centrifugal force, ratcheting or a piston for actuation, a pantograph and the like. The cavity may be otherwise formed by fracing and the like. A portion of the well bore 12 may continue below the cavity 20 to form a sump 22 for the cavity 20. After formation of the cavity 20, well 12 may be capped with a suitable well head.

An articulated well bore 30 extends from the surface 14 to the enlarged cavity 20 of the well bore 12. The articulated well bore 30 may include a portion 32, a portion 34, and a curved or radiused portion 36 interconnecting the portions 32 and 34. The portion 32 is substantially vertical, and thus may include a suitable slope. As previously described, portion 32 may be formed at any suitable angle relative to the surface 14 to accommodate surface 14 geometric characteristics and attitudes and/or the geometric configuration or attitude of the coal seam 15. The portion 34 is substantially horizontal in that it lies substantially in the plane of the coal seam 15. The portion 34 intersects the cavity 20 of the well bore 12. It should be understood that portion 34 may be formed at any suitable angle relative to the surface 14 to accommodate the dip or other geometric characteristics of the coal seam 15. It will also be understood that the curved or radius portion 36 may directly intersect the cavity 20 and that the portion 34 may undulate, be formed partially or entirely outside the coal seam 15 and/or may be suitably angled.

In the embodiment illustrated in FIG. 1, the articulated well bore 30 is offset a sufficient distance from the well bore 12 at the surface 14 to permit the large radius curved section 36 and any desired portion 34 to be drilled before intersecting the enlarged cavity 20. To provide the curved portion 36 with a radius of 100-150 feet, the articulated well bore 30 may be offset a distance of about 300 feet from the well bore 12. This spacing reduces or minimizes the angle of the curved portion 36 to reduce friction in the articulated well bore 30 during drilling operations. As a result, reach of the drill string through the articulated well bore 30 is increased and/or maximized. In another embodiment, the articulated well bore 30 may be located within close proximity of the well bore 12 at the surface 14 to minimize the surface area for drilling and production operations. In this embodiment, the well bore 12 may be suitably sloped or radiused to extend down and over to a junction with the articulated bore 30. Thus, as described in more detail below, the multi-well system may have a vertical profile with a limited surface well bore area, a substantially larger subsurface well bore junction area and a still substantially larger subsurface coverage area. The surface well bore area may be minimized to limit environmental impact. The subsurface well bore junction area may be enlarged with respect to the surface area due to the use of large-radius curves for formation of the horizontal drainage pattern. The subsurface coverage area is drained by the horizontal pattern and may be optimized for drainage and production of gas from the coal seam 15 or other suitable subterranean zone.

In one embodiment, the articulated well bore 30 is drilled using a drill string 40 that includes a suitable down-hole motor and bit 42. A measurement while drilling (MWD) device 44 is included in the articulated drill string 40 for controlling the orientation and direction of the well bore drilled by the motor and bit 42. The portion 32 of the articulated well bore 30 is lined with a suitable casing 38.

After the enlarged cavity 20 has been successfully intersected by the articulated well bore 30, drilling is continued through the cavity 20 using the articulated drill string 40 and appropriate drilling apparatus to provide a subterranean well bore, or drainage pattern 50 in the coal seam 15. In other embodiments, the well bore 12 and/or cavity 20 may be otherwise positioned relative to the well bore pattern 50 and the articulated well 30. For example, in one embodiment, the well bore 12 and cavity 20 may be positioned at an end of the well bore pattern 50 distant from the articulated well 50. In another embodiment, the well bore 12 and/or cavity 20 may be positioned within the pattern 50 at or between sets of laterals. In addition, portion 34 of the articulated well may have any suitable length and itself form the well bore pattern 50 or a portion of the pattern 50. Also, pattern 50 may be otherwise formed or connected to the cavity 20.

The well bore pattern 50 may be substantially horizontal corresponding to the geometric characteristics of the coal seam 15. The well bore pattern 50 may include sloped, undulating, or other inclinations of the coal seam 15 or other subterranean zone. During formation of well bore pattern 50, gamma ray logging tools and conventional MWD devices may be employed to control and direct the orientation of the drill bit 42 to retain the well bore pattern 50 within the confines of the coal seam 15 and to provide substantially uniform coverage of a desired area within the coal seam 15.

In one embodiment, as described in more detail below, the drainage pattern 50 may be an omni-directional pattern operable to intersect a substantial or other suitable number of fractures in the area of the coal seam 15 covered by the pattern 50. The drainage pattern 50 may intersect a significant number of fractures of the coal seam 15 when it intersects a majority of the fractures in the coverage area and plane of the pattern 50. In other embodiments, the drainage pattern 50 may intersect five, ten, twenty-five, forty or other minority percentage of the fractures or intersect sixty, seventy-five, eighty or other majority or super majority percentage of the fractures in the coverage area and plane of the pattern 50. The coverage area may be the area between the well bores of the drainage network of the pattern 50.

The drainage pattern 50 may be a pinnate pattern, other suitable multi-lateral or multi-branching pattern, other pattern having a lateral or other network of bores or other patterns of one or more bores with a significant percentage of the total footage of the bores having disparate orientations. The percentage of the bores having disparate orientations is significant when twenty-five to seventy-five percent of the bores have an orientation at least twenty degrees offset from other bores of the pattern. In a particular embodiment, the well bores of the pattern 50 may have three or more main orientations each including at least 10 percent of the total footage of the bores. As described below, the pattern 50 may have a plurality of bores extending outward of a center point. The bores may be oriented with a substantially equal radial spacing between them. The bores may in some embodiments be main bores with a plurality of lateral bores extending from each main bore. In another embodiment, the radially extending bores may together and alone form a multi-lateral pattern.

During the process of drilling the well bore pattern 50, drilling fluid or "mud" is pumped down the drill string 40 and circulated out of the drill string 40 in the vicinity of the bit 42, where it is used to scour the formation and to remove formation cuttings. The cuttings are then entrained in the drilling fluid which circulates up through the annulus between the drill string 40 and the walls of well bore 30 until it reaches the surface 14, where the cuttings are removed from the drilling fluid and the fluid is then recirculated. This conventional drilling operation produces a standard column of drilling fluid having a vertical height equal to the depth of the well bore 30 and produces a hydrostatic pressure on the well bore 30 corresponding to the well bore 30 depth. Because coal seams 15 tend to be porous and fractured, they may be unable to sustain such hydrostatic pressure, even if formation water is also present in the coal seam 15. Accordingly, if the full hydrostatic pressure is allowed to act on the coal seam 15, the result may be loss of drilling fluid and entrained cuttings into the formation. Such a circumstance is referred to as an over-balanced drilling operation in which the hydrostatic fluid pressure in the well bore 30 exceeds the ability of the formation to withstand the pressure. Loss of drilling fluids and cuttings into the formation not only is expensive in terms of the lost drilling fluids, which must be made up, but it also tends to plug the pores in the coal seam 15, which are needed to drain the coal seam 15 of gas and water.

To prevent over-balance drilling conditions during formation of the well bore pattern 50, air compressors 60 may be provided to circulate compressed air down the well bore 12 and back up through the articulated well bore 30. The circulated air will admix with the drilling fluids in the annulus around the drill string 40 and create bubbles throughout the column of drilling fluid. This has the effect of lightening the hydrostatic pressure of the drilling fluid and reducing the down-hole pressure sufficiently that drilling conditions do not become over-balanced. Aeration of the drilling fluid reduces down-hole pressure to less than the pressure of the hydrostatic column. For example, in some formations, down-hole pressure may be reduced to approximately 150-200 pounds per square inch (psi). Accordingly, low pressure coal seams and other subterranean resources can be drilled without substantial loss of drilling fluid and contamination of the resource by the drilling fluid.

Foam, which may be compressed air mixed with water or other suitable fluid, may also be circulated down through the drill string 40 along with the drilling mud in order to aerate the drilling fluid in the annulus as the articulated well bore 30 is being drilled and, if desired, as the well bore pattern 50 is being drilled. Drilling of the well bore pattern 50 with the use of an air hammer bit or an air-powered down-hole motor will also supply compressed air or foam to the drilling fluid. In this case, the compressed air or foam which is used to power the down-hole motor and bit 42 exits the articulated drill string 40 in the vicinity of the drill bit 42. However, the larger volume of air which can be circulated down the well bore 12 permits greater aeration of the drilling fluid than generally is possible by air supplied through the drill string 40.

Figure 2:
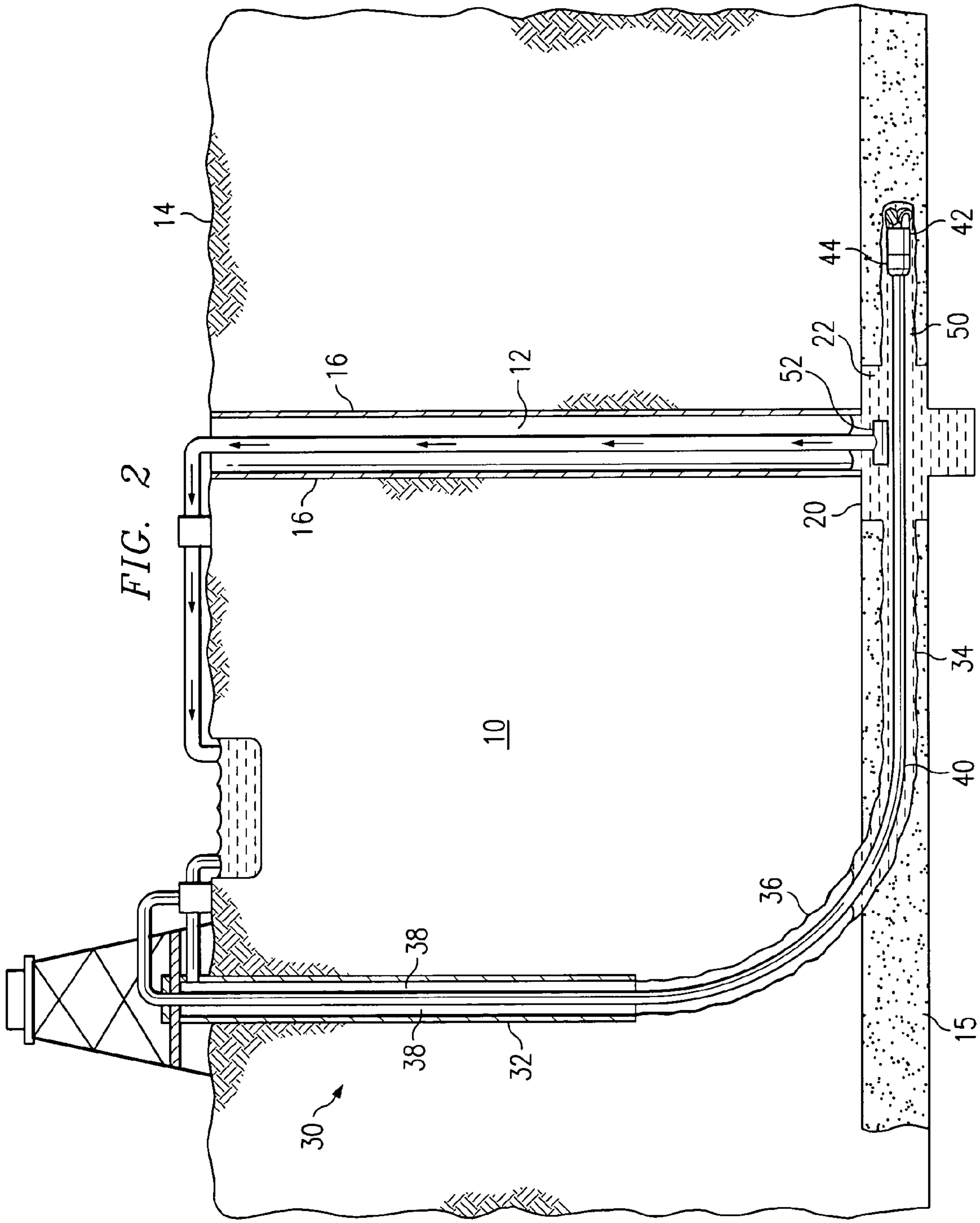
FIG. 2 is a cross-sectional diagram illustrating formation of the well bore pattern in the subterranean zone through the articulated surface well intersecting the cavity well in accordance with another embodiment of the present invention.

FIG. 2 is a diagram illustrating formation of the multi-well system 10 in accordance with another embodiment of the present invention. In this embodiment, the well bore 12, cavity 20 and articulated well bore 30 are positioned and formed as previously described in connection with FIG. 1. Referring to FIG. 2, after intersection of the cavity 20 by the articulated well bore 30, a Moineau or other suitable pump 52 is installed in the cavity 20 to pump drilling fluid and cuttings to the surface 14 through the well bore 12. This eliminates or reduces both the head pressure and the friction of air and fluid returning up the articulated well bore 30 and reduces down-hole pressure to nearly zero. Accordingly, coal seams and other subterranean resources having ultra low pressures below 150 psi can be accessed from the surface 14. Additionally, the risk of combining air and methane in the well is eliminated.

Figure 3:
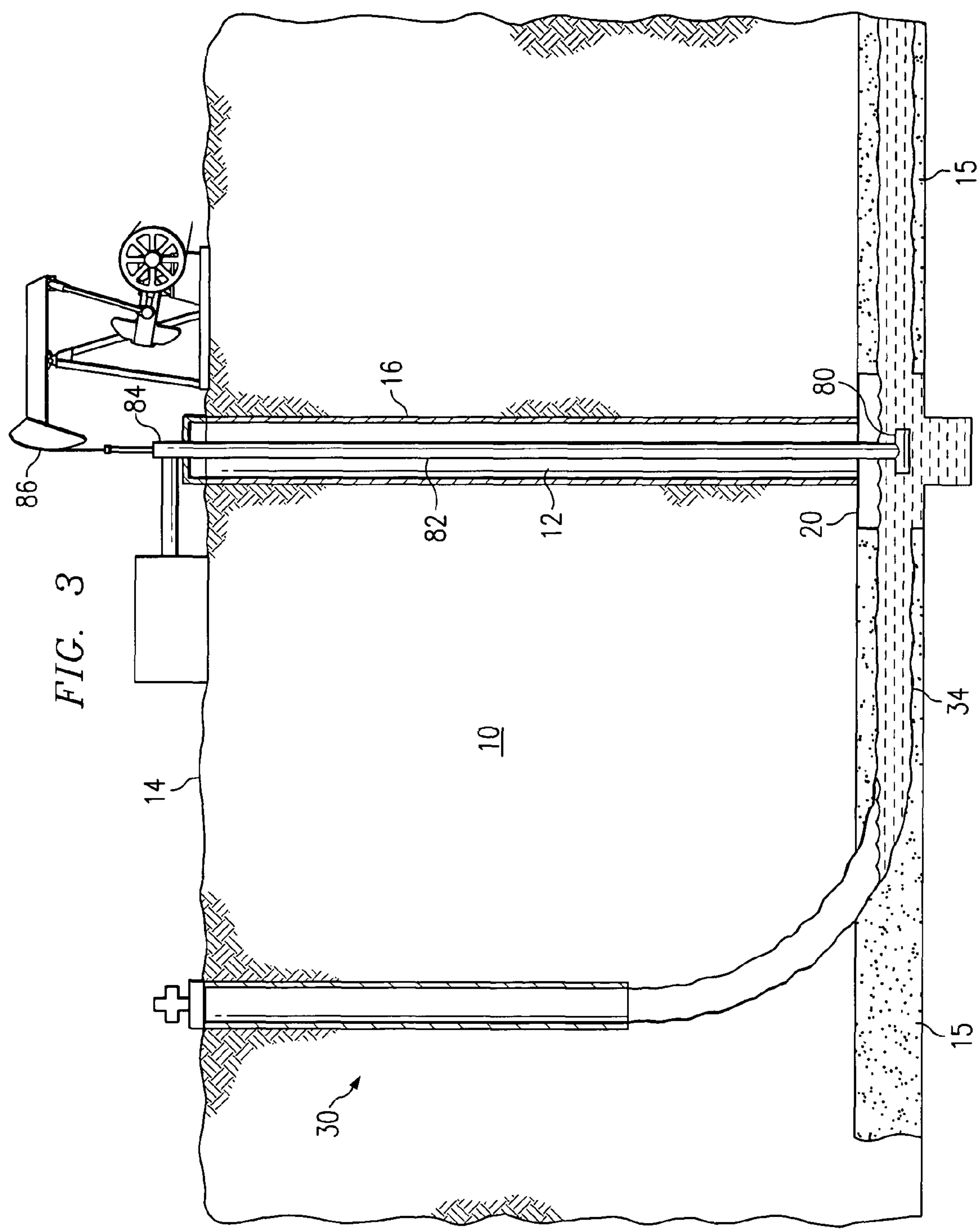
FIG. 3 is a cross-sectional diagram illustrating production of fluids from a well bore pattern in a subterranean zone through a well bore in accordance with one embodiment of the present invention.

FIG. 3 illustrates production from the coal seam 15 to the surface using the multi-well system 10 in accordance with one embodiment of the present invention. In particular, FIG. 3 illustrates the use of a rod pump to produce water from the coal seam 15. In one embodiment, water production may be initiated by gas lift to clean out the cavity 20 and kick-off production. After production kick-off, the gas lift equipment may be replaced with a rod pump for further removal of water during the life of the well. Thus, while gas lift may be used to produce water during the life of the well, for economic reasons, the gas lift system may be replaced with a rod pump for further and/or continued removal of water from the cavity 20 over the life of the well. In these and other embodiments, evolving gas disorbed from coal in the seam 15 and produced to the surface 14 is collected at the well head and after fluid separation may be flared, stored or fed into a pipeline.

As described in more detail below, for water saturated coal seams 15 water pressure may need to be reduced below the initial reservoir pressure of an area of the coal seam 15 before methane and other gas will start to diffuse or disorb from the coal in that area. For shallow coal beds at or around 1000 feet, the initial reservoir pressure is typically about 300 psi. For undersaturated coals, pressure may need to be reduced well below initial reservoir pressure down to the critical disorbtion pressure. Sufficient reduction in the water pressure for gas production may take weeks and/or months depending on configuration of the well bore pattern 50, water recharge in the coal seam 15, cavity pumping rates and/or any subsurface drainage through mines and other man made or natural structures that drain water from the coal seam 15 without surface lift. From non-water saturated coal seams 15, reservoir pressure may similarly need to be reduced before methane gas will start to diffuse or disorb from coal in the coverage area. Free and near-well bore gas may be produced prior to the substantial reduction in reservoir pressure or the start of disorbtion. The amount of gas disorbed from coal may increase exponentially or with other non-linear geometric progression with a drop in reservoir pressure. In this type of coal seam, gas lift, rod pumps and other water production equipment may be omitted.

Referring to FIG. 3, a pumping unit 80 is disposed in the well bore 12 and extends to the enlarged cavity 20. The enlarged cavity 20 provides a reservoir for accumulated fluids that may act as a surge tank and that may allow intermittent pumping without adverse effects of a hydrostatic head caused by accumulated fluids in the well bore 12. As a result, a large volume of fluids may be collected in the cavity 20 without any pressure or any substantial pressure being exerted on the formation from the collected fluids. Thus, even during non-extended periods of non-pumping, water and/or gas may continue to flow from the well bore pattern 50 and accumulate in the cavity 20.

The pumping unit 80 includes an inlet port 82 in the cavity 20 and may comprise a tubing string 83 with sucker rods 84 extending through the tubing string 83. The inlet 82 may be positioned at or just above a center height of the cavity 20 to avoid gas lock and to avoid debris that collects in the sump 22 of the cavity 20. The inlet 82 may be suitably angled with or within the cavity.

The sucker rods 84 are reciprocated by a suitable surface mounted apparatus, such as a powered walking beam 86 to operate the pumping unit 80. In another embodiment, the pumping unit 80 may comprise a Moineau or other suitable pump operable to lift fluids vertically or substantially vertically. The pumping unit 80 is used to remove water and entrained coal fines from the coal seam 15 via the well bore pattern 50. Once the water is removed to the surface 14, it may be treated in gas/water separator 76 for separation of methane which may be dissolved in the water and for removal of entrained fines.

After sufficient water has been removed from the coal seam 15, via gas lift, fluid pumping or other suitable manner, or pressure is otherwise lowered, coal seam gas may flow from the coal seam 15 to the surface 14 through the annulus of the well bore 12 around the tubing string 83 and be removed via piping attached to a wellhead apparatus.

The pumping unit 80 may be operated continuously or as needed to remove water drained from the coal seam 15 into the enlarged cavity 20. In a particular embodiment, gas lift is continued until the well is kicked-off to a self-sustaining flow at which time the well is briefly shut-in to allow replacement of the gas lift equipment with the fluid pumping equipment. The well is then allowed to flow in self-sustaining flow subject to periodic periods of being shut-in for maintenance, lack of demand for gas and the like. After any shut-in, the well may need to be pumped for a few cycles, a few hours, days or weeks, to again initiate self-sustaining flow or other suitable production rate of gas. In a particular embodiment, the rod pump may produce approximately eight gallons per minute of water from the cavity 20 to the surface. The well is at self sustaining flow when the flow of gas is operable to lift any produced water such that the well may operate for an extended period of six weeks or more without pumping or artificial gas lift. Thus, the well may require periodic pumping between periods of self sustaining flow.

In a particular embodiment, the well bore pattern 50 may be configured to result in a net reduction of water volume in the coverage area of the drainage pattern (overall water volume pumped to the surface 14 less influx water volume from the surrounding areas and/or formations) of one tenth of the initial insitu water volume in the first five to ten days of water production with gas lift or in the first 17 to 25 days of water production with a rod pump in order to kick-off or induce early and/or self-sustaining gas release. The start of water production may be the initial blow down or pump down of the well during a post-drilling testing and/or production phase.

In one embodiment, early or accelerated gas release may be through a chain reaction through an ever reducing reservoir pressure. Self-sustaining gas release provides gas lift to remove water without further pumping. Such gas may be produced in two-phase flow with the water. In addition, the blow down or rapid removal of water from the coverage area of the coal seam 15 may provide a pull or "jerk" on the formation and the high rate of flow in the bores may create an eductor affect in the intersecting fractures to "pull" water and gas from the coal seam 15. Also, the released gas may lower the specific gravity and/or viscosity of the produced fluid thereby further accelerating gas production from the formation. Moreover, the released gas may act as a propellant for further two-phase flow and/or production. The pressure reduction may affect a large rock volume causing a bulk coal or other formation matrix shrinkage and further accelerating gas release. For the coal seam 15, an attended increase in cleat width may increase formation permeability and thereby further expedite gas production from the formation. It will be understood that early gas release may be initiated with all, some or none of the further enhancements to production.

During gas release, as described in more detail below, a majority or other substantial portion of water and gas from the coal seam 15 may flow into the drainage pattern 50 for production to the surface through intersections of the pattern 50 with natural fractures in the coal seam 15. Due to the size of the fractures, the disabsorption of gas from coal that lowers the relative permeability of the coal matrix to gas and/or water to less than twenty percent of the absolute permeability does not affect or substantially affect flow into the pattern 50 from the fractures. As a result, gas and water may be produced in substantial qualities in formations having medium and low effective permeability despite low relative permeabilities of the formations.

Figure 4A:
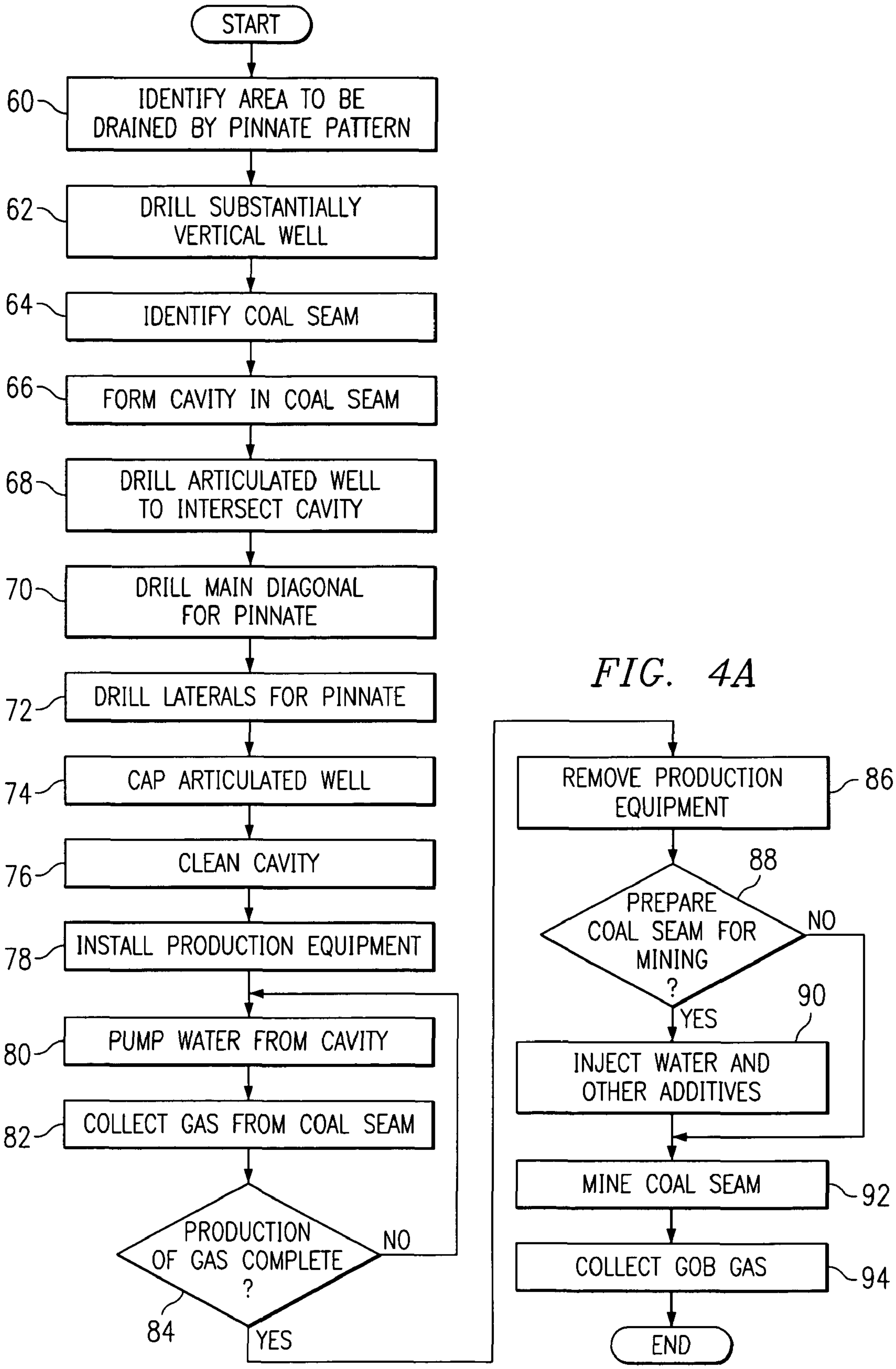
FIG. 4A is a flow diagram illustrating a method for preparing a coal seam for mining operations in accordance with one embodiment of the present invention.

FIG. 4A is a flow diagram illustrating a method for preparing the coal seam 15 for mining operations in accordance with one embodiment of the present invention. In this embodiment, the method begins at step 160 in which areas to be drained and drainage patterns 50 for the areas are identified. Preferably, the areas are aligned with the grid of a mining plan for the region. Pinnate structures 100, 120 and 140 may be used to provide optimized coverage for the region. It will be understood that other suitable patterns may be used to degasify the coal seam 15.

Proceeding to step 162, the substantially vertical well 12 is drilled from the surface 14 through the coal seam 15. Next, at step 164, down hole logging equipment is utilized to exactly identify the location of the coal seam in the substantially well bore 12. At step 164, the enlarged diameter cavity 22 is formed in the substantially vertical well bore 12 at the location of the coal seam 15. As previously discussed, the enlarged diameter cavity 20 may be formed by under reaming and other conventional techniques.

Next, at step 166, the articulated well bore 30 is drilled to intersect the enlarged diameter cavity 22. At step 168, the main diagonal bore 104 for the pinnate drainage pattern 100 is drilled through the articulated well bore 30 into the coal seam 15. After formation of the main diagonal 104, lateral bores 110 for the pinnate drainage pattern 100 are drilled at step 170. As previously described, lateral kick-off points may be formed in the diagonal bore 104 during its formation to facilitate drilling of the lateral bores 110.

At step 172, the articulated well bore 30 is capped. Next, at step 174, the enlarged diagonal cavity 22 is cleaned in preparation for installation of downhole production equipment. The enlarged diameter cavity 22 may be cleaned by pumping compressed air down the substantially vertical well bore 12 or other suitable techniques. At step 176, production equipment is installed in the substantially vertical well bore 12. The production equipment includes a sucker rod pump extending down into the cavity 22 for removing water from the coal seam 15. The removal of water will drop the pressure of the coal seam and allow methane gas to diffuse and be produced up the annulus of the substantially vertical well bore 12.

Proceeding to step 178, water that drains from the drainage pattern 100 into the cavity 22 is pumped to the surface with the rod pumping unit. Water may be continuously or intermittently be pumped as needed to remove it from the cavity 22. At step 180, methane gas diffused from the coal seam 15 is continuously collected at the surface 14. Next, at decisional step 182 it is determined whether the production of gas from the coal seam 15 is complete. In one embodiment, the production of gas may be complete after the cost of the collecting the gas exceeds the revenue generated by the well. In another embodiment, gas may continue to be produced from the well until a remaining level of gas in the coal seam 15 is below required levels for mining operations. If production of the gas is not complete, the No branch of decisional step 182 returns to steps 178 and 180 in which water and gas continue to be removed from the coal seam 15. Upon completion of production, the Yes branch of decisional step 182 leads to step 184 in which the production equipment is removed.

Next, at decisional step 186, it is determined whether the coal seam 15 is to be further prepared for mining operations. If the coal seam 15 is to be further prepared for mining operations, the Yes branch of decisional step 186 leads to step 188 in which water and other additives may be injected back into the coal seam 15 to rehydrate the coal seam in order to minimize dust, to improve the efficiency of mining, and to improve the mined product.

Step 188 and the No branch of decisional step 186 lead to step 190 in which the coal seam 15 is mined. The removal of the coal from the seam causes the mined roof to cave and fracture into the opening behind the mining process. The collapsed roof creates gob gas which may be collected at step 192 through the substantially vertical well bore 12. Accordingly, additional drilling operations are not required to recover gob gas from a mined coal seam. Step 192 leads to the end of the process by which a coal seam is efficiently degasified from the surface. The method provides a symbiotic relationship with the mine to remove unwanted gas prior to mining and to rehydrate the coal prior to the mining process.

Figure 4B:
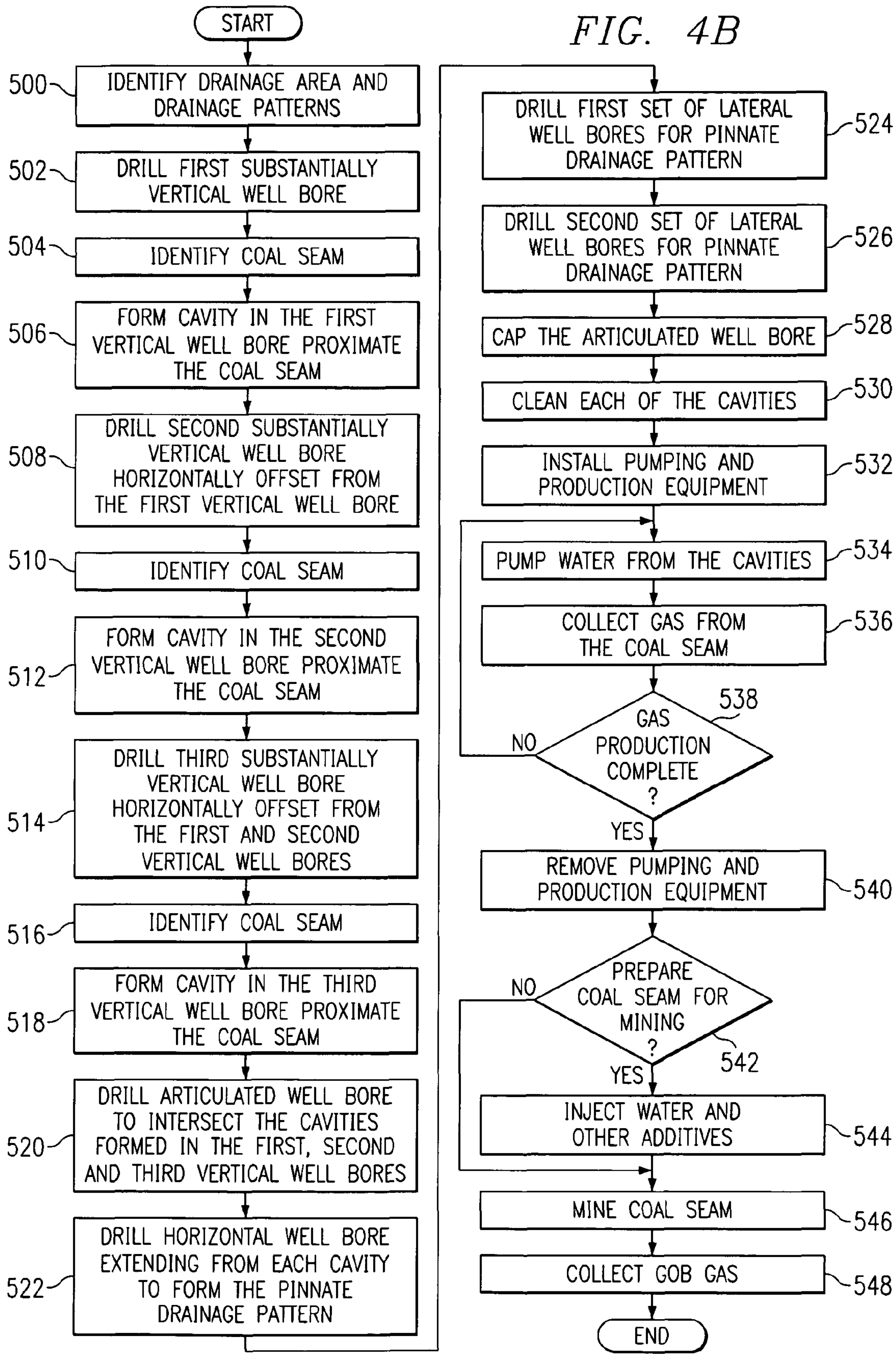
FIG. 4B is a flow diagram illustrating an alternative method for preparing a coal seam for mining operations in accordance with one embodiment of the present invention.

It will be understood that the above process may be modified to accommodate the creation of multiple well bore patterns, referred to, for pinnate patterns, as dual-pinnate, tri-pinnate; quad-pinnate, etc., as needed, for example for space-saving purposes. FIG. 4B provides example steps associated with such a process for tri-pinnate patterns.

FIG. 4B is a flow diagram illustrating a method for enhanced access to a subterranean resource, such as a coal seam 15, in accordance with another embodiment of the present invention. In this embodiment, the method begins at step 500 in which areas to be drained and well bore patterns for the areas are identified. Pinnate well bore patterns may be used to provide optimized coverage for the region. However, it should be understood that other suitable well bore patterns may also be used.

Proceeding to step 502, the first well bore 12 is drilled from the surface 14 to a predetermined depth through the coal seam 15. Next, at step 504, down hole logging equipment is utilized to exactly identify the location of the coal seam in the well bore 12. At step 506, the enlarged cavity 22 is formed in the first well bore 12 at the location of the coal seam 15. As previously discussed, the enlarged cavity 20 may be formed by under reaming and other conventional techniques.

At step 508, a second well bore 12 is drilled from the surface 14 to a predetermined depth through the coal seam 15. The second well bore 12 is disposed offset from the first well bore 12 at the surface 14. Next, at step 510, down hole logging equipment is utilized to exactly identify the location of the coal seam in the second well bore 12. At step 512, the enlarged cavity 22 is formed in the second well bore 12 at the location of the coal seam 15. At step 514, a third well bore 12 is drilled from the surface 14 to a predetermined depth through the coal seam 15. The third well bore 12 is disposed offset for the first and second well bores 12 at the surface. For example, as described above the first, second and third well bores 12 may be disposed having an approximately 120 degree spacing relative to each other and be equally spaced from a median location of a well bore area. Next, at step 516, down hole logging equipment is utilized to exactly identify the location of the coal seam 15 in the third well bore 12. At step 518, the enlarged cavity 22 is formed in the third well bore 12 at the location of the coal seam 15.

Next, at step 520, the articulated well bore 30 is drilled to intersect the enlarged cavities 22 formed in the first, second and third well bores 12. At step 522, the well bores 104 for the pinnate well bore patterns are drilled through the articulated well bore 30 into the coal seam 15 extending from each of the enlarged cavities 20. After formation of the well bore 104, lateral bores 110 for the pinnate well bore pattern are drilled at step 524. Lateral well bores 148 for the pinnate well bore pattern are formed at step 526.

At step 528, the articulated well bore 30 is capped. Next, at step 530, the enlarged cavities 22 are cleaned in preparation for installation of downhole production equipment. The enlarged cavities 22 may be cleaned by pumping compressed air down the first, second and third well bores 12 or other suitable techniques. At step 532, production equipment is installed in the first, second and third well bores 12. The production equipment may include a sucker rod pump extending down into the cavities 22 for removing water from the coal seam 15. The removal of water will drop the pressure of the coal seam and allow methane gas to diffuse and be produced up the annulus of the first, second and third well bores 12.

Proceeding to step 534, water that drains from the well bore patterns into the cavities 22 is pumped to the surface 14. Water may be continuously or intermittently pumped as needed to remove it from the cavities 22. At step 536, methane gas diffused from the coal seam 15 is continuously collected at the surface 14. Next, at decisional step 538, it is determined whether the production of gas from the coal seam 15 is complete. In one embodiment, the production of gas may be complete after the cost of the collecting the gas exceeds the revenue generated by the well. In another embodiment, gas may continue to be produced from the well until a remaining level of gas in the coal seam 15 is below required levels for mining operations. If production of the gas is not complete, the method returns to steps 534 and 536 in which water and gas continue to be removed from the coal seam 15. Upon completion of production, the method proceeds to step 540 in which the production equipment is removed.

Next, at decisional step 542, it is determined whether the coal seam 15 is to be further prepared for mining operations. If the coal seam 15 is to be further prepared for mining operations, the method proceeds to step 544, where water and other additives may be injected back into the coal seam 15 to rehydrate the coal seam 15 in order to minimize dust, improve the efficiency of mining, and improve the mined product.

If additional preparation of the coal seam 15 for mining is not required, the method proceeds from step 542 to step 546, where the coal seam 15 is mined. The removal of the coal from the coal seam 15 causes the mined roof to cave and fracture into the opening behind the mining process. The collapsed roof creates gob gas which may be collected at step 548 through the first, second and third well bores 12. Accordingly, additional drilling operations are not required to recover gob gas from a mined coal seam 15. Step 548 leads to the end of the process by which a coal seam 15 is efficiently degasified from the surface. The method provides a symbiotic relationship with the mine to remove unwanted gas prior to mining and to rehydrate the coal prior to the mining process.

B. Dual Well—Dual Zone

FIG. 5 illustrates a method and system for drilling the well bore pattern 50 in a second subterranean zone, located below the coal seam 15, in accordance with another embodiment of the present invention. In this embodiment, the well bore 12, enlarged cavity 20 and articulated well bore 32 are positioned and formed as previously described in connection with FIG. 1. In this embodiment, the second subterranean zone is also a coal seam. It will be understood that other subterranean formations and/or other low pressure, ultra-low pressure, and low porosity subterranean zones can be similarly accessed using the dual radius well system of the present invention to remove and/or produce water, hydrocarbons and other fluids in the zone, to treat minerals in the zone prior to mining operations, or to inject or introduce a gas, fluid or other substance into the zone.

In an alternative embodiment, the well bores 12 and 12' are formed first, followed by the cavities 20 and 20'. Then, articulated well bores 36 and 36' may be formed. It will be understood that similar modifications to the order of formation may be made, based on the production requirements and expected mining plan of the subsurface formations.

Referring to FIG. 5, after production and degasification is completed as to coal seam 15, a second coal seam 15' may be degasified following a similar method used to prepare coal seam 15. Production equipment for coal seam 15 is removed and well bore 12 is extended below coal seam 15 to form well bore 12' to the target coal seam 15'. The well bore 12' intersects, penetrates and continues below the coal seam 15'. The well bore 12' may be lined with a suitable well casing 16' that terminates at or above the upper level of the coal seam 15'. The well casing 16' may connect to and extend from well casing 16, or may be formed as a separate unit, installed after well casing 16 is removed, and extending from the surface 14 through well bores 12 and 12'. Casing 16' is also used to seal off cavity 20 from well bores 12 and 12' during production and drilling operations directed toward coal seam 15'.

The well bore 12' is logged either during or after drilling in order to locate the exact vertical depth of the coal seam 15'. As a result, the coal seam 15' is not missed in subsequent drilling operations, and techniques used to locate the coal seam 15' while drilling need not be employed. An enlarged cavity 20' is formed in the well bore 12' at the level of the coal seam 15'. The enlarged cavity 20' provides a collection point for fluids drained from the coal seam 15' during production operations and provides a reservoir for water separation of the fluids accumulated from the well bore pattern.

In one embodiment, the enlarged cavity 20' has a radius of approximately eight feet and a vertical dimension which equals or exceeds the vertical dimension of the coal seam 15'. The enlarged cavity 20' is formed using suitable under-reaming techniques and equipment. A portion of the well bore 12' continues below the enlarged cavity 20' to form a sump 22' for the cavity 20'.

An articulated well bore 30 extends from the surface 14 to both the enlarged cavity 20 of the well bore 12 and the enlarged cavity 20' of the well bore 12'. The articulated well bore 30 includes portions 32 and 34 and radiused portion 36 interconnecting the portions 32 and 34. The articulated well bore also includes portions 32' and 34' and a curved or radiused portion 36' interconnecting the portions 32' and 34'. Portions 32', 34' and 36' are formed as previously described in connection with FIG. 1 and portions 32, 34 and 36. The portion 34' lies substantially in the plane of the coal seam 15' and intersects the enlarged cavity 20' of the well bore 12'.

In the illustrated embodiment, the articulated well bore 30 is offset a sufficient distance from the well bore 12 at the surface 14 to permit the large radius curved portions 36 and 36' and any desired portions 34 and 34' to be drilled before intersecting the enlarged cavity 20 or 20'. To provide the curved portion 36 with a radius of 100-150 feet, the articulated well bore 30 is offset a distance of about 300 feet from the well bore 12. With a curved portion 36 having a radius of 100-150 feet, the curved portion 36' will have a longer radius than that of curved portion 36, depending on the vertical depth of coal seam 15' below the coal seam 15. This spacing minimizes the angle of the curved portion 36 to reduce friction in the bore 30 during drilling operations. As a result, reach of the articulated drill string drilled through the articulated well bore 30 is maximized. Because the shallower coal seam 15 is usually produced first, the spacing between articulated well bore 30 and well bore 12 is optimized to reduce friction as to curved portion 36 rather than curved portion 36'. This may effect the reach of drill string 40 in forming well bore pattern 50' within coal seam 15'. As discussed below, another embodiment of the present invention includes locating the articulated well bore 30 significantly closer to the well bore 12 at the surface 14, and thereby locating the articulated well bore 30 closer to well bore 12'.

As described above, the articulated well bore 30 is drilled using articulated drill string 40 that includes a suitable down-hole motor and bit 42. A measurement while drilling (MWD) device 44 is included in the articulated drill string 40 for controlling the orientation and direction of the well bore drilled by the motor and bit 42. The portion 32 of the articulated well bore 30 is lined with a suitable casing 38. A casing 38' coupled to casing 38 may be used to enclose the portion 32' of articulated well bore 30 formed by formed by drilling beyond the kick-off point for curved portion 36. Casing 38' is also used to seal off the curved radius portion 36 of the articulated well bore 30.

After the enlarged cavity 20' has been successfully intersected by the articulated well bore 30, drilling is continued through the cavity 20' using the articulated drill string 40 and an appropriate drilling apparatus to provide a well bore pattern 50' in the coal seam 15'. The well bore pattern 50' and other such well bores include sloped, undulating, or other inclinations of the coal seam 15' or other subterranean zone. During this operation, gamma ray logging tools and conventional measurement while drilling devices may be employed to control and direct the orientation of the drill bit to retain the well bore pattern 50' within the confines of the coal seam 15' and to provide substantially uniform coverage of a desired area within the coal seam 15'. The well bore pattern 50' may be constructed similar to well bore pattern 50 as described above. Further information regarding the well bore pattern is described in more detail above in Section B.

Drilling fluid or "mud" my be used in connection with drilling the drainage pattern 50' in the same manner as described above in connection with FIG. 1 for drilling the well bore pattern 50. At the intersection of the enlarged cavity 20' by the articulated well bore 30, a pump 52 is installed in the enlarged cavity 20' to pump drilling fluid and cuttings to the surface 14 through the well bores 12 and 12'. This eliminates the friction of air and fluid returning up the articulated well bore 30 and reduces down-hole pressure to nearly zero. Accordingly, coal seams and other subterranean zones having ultra low pressures below 150 psi can be accessed from the surface. Additionally, the risk of combining air and methane in the well is eliminated.

C. Dual Radius

FIG. 6A illustrates a dual radius articulated well combination 6200 for accessing a subterranean zone from the surface in accordance with another embodiment of the present invention. In this embodiment, the subterranean zone is a coal seam. It will be understood that other subterranean formations and/or other low pressure, ultra-low pressure, and low porosity subterranean zones can be similarly accessed using the dual radius articulated well system of the present invention to remove and/or produce water, hydrocarbons and other fluids in the zone, to treat minerals in the zone prior to mining operations, or to inject or introduce a gas, fluid or other substance into the subterranean zone.

Referring to FIG. 6A, a well bore 6210 extends from a limited drilling and production area on the surface 614 to a first articulated well bore 6230. The well bore 6210 may be lined with a suitable well casing 6215 that terminates at or above the level of the intersection of the articulated well bore 6230 with the well bore 6210. A second well bore 6220 extends from the intersection of the well bore 6210 and the first articulated well bore 6230 to a second articulated well bore 6235. The second well bore 6220 is in substantial alignment with the first well bore 6210, such that together they form a continuous well bore. In FIGS. 6A-8, well bores 6210 and 6220 are illustrated substantially vertical; however, it should be understood that well bores 6210 and 6220 may be formed at any suitable angle relative to the surface 614 to accommodate, for example, surface 614 geometries and attitudes and/or the geometric configuration or attitude of a subterranean resource. An extension 6240 to the second well bore 6220 extends from the intersection of the second well bore 6220 and the second articulated well bore 6235 to a depth below the coal seam 615.

The first articulated well bore 6230 has a radius portion 6232. The second articulated well bore 6235 has a radius portion 6237. The radius portion 6232 may be formed having a radius of about one hundred fifty feet. The radius portion 6237 is smaller than radius portion 6232, and may be formed having a radius of about fifty feet. However, other suitable formation radii may be used to form radius portions 6232 and 6237.

The first articulated well bore 6230 communicates with an enlarged cavity 6250. The enlarged cavity 6250 is formed at the distal end of the first articulated well bore 6230 at the level of the coal seam 615. As described in more detail below, the enlarged cavity 6250 provides a junction for intersection of a portion 6225 of the articulated well bore 6235. Portion 6225 of the well bore 6235 is formed substantially within the plane of the coal seam 615 and extends from the radius portion 6237 to the enlarged cavity 6250. In one embodiment, the enlarged cavity 6250 has a radius of approximately eight feet and a vertical dimension which equals or exceeds the vertical dimension of the coal seam 615. The enlarged cavity 6250 is formed using suitable under-reaming techniques and equipment.

The well bore 6235 is formed generally at the intersection of the second well bore 6220 and extends through the coal seam 615 and into the enlarged cavity 6250. In one embodiment, the well bores 6210 and 6220 are formed first, followed by the second articulated well bore 6235. Then, the enlarged cavity 6250 is formed, and the second articulated well bore 6230 is drilled to intersect the enlarged cavity 6250. However, other suitable drilling sequences may be used.

For example, after formation of well bore 6210, the first articulated well bore 6230 may be drilled using articulated drill string 6040 that includes a suitable down-hole motor and bit 6042. A measurement while drilling (MWD) device 6044 is included in the articulated drill string 6040 for controlling the orientation and direction of the well bore drilled by the motor and bit 6042. After the first articulated well bore 6230 is formed, the enlarged cavity 6250 is formed in the coal seam. The enlarged cavity 6250 may be formed by a rotary unit, an expandable cutting tool, a water-jet cutting tool, or other suitable methods of forming a cavity in a subsurface formation. After the enlarged cavity 6250 has been formed, drilling is continued through the cavity 6250 using the articulated drill string 6040 and appropriate drilling apparatus to provide the well bore pattern 6050 in the coal seam 6015. The well bore pattern 6050 and other such well bores include sloped, undulating, or other inclinations of the coal seam 6015 or other subterranean zone. During this operation, gamma ray logging tools and conventional measurement while drilling devices may be employed to control and direct the orientation of the drill bit to retain the well bore pattern 6050 within the confines of the coal seam 6015 and to provide substantially uniform coverage of a desired area within the coal seam 6015. Further information regarding the well bore pattern is described in more detail in Section B. Drilling mud and over-balance prevention operations may be conducted in the same manner as described above in connection with FIG. 1. After the well bore pattern 6050 has been formed, the articulated drill string 6040 is removed from the well bores and used to form the well bore 6220. As described above, the second well bore 6220 shares a common portion with the articulated well portion 6230.

After the well bore 6220 is drilled to the depth of the coal seam 6015, a subsurface channel is formed by the articulated well bore 6235. The second articulated well bore 6235 is formed using conventional articulated drilling techniques and interconnects the second well bore 6220 and the enlarged cavity 6250. As described in more detail in connection with FIG. 7 below, this allows fluids collected through the well bore pattern 6050 to flow through the enlarged cavity 6250 and along the well bore 6235 to be removed via the second well bore 6220 and the first well bore 6210 to the surface 6014. By drilling in this manner, a substantial area of a subsurface formation may be drained or produced from a small area on the surface.

Figure 6B:
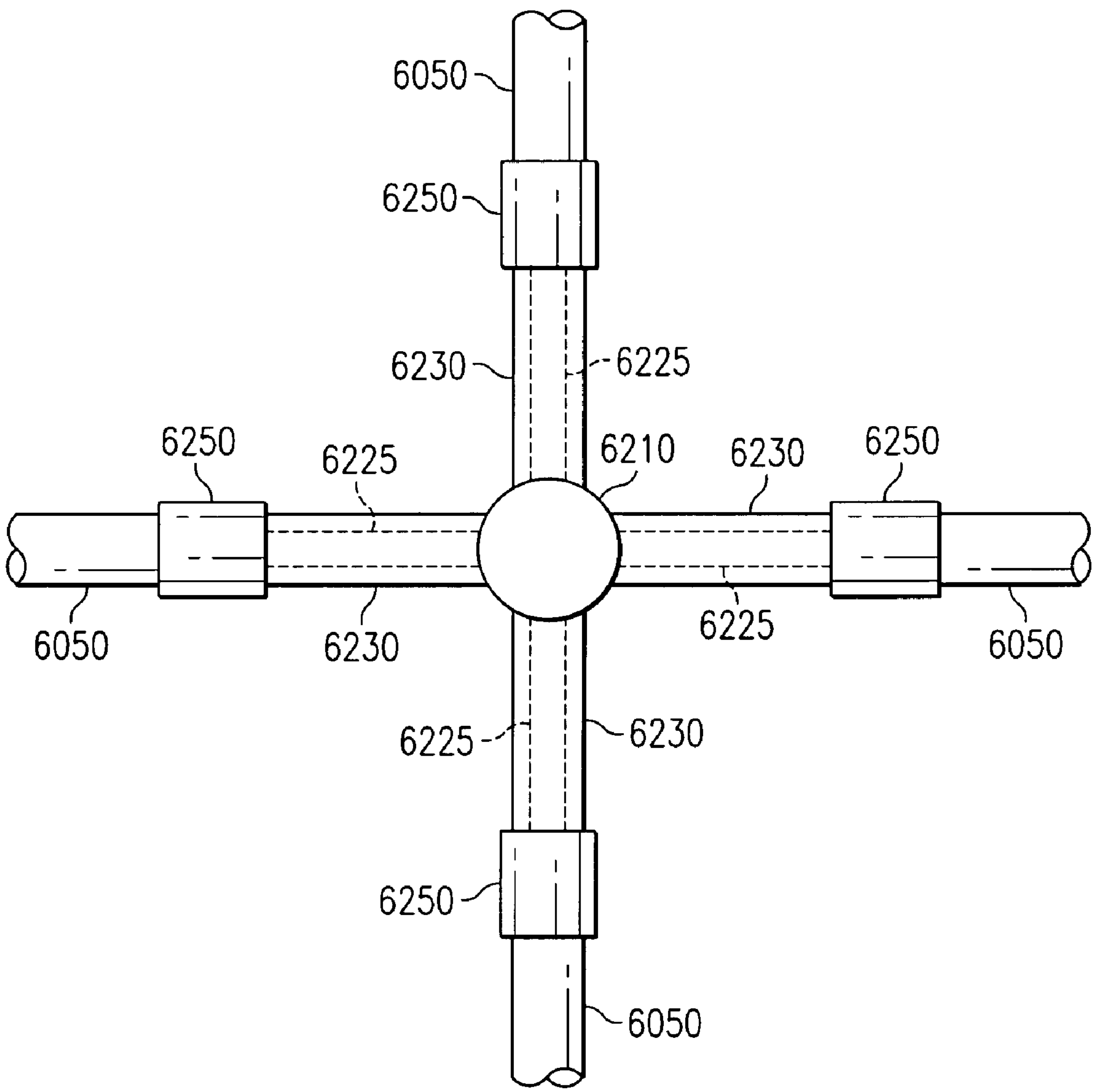
FIG. 6B is a top-plan diagram illustrating formation of multiple well bore patterns in a subterranean zone through multiple articulated surface wells intersecting a single cavity well at the surface in accordance with another embodiment of the present invention.

FIG. 6B illustrates formation of multiple well bore patterns in a subterranean zone through multiple articulated surface wells intersecting a single cavity well at the surface in accordance with another embodiment of the present invention. In this embodiment, a single cavity well bore 6210 is used to collect and remove to the surface resources collected from well bore patterns 6050. It will be understood that a varying number of multiple well bore patterns 6050, enlarged cavities 6250, and articulated wells 6230 and 6235 may be used, depending on the geology of the underlying subterranean formation, desired total drainage area, production requirements, and other factors.

Referring to FIG. 6B, well bores 6210 and 6220 are drilled at a surface location at the approximate center of a desired total drainage area. As described above, articulated well bores 6230 are drilled from a surface location proximate to or in common with the well bores 6210 and 6220. Well bore patterns 6050 are drilled within the target subterranean zone from each articulated well bore 6230. Also from each of the articulated well bores 6230, an enlarged cavity 6250 is formed to collect resources draining from the well bore patterns 6050. Well bores 6235 are drilled to connect each of the enlarged cavities 6250 with the well bores 6210 and 6220 as described above in connection with FIG. 6A.

Resources from the target subterranean zone drain into well bore patterns 6050, where the resources are collected in the enlarged cavities 6250. From the enlarged cavities 6250, the resources pass through the well bores 6235 and into the well bores 6210 and 6220. Once the resources have been collected in well bores 6210 and 6220, they may be removed to the surface by the methods as described above.

FIG. 7 illustrates production of fluids and gas from the well bore pattern 6050 in the coal seam 6015 in accordance with another embodiment of the present invention. In this embodiment, after the well bores 6210, 6220, 6230 and 6235, as well as desired well bore patterns 6050, have been drilled, the articulated drill string 6040 is removed from the well bores. In one aspect of this embodiment, the first articulated well bore 6230 is cased over and the well bore 6220 is lined with a suitable well casing 6216. In the illustrated aspect of this embodiment, only the well bore 6220 is cased by casing 6216 and the first articulated well bore 6230 is left in communication with the first well bore 6210.

Referring to FIG. 7, a down hole pump 6080 is disposed in the lower portion of the well bore 6220 above the extension 6240. The extension 6240 provides a reservoir for accumulated fluids allowing intermittent pumping without adverse effects of a hydrostatic head caused by accumulated fluids in the well bore.

The down hole pump 6080 is connected to the surface 6014 via a tubing string 6082 and may be powered by sucker rods 6084 extending down through the well bores 6210 and 6220 of the tubing string 6082. The sucker rods 6084 are reciprocated by a suitable surface mounted apparatus, such as a powered walking beam 6086 to operate the down hole pump 6080. The down hole pump 6080 is used to remove water and entrained coal fines from the coal seam 6015 via the well bore pattern 6050. Once the water is removed to the surface, it may be treated for separation of methane which may be dissolved in the water and for removal of entrained fines. After sufficient water has been removed from the coal seam 6015, pure coal seam gas may be allowed to flow to the surface 6014 through the annulus of the well bores 6210 and 6220 around the tubing string 6082 and removed via piping attached to a wellhead apparatus. Alternatively or additionally, pure coal seam gas may be allowed to flow to the surface 6014 through the annulus of the first articulated well bore 6230. At the surface, the methane is treated, compressed and pumped through a pipeline for use as a fuel in a conventional manner. The down hole pump 6080 may be operated continuously or as needed to remove water drained from the coal seam 6015 into the extension 6240.

D. Dual Radius and Dual Zone

FIG. 8 illustrates a method and system for drilling the well bore pattern 8050 in a second subterranean zone, located below the coal seam 8015, in accordance with another embodiment of the present invention. In this embodiment, the well bores 8210 and 8220, the articulated well bores 8230 and 8235, the enlarged cavity 8250, and the well bore pattern 8050 are positioned and formed as previously described in connection with components having similar reference numerals in FIG. 6A. In this embodiment, the second subterranean zone is also a coal seam. It will be understood that other subterranean formations and/or other low pressure, ultra-low pressure, and low porosity subterranean zones can be similarly accessed using the dual radius well system of the present invention to remove and/or produce water, hydrocarbons and other fluids in the zone, to treat minerals in the zone prior to mining operations, or to inject or introduce a gas, fluid or other substance into the zone.

Referring to FIG. 8, after production and degasification is completed as to coal seam 8015, a second coal seam 8015' may be degasified following a similar method used to prepare coal seam 8015. Production equipment for coal seam 8015 is removed and well bore 8220 is extended below coal seam 8015 to form a well bore 8260 to the target coal seam 8015'. The well bore 8260 intersects, penetrates and continues below the coal seam 8015', terminating in an extension 8285. The well bore 8260 may be lined with a suitable well casing 8218 that terminates at or above the upper level of the coal seam 8015'. The well casing 8218 may connect to and extend from well casing 8216, or may be formed as a separate unit, installed after well casing 8216 is removed, and extending from the surface 8014 through well bores 8210, 8220, and 8260. Casing 8260 may also used to seal off articulated well bores 8230 and 8235 from well bores 8210 and 8220 during production and drilling operations directed towards coal seam 8015'. Well bore 8260 is in substantial alignment with the well bores 8210 and 8220, such that together they form a continuous well bore. In FIG. 8, well bore 8260 is illustrated substantially vertical; however, it should be understood that well bore 8260 may be formed at any suitable angle relative to the surface 8014 and/or well bores 8210 and 8220 to accommodate, for example, the geometric configuration or attitude of a subterranean resource.

In a manner similar to that described in connection with FIG. 6A above, a first articulated well bore 8270, an enlarged cavity 8290, a well bore pattern 8050', and a second articulated well bore 8275 are formed in comparable relation to coal seam 8015'. Similarly, water, hydrocarbons, and other fluids are produced from coal seam 8015' in a manner substantially the same as described above in connection with FIG. 7. For example, resources from the target coal seam 8015' drain into well bore patterns 8050', where the resources are collected in the enlarged cavities 8290. From the enlarged cavities 8290, the resources pass through a portion 8280 of the well bore 8275 and into the well bores 8210, 8220, and 8260. Once the resources have been collected in well bores 8210, 8220, and 8260, they may be removed to the surface by the methods as described above.

FIG. 9 is a flow diagram illustrating a method for preparing the coal seam 8015 for mining operations in accordance with another embodiment of the present invention. In this embodiment, the method begins at step 900 in which areas to be drained and well bore patterns 8050 to provide drainage for the areas are identified. Preferably, the areas are aligned with a grid of a mining plan for the region. Pinnate structures described in Section B may be used to provide optimized coverage for the region. It will be understood that other suitable patterns may be used to degasify the coal seam 8015.

Proceeding to step 905, the first articulated well 8230 is drilled to the coal seam 8015. At step 915, down hole logging equipment is utilized to exactly identify the location of the coal seam in the first articulated well bore 8230. At step 920, the enlarged cavity 8250 is formed in the first articulated well bore 8230 at the location of the coal seam 8015. The enlarged cavity 8250 may be formed by under reaming and other conventional techniques. At step 925, a well bore for a well bore pattern such as the patterns described in Section B, for example, is drilled from the articulated well bore 8230 into the coal seam 8015. After formation of the well bore, lateral well bores for the well pattern are drilled at step 530. As previously described, lateral kick-off points may be formed in the well bore during its formation to facilitate drilling of the lateral well bores.

Next, at step 935, the enlarged cavity 8250 is cleaned in preparation for installation of downhole production equipment. The enlarged cavity 8250 may be cleaned by pumping compressed air down the well bores 8210 and 8230 or other suitable techniques. Next, at step 8540, the second well bore 8220 is drilled from or proximate to the articulated well bore 8230 to intersect the coal seam 8015. At step 945, the second articulated well bore 8235 and extension 8240 are formed. Next, at step 950, the well bore 8225 is drilled to intersect the enlarged cavity 8250.

At step 955, production equipment is installed in the well bores 8210 and 8220. The production equipment includes a sucker rod pump extending down into the bottom portion of well bore 8220, above the extension 8240 for removing water from the coal seam 8015. The removal of water will drop the pressure of the coal seam and allow methane gas to diffuse and be produced up the annulus of the well bores 8210 and 8220 and the articulated well bore 8230.

Proceeding to step 960, water that drains from the well bore pattern into the bottom portion of well bore 8220 is pumped to the surface with the rod pumping unit. Water may be continuously or intermittently be pumped as needed to remove it from the bottom portion of well bore 8220. At step 965, methane gas diffused from the coal seam 8015 is continuously collected at the surface 8014. Next, at decisional step 970, it is determined whether the production of gas from the coal seam 8015 is complete. In one embodiment, the production of gas may be complete after the cost of the collecting the gas exceeds the revenue generated by the well. In another embodiment, gas may continue to be produced from the well until a remaining level of gas in the coal seam 8015 is below required levels for mining operations. If production of the gas is not complete, the No branch of decisional step 970 returns to steps 960 and 965 in which water and gas continue to be removed from the coal seam 815. Upon completion of production, the Yes branch of decisional step 970 leads to step 975 in which the production equipment is removed.

Next, at decisional step 980, it is determined whether the coal seam 8015 is to be further prepared for mining operations. If the coal seam 8015 is to be further prepared for mining operations, the Yes branch of decisional step 980 leads to step 985 in which water and other additives may be injected back into the coal seam 15 to re-hydrate the coal seam in order to minimize dust, to improve the efficiency of mining, and to improve the mined product.

Step 985 and the No branch of decisional step 980 lead to step 990 in which the coal seam 8015 is mined. The removal of the coal from the seam causes the mined roof to cave and fracture into the opening behind the mining process. The collapsed roof creates gob gas which may be collected at step 995 through the well bores 8210 and 8220 and/or first articulated well bore 8230. Accordingly, additional drilling operations are not required to recover gob gas from a mined coal seam. Step 995 leads to the end of the process by which a coal seam is efficiently degasified from a minimum surface area. The method provides a symbiotic relationship with the mine to remove unwanted gas prior to mining and to re-hydrate the coal prior to the mining process. Furthermore, the method allows for efficient degasification in steep, rough, or otherwise restrictive topology.

E. Dual Well with Slant

Figure 10:
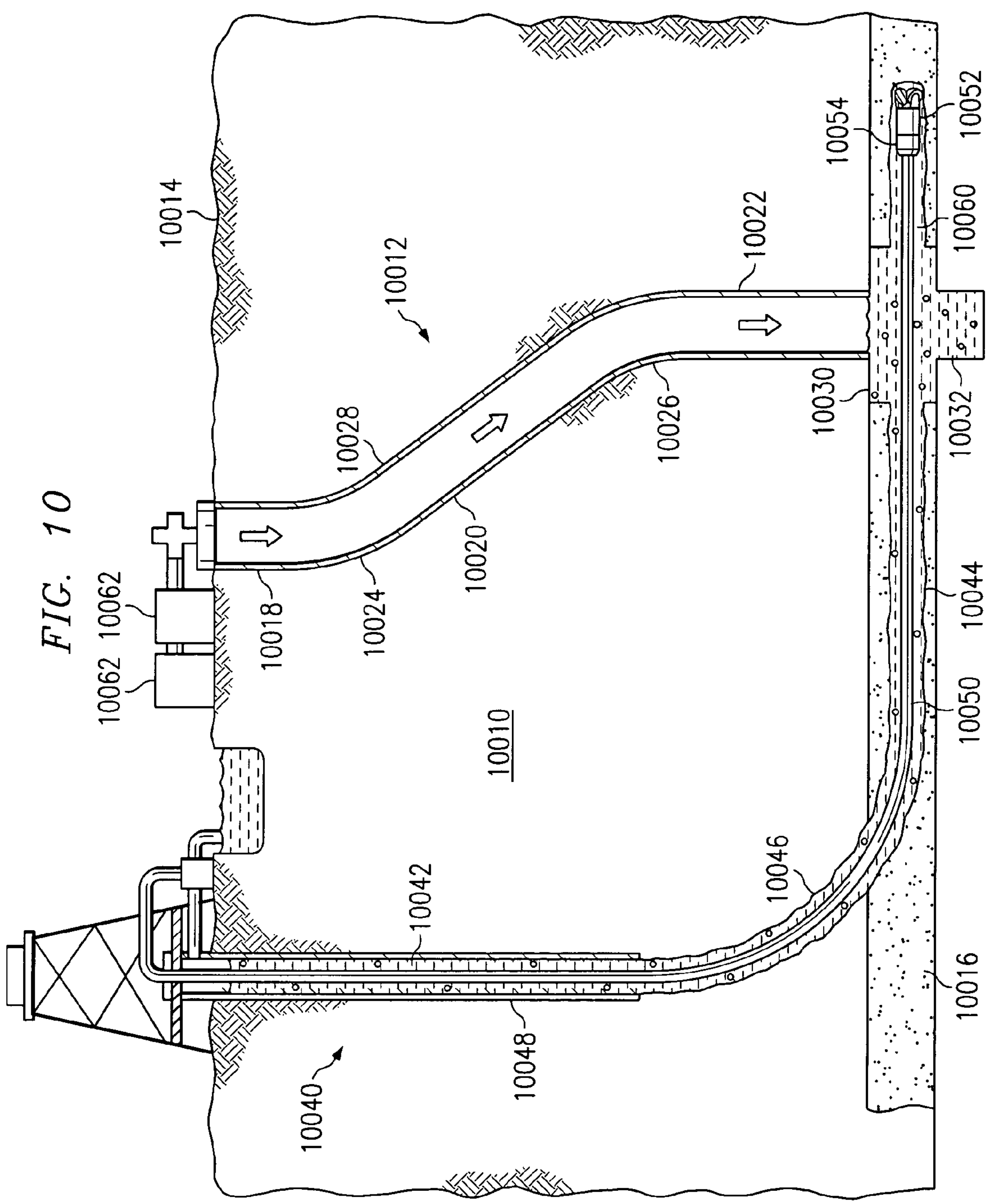
FIG. 10 is a cross-sectional diagram illustrating a system for accessing a subterranean zone from a limited surface area in accordance with another embodiment of the present invention.

FIG. 10 is a diagram illustrating a system 10010 for accessing a subterranean zone from a limited surface area in accordance with an embodiment of the present invention. In this embodiment, the subterranean zone is a coal seam. However, it should be understood that other subterranean formations and/or other low pressure, ultra-low pressure, and low porosity subterranean zones can be similarly accessed using the system 10010 of the present invention to remove and/or produce water, hydrocarbons and other fluids in the zone, to treat minerals in the zone prior to mining operations, or to inject, introduce, or store a gas, fluid or other substance into the zone.

Referring to FIG. 10, a well bore 10012 extends from the surface 10014 to a target coal seam 10016. The well bore 10012 intersects, penetrates and continues below the coal seam 10016. In the embodiment illustrated in FIG. 10, the well bore 10012 includes a portion 10018, an angled portion 10020, and a portion 10022 disposed between the surface 10014 and the coal seam 10016. In FIG. 10, portions 10018 and 10022 are illustrated substantially vertical; however, it should be understood that portions 10018 and 10022 may be formed at other suitable angles and orientations to accommodate surface 10014 and/or coal seam 10016 variations.

In this embodiment, the portion 10018 extends downwardly in a substantially vertical direction from the surface 10014 a predetermined distance to accommodate formation of radiused portions 10024 and 10026, angled portion 10020, and portion 10022 to intersect the coal seam 10016 at a desired location. Angled portion 10020 extends from an end of the portion 10018 and extends downwardly at a predetermined angle relative to the portion 10018 to accommodate intersection of the coal seam 10016 at the desired location. Angled portion 10020 may be formed having a generally uniform or straight directional configuration or may include various undulations or radiused portions as required to intersect portion 10022 and/or to accommodate various subterranean obstacles, drilling requirements or characteristics. Portion 10022 extends downwardly in a substantially vertical direction from an end of the angled portion 10020 to intersect, penetrate and continue below the coal seam 10016.

In one embodiment, to intersect a coal seam 10016 located at a depth of approximately 1200 feet below the surface 10014, the portion 10018 may be drilled to a depth of approximately 300 feet. Radiused portions 10024 and 10026 may be formed having a radius of approximately 400 feet, and angled portion 10020 may be tangentially formed between radiused portions 10024 and 10026 at an angle relative to the portion 10018 to accommodate approximately a 250 foot offset between portions 10018 and 10022 at a depth of approximately 200 feet above the target coal seam 10016. The portion 10022 may be formed extending downwardly the remaining 200 feet to the coal seam 10016. However, other suitable drilling depths, drilling radii, angular orientations, and offset distances may be used to form well bore 10012. The well bore 10012 may also be lined with a suitable well casing 10028 that terminates at or above the upper level of the coal seam 10016.

The well bore 10012 is logged either during or after drilling in order to locate the exact vertical depth of the coal seam 10016. As a result, the coal seam 10016 is not missed in subsequent drilling operations, and techniques used to locate the coal seam 10016 while drilling need not be employed. An enlarged cavity 10030 is formed in the well bore 10012 at the level of the coal seam 10016. As described in more detail below, the enlarged cavity 10030 provides a junction for intersection of the well bore 10012 by an articulated well bore used to form a subterranean well bore pattern in the coal seam 10016. The enlarged cavity 10030 also provides a collection point for fluids drained from the coal seam 10016 during production operations. In one embodiment, the enlarged cavity 10030 has a radius of approximately eight feet and a vertical dimension which equals or exceeds the vertical dimension of the coal seam 10016. The enlarged cavity 10030 is formed using suitable under-reaming techniques and equipment. Portion 10022 of the well bore 10012 continues below the enlarged cavity 10030 to form a sump 10032 for the cavity 10030.

An articulated well bore 10040 extends from the surface 10014 to the enlarged cavity 10030. In this embodiment, the articulated well bore 10040 includes a portion 10042, a portion 10044, and a curved or radiused portion 10046 interconnecting the portions 10042 and 10044. The portion 10044 lies substantially in the plane of the coal seam 10016 and intersects the enlarged cavity 10030. In FIG. 10, portion 10042 is illustrated substantially vertical, and portion 10044 is illustrated substantially horizontal; however, it should be understood that portions 10042 and 10044 may be formed having other suitable orientations to accommodate surface 10014 and/or coal seam 10016 characteristics.

In the illustrated embodiment, the articulated well bore 10040 is offset a sufficient distance from the well bore 10012 at the surface 10014 to permit the large radius curved portion 10046 and any desired distance of portion 10044 to be drilled before intersecting the enlarged cavity 10030. In one embodiment, to provide the curved portion 10046 with a radius of 100-150 feet, the articulated well bore 10040 is offset a distance of approximately 300 feet from the well bore 10012 at the surface 10014. This spacing minimizes the angle of the curved portion 10046 to reduce friction in the articulated well bore 10040 during drilling operations. As a result, reach of the articulated drill string drilled through the articulated well bore 10040 is maximized. However, other suitable offset distances and radii may be used for forming the articulated well bore 10040. The portion 10042 of the articulated well bore 10040 is lined with a suitable casing 10048.

The articulated well bore 10040 is drilled using an articulated drill string 10050 that includes a suitable down-hole motor and bit 10052. A measurement while drilling (MWD) device 10054 is included in the articulated drill string 10050 for controlling the orientation and direction of the well bore drilled by the motor and bit 52.

After the enlarged cavity 10030 has been successfully intersected by the articulated well bore 10040, drilling is continued through the cavity 10030 using the articulated drill string 10050 and appropriate drilling apparatus to provide a subterranean well bore pattern 10060 in the coal seam 10016. The well bore pattern 10060 and other such well bores include sloped, undulating, or other inclinations of the coal seam 10016 or other subterranean zone. During this operation, gamma ray logging tools and conventional measurement while drilling devices may be employed to control and direct the orientation of the drill bit 10052 to retain the well bore pattern 10060 within the confines of the coal seam 10016 and to provide substantially uniform coverage of a desired area within the coal seam 10016.

During the process of drilling the well bore pattern 10060, drilling fluid or "mud" is pumped down the articulated drill string 10050 and circulated out of the drill string 10050 in the vicinity of the bit 10052, where it is used to scour the formation and to remove formation cuttings. The cuttings are then entrained in the drilling fluid which circulates up through the annulus between the drill string 10050 and the walls of the articulated well bore 10040 until it reaches the surface 1014, where the cuttings are removed from the drilling fluid and the fluid is then recirculated. This conventional drilling operation produces a standard column of drilling fluid having a vertical height equal to the depth of the articulated well bore 10040 and produces a hydrostatic pressure on the well bore corresponding to the well bore depth. Because coal seams tend to be porous and fractured, they may be unable to sustain such hydrostatic pressure, even if formation water is also present in the coal seam 10016. Accordingly, if the full hydrostatic pressure is allowed to act on the coal seam 10016, the result may be loss of drilling fluid and entrained cuttings into the formation. Such a circumstance is referred to as an "over-balanced" drilling operation in which the hydrostatic fluid pressure in the well bore exceeds the ability of the formation to withstand the pressure. Loss of drilling fluids and cuttings into the formation not only is expensive in terms of the lost drilling fluids, which must be made up, but it also tends to plug the pores in the coal seam 10016, which are needed to drain the coal seam of gas and water.

To prevent over-balance drilling conditions during formation of the well bore pattern 10060, air compressors 10062 are provided to circulate compressed air down the well bore 10012 and back up through the articulated well bore 10040. The circulated air will admix with the drilling fluids in the annulus around the articulated drill string 10050 and create bubbles throughout the column of drilling fluid. This has the effect of lightening the hydrostatic pressure of the drilling fluid and reducing the down-hole pressure sufficiently that drilling conditions do not become over-balanced. Aeration of the drilling fluid reduces down-hole pressure to approximately 150-200 pounds per square inch (psi). Accordingly, low pressure coal seams and other subterranean zones can be drilled without substantial loss of drilling fluid and contamination of the zone by the drilling fluid.

Foam, which may be compressed air mixed with water, may also be circulated down through the articulated drill string 10050 along with the drilling mud in order to aerate the drilling fluid in the annulus as the articulated well bore 10040 is being drilled and, if desired, as the well bore pattern 10060 is being drilled. Drilling of the well bore pattern 10060 with the use of an air hammer bit or an air-powered down-hole motor will also supply compressed air or foam to the drilling fluid. In this case, the compressed air or foam which is used to power the down-hole motor and bit 10052 exits the articulated drill string 10050 in the vicinity of the drill bit 10052. However, the larger volume of air which can be circulated down the well bore 10012 permits greater aeration of the drilling fluid than generally is possible by air supplied through the articulated drill string 10050.

Figure 11:
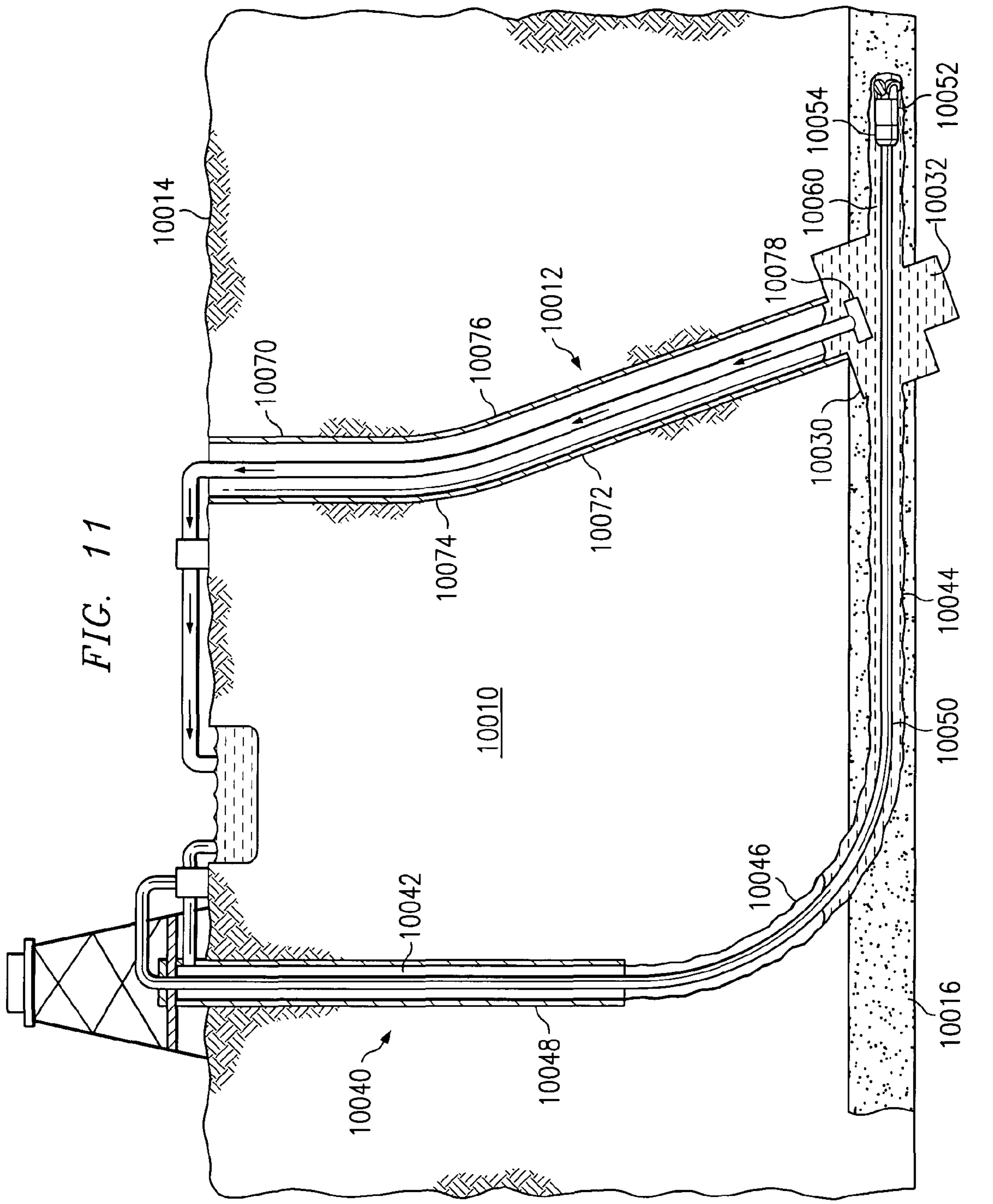
FIG. 11 is a cross-sectional diagram illustrating a system for accessing a subterranean zone from a limited surface area in accordance with another embodiment of the present invention.

FIG. 11 is a diagram illustrating system 10010 for accessing a subterranean zone from a limited surface area in accordance with another embodiment of the present invention. In this embodiment, the articulated well bore 10040 is formed as previously described in connection with FIG. 10. The well bore 10012, in this embodiment, includes a portion 10070 and an angled portion 10072 disposed between the surface 10014 and the coal seam 10016. The portion 10070 extends downwardly from the surface 10014 a predetermined distance to accommodate formation of a radiused portion 10074 and angled portion 10072 to intersect the coal seam 10016 at a desired location. In this embodiment, portion 10070 is illustrated substantially vertical; however, it should be understood that portion 10070 may be formed at other suitable orientations to accommodate surface 10014 and/or coal seam 10016 characteristics. Angled portion 10072 extends from an end of the portion 10070 and extends downwardly at a predetermined angle relative to portion 10070 to accommodate intersection of the coal seam 10016 at the desired location. Angled portion 10072 may be formed having a generally uniform or straight directional configuration or may include various undulations or radiused portions as required to intersect the coal seam 10016 at a desired location and/or to accommodate various subterranean obstacles, drilling requirements or characteristics.

In one embodiment, to intersect a coal seam 10016 located at a depth of approximately 1200 feet below the surface 10014, the portion 10070 may be drilled to a depth of approximately 300 feet. Radiused portion 10074 may be formed having a radius of approximately 400 feet, and angled portion 10072 may be tangentially formed in communication with the radiused portion 10074 at an angle relative to the portion 10070 to accommodate approximately a 300 foot offset between the portion 10070 and the intersection of the angled portion 10072 at the target coal seam 10016. However, other suitable drilling depths, drilling radii, angular orientations, and offset distances may be used to form well bore 10012.

The well bore 10012 may also be lined with a suitable well casing 10076 that terminates at or above the upper level of the coal seam 10016.

The well bore 10012 is logged either during or after drilling in order to locate the exact depth of the coal seam 10016. As a result, the coal seam 10016 is not missed in subsequent drilling operations, and techniques used to locate the coal seam 10016 while drilling need not be employed. The enlarged cavity 10030 is formed in the well bore 10012 at the level of the coal seam 10016 as previously described in connection with FIG. 10. However, as illustrated in FIG. 11, because of the angled portion 10072 of the well bore 10012, the enlarged cavity 10030 may be disposed at an angle relative to the coal seam 10016. As described above, the enlarged cavity 10030 provides a junction for intersection of the well bore 10012 and the articulated well bore 10040 to provide a collection point for fluids drained from the coal seam 10016 during production operations. Thus, depending on the angular orientation of the angled portion 10072, the radius and/or vertical dimension of the enlarged cavity 10030 may be modified such that portions of the enlarged cavity 10030 equal or exceed the vertical dimension of the coal seam 10016. Angled portion 10072 of the well bore 10012 continues below the enlarged cavity 10030 to form a sump 10032 for the cavity 10030.

After intersection of the enlarged cavity 10030 by the articulated well bore 10040, a pumping unit 10078 is installed in the enlarged cavity 10030 to pump drilling fluid and cuttings to the surface 10014 through the well bore 10012. This eliminates the friction of air and fluid returning up the articulated well bore 10040 and reduces down-hole pressure to nearly zero. Pumping unit 10078 may include a sucker rod pump, a submersible pump, a progressing cavity pump, or other suitable pumping device for removing drilling fluid and cuttings to the surface 10014. Accordingly, coal seams and other subterranean zones having ultra low pressures, such as below 150 psi, can be accessed from the surface. Additionally, the risk of combining air and methane in the well is substantially eliminated.

Figure 12:
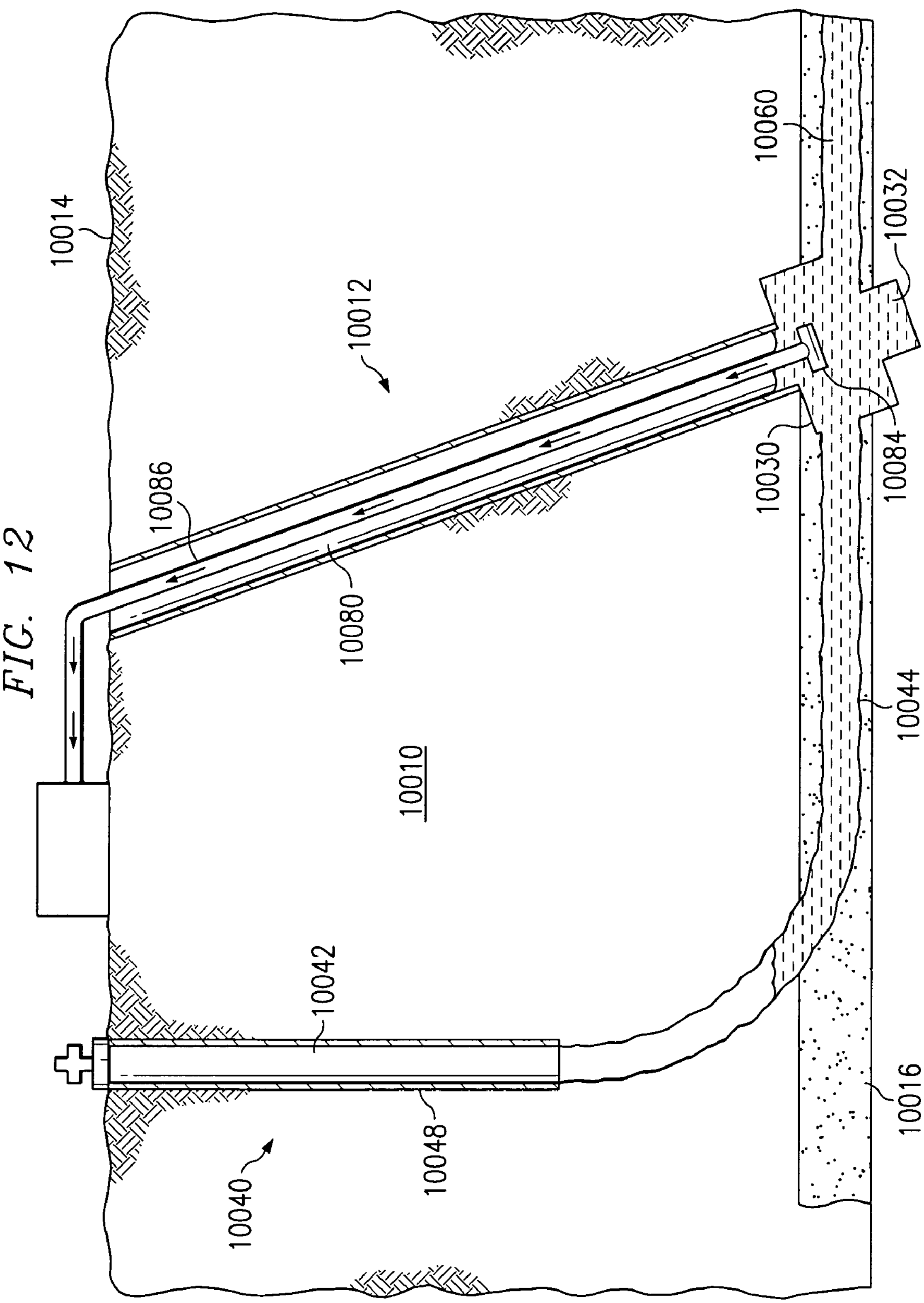
FIG. 12 is a cross-sectional diagram illustrating a system for accessing a subterranean zone from a limited surface area in accordance with another embodiment of the present invention.

FIG. 12 is a diagram illustrating system 10010 for accessing a subterranean zone from a limited surface area in accordance with another embodiment of the present invention. In this embodiment, the articulated well bore 10040 is formed as previously described in connection with FIG. 10. The well bore 10012, in this embodiment, includes an angled portion 10080 disposed between the surface 10014 and the coal seam 10016. For example, in this embodiment, the angled portion 10080 extends downwardly from the surface 10014 at a predetermined angular orientation to intersect the coal seam 10016 at a desired location. Angled portion 10080 may be formed having a generally uniform or straight directional configuration or may include various undulations or radiused portions as required to intersect the coal seam 10016 at a desired location and/or to accommodate various subterranean obstacles, drilling requirements or characteristics.

In one embodiment, to intersect a coal seam 10016 located at a depth of approximately 1200 feet below the surface 10014, the angled portion 10080 may be drilled at an angle of approximately 20 degrees from vertical to accommodate approximately a 440 foot offset between the surface 10014 location of the angled portion 10080 and the intersection of the angled portion 10080 at the target coal seam 10016. However, other suitable angular orientations and offset distances may be used to form angled portion 10080 of well bore 10012. The well bore 10012 may also be lined with a suitable well casing 10082 that terminates at or above the upper level of the coal seam 10016.

The well bore 10012 is logged either during or after drilling in order to locate the exact depth of the coal seam 10016. As a result, the coal seam 10016 is not missed in subsequent drilling operations, and techniques used to locate the coal seam 10016 while drilling need not be employed. The enlarged cavity 10030 is formed in the well bore 10012 at the level of the coal seam 10016 as previously described in connection with FIG. 10. However, as illustrated in FIG. 11, because of the angled portion 10080 of the well bore 10012, the enlarged cavity 10030 may be disposed at an angle relative to the coal seam 10016. As described above, the enlarged cavity 10030 provides a junction for intersection of the well bore 10012 and the articulated well bore 10040 to provide a collection point for fluids drained from the coal seam 10016 during production operations. Thus, depending on the angular orientation of the angled portion 10080, the radius and/or vertical dimension of the enlarged cavity 10030 may be modified such that portions of the enlarged cavity 10030 equal or exceed the vertical dimension of the coal seam 10016. Angled portion 10080 of the well bore 10012 continues below the enlarged cavity 10030 to form a sump 10032 for the cavity 10030.

After the well bore 10012, articulated well bore 10040, enlarged cavity 10030 and the desired well bore pattern 10060 have been formed, the articulated drill string 10050 is removed from the articulated well bore 10040 and the articulated well bore 10040 is capped. A down hole production or pumping unit 10084 is disposed in the well bore 10012 in the enlarged cavity 10030. The enlarged cavity 10030 provides a reservoir for accumulated fluids allowing intermittent pumping without adverse effects of a hydrostatic head caused by accumulated fluids in the well bore. Pumping unit 10084 may include a sucker rod pump, a submersible pump, a progressing cavity pump, or other suitable pumping device for removing accumulated fluids to the surface.

The down hole pumping unit 10084 is connected to the surface 10014 via a tubing string 10086. The down hole pumping unit 10084 is used to remove water and entrained coal fines from the coal seam 10016 via the well bore pattern 10060. Once the water is removed to the surface 10014, it may be treated for separation of methane which may be dissolved in the water and for removal of entrained fines. After sufficient water has been removed from the coal seam 10016, pure coal seam gas may be allowed to flow to the surface 10014 through the annulus of the well bore 10012 around the tubing string 10086 and removed via piping attached to a wellhead apparatus. At the surface 10014, the methane is treated, compressed and pumped through a pipeline for use as a fuel in a conventional manner. The down hole pumping unit 10084 may be operated continuously or as needed to remove water drained from the coal seam 10016 into the enlarged diameter cavity 10030.

Figure 13:
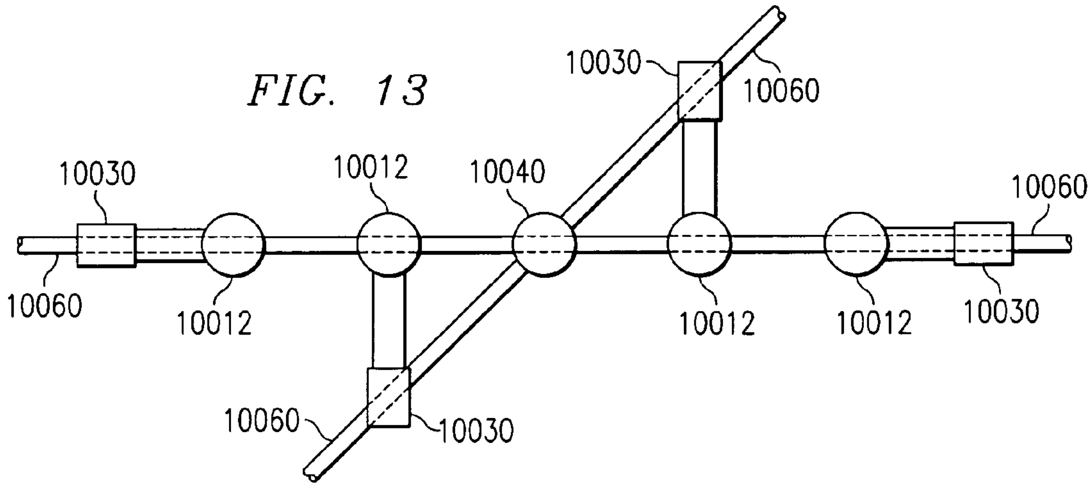
FIG. 13 is a diagram illustrating a top plan view of multiple well bore patterns in a subterranean zone through an articulated surface well intersecting multiple surface cavity wells in accordance with an embodiment of the present invention.

FIG. 13 is a diagram illustrating multiple well bore patterns in a subterranean zone through an articulated well bore 10040 intersecting multiple well bores 10012 in accordance with an embodiment of the present invention. In this embodiment, four well bores 10012 are used to access a subterranean zone through well bore patterns 10060. However, it should be understood that a varying number of well bores 10012 and well bore patterns 10060 may be used depending on the geometry of the underlying subterranean formation, desired access area, production requirements, and other factors.

Referring to FIG. 13, four well bores 10012 are formed disposed in a spaced apart and substantially linear formation relative to each other at the surface 10014. Additionally, the articulated well bore 10040, in this embodiment, is disposed linearly with the well bores 10012 having a pair of well bores

10012 disposed on each side of the surface location of the articulated well bore 10040. Thus, the well bores 10012 and the articulated well bore 10040 may be located over a subterranean resource in close proximity to each other and in a suitable formation to minimize the surface area required for accessing the subterranean formation. For example, according to one embodiment, each of the well bores 10012 and the articulated well bore 10040 may be spaced apart from each other at the surface 10014 in a linear formation by approximately twenty-five feet, thereby substantially reducing the surface area required to access the subterranean resource. As a result, the well bores 10012 and articulated well bore 10040 may be formed on or adjacent to a roadway, steep hillside, or other limited surface area. Accordingly, environmental impact is minimized as less surface area must be cleared. Well bores 10012 and 10040 may also be disposed in a substantially nonlinear formation in close proximity to each other as described above to minimize the surface area required for accessing the subterranean formation.

As described above, well bores 10012 are formed extending downwardly from the surface and may be configured as illustrated in FIGS. 10-12 to accommodate a desired offset distance between the surface location of each well bore 10012 and the intersection of the well bore 10012 with the coal seam 10016 or other subterranean formation. Enlarged cavities 10030 are formed proximate the coal seam 10016 in each of the well bores 10012, and the articulated well bore 10040 is formed intersecting each of the enlarged cavities 10030. In the embodiment illustrated in FIG. 10, the bottom hole location or intersection of each of the well bores 10012 with the coal seam 10016 is located either linearly or at a substantially ninety degree angle to the linear formation of the well bores 10012 at the surface. However, the location and angular orientation of the intersection of the well bores 10012 with the coal seam 10016 relative to the linear formation of the well bores 10012 at the surface 10014 may be varied to accommodate a desired access formation or subterranean resource configuration.

Well bore patterns 10060 are drilled within the target subterranean zone from the articulated well bore 10040 extending from each of the enlarged cavities 10030. In resource removal applications, resources from the target subterranean zone drain into each of the well bore patterns 10060, where the resources are collected in the enlarged cavities 10030. Once the resources have been collected in the enlarged cavities 10030, the resources may be removed to the surface through the well bores 10012 by the methods described above.

Figure 14:
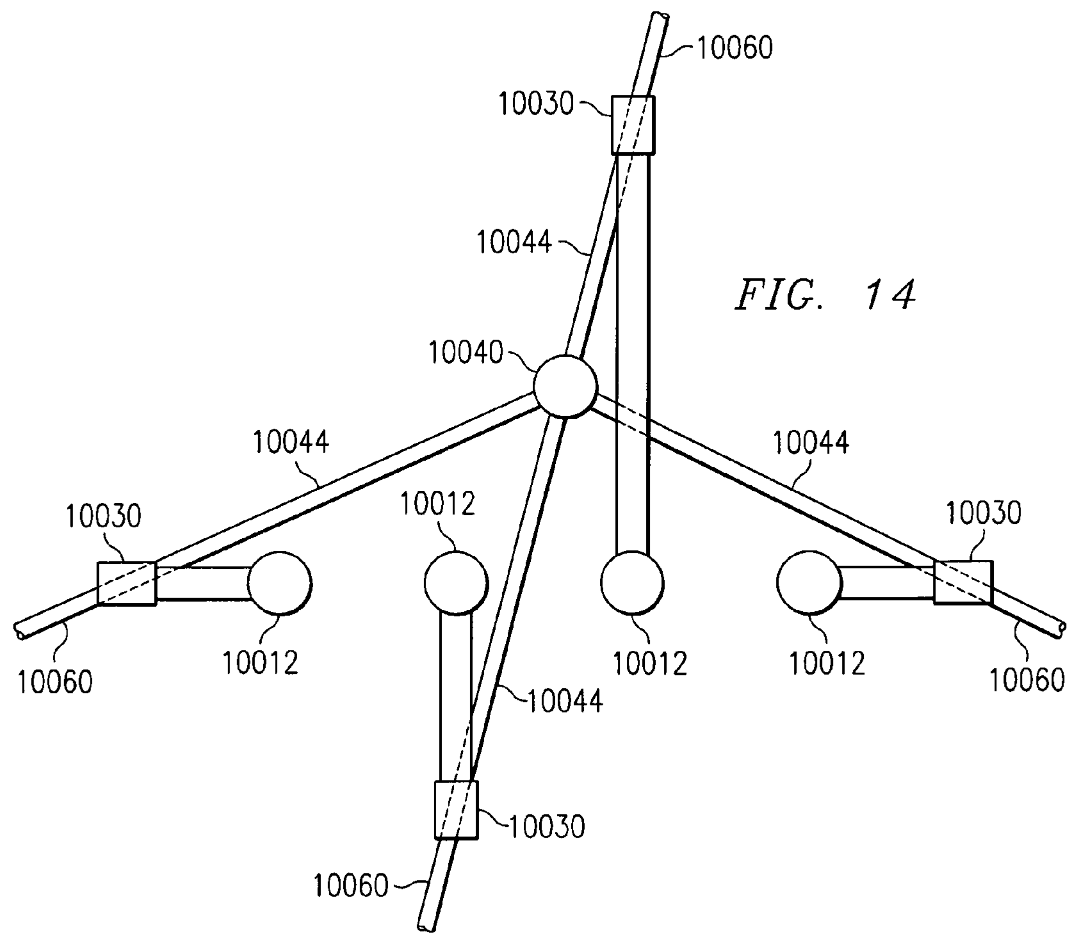
FIG. 14 is a diagram illustrating a top plan view of multiple well bore patterns in a subterranean zone through an articulated surface well intersecting multiple cavity wells in accordance with another embodiment of the present invention.

FIG. 14 is a diagram illustrating multiple horizontal well bore patterns in a subterranean zone through an articulated well bore 10040 intersecting multiple well bores 10012 in accordance with another embodiment of the present invention. In this embodiment, four well bores 10012 are used to collect and remove to the surface 10014 resources collected from well bore patterns 10060. However, it should be understood that a varying number of well bores 10012 and well bore patterns 10060 may be used depending on the geometry of the underlying subterranean formation, desired access area, production requirements, and other factors.

Referring to FIG. 14, four well bores 10012 are formed disposed in a spaced apart and substantially linear formation relative to each other at the surface 10014. In this embodiment, the articulated well bore 10040 is offset from and disposed adjacent to the linear formation of the well bores 10012. As illustrated in FIG. 14, the articulated well bore 10040 is located such that a pair of well bores 10012 are disposed on each side of the articulated well bore 10040 in a direction substantially orthogonal to the linear formation of well bores 10012. Thus, the well bores 10012 and the articulated well bore 10040 may be located over a subterranean resource in close proximity to each other and in a suitable formation to minimize the surface area required for gas production and coal seam 10016 treatment. For example, according to one embodiment, each of the well bores 10012 may be spaced apart from each other at the surface 10014 in a linear formation by approximately twenty-five feet, and the articulated well bore 10040 may be spaced apart from each of the two medially-located well bores 10012 by approximately twenty-five feet, thereby substantially reducing the surface area required to access the subterranean resource and for production and drilling. As a result, the well bores 10012 and articulated well bore 10040 may be formed on or adjacent to a roadway, steep hillside, or other limited surface area. Accordingly, environmental impact is minimized as less surface area must be cleared.

As described above, well bores 10012 are formed extending downwardly from the surface and may be configured as illustrated in FIGS. 10-12 to accommodate a desired offset distance between the surface location of each well bore 10012 and the intersection of the well bore 10012 with the coal seam 10016. Enlarged cavities 10030 are formed proximate the coal seam 10016 in each of the well bores 10012, and the articulated well bore 10040 is formed intersecting each of the enlarged cavities 10030. In the embodiment illustrated in FIG. 14, the bottom hole location or intersection of each of the well bores 10012 with the coal seam 10016 is located either linearly or at a substantially ninety degree angle to the linear formation of the well bores 10012 at the surface. However, the location and angular orientation of the intersection of the well bores 10012 with the coal seam 10016 relative to the linear formation of the well bores 10012 at the surface 10014 may be varied to accommodate a desired drainage formation or subterranean resource configuration.

Well bore patterns 10060 are drilled within the target subterranean zone from the articulated well bore 10040 extending from each of the enlarged cavities 10030. In resource collection applications, resources from the target subterranean zone drain into each of the well bore patterns 10060, where the resources are collected in the enlarged cavities 10030. Once the resources have been collected in the enlarged cavities 10030, the resources may be removed to the surface through the well bores 10012 by the methods described above.

Figure 15:
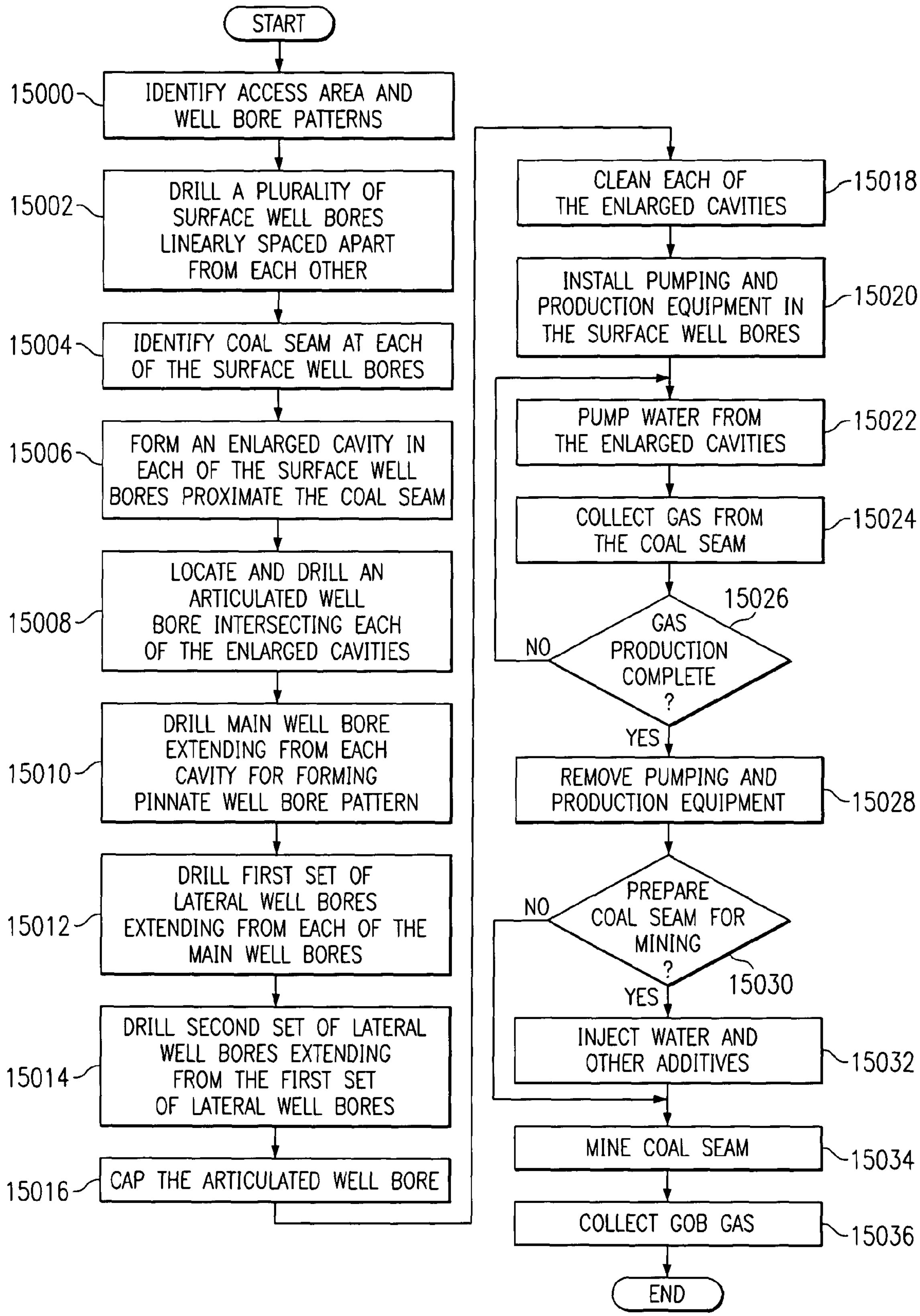
FIG. 15 is a flow diagram illustrating a method for accessing a subterranean zone from a limited surface area in accordance with an embodiment of the present invention.

FIG. 15 is a flow diagram illustrating a method for enhanced access to a subterranean resource, such as a coal seam 10016, from a limited surface area in accordance with an embodiment of the present invention. In this embodiment, the method begins at step 15000 in which areas to be accessed and well bore patterns for the areas are identified. Pinnate well bore patterns may be used to provide optimized coverage for the region. However, it should be understood that other suitable well bore patterns may also be used.

Proceeding to step 15002, a plurality of well bores 10012 are drilled from the surface 10014 to a predetermined depth through the coal seam 10016. The well bores 10012 may be formed having a substantially linear spaced apart relationship relative to each other or may be nonlinearly disposed relative to each other while minimizing the surface area required for accessing the subterranean resource. Next, at step 15004, down hole logging equipment is utilized to exactly identify the location of the coal seam 10016 in each of the well bores 10012. At step 15006, the enlarged cavities 10030 are formed in each of the well bores 10012 at the location of the coal seam 10016. As previously discussed, the enlarged cavities 10030 may be formed by under reaming and other conventional techniques.

At step 15008, the articulated well bore 10040 is drilled to intersect each of the enlarged cavities 10030 formed in the well bores 10012. At step 1510, well bores for well bore patterns such as those described in Section B, for example, are drilled from the articulated well bore 10040 into the coal seam 10016 extending from each of the enlarged cavities 10030. After formation of the well bores, lateral well bores for the well bore pattern are drilled at step 15012. Lateral well bores for the well bore pattern are formed at step 15014.

At step 15016, the articulated well bore 10040 is capped. Next, at step 15018, the enlarged cavities 10030 are cleaned in preparation for installation of downhole production equipment. The enlarged cavities 10030 may be cleaned by pumping compressed air down the well bores 10012 or other suitable techniques. At step 15020, production equipment is installed in the well bores 10012. The production equipment may include pumping units and associated equipment extending down into the cavities 10030 for removing water from the coal seam 10016. The removal of water will drop the pressure of the coal seam and allow methane gas to diffuse and be produced up the annulus of the well bores 10012.

Proceeding to step 15022, water that drains from the well bore patterns into the cavities 10030 is pumped to the surface 10014. Water may be continuously or intermittently pumped as needed to remove it from the cavities 10030. At step 15024, methane gas diffused from the coal seam 10016 is continuously collected at the surface 10014. Next, at decisional step 15026, it is determined whether the production of gas from the coal seam 10016 is complete. The production of gas may be complete after the cost of the collecting the gas exceeds the revenue generated by the well. Or, gas may continue to be produced from the well until a remaining level of gas in the coal seam 10016 is below required levels for mining operations. If production of the gas is not complete, the method returns to steps 15022 and 15024 in which water and gas continue to be removed from the coal seam 10016. Upon completion of production, the method proceeds from step 15026 to step 15028 where the production equipment is removed.

Next, at decisional step 15030, it is determined whether the coal seam 10016 is to be further prepared for mining operations. If the coal seam 10016 is to be further prepared for mining operations, the method proceeds to step 15032, where water and other additives may be injected back into the coal seam 10016 to rehydrate the coal seam 10016 in order to minimize dust, improve the efficiency of mining, and improve the mined product.

If additional preparation of the coal seam 10016 for mining is not required, the method proceeds from step 15030 to step 15034, where the coal seam 10016 is mined. The removal of the coal from the coal seam 10016 causes the mined roof to cave and fracture into the opening behind the mining process. The collapsed roof creates gob gas which may be collected at step 15036 through the well bores 10012. Accordingly, additional drilling operations are not required to recover gob gas from a mined coal seam 10016. Step 15036 leads to the end of the process by which a coal seam 10016 is efficiently degasified from the surface. The method provides a symbiotic relationship with the mine to remove unwanted gas prior to mining and to rehydrate the coal prior to the mining process.

Thus, the present invention provides greater access to subterranean resources from a limited surface area than prior systems and methods by providing decreasing the surface area required for dual well systems. For example, a plurality of well bores 10012 may be disposed in close proximity to each other, for example, in a linearly or nonlinearly spaced apart relationship to each other, such that the well bores 10012 may be located along a roadside or other generally small surface area. Additionally, the well bores 10012 may include angled portions 10020, 10072 or 10080 to accommodate formation of the articulated well bore 10040 in close proximity to the well bores 10012 while providing an offset to the intersection of the articulated well bore 10040 with the well bores 10012.

Figure 16:
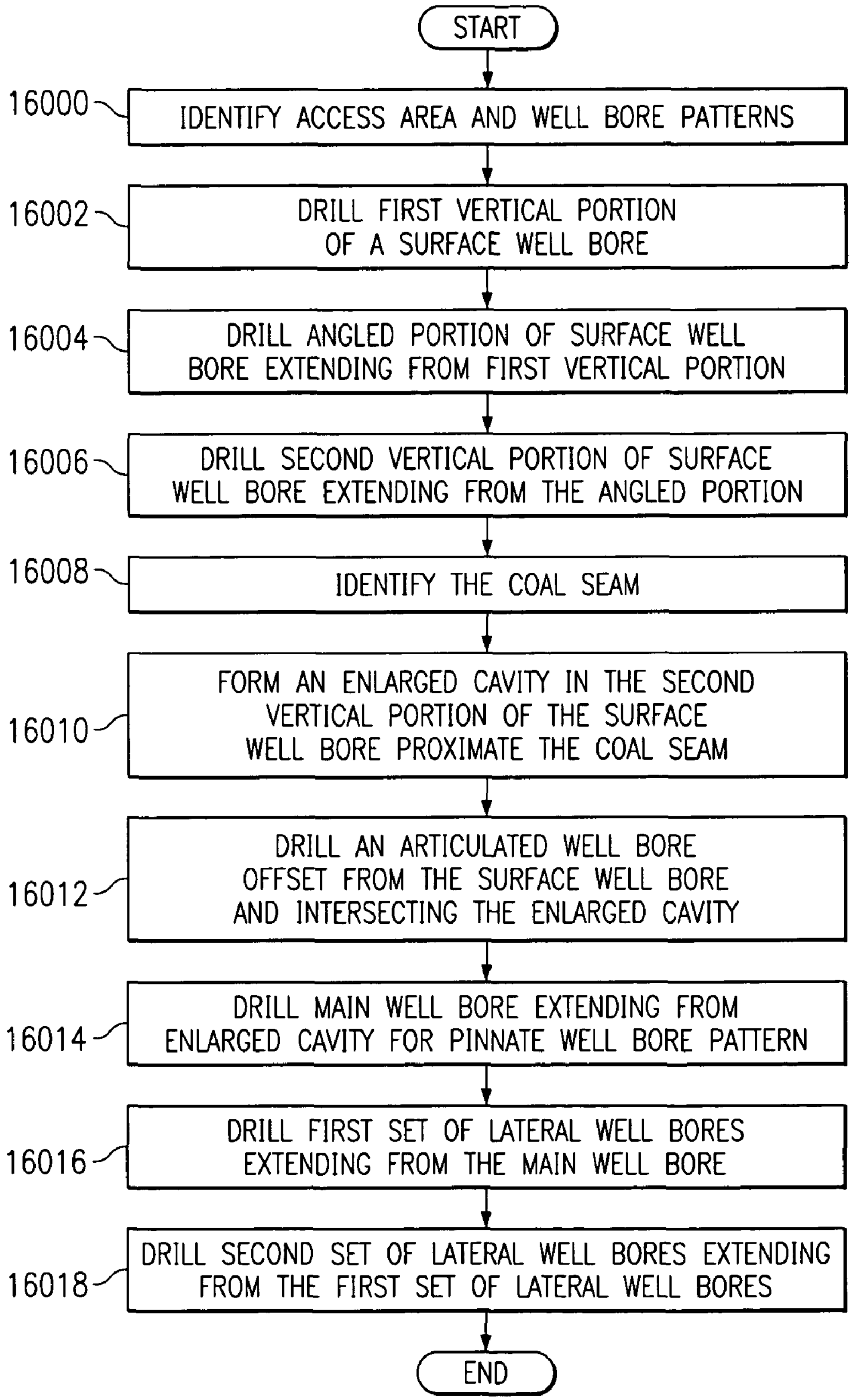
FIG. 16 is a flow diagram illustrating a method for accessing a subterranean zone from a limited surface area in accordance with another embodiment of the present invention.

FIG. 16 is a flow diagram illustrating a method for enhanced access to a subterranean resource, such as a coal seam 10016, from a limited surface area in accordance with an embodiment of the present invention. In this embodiment, the method begins at step 16000 in which areas to be accessed and well bore patterns for the areas are identified. Pinnate well bore patterns may be used to provide optimized coverage for the region. However, it should be understood that other suitable well bore patterns may also be used.

Proceeding to step 16002, the portion 10018 of the well bore 10012 is formed to a predetermined depth. As described above in connection with FIG. 10, the depth of the portion 10018 may vary depending on the location and desired offset distance between the intersection of the well bore 10012 with the coal seam 10016 and the surface location of the well bore 10012. The angled portion 10020 of the well bore 10012 is formed at step 16004 extending from the portion 10018, and the portion 10022 of the well bore 10012 is formed at step 16006 extending from the angled portion 10020. As described above in connection with FIG. 10, the angular orientation of the angled portion 10020 and the depth of the intersection of the angled portion 10020 with the portion 10022 may vary to accommodate a desired intersection location of the coal seam 10016 by the well bore 10012.

Next, at step 16008, down hole logging equipment is utilized to exactly identify the location of the coal seam 10016 in the well bore 10012. At step 16010, the enlarged cavity 10030 is formed in the portion 10022 of the well bore 10012 at the location of the coal seam 10016. As previously discussed, the enlarged cavity 10030 may be formed by under reaming and other conventional techniques.

At step 16012, the articulated well bore 10040 is drilled to intersect the enlarged cavity 10030 formed in the portion 10022 of the well bore 10012. At step 1614, a well bore for a well bore pattern such as the ones described in Section B, for example, is drilled from the articulated well bore 10040 into the coal seam 10016 extending from the enlarged cavity 10030. After formation of the well bore, lateral well bores for the well bore pattern are drilled at step 16016. Lateral well bores for the well bore pattern are formed at step 16018.

Figure 17:
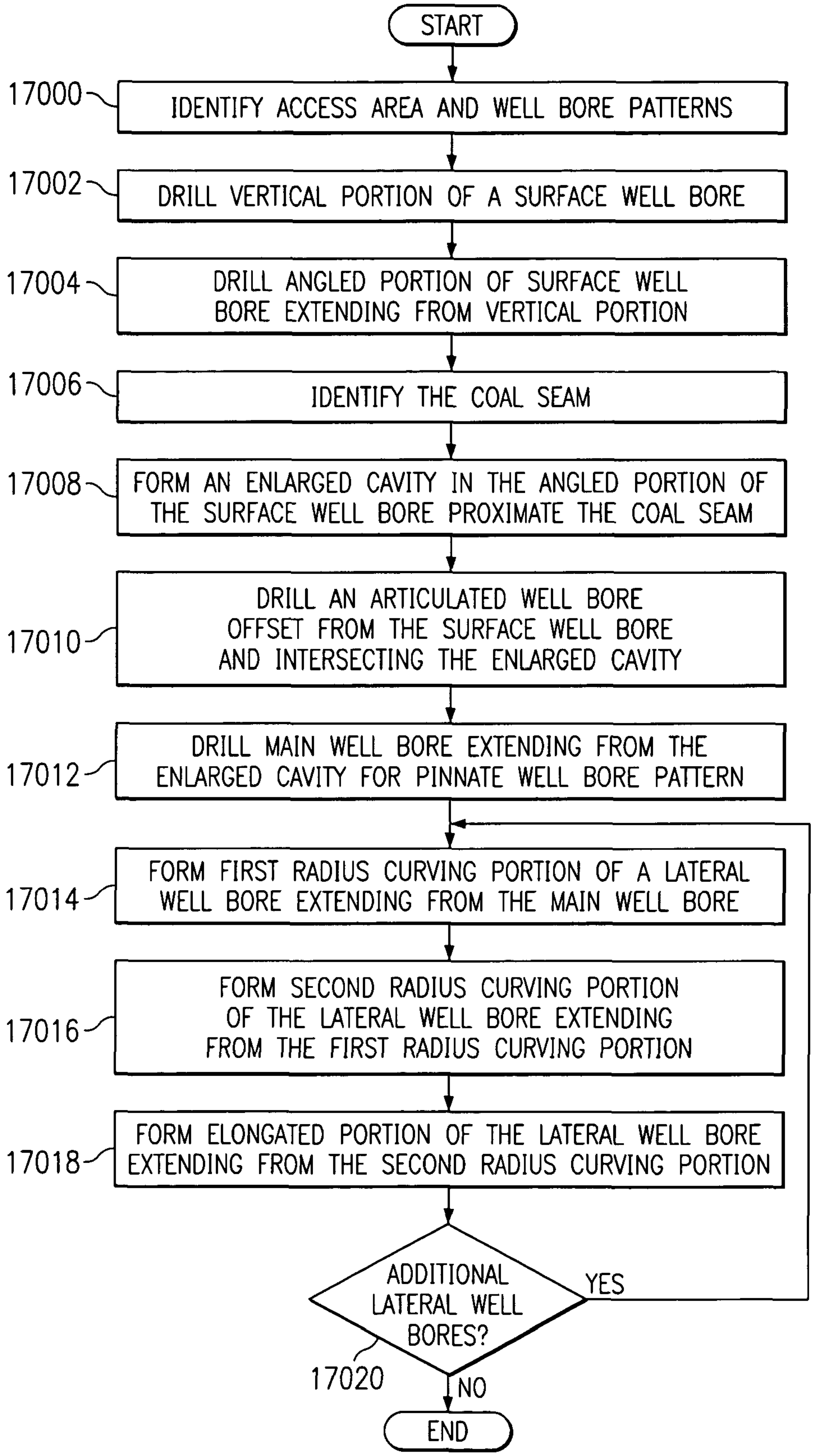
FIG. 17 is a flow diagram illustrating a method for accessing a subterranean zone from a limited surface area in accordance with another embodiment of the present invention.

FIG. 17 is a flow diagram illustrating a method for enhanced access to a subterranean resource, such as a coal seam 10016, from a limited surface area in accordance with an embodiment of the present invention. In this embodiment, the method begins at step 17000 in which areas to be accessed and well bore patterns for the areas are identified. Pinnate well bore patterns may be used to provide optimized coverage for the region, as described below in Section B. However, it should be understood that other suitable well bore patterns may also be used.

Proceeding to step 17002, the portion 10070 of the well bore 10012 is formed to a predetermined depth. As described above in connection with FIG. 11, the depth of the portion 10070 may vary depending on the location and desired offset distance between the intersection of the well bore 10012 with the coal seam 10016 and the surface location of the well bore 10012. The angled portion 10072 of the well bore 10012 is formed at step 1704 extending downwardly from the portion 10070. As described above in connection with FIG. 11, the angular orientation of the angled portion 10072 may vary to accommodate a desired intersection location of the coal seam 10016 by the well bore 10012.

Next, at step 17006, down hole logging equipment is utilized to exactly identify the location of the coal seam 10016 in the well bore 10012. At step 17008, the enlarged cavity 10030 is formed in the angled portion 10072 of the well bore 10012 at the location of the coal seam 10016. As previously discussed, the enlarged cavity 10030 may be formed by under reaming and other conventional techniques.

Figure 29:
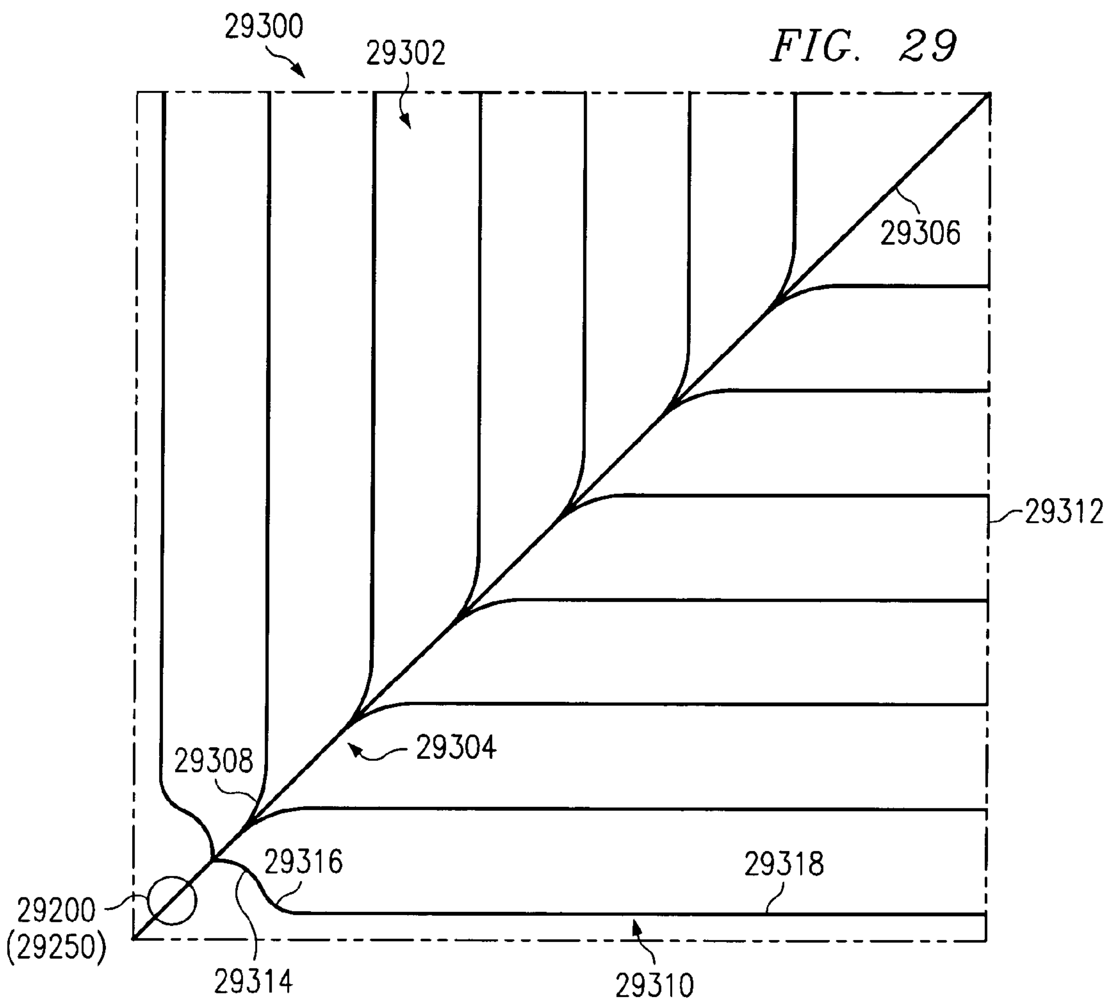
FIG. 29 is a top plan diagram illustrating a pinnate well bore pattern for accessing deposits in a subterranean zone in accordance with another embodiment of the present invention.

At step 17010, the articulated well bore 10040 is drilled to intersect the enlarged cavity 10030 formed in the angled portion 10072 of the well bore 10012. At step 17012, a well bore for a well bore pattern such as those described in Section B, for example, is drilled from the articulated well bore 10040 into the coal seam 10016 extending from the enlarged cavity 10030. Although any type of well bore pattern may be used, the following describes those of a particular pinnate pattern, which is also described below in Section B. and, in particular, with reference to FIG. 29. After formation of the well bore, a first radius curving portion 29314 (FIG. 29) of the lateral well bore for the pinnate well bore pattern is drilled at step 17014 extending from the well bore. A second radius curving portion 29316 (FIG. 29) of the lateral well bore is formed at step 17016 extending from the first radius curving portion 29314 (FIG. 29). The elongated portion 29318 (FIG. 29) of the lateral well bore is formed at step 1718 extending from the second radius curving portion 29316 (FIG. 29). At decisional step 17020, a determination is made whether additional lateral well bores are required. If additional lateral well bores are desired, the method returns to step 17014. If no additional lateral well bores are desired, the method ends.

Figure 18:
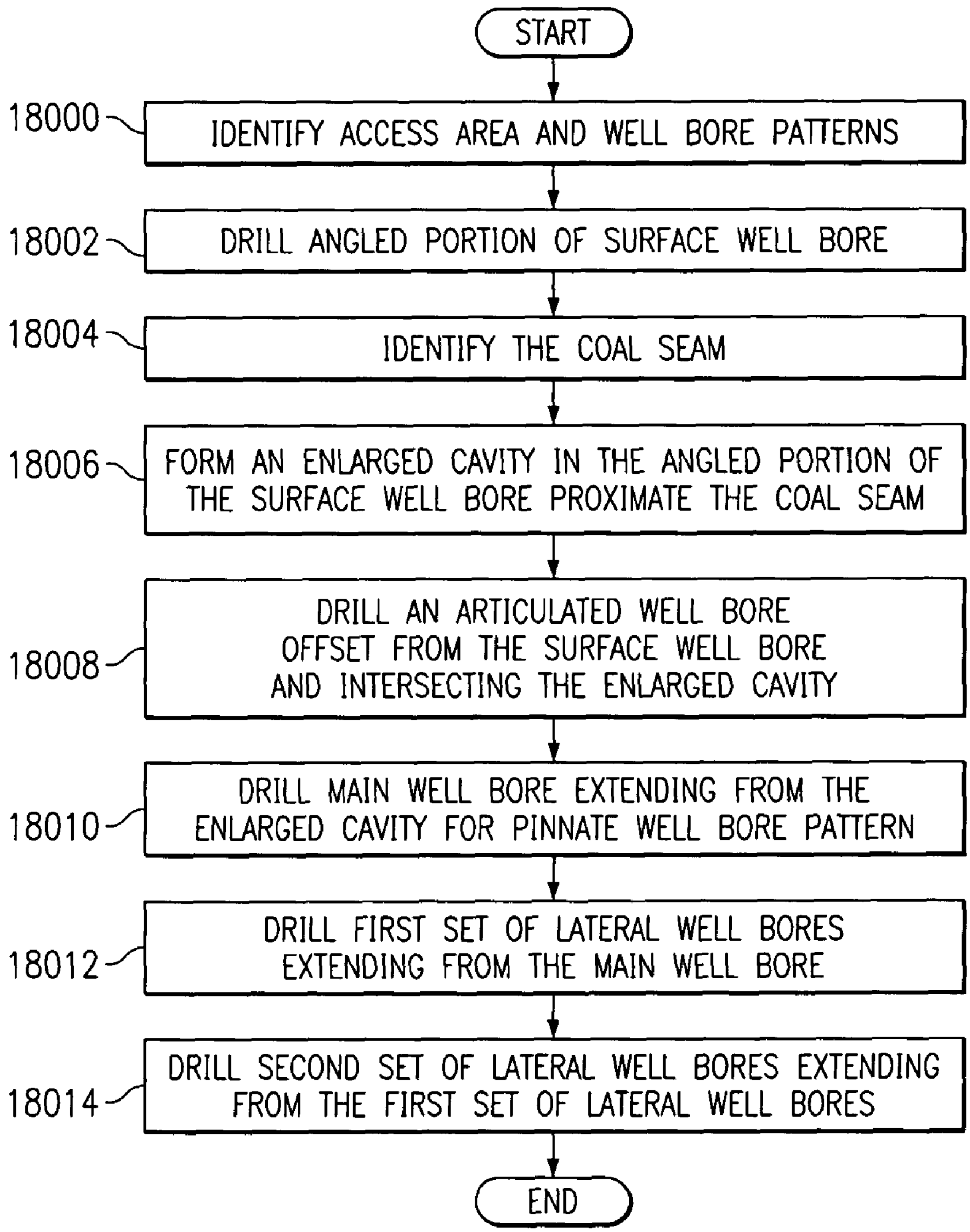
FIG. 18 is a flow diagram illustrating a method for accessing a subterranean zone from a limited surface area in accordance with another embodiment of the present invention.

FIG. 18 is a flow diagram illustrating a method for enhanced access to a subterranean resource, such as a coal seam 10016, from a limited surface area in accordance with an embodiment of the present invention. In this embodiment, the method begins at step 18000 in which areas to be accessed and well bore patterns for the areas are identified. Pinnate well bore patterns may be used to provide optimized coverage for the region. However, it should be understood that other suitable well bore patterns may also be used.

Proceeding to step 18002, the angled portion 10080 of the well bore 10012 is formed. As described above in connection with FIG. 12, angular orientation of the angled portion 10080 may vary to accommodate a desired intersection location of the coal seam 10016 by the well bore 10012. Next, at step 18004, down hole logging equipment is utilized to exactly identify the location of the coal seam 10016 in the well bore 10012. At step 18006, the enlarged cavity 10030 is formed in the angled portion 10080 of the well bore 10012 at the location of the coal seam 10016. As previously discussed, the enlarged cavity 10030 may be formed by under reaming and other conventional techniques.

At step 18008, the articulated well bore 10040 is drilled to intersect the enlarged cavity 10030 formed in the angled portion 10080 of the well bore 10012. At step 18010, the well bore for the pinnate well bore pattern is drilled through the articulated well bore 10040 into the coal seam 10016 extending from the enlarged cavity 10030. After formation of the well bore, lateral well bores for the well bore pattern are drilled at step 18012. Lateral well bores off of the lateral well bores formed at step 18012 are formed at step 18014.

Thus, the present invention provides greater access to subterranean resources from a limited surface area than prior systems and methods by decreasing the surface area required for dual well systems. For example, according to the present invention, the well bore 10012 may be formed having an angled portion 10020, 10072 or 10080 disposed between the surface 10014 and the coal seam 10016 to provide an offset between the surface location of the well bore 10012 and the intersection of the well bore 10012 with the coal seam 10016, thereby accommodating formation of the articulated well bore 10040 in close proximity to the surface location of the well bore 10012.

Figure 19:
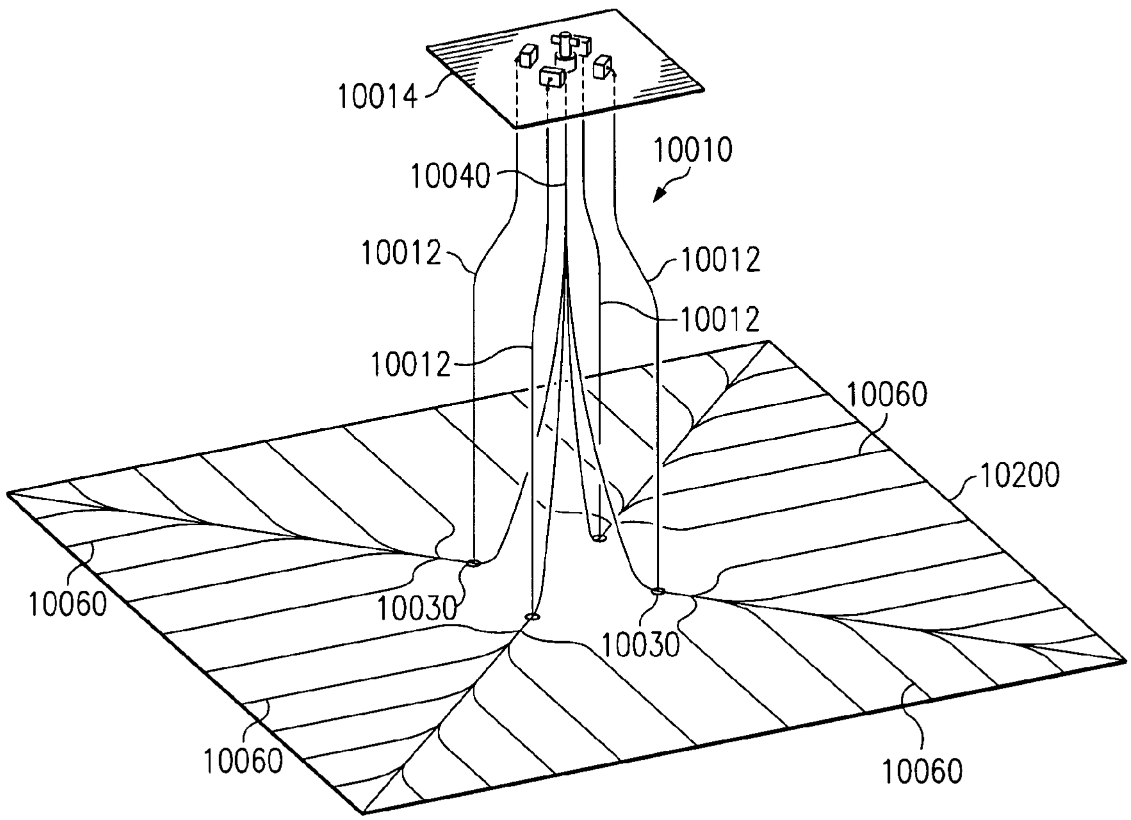
FIG. 19 is a diagram illustrating a system for accessing a subterranean zone in accordance with an embodiment of the present invention.
Figure 20:
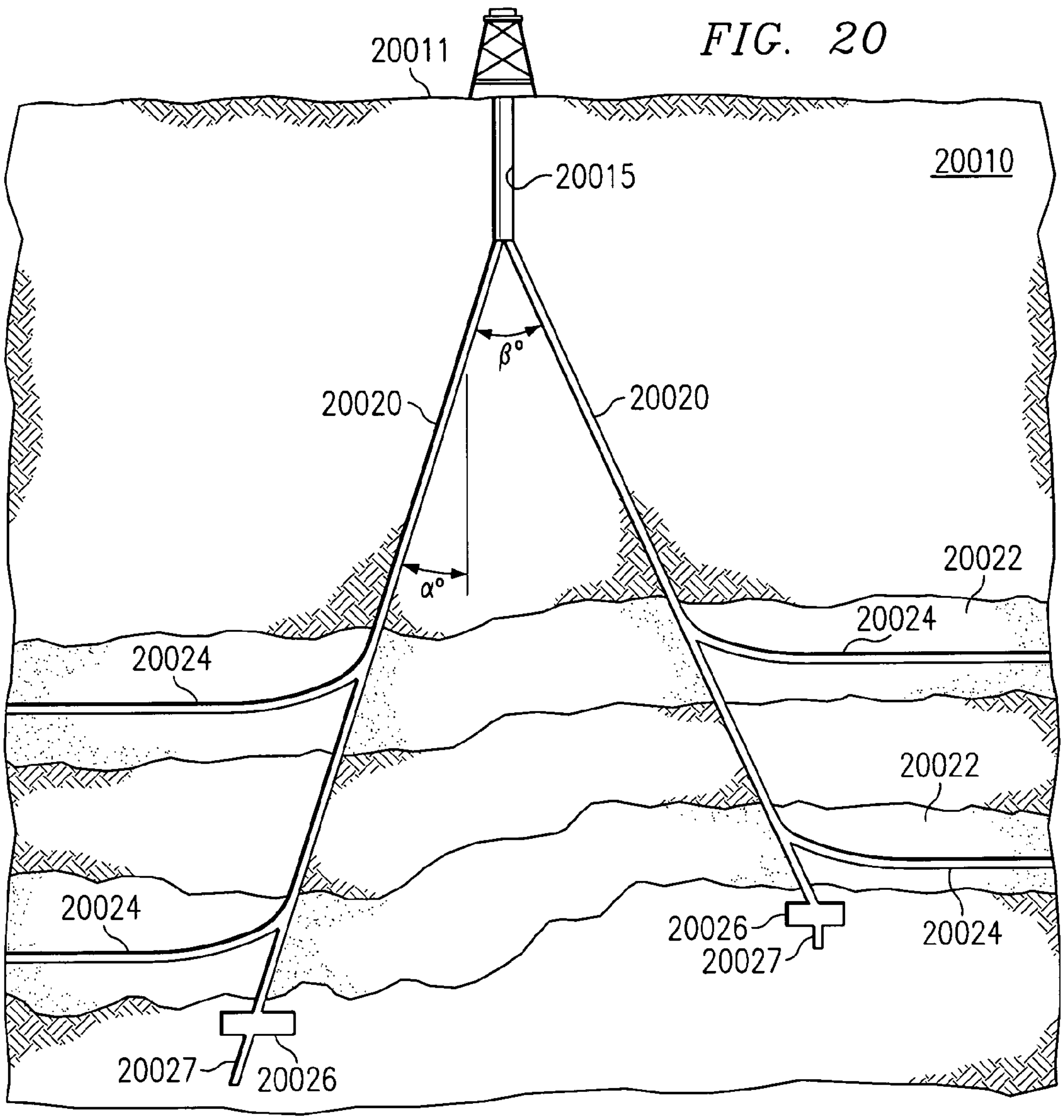
FIG. 20 illustrates an example slant well system for production of resources from a subterranean zone.

FIG. 19 is a diagram illustrating system 10010 for accessing a subterranean zone 10200 in accordance with an embodiment of the present invention. As illustrated in FIG. 19, the well bore 10040 is disposed offset relative to a pattern of well bores 10012 at the surface 10014 and intersects each of the well bores 10012 below the surface 10014. In this embodiment, well bores 10012 and 10040 are disposed in a substantially nonlinear pattern in close proximity to each other to minimize the area required for the well bores 10012 and 10040 on the surface 10014. In FIG. 19, well bores 10012 are illustrated having a configuration as illustrated in FIG. 10; however, it should be understood that well bores 10012 may be otherwise configured, for example, as illustrated in FIGS. 11 and 12.

Referring to FIG. 19, well bore patterns 10060 are formed within the zone 10200 extending from cavities 10030 located at the intersecting junctions of the well bores 10012 and 10040 as described above. Well bore patterns 10060 may comprise pinnate patterns, as illustrated in FIG. 19, or may include other suitable patterns for accessing the zone 10200. As illustrated in FIG. 19, well bores 10012 and 10040 may be disposed in close proximity to each other at the surface 14 while providing generally uniform access to a generally large zone 10200. For example, as discussed above, well bores 10012 and 10040 may be disposed within approximately 30 feet from each other at the surface while providing access to at least approximately 1000-1200 acres of the zone 10200. Further, for example, in a nonlinear well bore 10012 and 10040 surface pattern, the well bores 10012 and 10040 may be disposed in an area generally less than five hundred square feet, thereby minimizing the footprint required on the surface 10014 for system 10010. Thus, the well bores 10012 and 10040 of system 10010 may be located on the surface 10014 in close proximity to each other, thereby minimizing disruption to the surface 10014 while providing generally uniform access to a relatively large subterranean zone.

F. Slant Well

FIG. 20 illustrates an example slant well system for accessing a subterranean zone from the surface. In the embodiment described below, the subterranean zone is a coal seam. It will be understood that other subterranean formations and/or low pressure, ultra-low pressure, and low porosity subterranean zones can be similarly accessed using the slant well system of the present invention to remove and/or produce water, hydrocarbons and other fluids in the zone, to treat minerals in the zone prior to mining operations, or to inject or introduce fluids, gases, or other substances into the zone.

Referring to FIG. 20, a slant well system 20010 includes an entry well bore 20015, slant wells 20020, articulated well bores 20024, cavities 20026, and rat holes 20027. Entry well bore 20015 extends from the surface 11 towards the subterranean zone 20022. Slant wells 20020 extend from the terminus of entry well bore 20015 to the subterranean zone 20022, although slant wells 20020 may alternatively extend from any other suitable portion of entry well bore 20015. Where there are multiple subterranean zones 20022 at varying depths, as in the illustrated example, slant wells 20020 extend through the subterranean zones 20022 closest to the surface into and through the deepest subterranean zone 20022. Articulated well bores 20024 may extend from each slant well 20020 into each subterranean zone 20022. Cavity 20026 and rat hole 20027 are located at the terminus of each slant well 20020.

In FIG. 20, entry well bore 20015 is illustrated as being substantially vertical; however, it should be understood that entry well bore 20015 may be formed at any suitable angle relative to the surface 20011 to accommodate, for example, surface 20011 geometries and attitudes and/or the geometric configuration or attitude of a subterranean resource. In the illustrated embodiment, slant well 20020 is formed to angle away from entry well bore 20015 at an angle designated alpha, which in the illustrated embodiment is approximately 20 degrees. It will be understood that slant well 20020 may be formed at other angles to accommodate surface topologies and other factors similar to those affecting entry well bore 20015. Slant wells 20020 are formed in relation to each other at an angular separation of beta degrees, which in the illustrated embodiment is approximately sixty degrees. It will be understood that slant wells 20020 may be separated by other angles depending likewise on the topology and geography of the area and location of the target coal seam 20022.

Slant well 20020 may also include a cavity 20026 and/or a rat hole 20027 located at the terminus of each slant well 20020. Slant wells 20020 may include one, both, or neither of cavity 20026 and rat hole 20027.

Figure 21A:
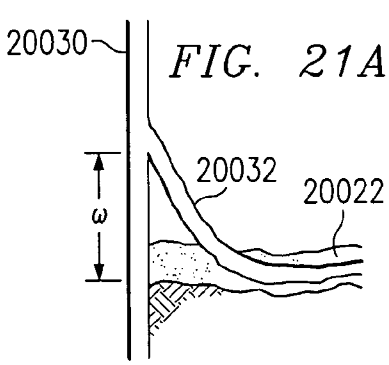
FIG. 21A illustrates a vertical well system for production of resources from a subterranean zone.
Figure 21B:
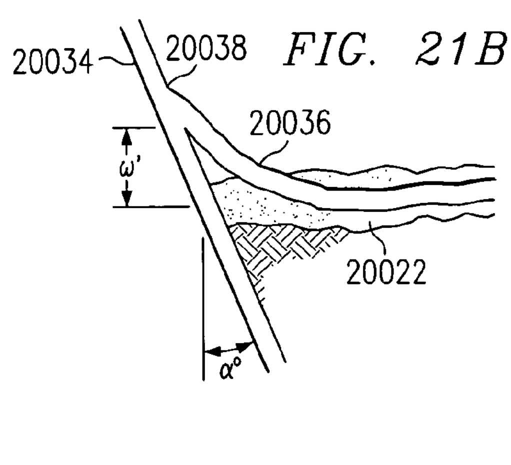
FIG. 21B illustrates a portion of An example slant entry well system in further detail.

FIGS. 21A and 21B illustrate by comparison the advantage of forming slant wells 20020 at an angle. Referring to FIG. 21A, a vertical well bore 20030 is shown with an articulated well bore 20032 extending into a coal seam 20022. As shown by the illustration, fluids drained from coal seam 20022 into articulated well bore 20032 must travel along articulated well bore 20032 upwards towards vertical well bore 20030, a distance of approximately W feet before they may be collected in vertical well bore 20030. This distance of W feet is known as the hydrostatic head and must be overcome before the fluids may be collected from vertical well bore 20030. Referring now to FIG. 21B, a slant entry well 20034 is shown with an articulated well bore 20036 extending into coal seam 20022. Slant entry well 20034 is shown at an angle alpha away from the vertical. As illustrated, fluids collected from coal seam 20022 must travel along articulated well bore 20036 up to slant entry well 20034, a distance of W' feet. Thus, the hydrostatic head of a slant entry well system is reduced as compared to a substantially vertical system. Furthermore, by forming slant entry well 20034 at angle alpha, the articulated well bore 20036 drilled from tangent or kick off point 20038 has a greater radius of curvature than articulated well bore 20032 associated with vertical well bore 20030. This allows for articulated well bore 20036 to be longer than articulated well bore 20032 (since the friction of a drill string against the radius portion is reduced), thereby penetrating further into coal seam 20022 and draining more of the subterranean zone.

FIG. 22 illustrates an example method of forming a slant entry well. The method begins at step 22100 where the entry well bore is formed. At step 22105, a fresh water casing or other suitable casing with an attached guide tube bundle is installed into the entry well bore formed at step 22100. At step 22110, the fresh water casing is cemented in place inside the entry well bore of step 22100.

At step 22115, a drill string is inserted through the entry well bore and one of the guide tubes in the guide tube bundle. At step 22120, the drill string is used to drill approximately fifty feet past the casing. At step 22125, the drill is oriented to the desired angle of the slant well and, at step 22130, a slant well bore is drilled down into and through the target subterranean zone.

At decisional step 22135, a determination is made whether additional slant wells are required. If additional slant wells are required, the process returns to step 22115 and repeats through step 22135. Various means may be employed to guide the drill string into a different guide tube on subsequent runs through steps 22115-22135, which should be apparent to those skilled in the art.

If no additional slant wells are required, the process continues to step 22140. At step 22140 the slant well casing is installed. Next, at step 22145, a short radius curve is drilled into the target coal seam. Next, at step 22150, a substantially horizontal well bore is drilled into and along the coal seam. It will be understood that the substantially horizontal well bore may depart from a horizontal orientation to account for changes in the orientation of the coal seam. Next, at step 22155, a drainage pattern is drilled into the coal seam through the substantially horizontal well. At decisional step 22157, a determination is made whether additional subterranean zones are to be drained as, for example, when multiple subterranean zones are present at varying depths below the surface. If additional subterranean zones are to be drained, the process repeats steps 22145 through 22155 for each additional subterranean zone. If no further subterranean zones are to be drained, the process continues to step 22160.

At step 22160, production equipment is installed into the slant well and at step 22165 the process ends with the production of water and gas from the subterranean zone.

G. Slant Wells with Non-Common Surface Wells

FIG. 23 illustrates an example slant well system for accessing a subterranean zone from the surface. In the embodiment described below, the subterranean zone is a coal seam. It will be understood that other subterranean formations and/or zones can be similarly accessed using the slant well system of the present invention to remove and/or produce water, hydrocarbons, and other fluids in the zone, to treat minerals in the zone prior to mining operations, to inject or introduce fluids, gases, or other substances into the zone or for any other appropriate purpose.

Referring to FIG. 23, a slant well system 23010 includes entry well bores 23015, slant wells 23020, articulated well bores 23024, cavities 23026, and rat holes 23027. Entry well bores 23015 extend from the surface 23011 towards the subterranean zone 23022. Slant wells 23020 extend from the terminus of each entry well bore 23015 to the subterranean zone 23022, although slant wells 23020 may alternatively extend from any other suitable portion of an entry well bore 23015. As used herein, "each" means all of a particular subset. Where there are multiple subterranean zones 23022 at varying depths, as in the illustrated example, slant wells 23020 extend through the subterranean zones 23022 closest to the surface into and through the deepest subterranean zone 23022. Articulated well bores 23024 may extend from each slant well 23020 into each subterranean zone 23022. One or more cavities 23026 may be located along a slant well 23020 and a cavity 23026 or a rat hole 23027 may be located at the terminus of each slant well 23020.

In FIG. 23, entry well bores 23015 are illustrated as being substantially vertical; however, it should be understood that entry well bores 23015 may be formed at any suitable angle relative to the surface 23011 to accommodate, for example, surface geometries and attitudes and/or the geometric configuration or attitude of a subterranean resource. In the illustrated embodiment, each slant well 23020 is formed to angle away from entry well bore 15 at an angle designated a, which in the illustrated embodiment is approximately 20 degrees. It will be understood that each slant well 23020 may be formed at other angles to accommodate surface topologies and other factors similar to those affecting entry well bores 23015. In the illustrated embodiment, slant wells 23020 are formed in relation to each other at an angular separation of approximately sixty degrees. It will be understood that slant wells 23020 may be separated by other angles depending likewise on the topology and geography of the area and location of the target coal seam 23022.

Entry well bores 23015 are formed at the surface at a distance of β feet apart. In the illustrated embodiment, entry well bores 23015 are approximately twenty feet apart. It will be understood that entry well bores 23015 may be formed at other separations to accommodate surface topologies and/or the geometric configuration or attitude of a subterranean resource.

In some embodiments, entry well bores 23015 may be between two feet and one hundred feet apart. In some embodiments, the entry well bores 23015 may be located on the same drilling pad. As used herein, "on the same drilling pad" means located at the same drilling location where drilling operations are being conducted. In some embodiments, entry well bores 23015 are closely spaced together. As used herein, "closely spaced" means on the same drilling pad.

Cavities 23026 may be formed at intervals along slant wells 23020 above one or more of articulated well bores 23024. For example, cavities 23026 may be formed immediately above an articulated well bore 23024. Cavities 23026 may also be formed proximate to the junction of slant well 23020 and articulated well bore 23024. As used herein, proximate means immediately above, below, or at the junction of slant well 23020 and articulated well bore 23024. It will be understood that other appropriate spacing may also be employed to accommodate, for example, sub-surface geometries and attitudes and/or the geometric configuration or attitude of a subterranean resource. Slant well 23020 may also include a cavity 23026 and/or a rat hole 23027 located at the terminus of each slant well 23020. Slant wells 23020 may include one, both, or neither of cavity 23026 and rat hole 23027.

Figure 23B:
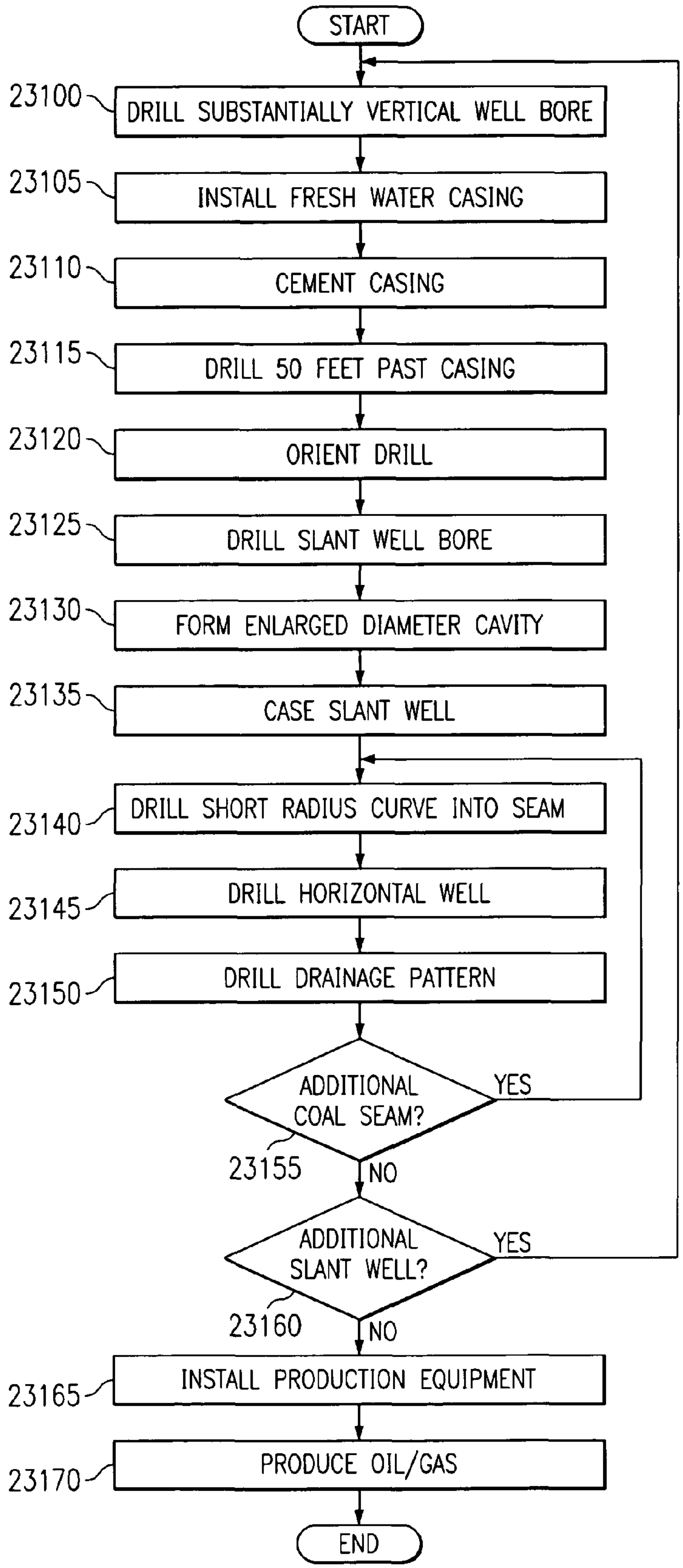
FIG. 23B illustrates an example method for producing water and gas from a subsurface formation.

FIG. 23B illustrates an example method of forming a slant entry well 23020. The method begins at step 23100 wherein an entry well bore is formed. At step 23105, a fresh water casing or other suitable casing is installed into the entry well bore formed at step 23100. At step 23110, the fresh water casing is cemented in place inside the entry well bore of step 23100.

At step 23115, a drill string is inserted through the entry well bore, and is used to drill approximately fifty feet past the casing. In some embodiments, a short, radiused bore is formed. In some embodiments, the radiused bore may be two hundred feet long and articulate thirty-five degrees over its length. It will be understood that other lengths and degrees may be employed based on the local geology and topography. At step 23120, the drill is oriented to the desired angle of the slant well and, at step 23125, a slant well bore is drilled down into and through the target subterranean zone. At step 23130, one or more cavities are formed in the slant well.

At step 23135 the slant well casing is installed. Next, at step 23140, a short radius curve is drilled into the target coal seam. Next, at step 23145, a substantially horizontal well bore is drilled into and along the coal seam. It will be understood that the substantially horizontal well bore may depart from a horizontal orientation to account for changes in the orientation of the coal seam. Next, at step 23150, a drainage pattern is drilled into the coal seam through the substantially horizontal well. The drainage pattern may comprise a pinnate pattern, a crow's foot pattern, or other suitable pattern. At decisional step 23155, a determination is made whether additional subterranean zones are to be drained as, for example, when multiple subterranean zones are present at varying depths below the surface. If additional subterranean zones are to be drained, the process repeats steps 23140 through 23155 for each additional subterranean zone. If no further subterranean zones are to be drained, the process continues to step 23160.

At decisional step 23160, a determination is made whether additional slant wells are required. If additional slant wells are required, the process returns along the Yes branch to step 23100 and repeats through step 24155. A separate entry well bore may be formed for each individual slant well bore. Thus, for each slant well, the process begins at step 23100, wherein a substantially vertical well bore is found. In some embodiments, however, multiple slant wells may be formed from one entry well bore.

If no additional slant wells are required, the process continues along the No branch to step 24165.

At step 23165, production equipment is installed into each slant well and at step 23170 the process ends with the production of water and gas from the subterranean zone.

Although the steps have been described in a certain order, it will be understood that they may be performed in any other appropriate order. Furthermore, one or more steps may be omitted, or additional steps performed, as appropriate.

For example, where multiple target zones are present (as determined at step 23155), an enlarged diameter cavity may be found (step 23130) above each target zone before any of the short radius curves are drilled (step 140). Alternatively, all of the short radius curves may be found in each target zone (step 23140) before any enlarged diameter cavities are found (step 23130). Other suitable modifications will be apparent to one skilled in the art.

Figure 24A:
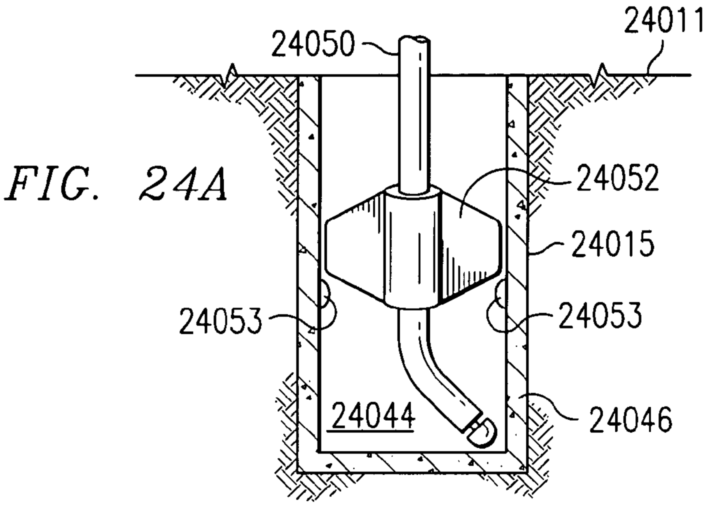
FIG. 24A illustrates an example entry well bore.

FIG. 24A illustrates entry well bore 23015 and casing 24044 in its operative mode as a slant well 23020 is about to be drilled. Corresponding with step 22110 of FIG. 22, a cement retainer 24046 is poured or otherwise installed around the casing inside entry well bore 24015. The cement casing may be any mixture or substance suitable to maintain casing 24044 in the desired position with respect to entry well bore 23015. A drill string 24050 is positioned to begin forming a slant well. In order to keep drill string 24050 relatively centered in casing 24044, a stabilizer 24052 may be employed. Stabilizer 24052 may be a ring and fin type stabilizer or any other stabilizer suitable to keep drill string 24050 relatively centered. To keep stabilizer 24052 at a desired depth in well bore 23015, stop ring 24053 may be employed. Stop ring 24053 may be constructed of rubber or metal or any other suitable down-hole environment material.

Figure 24B:
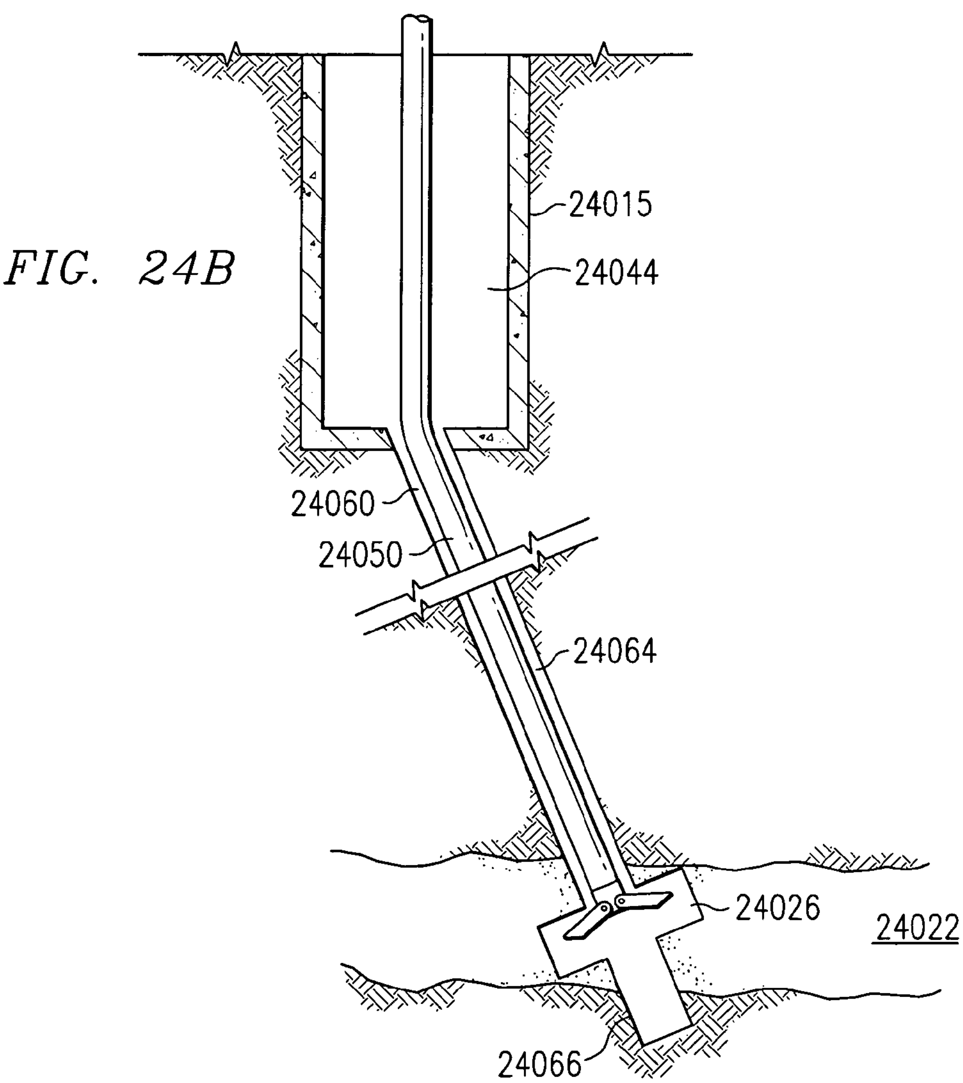
FIG. 24B illustrates the use of an example system of an entry well bore and a slanted well bore.

FIG. 24B illustrates an example system of a slant well 20020. Corresponding with step 23115 of FIG. 23, well bore 24060 is drilled approximately fifty feet past the end of entry well bore 23015 (although any other appropriate distance may be drilled). Well bore 24060 is drilled away from casing 24044 in order to minimize magnetic interference and improve the ability of the drilling crew to guide the drill bit in the desired direction. Well bore 24060 may also comprise an articulated well bore with a radius of thirty-five degrees in two hundred feet.

Corresponding with step 23120 of FIG. 23B, the drill bit is oriented in preparation for drilling slant entry well bore 24064. Corresponding with step 23125 of FIG. 23B, a slant entry well bore 24064 is drilled from the end of the radius well bore 24062 into and through the subterranean zone 20022.

Alternatively, slant well 20020 may be drilled directly from entry well bore 20015, without including tangent well bore 24060 or radiused well bore. A rat hole 24066, which is an extension of slant well 24064, is also formed. Rat hole 24066 may also be an enlarged diameter cavity or other suitable structure. Corresponding with step 23130 of FIG. 23B, a cavity 23026 is formed in slant well 24064.

Cavity 23026 acts as a velocity reduction chamber, separating entrained liquids from gasses destined for the surface. Without at least one cavity 23026 located closer to the surface than the shallowest lateral well bore, entrained liquids form a mist that raises down-hole pressure. Friction is increased by the liquids entrained in escaping gasses, creating increased back pressure (down-hole pressure). Reducing the gas velocity separates out the liquid as the velocity drops below the speed at which the gas can entrain liquids. Cavity 23026 lowers the velocity of the gas enough to separate out the entrained liquids, allowing the gas to proceed to the surface more efficiently.

In the illustrated embodiment, cavity 23026 is shown immediately above the expected kick-off point for a subsequent short radiused well bore. It will be understood that cavity 23026 may be otherwise suitably located. Moreover, it will be understood that cavity 23026 may also be formed after the horizontal drainage pattern is formed.

FIG. 24C is an illustration of the positioning of the casing in a slant well 24064. For ease of illustration, only one slant well 24064 is shown. Corresponding with step 23135 of FIG. 23, a whipstock casing 24070 is installed into the slant entry well bore 24064. In the illustrated embodiment, whipstock casing 24070 includes a whipstock 24072 which is used to mechanically direct a drill string into a desired orientation. It will be understood that other suitable techniques may be employed and the use of a whipstock 24072 is not necessary when other suitable methods of orienting a drill bit through slant well 24064 into the subterranean zone 23022 are used. Whipstock casing 24070 is oriented such that whipstock 24072 is positioned so that a subsequent drill bit is aligned to drill into the subterranean zone 23022 at a desired depth.

FIG. 24C illustrates whipstock casing 24070 and slant entry well bore 24064 in further detail. As discussed in conjunction with FIG. 24C, whipstock casing 24070 is positioned within slant entry well bore 24064 such that a drill string 24050 will be oriented to pass through slant entry well bore 24064 at a desired tangent or kick off point 24038. This corresponds with step 23140 of FIG. 23B. Drill string 24050 is used to drill through slant entry well bore 24064 at tangent or kick off point 24038 to form articulated well bore 24036. In a particular embodiment, articulated well bore 24036 has a radius of approximately seventy-one feet and a curvature of approximately eighty degrees per one hundred feet. In the same embodiment, slant entry well 24064 is angled away from the vertical at approximately ten degrees. In this embodiment, the hydrostatic head generated in conjunction with production is roughly thirty feet. However, it should be understood that any other appropriate radius, curvature, and slant angle may be used.

Figure 24E:
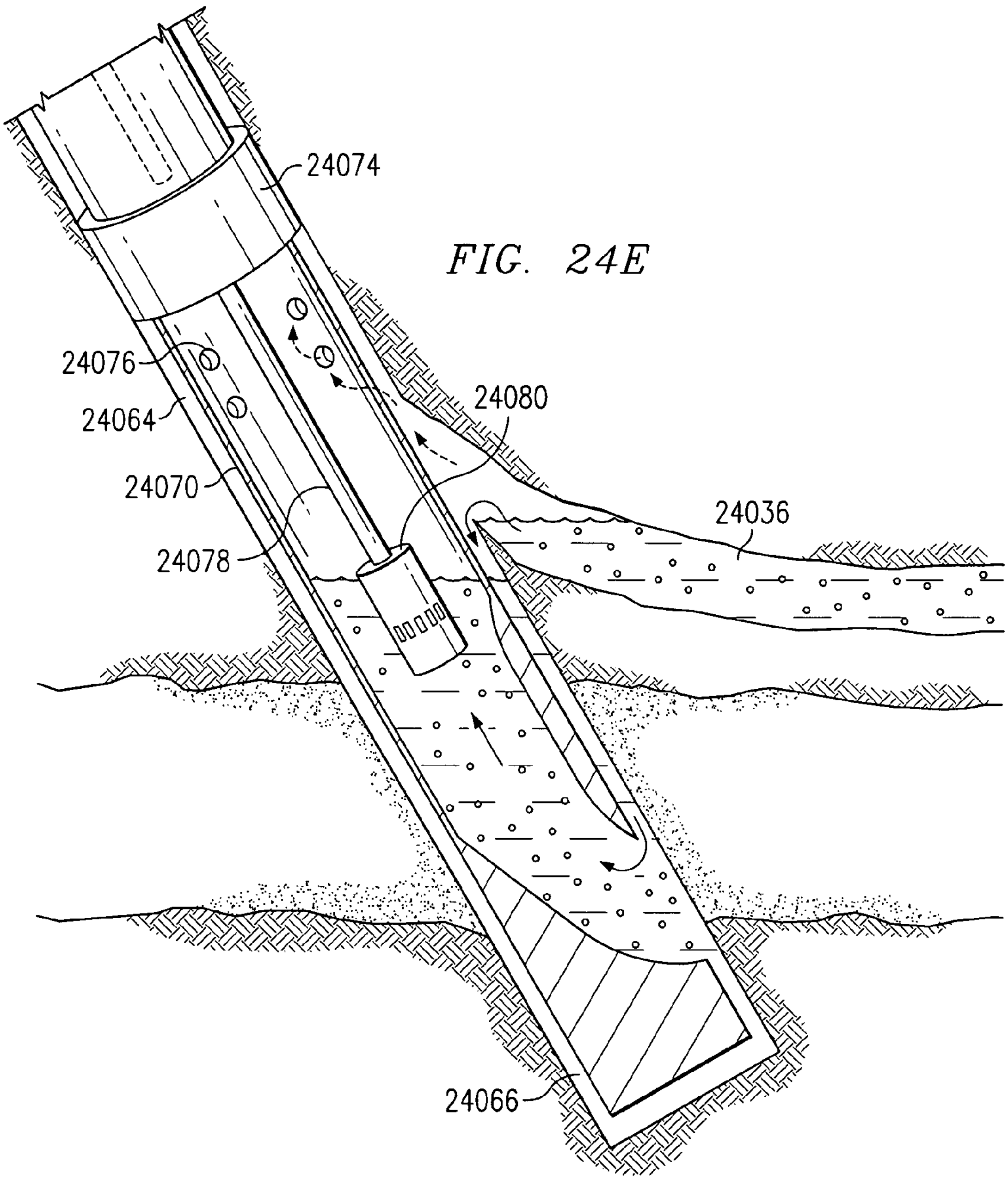
FIG. 24E illustrates production of water and gas in an example slant well system.

FIG. 24E illustrates a slant entry well 24064 and articulated well bore 24036 after drill string 24050 has been used to form articulated well bore 24036. In a particular embodiment, a horizontal well and drainage pattern may then be formed in subterranean zone 23022, as represented by step 23145 and step 32150 of FIG. 23B.

Referring to FIG. 24E, whipstock casing 24070 is set on the bottom of rat hole 24066 to prepare for production of oil and gas. A sealer ring 24074 may be used around the whipstock casing 24070 to prevent gas produced from articulated well bore 24036 from escaping outside whipstock casing 24070. Gas ports 24076 allow escaping gas to enter into and up through whipstock casing 24070 for collection at the surface. As described above, liquids entrained in the escaping gas may be separated from the gas in enlarged diameter cavities 23026 situated above the articulated well bore 24036. As the liquids separate from the gas, the liquids travel down slant well 24064 and are collected in rat hole 24066. Rat hole 24066 may also comprise an enlarged diameter cavity (not shown) to collect liquids arriving from above.

Figure 24F:
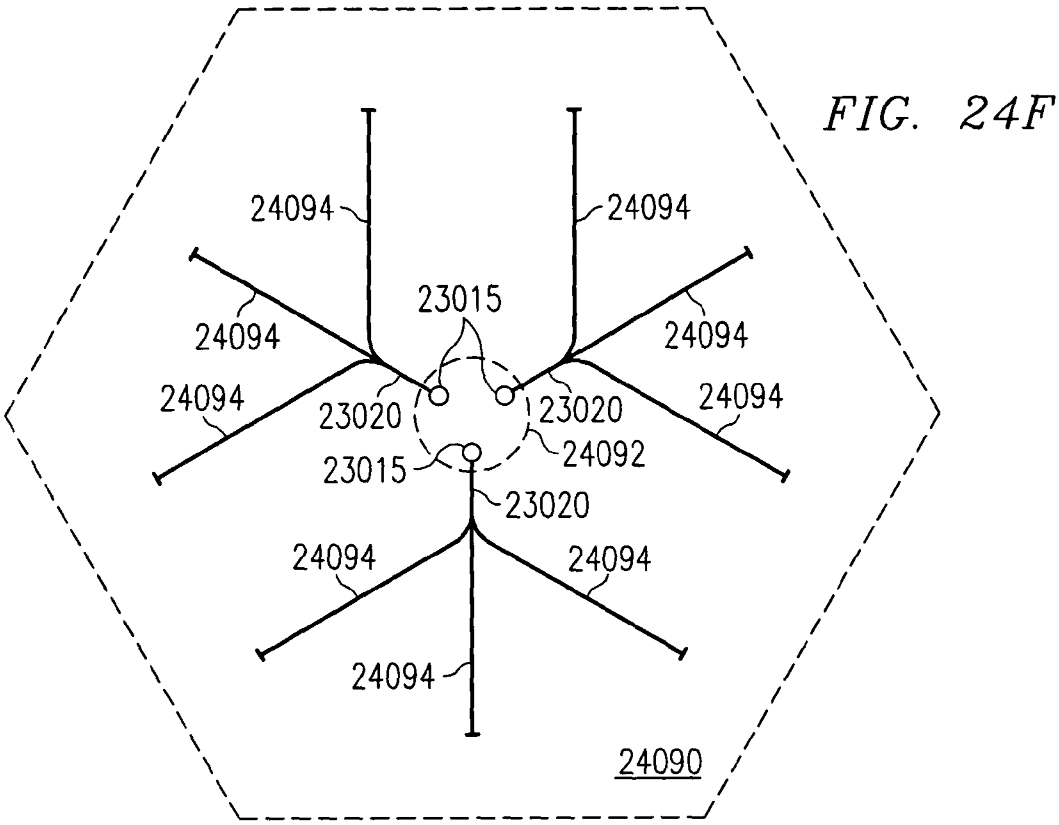
FIG. 24F illustrates an example drainage pattern that may be used with wells described herein.

A pump string 24078 and submersible pump 24080 is used to remove water and other liquids that are collected from the subterranean zone through articulated well bore 24036. As shown in FIG. 24F, the liquids, under the power of gravity and the pressure in subterranean zone 23022, pass through articulated well bore 24036 and down slant entry well bore 24064 into rat hole 24066. From there the liquids travel into the opening in the whipstock 24072 of whipstock casing 24070 where they come in contact with the installed pump string 24078 and submersible pump 24080. Submersible pump 24080 may be a variety of submersible pumps suitable for use in a down-hole environment to remove liquids and pump them to the surface through pump string 24078. Installation of pump string 24078 and submersible pump 24080 corresponds with step 23165 of FIG. 23C. Production of liquid and gas corresponds with step 23170 of FIG. 23C.

FIG. 24F illustrates an example drainage pattern 24090 that may be drilled from articulated well bores 24036. At the center of drainage pattern 24090 is a plurality of entry well bores 23015 on a drilling pad 24092 at the surface. In one embodiment, entry well bores 23015 are spaced approximately twenty feet apart. It will be understood that other suitable spacings may also be employed.

Connecting to each entry well bore 23015 is a slant well 23020. At the terminus of slant well 23020, as described above, are substantially horizontal well bores 24094 roughly forming a "crow's foot" pattern off of each of the slant wells 23020. It will be understood that any other suitable drainage patterns, for example, a pinnate pattern, may be used. In an example embodiment, the horizontal reach of each substantially horizontal well bore 24094 is approximately three hundred feet. Additionally, the lateral spacing between the parallel substantially horizontal well bores 24094 is approximately eight hundred feet. In this particular embodiment, a drainage area of approximately six hundred and forty acres would result.

Figure 24G:
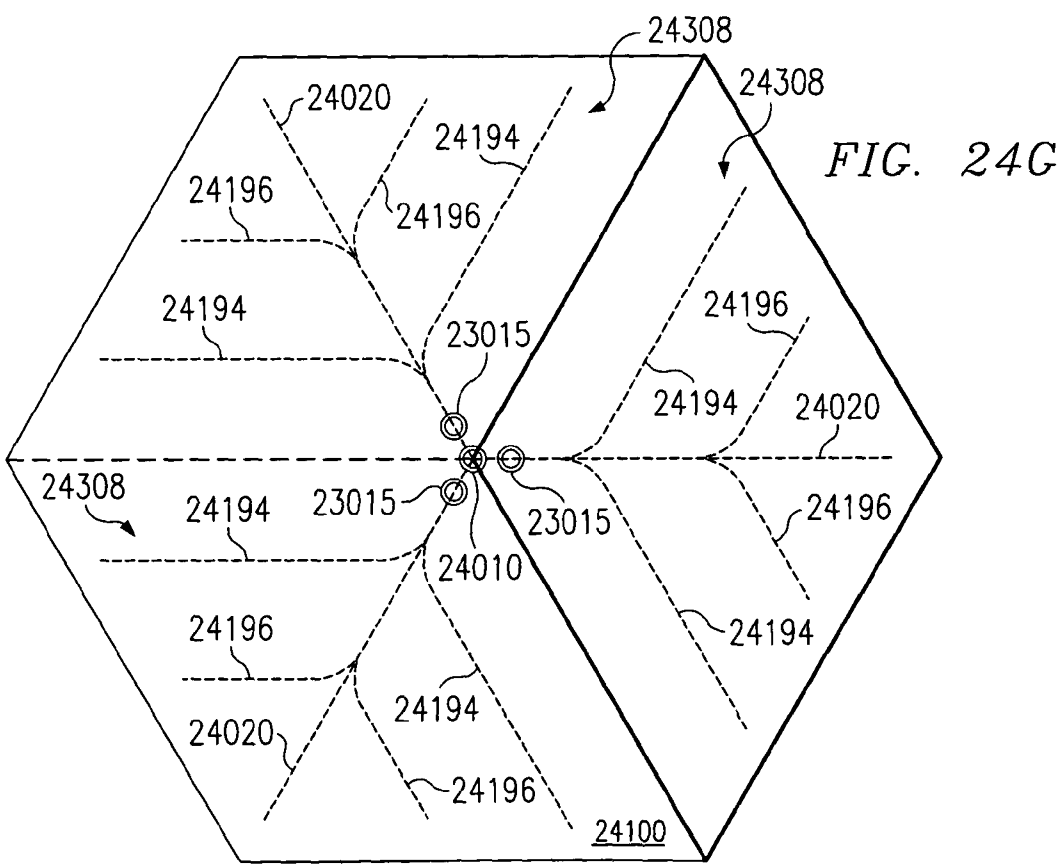
FIG. 24G illustrates another example drainage pattern according to the teachings of the invention.

FIG. 24G illustrates an example tri-pinnate drainage pattern for accessing deposits in a subterranean zone. In this embodiment, the tri-pinnate pattern 24100 provides access to a substantially hexagonal subterranean zone. In one particular embodiment, hexagonal area comprises 763.28 acres; however other suitable acre sizes may be utilized.

The tri-pinnate pattern 24100 includes three discreet well bore patterns each draining a portion of a region covered by the tri-pinnate pattern 24100. Each of the well bore patterns includes a main drainage well bore 24020 and a set of lateral well bores 24308 extending from the main well bore 24020. In tri-pinnate pattern 24100, each of the main drainage well bores 24020 extends from a respective articulated well bore 23015. The articulated well bore 23105 of each well bore pattern may initiate from a common surface point 24010. Thus, the articulated well bores 23015 of each well bore pattern may initiate together and share a common portion for a desired distance below the earth's surface before diverging into different directions. Each main drainage well bore 24020 intersects a respective surface well bore 23015. Fluid and/or gas may be removed from or introduced into the subterranean zone through the respective surface well bores 23015 in communication with the main drainage well bores 24020. This allows tighter spacing of the surface production equipment, wider coverage of a well bore pattern and reduces drilling equipment and operations.

Each main drainage well bore 24020 may be formed at a location relative to other main drainage well bores 24020 to accommodate access to a particular subterranean region. For example, main drainage well bores 24020 may be formed having a spacing or a distance between each other adjacent main drainage well bores 24020 to accommodate access to subterranean regions such that only three main drainage well bores 24020 are required. Thus the spacing between adjacent main drainage well bores 24020 may be substantially equal or may vary to accommodate unique characteristics of a particular subterranean resource. For example, in the embodiment illustrated in FIG. 24G, the spacing between each main drainage well bore 24020 is substantially equal at an angle of approximately 126 degrees from each other thereby resulting in each well bore pattern 24020 extending in a direction approximately 120 degrees from an adjacent well bore pattern. However, other suitable number of well bores, well bore spacing angles, patterns or orientations may be used to accommodate the characteristics of a particular subterranean resource.

Each well bore pattern may also include a set of lateral well bores 24308 extending from the main drainage well bore 24020. The lateral well bores 24308 may mirror each other on opposite sides of the main drainage well bore 24308, as shown, or may be offset from each other along the main drainage well bore 24020. For uniform coverage of the substantially hexagonal area, pairs of lateral well bores 24308 may be disposed substantially equally spaced on each side of the main well bore 24020 and may extend from the main drainage well bore 24020 at an angle of approximately 60 degrees. The lateral well bores 24308 may shorten in length based on progression away from the enlarged diameter cavity in order to facilitate drilling of the lateral well bores 41308. In this particular embodiment, lateral well bores 24308 include a first set 24194 and a second shorter set 24196.

II. Drilling Patterns

FIGS. 25-45 (as well as FIGS. 24F and 24G) are related to example well bore patterns for accessing the coal seam or other subterranean zone in accordance with one embodiment of the present invention.

FIGS. 25-31, 35, 39, 41, and 44 illustrate examples of well bore or drainage patterns for accessing the coal seam 15 or other subterranean zone in accordance with various embodiments of the present invention. The patterns may be used to remove or inject water. In these embodiments, the well bore patterns comprise one or more pinnate well bore patterns that each have a central diagonal or other main bore with generally symmetrically arranged and appropriately spaced laterals extending from each side of the diagonal. As used herein, the term each means every one of at least a subset of the identified items. It will be understood that other suitable multi-branching patterns including or connected to a surface production bore and having the significant percentage of their total length at different angles, directions or orientations than each other or the production bore may be used without departing from the scope of the present invention.

The pinnate patterns approximate the pattern of veins in a leaf or the design of a feather in that it has similar, substantially parallel, auxiliary drainage bores arranged in substantially equal and parallel spacing on opposite sides of an axis. The pinnate drainage patterns with their central bore and generally symmetrically arranged and appropriately spaced auxiliary drainage bores on each side provide a substantially uniform pattern for draining fluids from a coal seam 15 or other subterranean formation. The number and spacing of the lateral bores may be adjusted depending on the absolute, relative and/or effective permeability of the coal seam and the size of the area covered by the pattern. The area covered by the pattern may be the area drained by the pattern, the area of a spacing unit that the pattern is designed to drain, the area within the distal points or periphery of the pattern and/or the area within the periphery of the pattern as well as the surrounding area out to a periphery intermediate to adjacent or neighboring patterns. The coverage area may also include the depth, or thickness of the coal seam or, for thick coal seams, a portion of the thickness of the seam. Thus, the pattern may include upward or downward extending branches in addition to horizontal branches.

In a particular embodiment, for a coal seam having an effective permeability of seven millidarcies and a coverage area of three hundred acres, the laterals may be spaced approximately six hundred feet apart from each other. For a low permeability coal seam having an effective permeability of approximately one millidarcy and a coverage area of three hundred acres, the lateral spacing may be four hundred feet. The effective permeability may be determined by well testing and/or analysis of long-term production trends.

As described in more detail below, the pinnate patterns may provide substantially uniform coverage of a quadrilateral or other non-disjointed area having a high area to perimeter ratio. Coverage is substantially uniform when, except for pressure due to hydrostatic head, friction or blockage, the pressure differential across the coverage area is less than or equal to twenty psi for a mature well the differential at any time after an initial month of production is less than twenty psi or when less than ten percent of the area bounded by the pattern comprises trapped cells. In a particular embodiment, the pressure differential may be less than ten psi. The coverage area may be a square, other quadrilateral, or other polygon, circular, oval or other ellipsoid or grid area and may be nested with other patterns of the same or similar type. It will be understood that other suitable well bore patterns may be used in accordance with the present invention.

The pinnate and other suitable well bore patterns drilled from the surface 14 provide surface access to subterranean formations. The well bore pattern may be used to uniformly remove and/or insert fluids or otherwise manipulate a subterranean zone. In non-coal applications, the well bore pattern may be used initiating in-situ burns, "huff-puff" steam operations for heavy crude oil, and the removal of hydrocarbons from low porosity reservoirs. The well bore pattern may also be used to uniformly inject or introduce a gas, fluid or other substance into a subterranean zone. For example, carbon dioxide may be injected into a coal seam for sequestration through the pattern.

Figure 25:
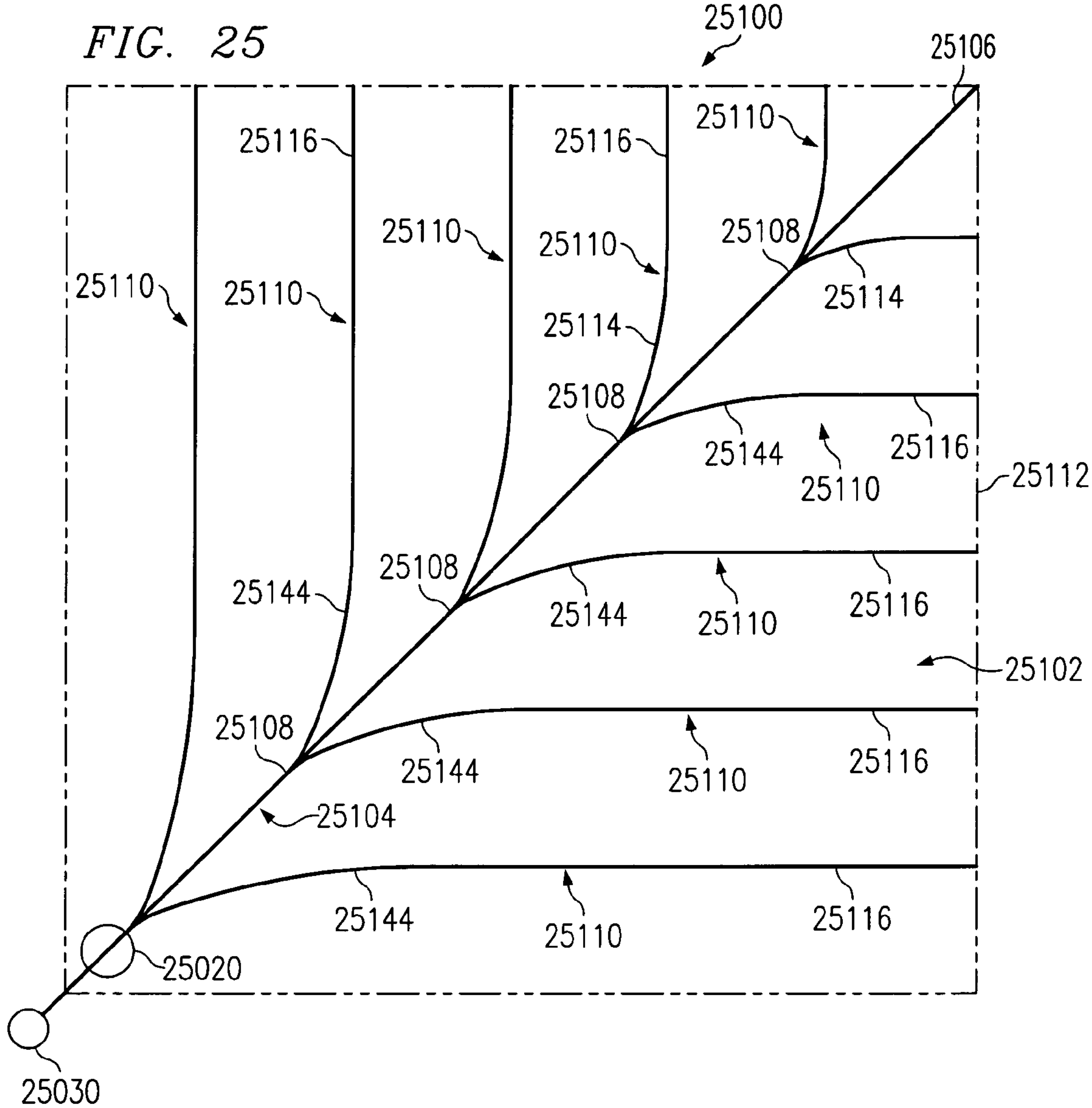
FIG. 25 is a top plan diagram illustrating a pinnate well bore pattern for accessing a subterranean zone in accordance with one embodiment of the present invention.

FIG. 25 illustrates a pinnate well bore pattern 25100 in accordance with one embodiment of the present invention. In this embodiment, the pinnate well bore pattern 25100 provides access to a substantially square area 25102 of a subterranean zone. A number of the pinnate well bore patterns 25100 may be used together to provide uniform access to a large subterranean region.

Referring to FIG. 25, the enlarged cavity 2520 defines a first corner of the area 25102. The pinnate pattern 25100 includes a main well bore 25104 extending diagonally across the coverage area 25102 to a distant corner 25106 of the area 25102. In one embodiment, the well bores 25012 and 25030 are positioned over the area 25102 such that the main well bore 25104 is drilled up the slope of the coal seam 25015. This will facilitate collection of water, gas, and other fluids from the area 25102. The well bore 25104 is drilled using the articulated drill string 25040 and extends from the enlarged cavity 25020 in alignment with the articulated well bore 25030.

A plurality of lateral well bores 25110 extend from opposites sides of well bore 25104 to a periphery 25112 of the area 25102. The lateral bores 25110 may mirror each other on opposite sides of the well bore 25104 or may be offset from each other along the well bore 25104. Each of the lateral bores 25110 includes a radius curving portion 25114 extending from the well bore 25104 and an elongated portion 25116 formed after the curved portion 25114 has reached a desired orientation. For uniform coverage of the square area 25102, pairs of lateral bores 25110 may be substantially evenly spaced on each side of the well bore 25104 and extend from the well bore 25104 at an angle of approximately 45 degrees. The lateral bores 25110 shorten in length based on progression away from the enlarged cavity 25020 in order to facilitate drilling of the lateral bores 25110.

The pinnate well bore pattern 25100 using a single well bore 25104 and five pairs of lateral bores 25110 may drain a coal seam area of approximately 150 acres in size. For this and other pinnate patterns, where a smaller area is to be drained, or where the coal seam has a different shape, such as a long, narrow shape, other shapes or due to surface or subterranean topography, alternate pinnate well bore patterns may be employed by varying the angle of the lateral bores 25110 to the well bore 25104 and the orientation of the lateral bores 25110. Alternatively, lateral bores 25110 can be drilled from only one side of the well bore 25104 to form a one-half pinnate pattern.

As previously described, the well bore 25104 and the lateral bores 25110 of pattern 25100 as well as bores of other patterns are formed by drilling through the enlarged cavity 25020 using the drill string 25040 and an appropriate drilling apparatus. During this operation, gamma ray logging tools and conventional measurement while drilling (MWD) technologies may be employed to control the direction and orientation of the drill bit so as to retain the well bore pattern within the confines of the coal seam 25015 and to maintain proper spacing and orientation of the well bores 25104 and 25110.

In a particular embodiment, the well bore 25104 and that of other patterns are drilled with an incline at each of a plurality of lateral branch points 25108. After the well bore 25104 is complete, the articulated drill string 25040 is backed up to each successive lateral point 25108 from which a lateral bore 25110 is drilled on each side of the well bore 25104. It will be understood that the pinnate drainage pattern 25100 may be otherwise suitably formed.

Figure 26:
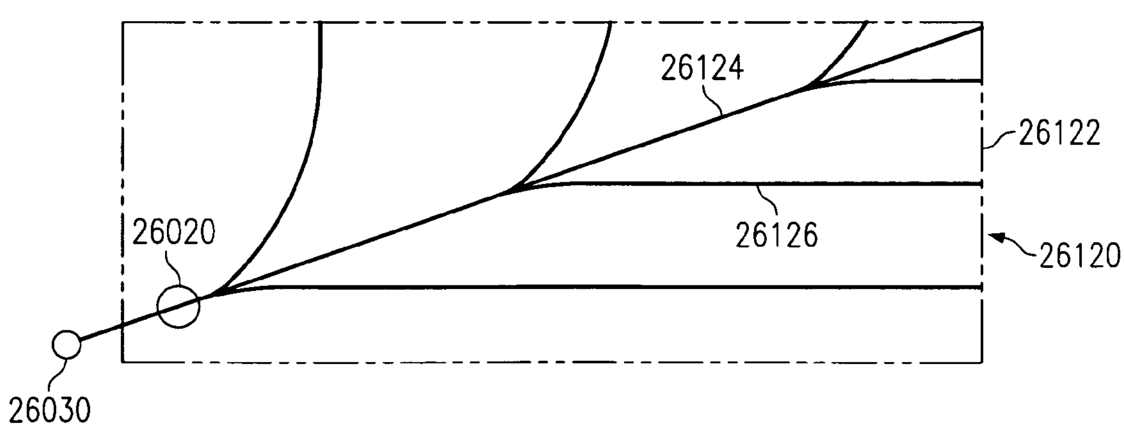
FIG. 26 is a top plan diagram illustrating a pinnate well bore pattern for accessing a subterranean zone in accordance with another embodiment of the present invention.

FIG. 26 illustrates a pinnate well bore pattern 26120 in accordance with another embodiment of the present invention. In this embodiment, the pinnate well bore pattern 26120 drains a substantially rectangular area 26122 of the coal seam 26015. The pinnate well bore pattern 26120 includes a main well bore 26124 and a plurality of lateral bores 26126 that are formed as described in connection with well bores 26104 and 26110 of FIG. 25. For the substantially rectangular area 26122, however, the lateral well bores 26126 on a first side of the well bore 26124 include a shallow angle while the lateral bores 26126 on the opposite side of the well bore 26124 include a steeper angle to together provide uniform coverage of the area 26122.

Figure 27A:
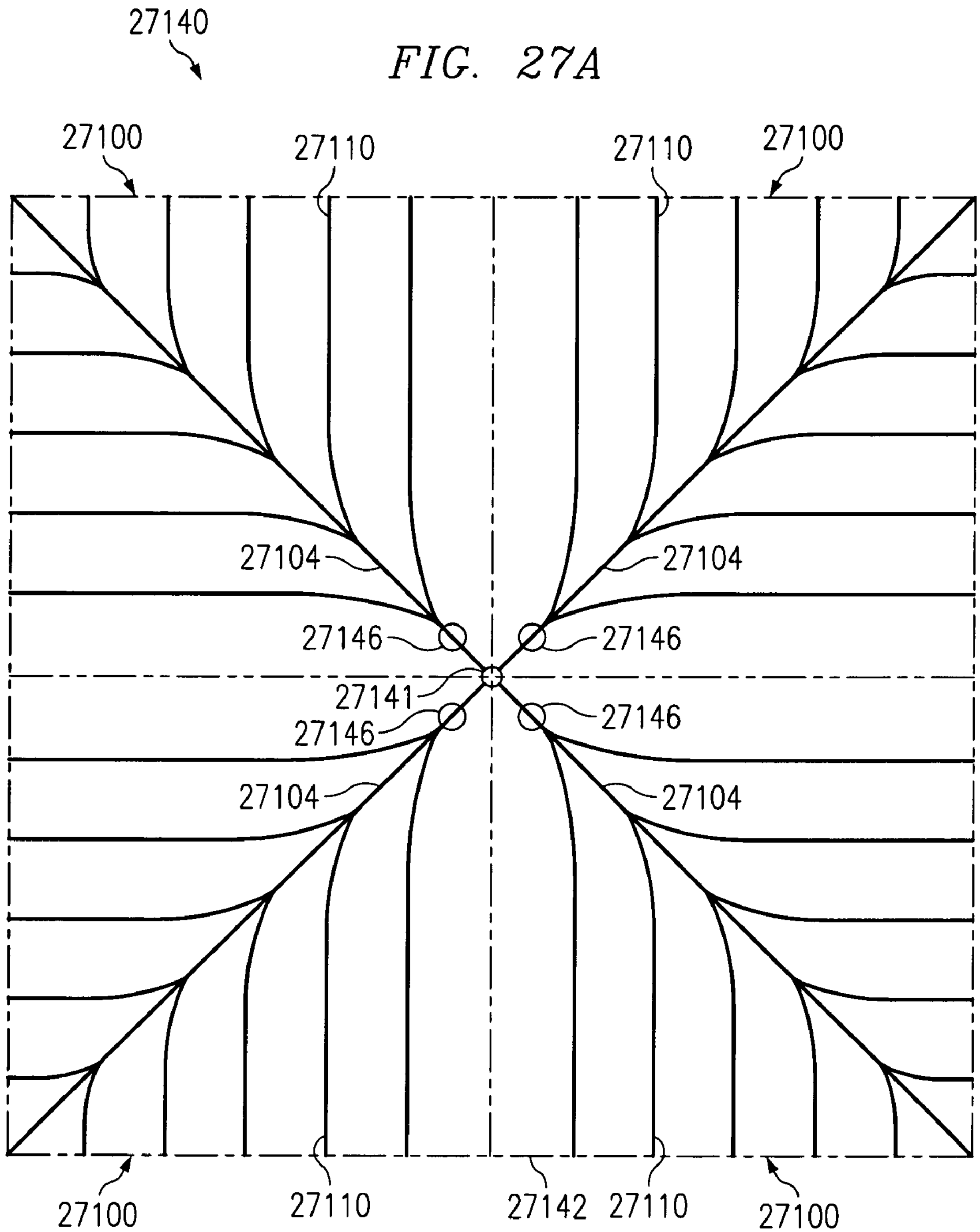
FIG. 27A is a top plan diagram illustrating a quadrilateral pinnate well bore pattern for accessing a subterranean zone in accordance with still another embodiment of the present invention.

FIG. 27A illustrates a quad-pinnate well bore pattern 27140 in accordance with another embodiment of the present invention. The quad-well bore pattern 27140 includes four discrete sub-patterns extending from a substantial center of the area. In this embodiment, the wells are interconnected in that the articulated bores are drilled from the same surface bore. It will be understood that a plurality of sub-patterns may be formed from main bores extending away from a substantial center of an area in different directions. The main bores may be substantially evenly oriented about the center to uniform coverage and may be the same, substantially the same or different from each other.

The sub-patterns may each be a pinnate well bore patterns 27100 that accesses a quadrant of a region 27142 covered by the pinnate well bore pattern 27140. Each of the pinnate well bore patterns 27100 includes a main well bore 27104 and a plurality of lateral well bores 27110 extending from the well bore 27104. In the quad-embodiment, each of the well bores 27104 and 27110 is drilled from a common articulated well bore 27141 through a cavity. This allows tighter spacing of the surface production equipment, wider coverage of a well bore pattern, and reduces drilling equipment and operations.

Figure 27B:
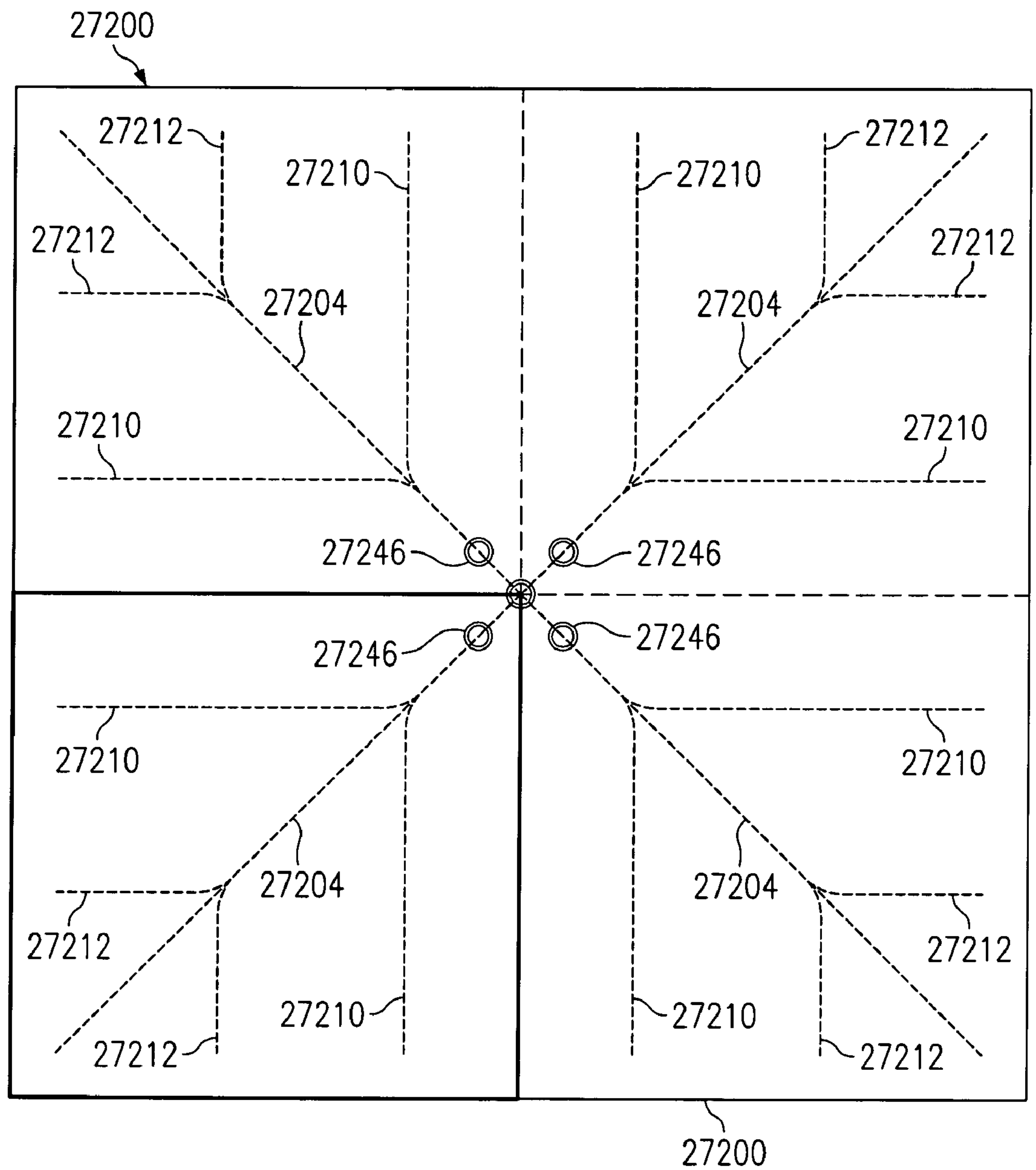
FIG. 27B is a top plan diagram illustrating another example of a quadrilateral pinnate well bore for accessing a subterranean zone in accordance with still another embodiment of the present invention.

FIG. 27B illustrates a particular embodiment of a quad-pinnate well bore pattern 27200 in accordance with another embodiment of the present invention. This embodiment is analogous to that of FIG. 27A, except that a fewer number of laterals 27210 and 27212 are formed off of the main well bore 27204. In this example, each pinnate pattern has a total footage of 7804 feet, with an associated drainage area of 157.74 acres. This results in a total drainage are for pattern 27200 of 630.96 acres with a total drainage footage of 31,216 feet.

Figure 28:
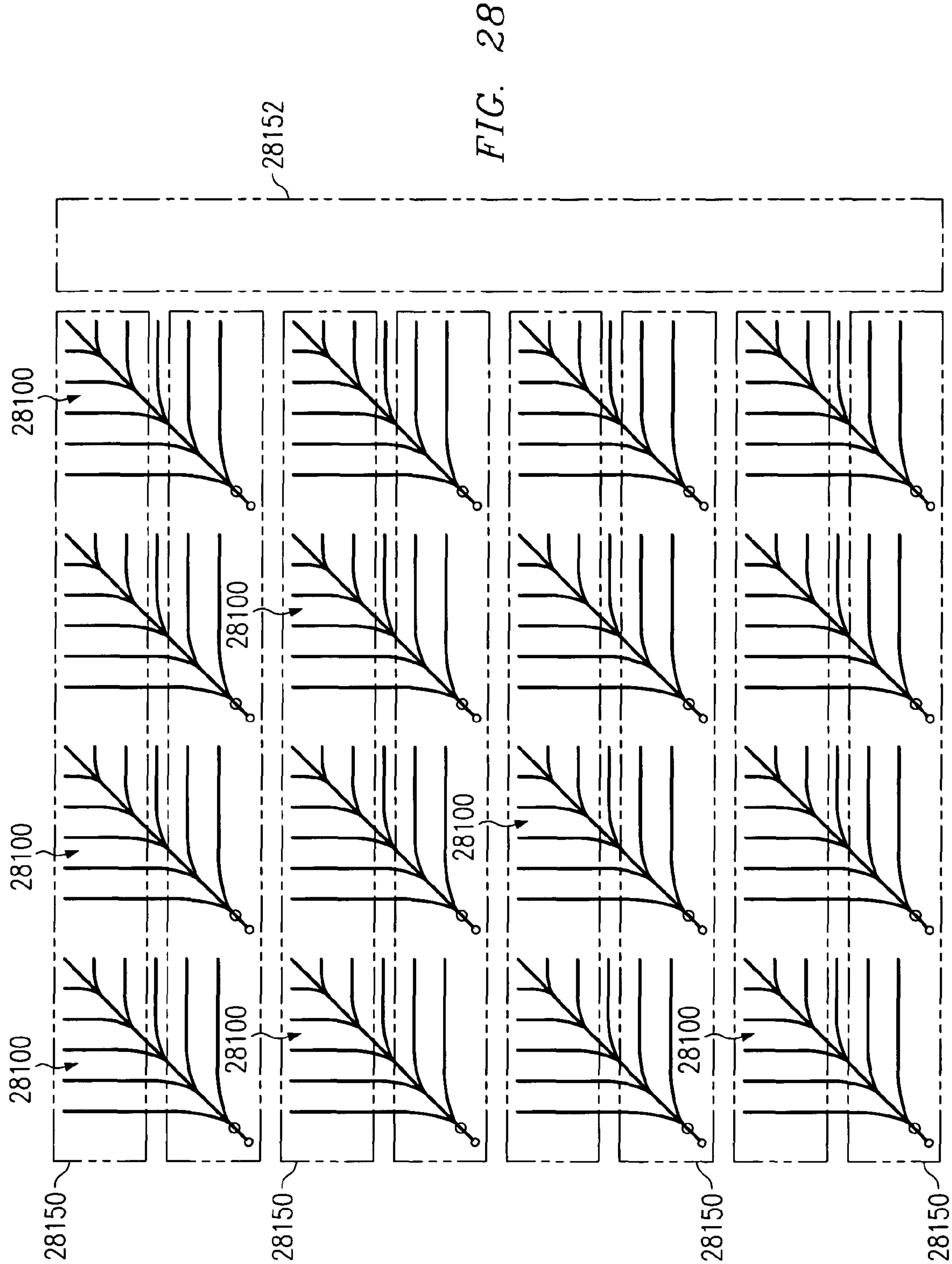
FIG. 28 is a top plan diagram illustrating the alignment of pinnate well bore patterns within panels of a coal seam for degasifying and preparing the coal seam for mining operations in accordance with one embodiment of the present invention.

FIG. 28 illustrates the alignment of pinnate well bore patterns 28100 with planned subterranean structures of a coal seam 28015 for degasifying and preparing the coal seam 28015 for mining operations in accordance with one embodiment of the present invention. In this embodiment, the coal seam 28015 will be mined using a longwall process. It will be understood that the present invention can be used to degasify coal seams for other types of mining operations.

Referring to FIG. 28, planned coal panels 28150 extend longitudinally from a longwall 28152. In accordance with longwall mining practices, each panel 28150 will be subsequently mined from a distant end toward the longwall 28152 and the mine roof allowed to cave and fracture into the opening behind the mining process. Prior to mining, the pinnate well bore patterns 28100 are drilled into the panels 28150 from the surface to degasify the panels 28150 well ahead of mining operations. Each of the pinnate well bore patterns 28100 aligned with the planned longwall 28152 and panel 28150 grid and covers portions of one or more panels 28150. In this way, a region of a planned mine can be degasified from the surface based on subterranean structures and constraints, allowing a subsurface formation to be degasified and mined within a short period of time.

FIG. 29 illustrates a pinnate well bore pattern 29300 in accordance with another embodiment of the present invention. In this embodiment, the pinnate well bore pattern 29300 provides access to a substantially square area 29302 of a subterranean zone. As with the other pinnate patterns a number of the pinnate patterns 29300 may be used together in dual, triple, and quad pinnate structures to provide uniform access to a large subterranean region.

Referring to FIG. 29, the enlarged cavity 250 defines a first corner of the area 29302, over which a pinnate well bore pattern 29300 extends. The enlarged cavity 250 defines a first corner of the area 29302. The pinnate pattern 29300 includes a main well bore 29304 extending diagonally across the area 29302 to a distant corner 29306 of the area 29302. Preferably, the main well bore 29304 is drilled up the slope of the coal seam. This may facilitate collection of water, gas, and other fluids from the area 29302. The main well bore 29304 is drilled using the drill string 40 and extends from the enlarged cavity 29250 in alignment with the articulated well bore 29230.

A plurality of lateral well bores 29310 extend from the opposite sides of well bore 29304 to a periphery 29312 of the area 29302. The lateral bores 29310 may mirror each other on opposite sides of the well bore 29304 or may be offset from each other along the well bore 29304. Each of the lateral well bores 29310 includes a first radius curving portion 29314 extending from the well bore 29304, and an elongated portion 29318. The first set of lateral well bores 29310 located proximate to the cavity 29250 may also include a second radius curving portion 29316 formed after the first curved portion 29314 has reached a desired orientation. In this set, the elongated portion 29318 is formed after the second curved portion 29316 has reached a desired orientation. Thus, the first set of lateral well bores 29310 kicks or turns back towards the enlarged cavity 29250 before extending outward through the formation, thereby extending the coverage area back towards the cavity 29250 to provide enhanced uniform coverage of the area 29302. For uniform coverage of the square area 29302, pairs of lateral well bores 29310 may be substantially evenly spaced on each side of the well bore 29304 and extend from the well bore 29304 at an angle of approximately 45 degrees. The lateral well bores 29310 shorten in length based on progression away from the enlarged cavity 29250. Stated another way, the lateral well bores 29310 lengthen based on proximity to the cavity in order to provide an enlarged and uniform coverage area. Thus, the length from a tip of each lateral to the cavity is substantially equal and at or close tot he maximum reach of the drill string through the articulated well.

Figure 30:
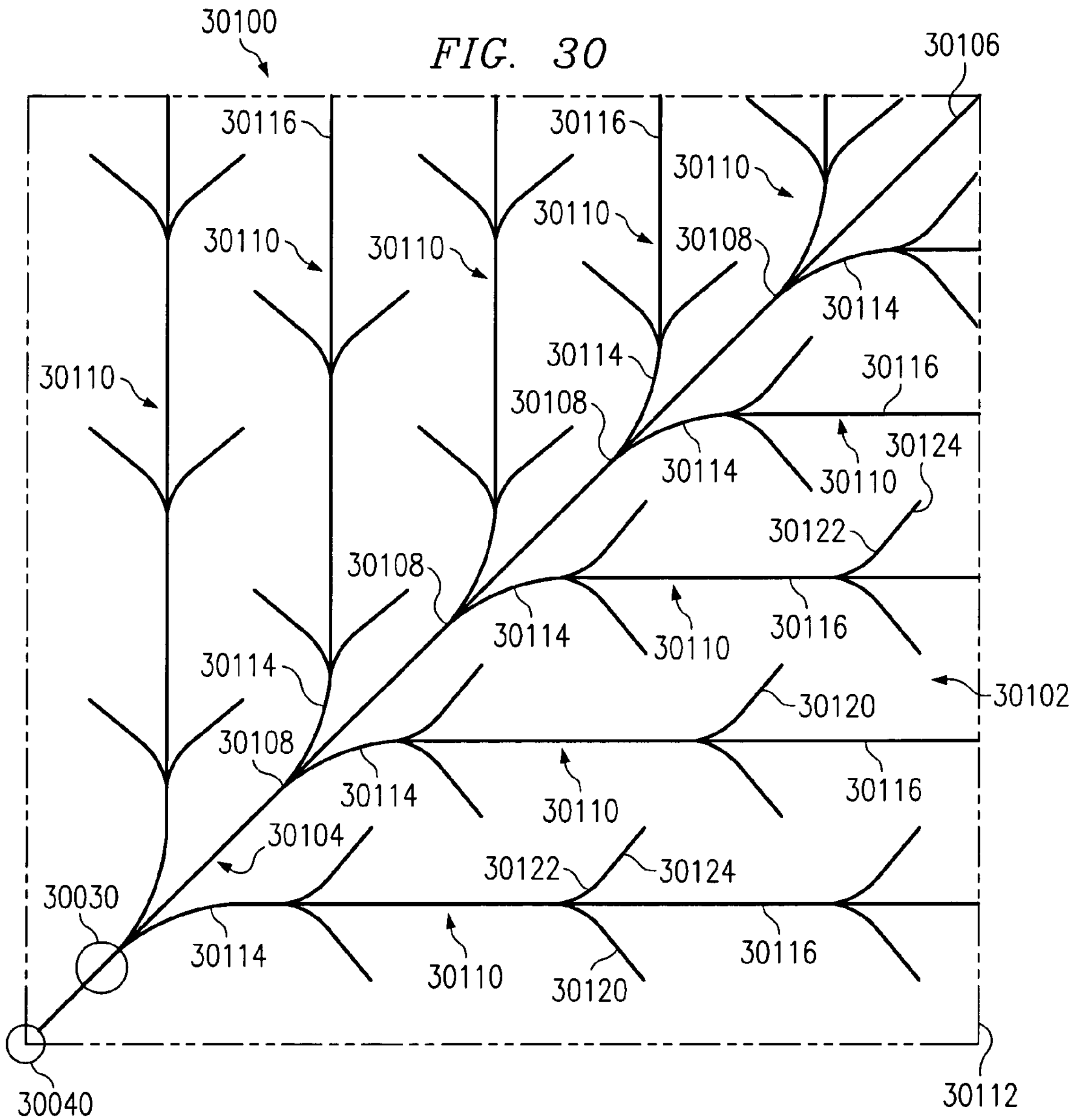
FIG. 30 is a diagram illustrating a top plan view of a pinnate well bore pattern for accessing a subterranean zone in accordance with an embodiment of the present invention.

FIG. 30 is a diagram illustrating a pinnate well bore pattern 30100 in accordance with one embodiment of the present invention. In this embodiment, the pinnate well bore pattern 30100 provides access to a substantially square area 30102 of a subterranean zone. A number of the pinnate patterns 30100 may be used together to provide uniform access to a large subterranean region.

Referring to FIG. 30, the enlarged cavity 30030 defines a first corner of the area 30102. The pinnate well bore pattern 30100 includes a main well bore 30104 extending diagonally across the area 30102 to a distant corner 30106 of the area 30102. In one embodiment, the well bore 30104 is drilled up the slope of the coal seam 30016. This may facilitate collection of water, gas, and other fluids from the area 30102. The well bore 30104 is drilled using the drill string 30050 and extends from the enlarged cavity 30030 in alignment with the articulated well bore 30040.

A set of lateral well bores 30110 extends from opposite sides of well bore 30104 to a periphery 30112 of the area 30102. The lateral well bores 30110 may mirror each other on opposite sides of the well bore 30104 or may be offset from each other along the well bore 30104. Each of the lateral well bores 30110 includes a radius curving portion 30114 extending from the well bore 30104 and an elongated portion 30116 formed after the curved portion 30114 has reached a desired orientation. For uniform coverage of the square area 30102, pairs of lateral well bores 30110 may be substantially evenly spaced on each side of the well bore 30104 and extend from the well bore 30104 at an angle of approximately 45 degrees. However, the lateral well bores 30110 may be formed at other suitable angular orientations relative to well bore 30104.

The lateral well bores 30110 shorten in length based on progression away from the enlarged diameter cavity 30030. Thus, as illustrated in FIG. 30, a distance to the periphery 30112 for pattern 30100 as well as other pinnate patterns from the cavity or well bores 30030 or 30040 measured along the lateral well bores 30110 is substantially equal for each lateral well bore 30110, thereby enhancing coverage by drilling substantially to a maximum distance by each lateral.

In the embodiment illustrated in FIG. 30, well bore pattern 30100 also includes a set of secondary lateral well bores 30120 extending from lateral well bores 30110. The secondary lateral well bores 30120 may mirror each other on opposite sides of the lateral well bore 30110 or may be offset from each other along the lateral well bore 30110. Each of the secondary lateral well bores 30120 includes a radius curving portion 30122 extending from the lateral well bore 30110 and an elongated portion 30124 formed after the curved portion 30122 has reached a desired orientation. For uniform coverage of the area 30102, pairs of secondary lateral well bores 30120 may be disposed substantially equally spaced on each side of the lateral well bore 30110. Additionally, secondary lateral well bores 30120 extending from one lateral well bore 110 may be disposed to extend between secondary lateral well bores 30120 extending from an adjacent lateral well bore 30110 to provide uniform coverage of the area 30102. However, the quantity, spacing, and angular orientation of secondary lateral well bores 30120 may be varied to accommodate a variety of resource areas, sizes and drainage requirements. It will be understood that secondary lateral well bores 30120 may be used in connection with other main laterals of other suitable pinnate patterns.

Figure 31:
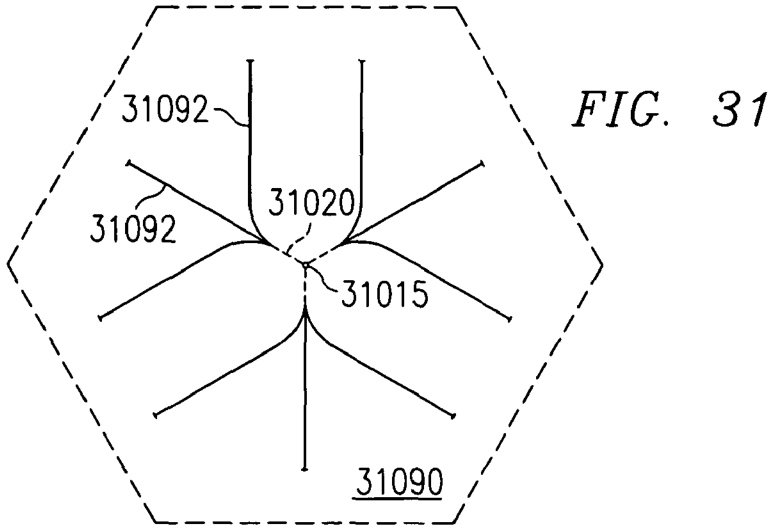
FIG. 31 illustrates an example drainage pattern for use with a slant well system.

FIG. 31 illustrates an example drainage pattern 31090 that may be drilled from articulated well bores 31036. At the center of drainage pattern 31090 is entry well bore 31015. Connecting to entry well bore 31015 are slant wells 31020. At the terminus of slant well 31020, as described above, are substantially horizontal well bores 31092 roughly forming a "crow's foot" pattern off of each of the slant wells 31020. As used throughout this application, "each" means all of a particular subset. In a particular embodiment, the horizontal reach of each substantially horizontal well bore 31092 is approximately fifteen hundred feet. Additionally, the lateral spacing between the parallel substantially horizontal well bores 92 is approximately eight hundred feet. In this particular embodiment, a drainage area of approximately two hundred and ninety acres would result. In an alternative embodiment where the horizontal reach of the substantially horizontal well bore 92 is approximately two thousand four hundred and forty feet, the drainage area would expand to approximately six hundred and forty acres. However, any other suitable configurations may be used. Furthermore, any other suitable drainage patterns may be used.

Figure 32:
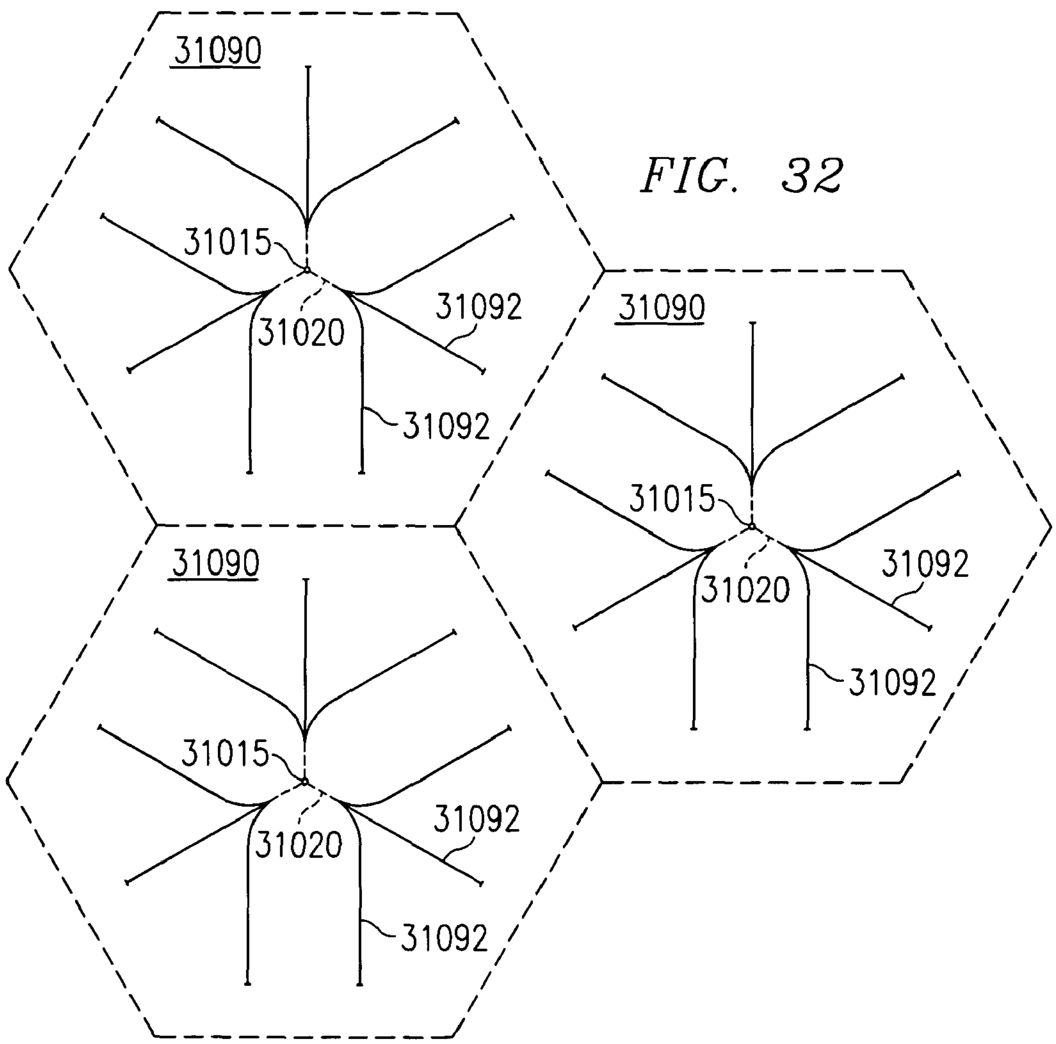
FIG. 32 illustrates an example alignment of drainage patterns for use with a slant well system.

FIG. 32 illustrates a plurality of drainage patterns 31090 in relationship to one another to maximize the drainage area of a subsurface formation covered by the drainage patterns 31090. Each drainage pattern 31090 forms a roughly hexagonal drainage pattern. Accordingly, drainage patterns 31090 may be aligned, as illustrated, so that the drainage patterns 31090 form a roughly honeycomb-type alignment.

Figure 33:
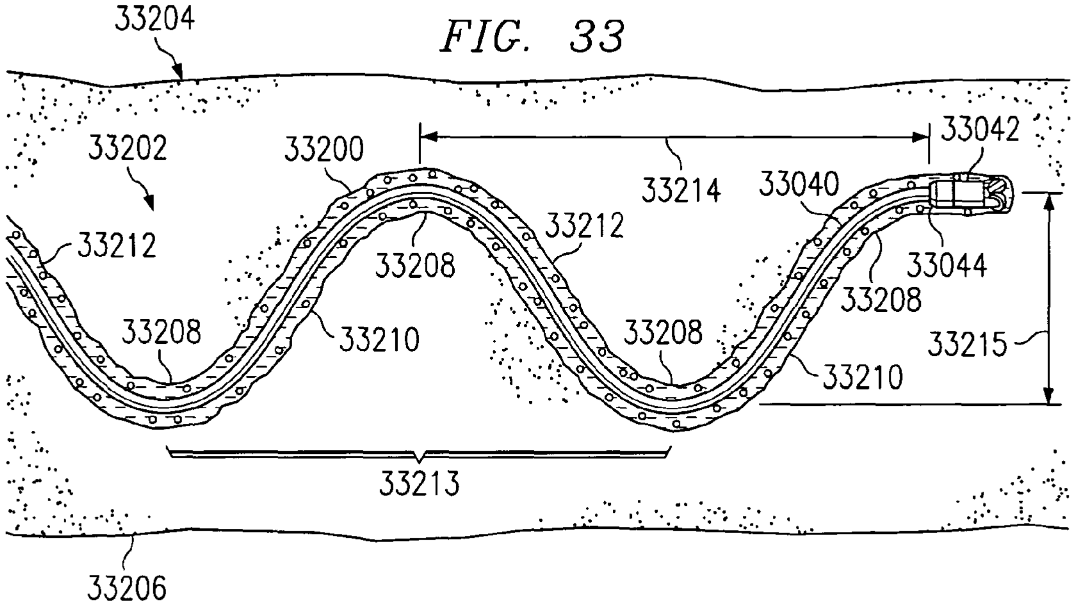
FIG. 33 is a cross-sectional diagram illustrating an example undulating well bore for accessing a layer of subterranean deposits.

FIG. 33 is a cross-sectional diagram illustrating an example undulating well bore 33200 for accessing a layer of subterranean deposits 33202. Undulating well bore 33200 may be included as any well bore of the systems illustrated in FIGS. 1 through 24 or a well bore of any other system that may be used to remove and/or produce water, hydrocarbons and other fluids in a layer of subterranean deposits 33202. Alternatively or additionally, undulating well bore 33200 may be included as any well bore of a well bore system for the remediation or treatment of a contaminated area within or surrounding the coal seam or for the sequestration of gaseous pollutants and emissions in the coal seam. For example, undulating well bore may extend from a single vertical well or from a slant well. In a particular embodiment, the layer of subterranean deposits 33202 may comprise a coal seam or other subterranean zone. Additionally or alternatively, the layer of subterranean deposits may comprise a thick, single layer of hydrocarbons or other extractable substances. For example, the single, thick layer of subterranean deposits 33202 may be approximately fifty feet thick as measured from an upper boundary 33204 closest to the earth's surface to a lower boundary 33206 furthest from the earth's surface. Fifty feet is, however, merely exemplary. One skilled in the art may recognize that the layer of subterranean deposits 33202 may be of any thickness in which an undulating well bore 33200 may be contained. One skilled in the art may also recognize that the layer 33202 may include any impurities that may be separated from the subterranean deposits before or after extraction. Additionally or alternatively, layer of subterranean deposits 33202 may also include partings of shale or other impermeable or substantially impermeable material.

In one embodiment of the present invention, undulating well bore 33200 may include at least one bending portion 33208, at least one inclining portion 33210, and at least one declining portion 33212. Inclining portion 33210 may be drilled at an inclination sloping toward upper boundary 33204 of layer 33202. Similarly, declining portion 33212 may be drilled at a declination sloping toward lower boundary 33206 of layer 33202. Bending portions 33208 may be located near the upper boundary 33204 or lower boundary 33206 and act to reverse the direction of the undulating well bore 33200 to retain the undulating well bore 200 within the confines of the layer 33202. In one example embodiment, bending portion 33208 may include a substantially straight portion before reversing the direction of undulating well bore 33202. Thus, the humps of undulating well bore 33200 may be flat at the crest of bending portions 33208. For example, a bending portion 33208 located near the upper boundary 33204 may level off and extend in a substantially horizontal plane closer to the upper boundary 33204 for some distance before curving downward toward the lower boundary 33206. Similarly, a bending portion 33208 located near the lower boundary 33206 may level off and extend in a substantially horizontal plane closer to the lower boundary 33206 for some distance before curving upward toward the upper boundary 33204. The three portions 33208, 33210, and 33212 may couple to comprise a waveform 33213 having a wavelength 33214 and a wave height 33215. The wavelength 33214 may be measured from any point on waveform 33213 to the next similar point on the waveform 33213. For example, wavelength 33214 may be measured from the top of the crest of a bending portion 33208 located near the upper boundary 33204 to the top of the crest of the next bending portion 33208 located near the upper boundary 33204. Alternatively, wavelength 33214 may be measured from a point where bending portion 33208 transitions to inclining portion 33210 to the next point where bending portion 33208 couples to the next inclining portion 33210. Thus, one of ordinary skill in the art may recognize that wavelength 33214 may be measured from any of a number of points on a waveform 33213 to the next like point. Further, undulating well bore 33200 may comprise one complete waveform 33213, a portion of a waveform 33213, or a plurality of waveforms 33213.

In one embodiment of the present invention, undulating well bore 33200 may comprise a substantially smooth and wavelike form. In this embodiment, displacement of undulating well bore 33200 may vary over space in a periodic manner. Thus, the wavelength 33214 of each waveform 33213 may be substantially equal to the wavelength 33214 of every other waveform 33213. In this manner, the wavelength 33214 of each waveform 33213 may remain substantially constant throughout the length of undulating well bore 33200. For example, the wavelength 33214 of each waveform 33213 may be six hundred feet. Alternatively, the wavelength 33214 of each waveform 33213 may be seven hundred feet or any other length for effectively accessing layer 33202 of subterranean deposits. A wavelength 33214 of six hundred or seven hundred feet is merely exemplary. Similarly, the wave height 33215 of each waveform 33213 may be substantially equal to the wave height 33215 of every other waveform 33213, and the wave height 33215 of each waveform 33213 may remain substantially constant throughout the entire undulating well bore 33200. The wave height may relate to the thickness of layer 33202. If for example layer 33202 is eleven feet thick, the wave height 33215 for each waveform 33213 may be ten feet. One of ordinary skill in the art may recognize, however, that a wave height 33215 of ten feet is merely exemplary. Wave height 33215 may be unrelated to the thickness of layer 33202 and may be of any height for effectively accessing layer 33202 of subterranean deposits.

In an alternative embodiment, undulating well bore 33200 need not have periodic characteristics. The displacement of undulating well bore 33200 may vary over space in a non-uniform manner. The wavelength 33214 of each waveform 33213 may vary throughout the length of undulating well bore 33200. For example, the wave length 33214 of the first wave cycle may be six hundred feet, while the wave length 33214 of the second waveform 33213 may be seven hundred feet. Thus, the wave length 33214 of each waveform 33213 may vary throughout undulating well bore 33200 and may be of any number of lengths for effectively accessing layer 33202. Additionally or alternatively, the wave height 33214 of each waveform 33213 may vary such that the wave height 33215 of a specific waveform 33213 is different from the wave height 33215 of the preceding waveform 33213. For example, the wave height 33215 of the first waveform 33213 may be ten feet, while the wave height 33215 of the second waveform 33213 may be fifteen feet. One of ordinary skill in the art may recognize, however, that the above described wave heights 33215 are merely exemplary. The wave height 33215 of each waveform 213 may vary and be of any height for effectively accessing layer 33202.

Further, although undulating well bore 33200 is described as including a substantially smooth wavelike form, bending portions 33208 may not necessarily be a perfect curve. For example, bending portions 33208 may level off to include a substantially flat portion such that there is no single point of each bending portion 33208 constituting an apex. Similarly, inclining portions 33210 and declining portions 33212 may not necessarily be perfectly straight. One of ordinary skill in the art may appreciate that a smooth and wavelike form may include normal inaccuracies of drilling. Because operation of a drill string 3340 through a layer 33202 of subterranean deposits may not be visually monitored, inaccuracies may result in the positioning of the drill bit 3344. As a result, drill string 3340 may vary slightly from the operator's intended path. Such minor variations and deviations do not change the substantially smooth characteristics of the undulating well bore 33200. Rather, the minor variations and deviations are within the intended scope of the invention.

Figure 34:
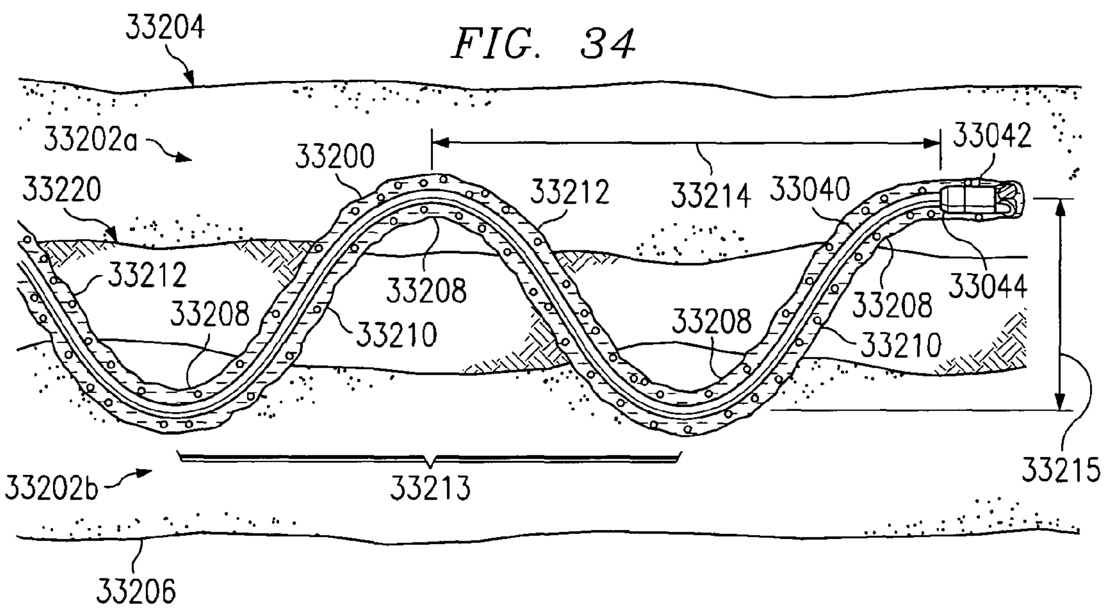
FIG. 34 is a cross-sectional diagram illustrating an example undulating well bore for accessing multiple layers of subterranean deposits.

FIG. 34 is a cross-sectional diagram illustrating an example undulating well bore 33200 for accessing multiple layers 33202 of subterranean deposits. Undulating well bore 33200 may provide uniform access to multiple layers 33202 of subterranean deposits that may be separated by impermeable or substantially impermeable material 33220 such as sandstone, shale, or limestone. In this embodiment, bending portions 33208, inclining portions 33210, and declining portions 33212 of undulating well bore 33200 may be formed as previously described in connection with FIG. 33.

Referring again to FIG. 34, wave height 33215 may be of a sufficient height to allow undulating well bore 33200 to intersect multiple coal seams or multiple layers 33202 of any other subterranean deposits. For example, bending portions 33208 may alternate to reach an upper layer 33202*a* of subterranean deposits and a lower layer 33202*b* of subterranean deposits. Although only two layers 33202*a* and 33202*b* are shown in FIG. 34, undulating well bore 33200 may intersect any appropriate number of layers 33202. For example, inclining portions 33210 and declining portions 33212 may travel through a number of layers of subterranean deposits 33202 separated by multiple layers of impermeable or substantially impermeable material 33220. As will be described below, undulating well bore 33200 may form some or all of a main drainage well bore and/or a one or more lateral well bores. As was described with regard to FIG. 33, many modifications and variations may be made to undulating well bore 33200. For example, the wave height 33215 and wave length 33214 of a waveform 33213 may have periodic or non-periodic characteristics. Additionally, inaccuracies from drilling do not change the substantially smooth characteristics of the undulating well bore 33200. These variations and modifications are within the intended scope of the invention.

Figure 35:
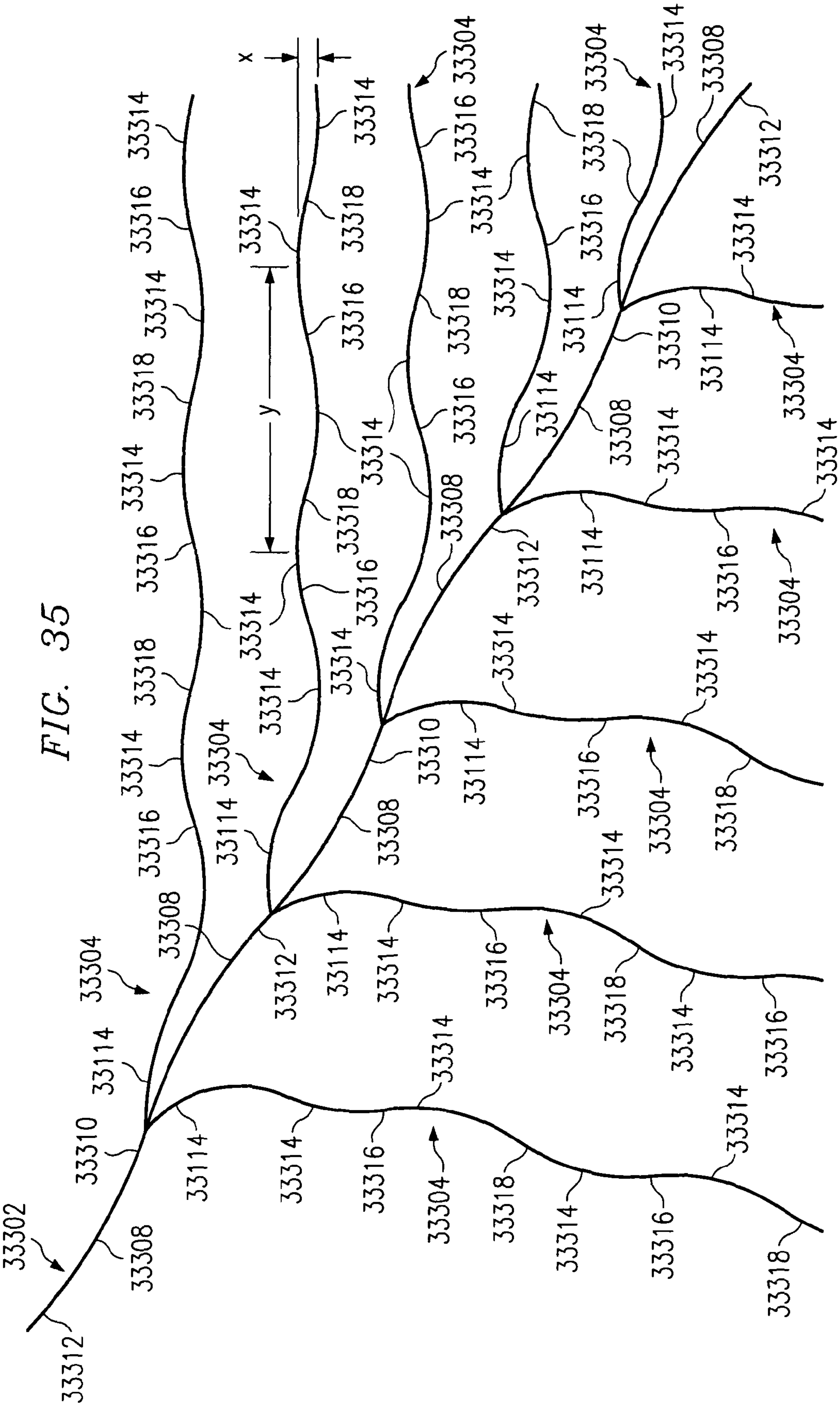
FIG. 35 is an isometric diagram illustrating an example drainage pattern of undulating well bores for accessing deposits in a subterranean zone.

FIG. 35 is an isometric diagram illustrating an example drainage pattern 33300 of undulating well bores for accessing deposits in a subterranean zone. In the depicted embodiment, the substantially horizontal portions of both the main drainage well bore and the lateral well bores illustrated in FIGS. 25 through 32, are replaced with undulating well bore 33200. Thus as illustrated, the system of FIG. 35 includes an undulating main well bore 33302 with undulating lateral well bores 33304 for the removal and production of entrained water, hydrocarbons, and other deposits or for use in remediation of contaminated areas in or surrounding the coal seam. Alternatively, drainage pattern 33300 may include, however, an undulating main drainage well bore 33302 with substantially horizontal lateral well bores, a substantially horizontal main drainage well bore with undulating lateral well bores 33304, or any other combination thereof to remove and produce entrained water, hydrocarbons, and other subterranean deposits. As was previously described, pinnate drainage pattern 33300 may provide access to a single, thick layer 33202 of subterranean deposits as was described with regard to FIG. 33. Alternatively, the pinnate drainage pattern 33300 may provide access to multiple layers 33202 of subterranean deposits separated by impermeable or substantially impermeable material 33220 such as sandstone, shale, or limestone, as was described with regard to FIG. 34.

In particular embodiments, undulating main drainage well bore 33302 may replace the main drainage well bore, replace main well bore, or extend from the substantially horizontal portion of the articulated well bore 30. For example, after the enlarged diameter cavity has been successfully intersected by the articulated well bore, drilling may continue through the cavity using the articulated drill string and appropriate horizontal drilling apparatus to form drainage pattern 33300. Thus, undulating main drainage well bore 33302 may initiate from the cavity. During this operation, gamma ray logging tools and conventional MWD devices may be employed to control and direct the orientation of the drill bit to direct the undulating main drainage well bore 33302 on its intended path through a layer or layers 33202 of subterranean deposits.

Additionally, a plurality of lateral well bores 33304 may extend from opposite sides of the undulating main drainage well bore 33302 to a periphery of the area being drained. Thus, a first set of lateral well bores 33304 may extend in spaced apart relation to each other from a first side portion of undulating well bore 33302. Similarly, a second set of lateral well bores 33304 may extend in spaced apart relation to each other from a second, opposite side portion of undulating main drainage well bore 33302. The lateral well bores 33304 may mirror each other on opposite sides of the undulating main drainage well bore 33302 or may be offset from each other along the undulating main drainage well bore 33302. In particular embodiments, pairs of lateral well bores 33304 may be substantially evenly spaced on each side of the undulating main drainage well bore 33302 and extend from the main drainage well bore 33302 at an angle of approximately 45 degrees.

In a particular embodiment of the present invention, a pair of lateral well bores 33304 may extend from opposite sides of the undulating main drainage well bore 33302 at intervals corresponding to each wave for 33213. For example, a pair of lateral well bores 33304 may extend from each bending portion 33308 located closest to the earth's surface. Additionally or alternatively, lateral well bores 33304 may extend from each bending portion 33308 located further from the earth's surface. Thus, some lateral well bores 33304 may initiate near the surface, while other lateral well bores 33304 may initiate away from the surface.

By initiating lateral well bores 33304 from different depths within the subterranean zone, drainage pattern 33300 may provide access to a single, thick layer 33202 of subterranean deposits as was described with regard to FIG. 33. Alternatively, drainage pattern 33300 may provide access to multiple layers 33202 of subterranean deposits separated by impermeable or substantially impermeable material 33220, as was described with regard to FIG. 34. In the latter embodiment, alternating bending portions 33308 may be located in different layers of subterranean deposits. For example, the first bending portion 33308 may be located in a layer 33202*a* closer to the earth's surface while the second bending portion 33308 may be located in a lower layer 33202*b* further from the earth's surface. Lateral well bores 33304 may extend from each bending portion 33308 or from alternate bending portions 33308. Consequently, the drainage pattern formed by undulating main drainage well bore 33302 and lateral well bores 33304 may be customized as is necessary to optimize the draining of the layer of subterranean deposits.

Each lateral well bore 33304 may include a radiused portion 33114 and an elongated portion 33116. The radiused portion 33114 may connect the lateral well bore 33304 to the undulating main drainage well bore 33302 at a predetermined radius of curvature. The appropriate radius of curvature may be dictated by drilling apparatus capabilities. In one embodiment of the present invention, the radius of curvature of the bending portion 33308 of undulating main drainage well bore 33302 may be substantially equal to the radius of curvature of the radiused portion 33114 of lateral well bore 33304. For example, if the radius of curvature for radiused portion 33114 is three hundred feet, the radius of curvature for bending portions 33308 may also be three hundred feet. Elongated portion 33116 may then extend from the radiused portion 33114 to the periphery of the area. A radius of curvature of three hundred feet is provided merely as an example. One skilled in the art may recognize that the radius of curvature may include any appropriate radius of curvature for effectively drilling lateral well bores 33304.

Referring again to FIG. 35, lateral well bores 33304 are depicted as extending from bending portions 33308 of undulating main drainage well bore 33302. Lateral well bores 33304 may extend, however, from any portion of undulating main drainage well bore 33302. Thus, lateral well bores 33304 may additionally or alternatively extend from inclining portions 33310 and/or declining portions 33312. Further, although lateral well bores 33304 may extend from undulating main drainage well bore 33302 at evenly spaced intervals, lateral well bores 33304 may extend from undulating well bore 33302 at any interval. Thus, the horizontal distance between lateral well bores 33304 along undulating main drainage well bore 33302 may vary. Regardless of the location of or spacing between lateral well bores 33304, lateral bores 33304 may be formed by drilling through the enlarged cavity using the articulated drill string and an appropriate drilling apparatus. During this operation, gamma ray logging tools and conventional MWD technologies may be used to control the direction and orientation of the drill bit to maintain the desired spacing and orientation of the lateral well bores 33304.

In particular example embodiments and as shown in FIG. 35, each lateral well bore 33304 may comprise an undulating well bore 33200. For example, undulating well bore 33200 may replace the elongated portion that is formed after the radiused portion 33314 has reached a desired orientation. Each lateral well bore 33304 may then include one or more bending portions 33314, inclining portions 33316, and/or declining portions 33318. In a particular embodiment, the radius of curvature of bending portions 33308 and/or 33314 may be substantially equal to the radius of curvature of the radiused portion 33114 that connects the lateral well bore 33304 to the main drainage well bore 33302. Alternatively, the radius of curvature of bending portions 33308 and/or 33314 may be different from the radius of curvature of radiused portion 33114.

A number of variations and modifications may be made to drainage pattern 33300. The present invention is intended to compass all such variations and modifications. Thus, FIG. 35 is merely an example embodiment of drainage pattern 33300. Drainage pattern 33300 may include an undulating main drainage well bore 33304 with undulating lateral well bores 33304, an undulating main drainage well bore 33304 with substantially horizontal lateral well bores, a substantially horizontal main well bore with undulating lateral well bores 33304, or any other combination thereof to remove and produce entrained water, hydrocarbons, and other deposits, to treat contaminated areas within single, thick layer 33202 of subterranean deposits, or to sequester gaseous emissions or pollutants within layer 33202. Additionally, one skilled in the art may recognize, that portions of well bores described as substantially horizontal need not be perfectly horizontal. Where the layer 33202 of subterranean deposits is not perfectly horizontal, the well bore may be drilled to conform with the planar orientation of the layer 33202. For example, if layer 33202 is inclined, the substantially horizontal well bore may also be inclined in conformity with the plane of the layer 33202. Alternatively, if layer 33202 slopes downwardly away from the earth's surface, the substantially horizontal well bore may also slope downwardly away from the earth's surface. One skilled in the art may also recognize that the length of the undulating well bores may be increased to maximize the area horizontally covered by the undulating well bores, and the height of the undulating well bores may be increased to maximize the area vertically covered by the undulating well bores.

Figure 36:
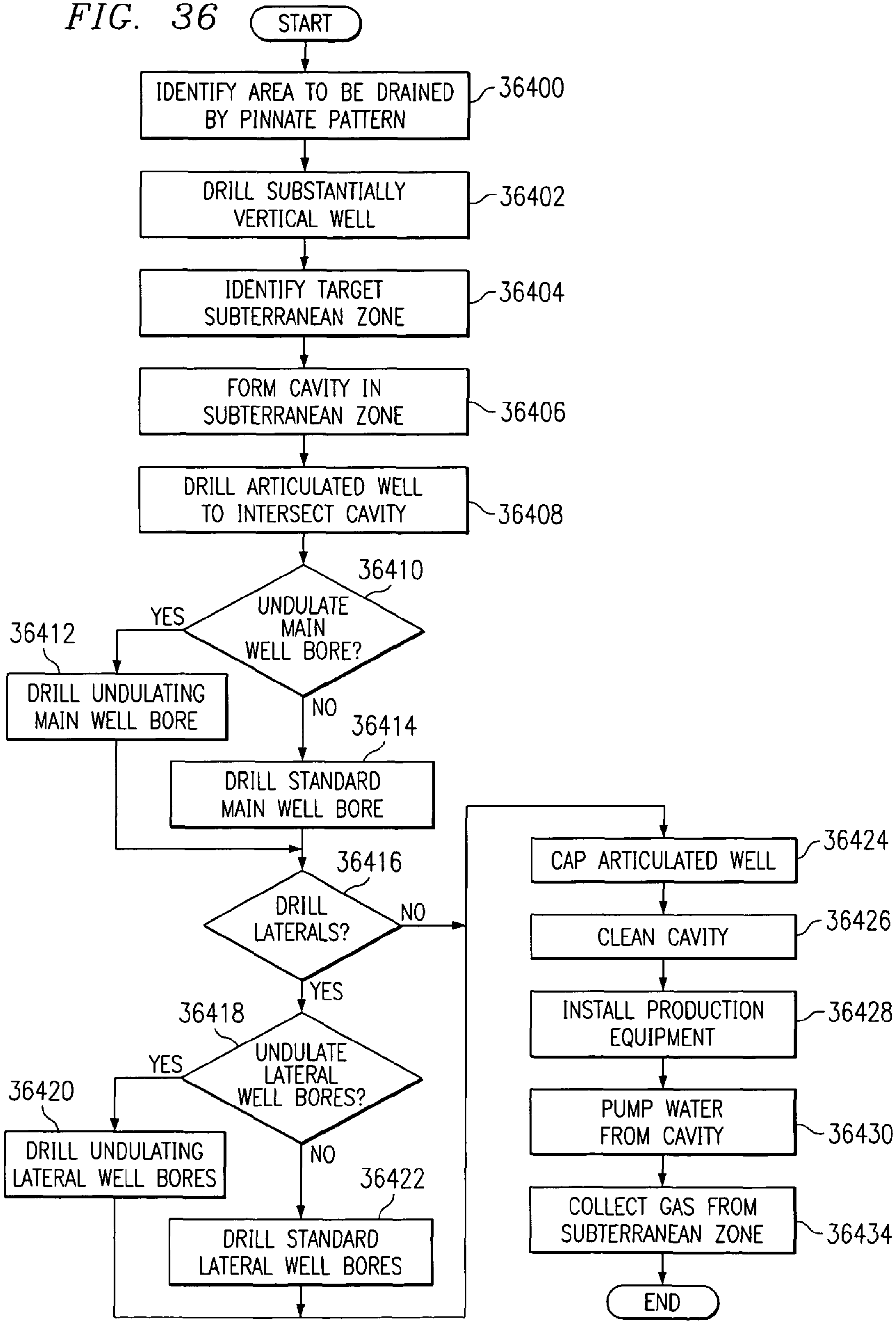
FIG. 36 is a flow diagram illustrating an example method for producing gas from a subterranean zone.

FIG. 36 is a flow diagram illustrating an example method for producing gas from a subterranean zone. In this embodiment, the method begins at step 36400 in which areas to be drained and drainage patterns to be used in the areas are identified. For example, the drainage patterns described above may be used to provide optimized coverage for the region. It will be understood that any other suitable patterns may also or alternatively be used to degasify subterranean zone deposits in one or more layers 33202.

Proceeding to step 36402, the substantially vertical well is drilled from the surface through the subterranean zone. Next, at step 36404, down hole logging equipment is used to exactly identify the location of the target layer of subterranean deposits in the substantially vertical well bore. At step 36406, the enlarged diameter cavity is formed in the substantially vertical well bore at a location within the target layer 33202 of subterranean deposits. As previously discussed, the enlarged diameter cavity may be formed by under reaming and other conventional techniques. Next, at step 36408, the articulated well bore is drilled to intersect the enlarged diameter cavity. It should be understood that although the drilling of a dual well system is described in steps 36402-36408, any other appropriate technique for drilling into subterranean deposits may be used. After the subterranean deposits are reached, a drainage pattern may then be drilled in the deposits, as described below.

At decisional step 36410, it is determined whether the main well bore of the drainage pattern should comprise an undulating well bore 33200. In making the determination, the size and accessibility of the layer or layers 33202 of subterranean deposits should be considered. In a particular embodiments of the present invention, it may be desirable to drill a substantially straight main well bore. Alternatively, it may be desirable to drill an undulating main well bore 33200, which may provide access to minerals within a single, thick layer 33202 of subterranean deposits. Undulating main well bore 33200 may also provide access to multiple layers 33202 of subterranean deposits that may be separated by impermeable or substantially impermeable material 33220 such as shale, limestone, or sandstone. If it is determined at decisional step 36410 that the main well bore should comprise an undulating well bore 33202, the undulating well bore 33202 is drilled at step 36412. If, on the other hand, a substantially horizontal main well bore is desired, a standard, straight main well bore may be drilled at step 36414.

At decisional step 36416, a determination is made as to whether the lateral well bores should be drilled. The lateral well bores may be drilled from the main well bore and extended to a periphery of the area to be drained. The lateral well bores may provide access to a greater area of the layer or layers 33202 of subterranean deposits. If at decisional step 36416, it is determined that the lateral well bores 110 should not be drilled, steps 36418 through 36422 are skipped and the method proceeds directly to decisional step 36424. Instead, if it is determined at decisional step 36416 that the lateral well bores should be drilled, a determination is made at decisional step 36418 as to whether one or more of the lateral well bores should comprise an undulating well bore 33202. In one embodiment of the present invention, it may be desirable to drill substantially straight lateral well bores. Alternatively, it may be desirable to drill undulating lateral well bores, which may provide access to minerals within a single, thick layer 33202 of subterranean deposits or to minerals within multiple layers 33202 of subterranean deposits separated by impermeable or substantially impermeable material 33220. If it is determined that one or more lateral well bores should comprise undulating well bores 33202, undulating lateral well bores 33304 are drilled at step 36420. Alternatively, if it is determined at decisional step 36418 that lateral well bores should be drilled to include a substantially straight elongated portion, standard substantially straight well bores are drilled at step 33422. The method then proceeds to step 36424.

At step 36424, the articulated well bore may be capped. Next, at step 36426, the enlarged cavity may be cleaned in preparation for installation of downhole production equipment. The enlarged diameter cavity may be cleaned by pumping compressed air down the substantially vertical well bore or by other suitable techniques. At step 36428, production equipment is installed in the substantially vertical well bore. The production equipment may include a sucker rod pump extending down into the cavity. The sucker rod pump may be used to remove water from the layers 33202 of subterranean deposits. The removal of water will drop the pressure of the subterranean layers 33202 and allow gas to diffuse and be produced up the annulus of the substantially vertical well bore.

Proceeding to step 36430, water that drains from the drainage pattern into the cavity is pumped to the surface with the rod pumping unit. Water may be continuously or intermittently pumped as needed to remove it from the cavity. Additionally or alternatively, the drainage pattern may be used for environmental remediation purposes to treat or recover underground contaminants posing a danger to the environment. For example, the drainage pattern and cavity may be used to inject a treatment solution into a contaminated coal seam or surrounding area, recover byproducts from the contaminated coal seam or surrounding area, or strip recoverable products. The drainage pattern may also be used for the sequestration of gaseous emissions. For example, gaseous emissions such as carbon dioxide entrained in a carrier medium may be injected into the pattern with the aid of a surface pump. At step 36434, gas diffused from the subterranean zone is continuously collected at the surface. Upon completion of production, the method is completed.

Figure 37:
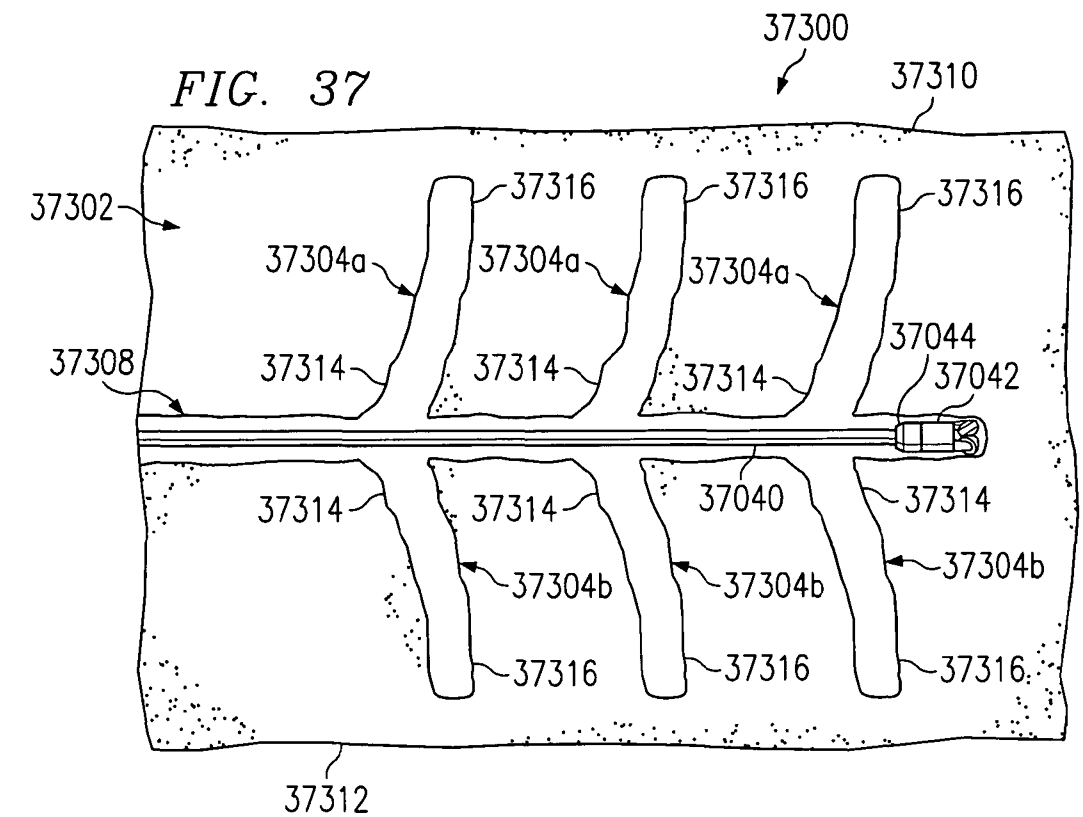
FIG. 37 is a cross-sectional diagram illustrating an example multi-plane well bore pattern for accessing a single, thick layer of subterranean deposits.

FIG. 37 is a cross-sectional diagram illustrating an example multi-plane well bore pattern 37300 for accessing deposits in a single, thick layer 37302 of subterranean deposits. The multi-plane well bore pattern 37300 may include one or more ramping well bores 37304 that may be used to remove and/or produce water, hydrocarbons, and other fluids in layer 37302. Ramping well bores 37304 may also be used in remediation processes to treat or remove contaminants in a coal seam or the surrounding area or in sequestration processes to dispose of gaseous pollutants and emissions. In one example embodiment, layer 37302 of subterranean deposits may comprise a coal seam or other subterranean zone. Additionally or alternatively, layer 37302 of subterranean deposits may comprise a thick, single layer of hydrocarbons or other extractable substances. For example, the single, thick layer 37302 may be approximately fifty feet thick as measured from an upper boundary 37310 closest to the earth's surface to a lower boundary 37312 furthest from the earth's surface. Fifty feet is, however, merely exemplary; one skilled in the art may recognized that layer 37302 may be of any thickness appropriate for drainage by multi-plane well bore pattern 37300. One skilled in the art may also recognize that the layer 37302 may include any impurities that may be separated from the subterranean deposits before or after extraction. Additionally or alternatively, layer 37302 of subterranean deposits may also include partings of shale or other impermeable or substantially impermeable material.

Each ramping well bore 37304 may include a radiused portion 37314 and an elongated portion 37316. The radiused portion 37314 may connect the ramping well bore 37304 to a substantially horizontal well bore 37308 at a predetermined radius of curvature. The appropriate radius of curvature may be dictated by drilling apparatus capabilities and/or by the dimensions of the area to be drained by the multi-plane drainage pattern 37300. Radiused portion 37314 may then transition to an elongated portion 37316. Elongated portion 37316 may extend in a substantially vertical, inclined, or declined direction to a distant point within layer 37302. One skilled in the art may recognize that elongated portion 37316 may not necessarily include a perfectly straight well bore. It may be appreciated that the path of elongated portion 37316 may include normal inaccuracies of drilling. Because operation of a drill string 3740 through a subterranean zone may not be visually monitored, inaccuracies may result in the positioning of the drill bit. As a result, drill string 3740 may vary slightly from the operator's intended path. Such minor variations and deviations do not change the substantially vertical characteristics of elongated portion 37316. Rather, minor variations and deviations are within the intended scope of the invention. In other particular embodiments, ramping well bore 37304 may extend from the substantially horizontal well bore 37308 such that elongated portion 37316 is offset at any appropriate angle from the substantially horizontal well bore 37308.

Ramping well bores 37304 may extend upwardly from the substantially horizontal well bore 37308 toward the upper boundary 37310 of the layer 37302. Alternatively or additionally, ramping well bores 37304 may extend downwardly from the substantially horizontal well bore 37308 toward the lower boundary 37312 of the layer 37302. Ramping well bores 37304 may extend in a substantially vertical direction to a distant point within layer 37302. Thus, in one embodiment, multi-plane drainage pattern 37300 may include a first set of ramping well bores 37304*a* extending from an upper portion of the substantially horizontal well bore 37308 and a second set of ramping well bores 37304*b* extending from a lower portion of the substantially horizontal well bore 37308. The first and second sets of ramping well bores 37304 may mirror each other on opposite sides of the substantially horizontal well bore 37308 or may be offset from each other along the substantially horizontal well bore 37308. Thus, upwardly ramping well bores 37304*a* and downwardly ramping well bores 37304*b* need not necessarily extend from similar points along the substantially horizontal well bore 37308.

Further, ramping well bores 37304 may be substantially evenly spaced along the upper and lower portions of the substantially horizontal portion 37308. For example, ramping well bores 37304*a* may extend upwardly from substantially horizontal well bore 37308 at evenly spaced intervals of one hundred feet. Similarly, ramping well bores 37304*b* may extend downwardly from the substantially horizontal well bore 37308 at evenly spaced intervals of one hundred feet. In other embodiments, the spacing between ramping well bores 37304 may vary. Thus, the interval spacing between the first ramping well bore 37304 and the second ramping well bore 37304 may approximate one hundred feet; the interval spacing between the second ramping well bore 37304 and the third ramping well bore 37304 may approximate instead two hundred feet. One skilled in the art may recognize that the above described interval spacings are merely provided as an example. The interval spacings may include any appropriate interval spacing for effectively drilling ramping well bores 37304.

In particular embodiments, substantially horizontal well bore 37308 may be the main well bore of a drainage pattern. Substantially horizontal well bore 37308 may lie in the substantially horizontal plane of layer 37302 and intersect the large diameter cavity of the substantially vertical well bore.

Although well bore 37308 is described as substantially horizontal, one skilled in the art may recognize that substantially horizontal well bore 37308 need not necessarily be perfectly horizontal where the layer is not perfectly horizontal. Rather, substantially horizontal merely implies that the well bore 37308 is in conformance with the shape of the layer 37302. Thus, if layer 37302 inclines upward toward the earth's surface, substantially horizontal well bore 37308 may also incline toward the earth's surface in conformance with the plane of the layer 37302.

In other embodiments, substantially horizontal well bore 37308 may alternatively or additionally be lateral well bore extending from a main drainage well bore. For example, substantially horizontal portion 37308 may replace all or a part of the elongated portion of the lateral well bore. Multi-plane well bore pattern 37300 may merely include a main drainage well bore with ramping well bores 37304. Alternatively, multi-plane well bore pattern 37300 may include a main drainage well bore, lateral well bores, and ramping well bores 37304 extending from the main drainage well bore and/or the lateral well bores or any other combination thereof. Because ramping well bores 37304 may extend from lateral well bores or main drainage well bores, multi-plane drainage pattern may be modified as appropriate to adequately drain layer 37302.

Other variations and modifications may also be made to multi-plane well bore pattern 37300. Although FIG. 37 depicts a plurality of upwardly ramping well bores 37304*a* and downwardly ramping well bores 37304*b* extending from opposite sides of the substantially horizontal well bore 37308, multi-plane well bore pattern 37300 may include only upwardly ramping well bores 37304*a* or only downwardly ramping well bores 37304*b*. Additionally, upwardly ramping well bores 37304*a* and downwardly ramping well bores 37304*b* may mirror one another from opposite sides of the substantially horizontal portion 37308 or may be offset from one another. These modifications and others may be made to multi-plane well bore pattern 37300 as appropriate to allow for the removal and production of hydrocarbons and other mineral deposits from layer 37302. Gamma ray logging tools and conventional MWD technologies may be used to control the direction and orientation of the drill bit so as to retain the multi-plane drainage pattern 37300 within the confines of the upper boundary 37310 and lower boundary 37312, if appropriate, and to maintain proper spacing and orientation of ramping well bores 37304 and lateral well bores.

Figure 38:
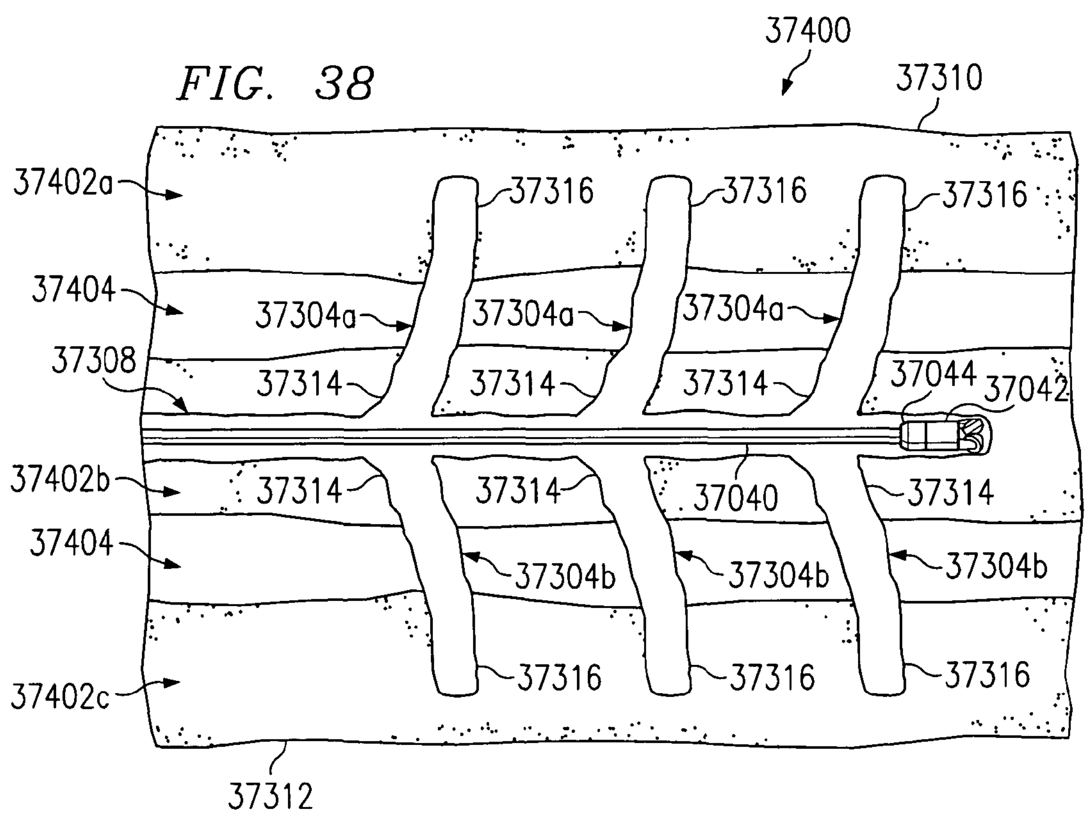
FIG. 38 is a cross-sectional diagram illustrating an example multi-plane well bore pattern for accessing multiple layers of subterranean deposits.

FIG. 38 is a cross-sectional diagram illustrating an example multi-plane drainage pattern 37400 for accessing deposits in multiple layers 37402 of subterranean deposits. Multi-plane drainage pattern 37400 may provide access to multiple layers 37402 of subterranean deposits that may be separated by impermeable or substantially impermeable material 37404 such as sandstone, shale, or limestone. In this embodiment, substantially horizontal portion 37308, upwardly ramping well bore 37304*a*, and downwardly ramping well bore 37304*b* may be formed as previously described in connection with FIG. 37.

Elongated portion 37316 of upwardly ramping well bores 37304*a* and downwardly ramping well bores 37304*b* may be of sufficient length to allow multi-plane drainage pattern 37400 to intersect multiple coal seams or multiple layers 37402 of any other subterranean zone. For example, ramping well bores 37304 may extend in a substantially vertical plane to provide access to an upper layer 37402*a* and a lower layer 37402*c*. Although only three subterranean layers 37402*a-c* are shown in FIG. 37, multi-plane drainage pattern 37400 may intersect any appropriate number of subterranean layers 37402 to effectively drain the subterranean zone. For example, upwardly ramping well bores 37304*a* and downwardly ramping well bores 37304*b* may travel through a number of subterranean layers 37402 separated by multiple layers of impermeable or substantially impermeable material 37404.

As was described with regard to FIG. 37, multi-plane drainage pattern 37400 may also include ramping well bores 37304 that extend from opposite portions of the elongated portion of the lateral well bores. Because ramping well bores 37304 may extend from lateral well bores or main drainage well bore, multi-plane drainage pattern 37400 may be modified as appropriate to adequately drain multiple layers 37402 of subterranean deposits. Thus, multi-plane well bore pattern 37400 may merely include a main drainage well bore with ramping well bores 37304. As alternative embodiments, multi-plane well bore pattern 37400 may include a main drainage well bore, lateral well bores, ramping well bores 37304 extending from the main drainage well bore and/or the lateral well bores, or any combination thereof. Other modifications and variations described with regard to FIG. 37 may be made to multi-plane drainage pattern 37400 as appropriate.

Figure 39:
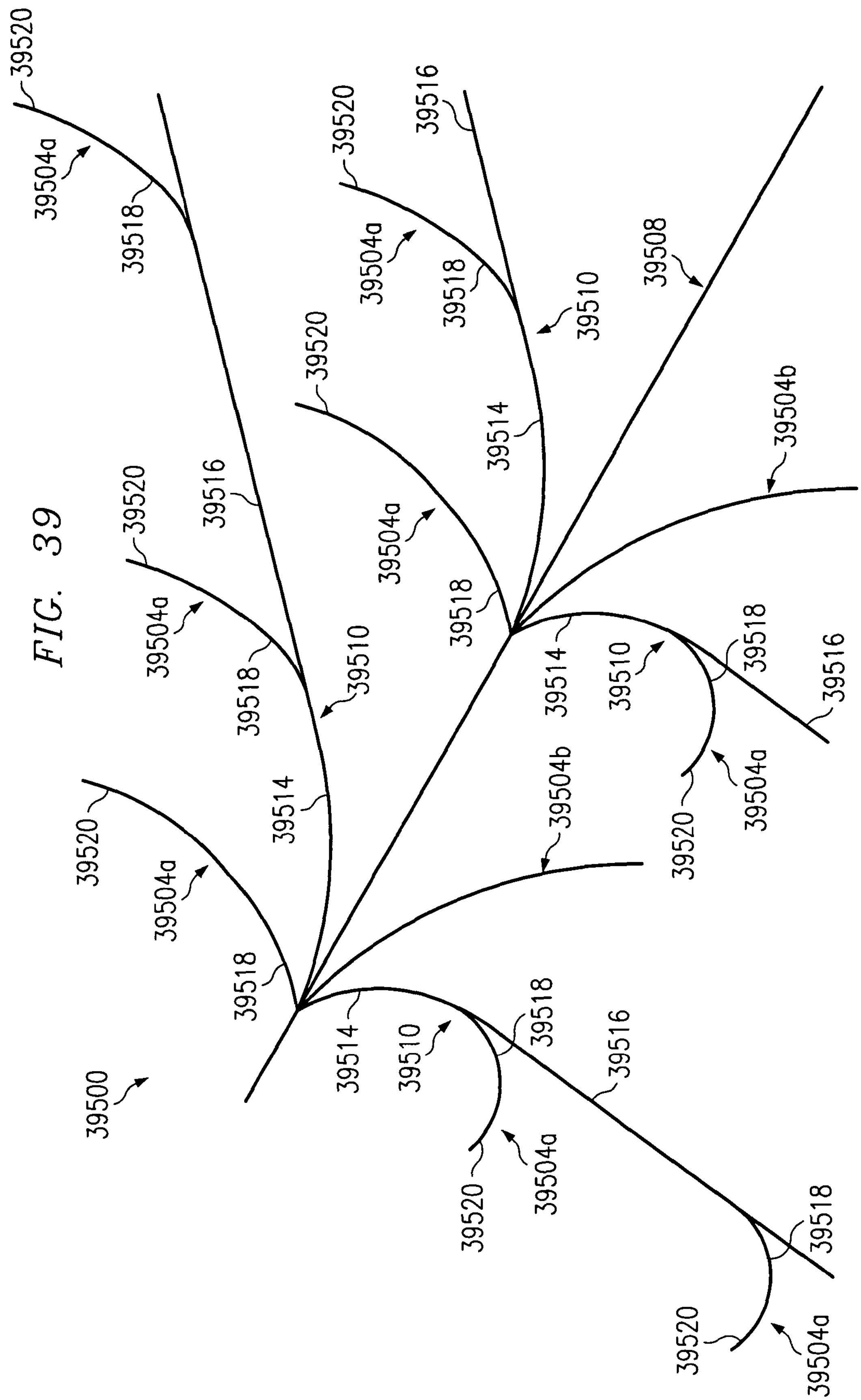
FIG. 39 is an isometric diagram illustrating an example multi-plane well bore pattern for accessing deposits in a subterranean zone.

FIG. 39 is an isometric diagram illustrating an example multi-plane drainage pattern 39500 for accessing deposits in a subterranean zone. In this embodiment, the substantially horizontal portions of both the main drainage well bore and the elongated portions of lateral well bores, are replaced with the substantially horizontal well bore 39308 described with regard to FIGS. 37 and 38. Thus, as illustrated, drainage pattern 39500 includes ramping well bores 39504 extending from the main drainage well bore 39508 and extending from each lateral well bore 39510. Alternatively, however, drainage pattern 39500 may include a main drainage well bore 39508 with ramping well bores 39504, lateral well bores 39510 extending from a main drainage well bore 39508 with ramping well bores 39504, or any combination thereof for producing entrained water, hydrocarbons, and other fluids from one or more layers. As was previously described, the multi-plane drainage pattern 39500 may provide access to a single, thick layer 39302 of subterranean deposits as was described with regard to FIG. 37. Alternatively, multi-plane drainage pattern 39500 may provide access to multiple layers 39402 of subterranean deposits separated by impermeable or substantially impermeable material such as sandstone, shale, or limestone, as was described with regard to FIG. 38.

In particular embodiments of the present invention, lateral well bores 39510 may extend from opposite sides of main drainage well bore 39508 to a periphery of the area being drained. Thus, a first set of lateral well bores 39510*a* may extend in spaced apart relation to each other from one side of main drainage well bore 39508. Similarly, a second set of lateral well bores 39510 may extend in spaced apart relation to each other from a second, opposite side of main drainage well bore 39508. The first and second sets of lateral well bores 39510 may mirror each other or may be offset from each other along the main drainage well bore 39508. In particular embodiments, pairs of lateral well bores 39510 may be substantially evenly spaced on each side of the main drainage well bore 39508 and extend from the main drainage well bore 39508 at an angle of approximately 45 degrees.

The interval spacing between ramping well bores 39504 may correspond to the spacing interval between lateral well bores 39510. If, for example, lateral well bores 39510 extend from the main drainage well bore 39508 at three hundred foot intervals, ramping well bores 39504 may also extend from the same point at three hundred foot intervals. In the illustrated embodiment of the present invention, a pair of lateral well bores 39510 and at least one ramping well bore 39504 intersect the main drainage well bore 39508 at a single location. The at least one ramping well bore 39304 may comprise an upwardly ramping well bore 39504*a*, a downwardly ramping well bore 39504*b*, or both. In an alternate embodiment, the at least one ramping well bore 39504 and pair of lateral well bores 39510 may not intersect the main drainage well bore 39508 at a single location. Additionally, the spacing between ramping well bores 39504 may not correspond to the spacing between lateral well bores 39510. For example, the interval spacing between ramping well bores 39504 may approximate three hundred feet, while the interval spacing between lateral well bores 39510 may approximate one hundred feet. One skilled in the art may recognize that the spacings described are merely exemplary. Any appropriate interval spacing may be used to adequately cover the area to be drained.

Further, the interval spacing between ramping well bores 39504 and/or lateral well bores 39510 may vary along main drainage well bore 39508. For example, the interval spacing between the first ramping well bore 39504 and the second ramping well bore 39504 may be approximately three hundred feet and the interval spacing between the second ramping well bore 39504 and the third ramping well bore 39504 may be approximately two hundred feet. Similarly, the interval spacing between the first lateral 39510 and the second lateral 39510 may be approximately one hundred feet, and the interval spacing between the second lateral 39510 and the third lateral 39510 may be approximately fifty feet. The interval spacings given above are also only exemplary. One skilled in the art may recognize that the interval spacings separating ramping well bores 39504 and/or lateral well bores 39510 may be any appropriate interval to provide access to the one or more layers of subterranean deposits.

Each lateral well bore 39510 may also include a radiused portion 39514 and an elongated portion 39516. The radiused portion 39514 may connect the lateral well bore 39510 to the main drainage well bore 39508 at a predetermined radius of curvature. The appropriate radius of curvature may be dictated by drilling apparatus capabilities and/or by the dimensions of the area to be drained by the multi-plane well bore pattern 39500. As previously described, each ramping well bore 39504 may include a radiused portion 39518 and an elongated portion 39520.

In particular embodiments, the radius of curvature of the radiused portion 39518 of the ramping well bore 39504 may be substantially equal to the radius of curvature of the radiused portion 39514 of the lateral well bores 39510. For example, if the radius of curvature for radiused portion 39514 is three hundred feet, the radius of curvature for radiused portion 39518 may also be three hundred feet. Alternatively, the radius of curvature of the radius portion 39518 of the ramping well bore 39504 may not correspond with the radius of curvature of the radiused portion 39514 of the lateral well bore 39510. Thus, while the radius of curvature for radiused portion 39514 may be approximately three hundred feet, the radius of curvature of radiused portion 39518 may be approximately two hundred feet. Accordingly, the multi-plane drainage pattern 39500 may be customized as is necessary to optimize the draining of the one or more layers of subterranean deposits. The invention is not limited to the radius of curvature dimensions given above. Rather, the radius of curvature dimensions are merely exemplary. It may be recognized by one skilled in the art that the radius of curvature of either radiused portion 39514 or 39518 may be any appropriate radius of curvature to provide access to the layer or layers of subterranean deposits.

A number of other variations and modifications may also be made to multi-plane well bore pattern 39500 as appropriate to allow for the removal and production of hydrocarbons and other mineral deposits from one or more layers of subterranean deposits. For example, although FIG. 39 depicts a plurality of upwardly ramping well bores 39504*a* and downwardly ramping well bores 39504*b* extending from opposite sides of the main drainage well bore 39508, multi-plane well bore pattern 39500 may include only upwardly ramping well bores 39504*a* or only one downwardly ramping well bores 39504*b*. Other suggested modifications were described with regards to FIGS. 37 and 38 and may be appropriately applied to the embodiment of FIG. 39.

Figure 40:
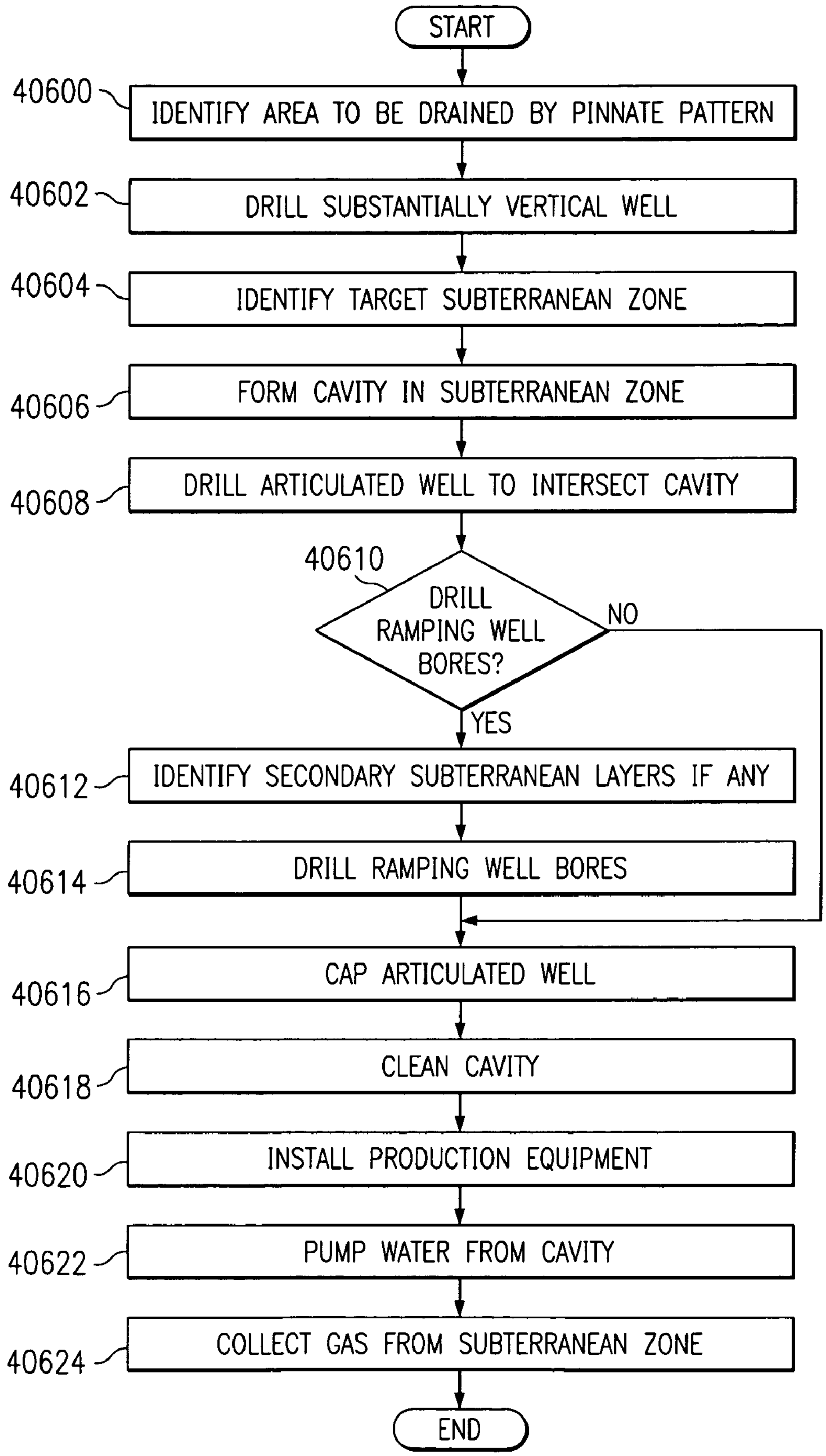
FIG. 40 is a flow diagram illustrating an example method for producing gas from a subterranean zone.

FIG. 40 is a flow diagram illustrating an example method for producing gas from a subterranean zone. In this embodiment, the method begins at step 40600 in which areas to be drained and drainage patterns to be used in the areas are identified. For example, drainage patterns 40300, 40400, or 40500 may be used to provide optimized coverage for the region. It will be understood that any other suitable patterns may also or alternatively be used to degasify one or more layers of subterranean deposits.

Proceeding to step 40602, the substantially vertical well is drilled from the surface through the subterranean zone. Next, at step 40604, down hole logging equipment is used to exactly identify the location of the target layer of subterranean deposits in the substantially vertical well bore. At step 40606, the enlarged diameter cavity may be formed in the substantially vertical well bore at a location within the target layer of subterranean deposits. As previously discussed, the enlarged diameter cavity may be formed by under reaming and other conventional techniques. Next, at step 608, the articulated well bore is drilled to intersect the enlarged diameter cavity. It should be understood that although the drilling of a dual well system is described in steps 40602-40608, any other appropriate technique for drilling into subterranean deposits may be used. After the subterranean deposits are reached, a drainage pattern may then be drilled in the deposits, as described below.

At decisional step 40610, it is determined whether ramping well bores 40504 should be drilled. Ramping well bores 40504 may extend upwardly or downwardly from a main drainage well bore 40508. In deciding whether to drill ramping well bores 40504, the size and accessibility of the layer or layers of subterranean deposits may be considered. In one embodiment of the present invention, it may be desirable to drill ramping well bores 40504 to access minerals, gas, and water within a single, thick layer 40302 of subterranean deposits. Alternatively, ramping well bores 40504 may provide access to multiple layers 40402 of subterranean deposits that may be separated by impermeable or substantially impermeable material 40404 such as shale, limestone, or sandstone. If at decisional step 40610 it is determined that ramping well bores 40504 should not be drilled, steps 40612 through 40614 are skipped and the method proceeds directly to step 40616. If instead, however, it is determined at decisional step 40610 that that ramping well bores 40504 should be drilled, any secondary subterranean layers 40402 of subterranean deposits, if any, may be identified at step 40612. Ramping well bores 40504 are drilled at step 40614.

At step 40616, the articulated well bore may be capped. Next, at step 40618, the enlarged cavity is cleaned in preparation for installation of downhole production equipment. The enlarged diameter cavity may be cleaned by pumping compressed air down the substantially vertical well bore or by other suitable techniques. At step 40620, production equipment is installed in the substantially vertical well bore. The production equipment may include a sucker rod pump extending down into the cavity. The sucker rod pump may be used to remove water from the layer or layers of subterranean deposits. The removal of water will drop the pressure of the subterranean layers and allow gas to diffuse and be produced up the annulus of the substantially vertical well bore.

Proceeding to step 40622, water that drains from the drainage pattern into the cavity is pumped to the surface with the rod pumping unit. Water may be continuously or intermittently pumped as needed to remove it from the cavity. Additionally or alternatively, the drainage pattern may be used for environmental remediation purposes to treat or recover underground contaminants posing a danger to the environment. For example, the drainage pattern and cavity may be used to inject a treatment solution into a contaminated coal seam or surrounding area, recover byproducts from the contaminated coal seam or surrounding area, or strip recoverable product from the coal seam. The drainage pattern may also be used for the sequestration of gaseous emissions. For example, gaseous emissions such as carbon dioxide entrained in a carrier medium may be injected into the pattern with the aid of a surface pump. At step 40624, gas diffused from the subterranean zone is continuously collected at the surface. Upon completion of production, the method is completed.

Figure 41A:
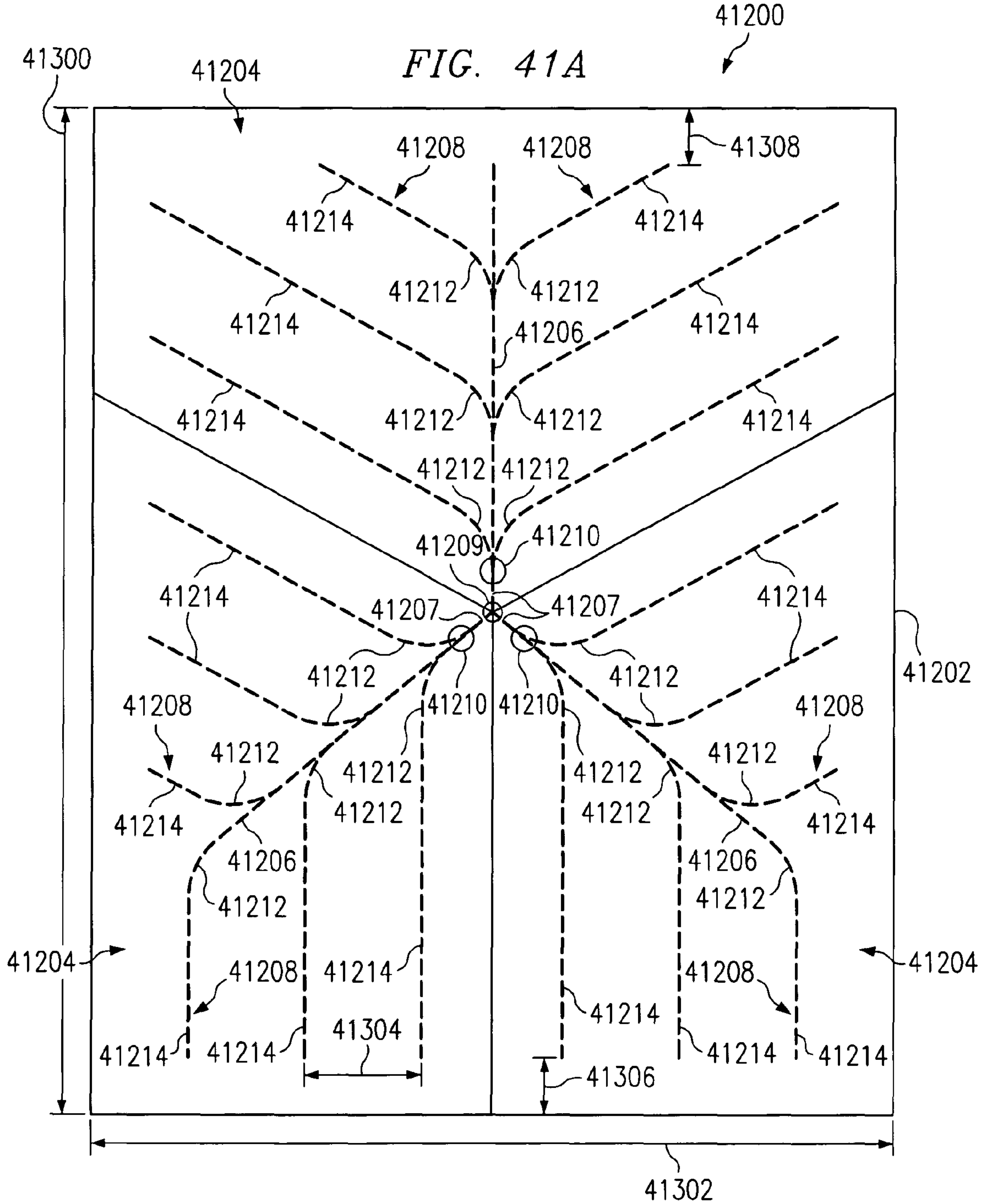
FIG. 41A is top plan diagram illustrating an example tri-pinnate drainage pattern for accessing deposits in a subterranean zone.

FIG. 41A is top plan diagram illustrating an example tri-pinnate drainage pattern for accessing deposits in a subterranean zone. In this embodiment, the tri-pinnate pattern 41200 provides access to a substantially rectangular area 41202 of a subterranean zone. In one particular embodiment, rectangular area 41202 has a length of 41300 of approximately 6980 feet and a width 41302 of approximately 5450 feet; however any suitable dimensions may be utilized. A number of tri-pinnate patterns 41200 may be used together to provide uniform access to a large subterranean region.

The tri-pinnate pattern 41200 includes three discrete well bore patterns 41204 each draining a portion of a region covered by the tri-pinnate pattern 41200. Each of the well bore patterns 41204 includes a main drainage well bore 41206 and a set of lateral well bores 41208 extending from the main well bore 41206. In tri-pinnate pattern 41200, each of the main drainage well bores 41206 extends from a respective articulated well bore 41207. The articulated well bores 41207 of each well bore pattern 41204 may initiate from a common surface point 41209. Thus, the articulated well bores 41207 of each well bore pattern 41204 may initiate together and share a common portion for a desired distance below the earth's surface before diverging into different directions. Each main drainage well bore 41206 intersects a respective surface well bore 41210. Fluid and/or gas may be removed from or introduced into the subterranean zone through the respective surface well bores 41210 in communication with the main drainage well bores 41206. This allows tighter spacing of the surface production equipment, wider coverage of a well bore pattern and reduces drilling equipment and operations.

Each main drainage well bore 41206 may be formed at a location relative to other main drainage well bores 41206 to accommodate access to a particular subterranean region. For example, main drainage well bores 41206 may be formed having a spacing or a distance between other adjacent main drainage well bores 41206 to accommodate access to a subterranean region such that only three main drainage well bores 41206 are required. Thus, the spacing between adjacent main drainage well bores 41206 may be substantially equal or may vary to accommodate the unique characteristics of a particular subterranean resource. For example, in the embodiment illustrated in FIG. 41A, the spacing between each main drainage well bore 41206 is substantially equal at an angle of approximately 120 degrees from each other, thereby resulting in each well bore pattern 41204 extending in a direction approximately 120 degrees from an adjacent well bore pattern 41204. However, other suitable number of well bores, well bore spacing angles, patterns or orientations may be used to accommodate the characteristics of a particular subterranean resource.

Each well bore pattern 41204 may also include a set of lateral well bores 41208 extending from the main drainage well bore 41206. In one particular embodiment; the lateral well bores 41208 are separated by a distance of 41304 of approximately 800 feet; however, other spacings may be utilized. In that same embodiment; lateral well bores 41208 terminate at a distance 41308 approximately 400 feet from an edge of rectangular area 41202; however, other dimensions may be utilized. The lateral well bores 41208 may mirror each other on opposite sides of the main drainage well bore 41206 or may be offset from each other along the main drainage well bore 41206. In the embodiment illustrated in FIG. 41, tri-pinnate drainage pattern 41200 includes a combination of both mirroring lateral well bores 41208 and offset lateral well bores 41208. Each of the lateral well bores 41208 includes a radiused portion 41212 extending from the main drainage well bore 41206 and an elongated portion 41214 formed after the radiused portion 41212 has reached a desired orientation. For uniform coverage of the substantially rectangular area 41202, pairs of lateral well bores 41208 may be disposed substantially equally spaced on each side of the main well bore 41206 and may extend from the main drainage well bore 41206 at an angle of approximately 60 degrees. The lateral well bores 41208 may shorten in length based on progression away from the enlarged diameter cavity in order to facilitate drilling of the lateral well bores 41208.

In a particular embodiment, a tri-pinnate drainage pattern 41200 including three main drainage well bores 41206 and three pairs of lateral well bores 41208 extending from each main drainage well bore 41206 may drain a substantially rectangular area 41202 of approximately 873 acres in size. Where a smaller area is to be drained, or where the substantially rectangular area 41202 has a different shape, such as a long, narrow shape, or due to surface topography, alternate tri-pinnate drainage patterns may be employed by varying the angle of the lateral well bores 41208 to the main drainage well bore 41206 and the orientation of the lateral well bores 41208. Thus, the quantity, spacing, and angular orientation of lateral well bores 41208 may be varied to accommodate a variety of resource areas, sizes and well bore requirements. As described above, multiple tri-pinnate drainage patterns 41200 may be positioned or nested adjacent each other to provide substantially uniform access to a subterranean zone. It should be understood that the length of lateral well bores 41208 and their direction may be varied as appropriate to create an appropriately shaped drainage pattern 41200 to allow nesting of multiple drainage patterns 41200. Such appropriate shapes may include rectangles and other quadrilaterals of any size as well as any other polygonal or other shape suitable for nesting.

The main drainage well bores 41206 and the lateral well bores 41208 may be formed by drilling through the enlarged diameter cavity using the articulated drill string and any appropriate horizontal drilling apparatus. During this operation, gamma ray logging tools and conventional MWD technologies may be employed to control the direction and orientation of the drill bit so as to retain the drainage pattern within the confines of the subterranean zone and to maintain proper spacing and orientation of the main drainage well bores 41206 and lateral well bores 41208.

Figure 41B:
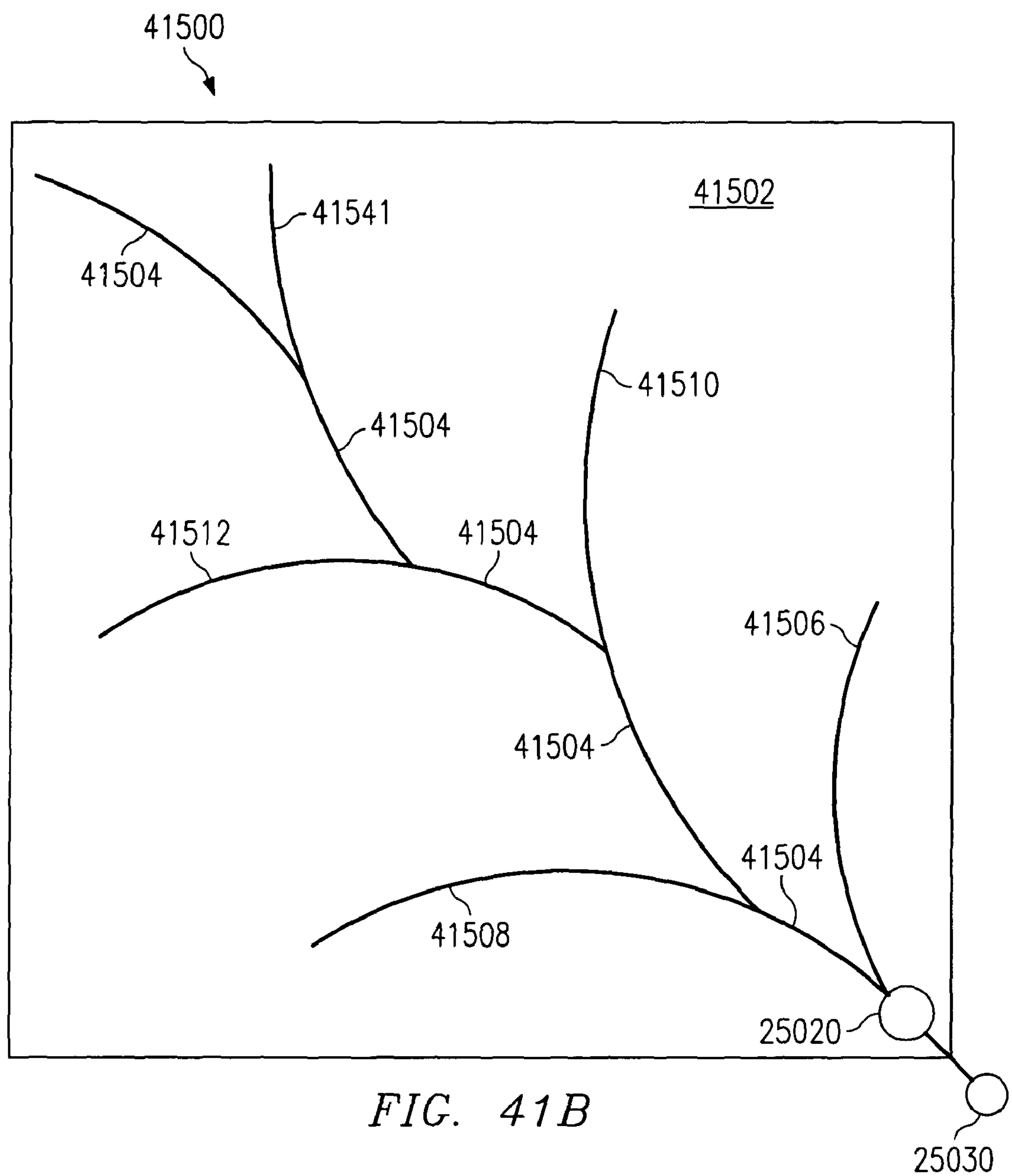
FIG. 41B is a top plan diagram illustrating another example drainage pattern for accessing deposits in a subterranean zone.

FIG. 41B illustrates a pinnate well bore pattern 41500 in accordance with one embodiment of the present invention. This pinnate well bore pattern is analogous to the pattern of FIG. 25, except that the main well bore pattern and laterals extending from the main well bore pattern are curved, due to the method utilized in their formation, as described below. In this embodiment, the pinnate well bore pattern 41500 provides access to a substantially square area 25102 of a subterranean zone. A number of the pinnate well bore patterns 41500 may be used together to provide uniform access to a large subterranean region.

Referring to FIG. 41B, the pinnate pattern 41500 includes a main well bore 41504 extending across the coverage area 41502 to a distant corner of the area 41502. The well bore 41504 may be drilled using an articulated drill that extends from the enlarged cavity 25020 in alignment with the articulated well bore 25030, as described below. Also illustrated in FIG. 41B are a plurality of lateral well bores (41506, 41508, 41510, 41512, and 41541) extending from well bore 41504.

Formation of main well bore 41504 and the lateral well bores may occur as follows. An articulated drill extending from the enlarged cavity 25020 drills curved lateral well bore 41506. Then the articulated drill is backed out through lateral 41506. A curved portion of main well bore 41504 as well as curved lateral well bore 41508 is then drilled. Then the articulated drill is backed out to the intersection of lateral well bore 41508 and main well bore 41504 and the process continues until the well more pattern of 41500 is formed. In one embodiment of the invention, drilling curved lateral and curved portion of the main well bore pattern in such a manner facilitates reformation of the laterals if they were to collapse.

Figure 42:
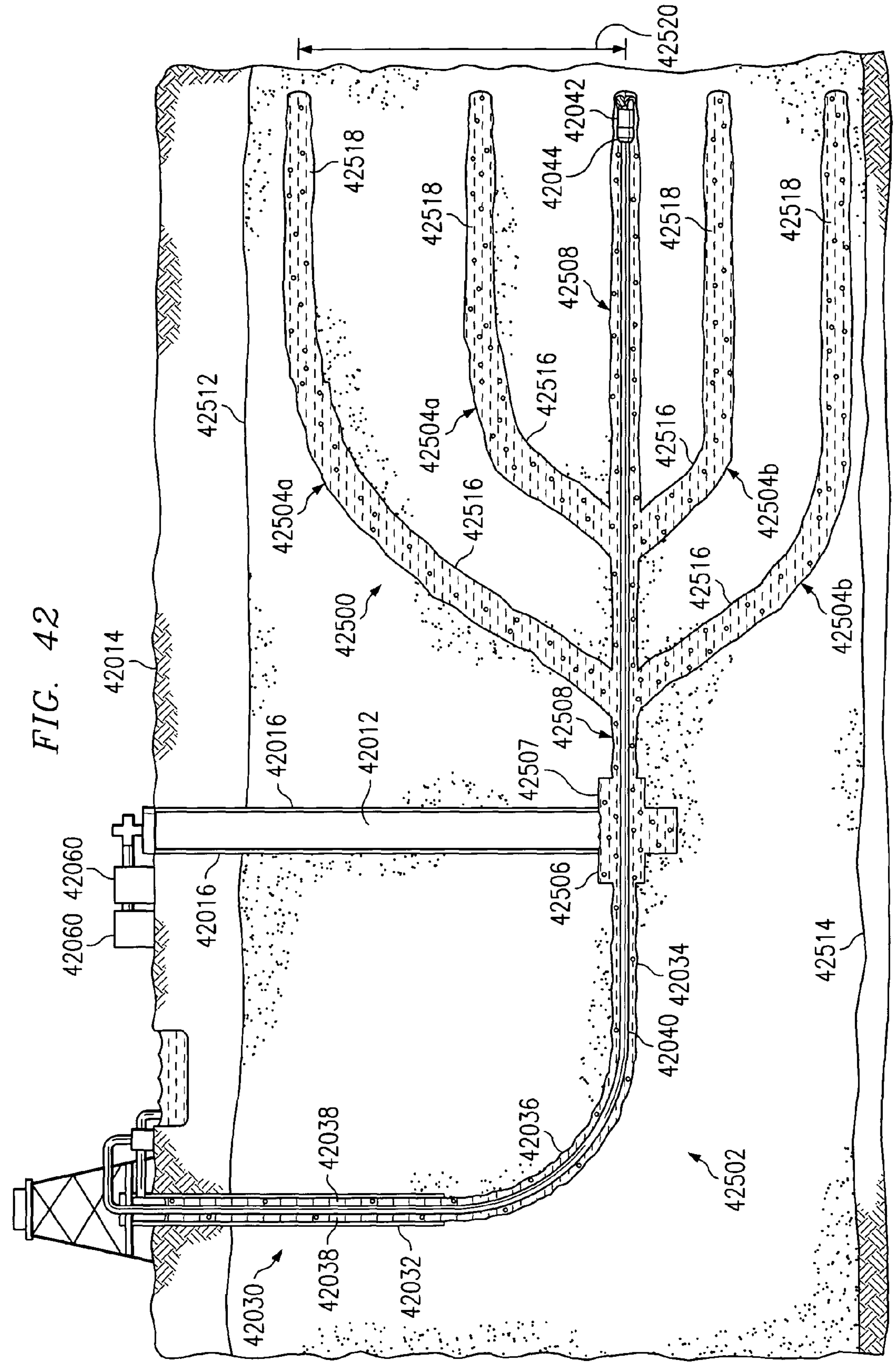
FIG. 42 is a cross-sectional diagram illustrating formation of an example multi-level drainage pattern in a single, thick layer of subterranean deposits using a single cavity.

FIG. 42 is a cross-sectional diagram illustrating formation of an example multi-level drainage pattern 42500 in a single, thick layer 42502 of subterranean deposits using a single cavity well 42506. In this embodiment, the layer 42502 of subterranean deposits may be a coal seam or any other subterranean zone that can be accessed using a dual well system for removing and/or producing water, hydrocarbons, and other fluids in the zone and to treat minerals prior to mining operations. For example, the layer 42502 of subterranean deposits may be approximately fifty feet thick as measured from an upper boundary 42512 closest to the earth's surface to a lower boundary 42514 furthest from the earth's surface. In the illustrated embodiment, an articulated well bore and a substantially vertical well bore are formed.

As described above, after the enlarged diameter cavity has been successfully intersected by the articulated well bore, drilling may be continued through the cavity using the articulated drill string and appropriate horizontal drilling apparatus to form a drainage pattern 42500 in the subterranean layer 42502. Drainage pattern 42500 may initiate from cavity as main well bore 42508. The enlarged diameter cavity 42506 provides a junction for the intersection of the substantially vertical well bore with the articulated well bore. The enlarged diameter cavity 42506 also provides a collection point for fluids drained from subterranean layer 42502 during production operations. Substantially vertical well bore may extend below the enlarged diameter cavity 42506 to form a sump 42507 for the cavity 42506.

Main well bore 42508 may extend beyond the cavity 42506 and continue through the substantially horizontal plane of layer 42502. Additional secondary well bores 42504 may extend from the main well bore 42508 to form drainage pattern 42500. Specifically, the main well bore 42508 (and secondary well bores 42504, described below) may be main well bore. In one embodiment, the main well bore 42508 and elongated portions 42518 of the secondary well bores 42504 may lie in the substantially horizontal plane of layer 42502. One skilled in the art may recognize, however, that the main well bore 42508 and elongated portions 42518 may not be perfectly horizontal where the layer 42502 itself is not perfectly horizontal. Rather, substantially horizontal merely implies that the well bores are in conformance with the shape of layer 42502. Thus, if layer 42502 slopes toward the earth's surface, the substantially horizontal portion 42034 may also be slope toward the earth's surface in conformance with layer 42502.

In one embodiment of the present invention, multi-level drainage pattern 42500 includes at least one secondary well bore 42504. Secondary well bore 42504 may extend upwardly from main well bore 42508 toward an upper boundary 42512 of layer 42502. Alternatively or additionally, secondary well bore 42504 may extend downwardly from main well bore 42508 toward a lower boundary 42514 of layer 42502. Each secondary well bore 42504 may include a curving portion 42516 that extends from and intersects with main well bore 42508. Each secondary well bore 42504 may also include an elongated portion 42518. The elongated portions 42518 of secondary well bores 42504 and the main well bore 42508 may lie substantially parallel to one another. Elongated portions 42518, as with main well bore 42508, may then extend through the layer 42502 to be drained.

Curving portion 42514 may extend from the main well bore 42508 at a predetermined radius of curvature. The appropriate radius of curvature may be dictated by drilling apparatus capabilities and by the size of the layer to be drained by multi-level drainage pattern 42500. Additionally, the radius of curvature may be dictated by a desired span 42520 that is the distance from the centerline of the main well bore 42508 to the centerline of elongated portion 42518 of secondary well bore 42504.

In one embodiment of the present invention, a pair of secondary well bores 42504 may extend upwardly and downwardly from the top and bottom, respectively, of main well bore 42508. In this embodiment, upwardly and downwardly extending secondary well bores 42504 may substantially mirror each other. Alternatively, multi-level drainage pattern 42500 may include upwardly and downwardly secondary well bores 42504 positioned to offset one another. Although FIG. 42 depicts multi-level drainage pattern 42500 as including a plurality of upwardly and downwardly extending secondary well bores 42304, multi-level drainage pattern 42500 may also include merely a single upwardly extending secondary well bore 42504*a* or a plurality of upwardly extending secondary well bores 42504*a*. Alternatively, multi-level drainage pattern 42500 may include merely a single downwardly extending secondary well bore 42504*b* or a plurality of downwardly extending secondary well bores 42504*b*. Thus, a number of configurations and modifications may be made to multi-level drainage pattern 42500 without departing from the intended scope of the invention.

In particular embodiments, a technical advantage of the multi-level drainage pattern may include the ability to drain a substantially larger area of the subterranean without requiring the formation of additional articulated well bores. Consequently, the vertical well bore must only be intercepted once. Although a MWD device may be used to control the direction and orientation of articulated well bore below the surface, the intersection of multiple articulated well bores with vertical well bore may be challenging and time-consuming.

Figure 43:
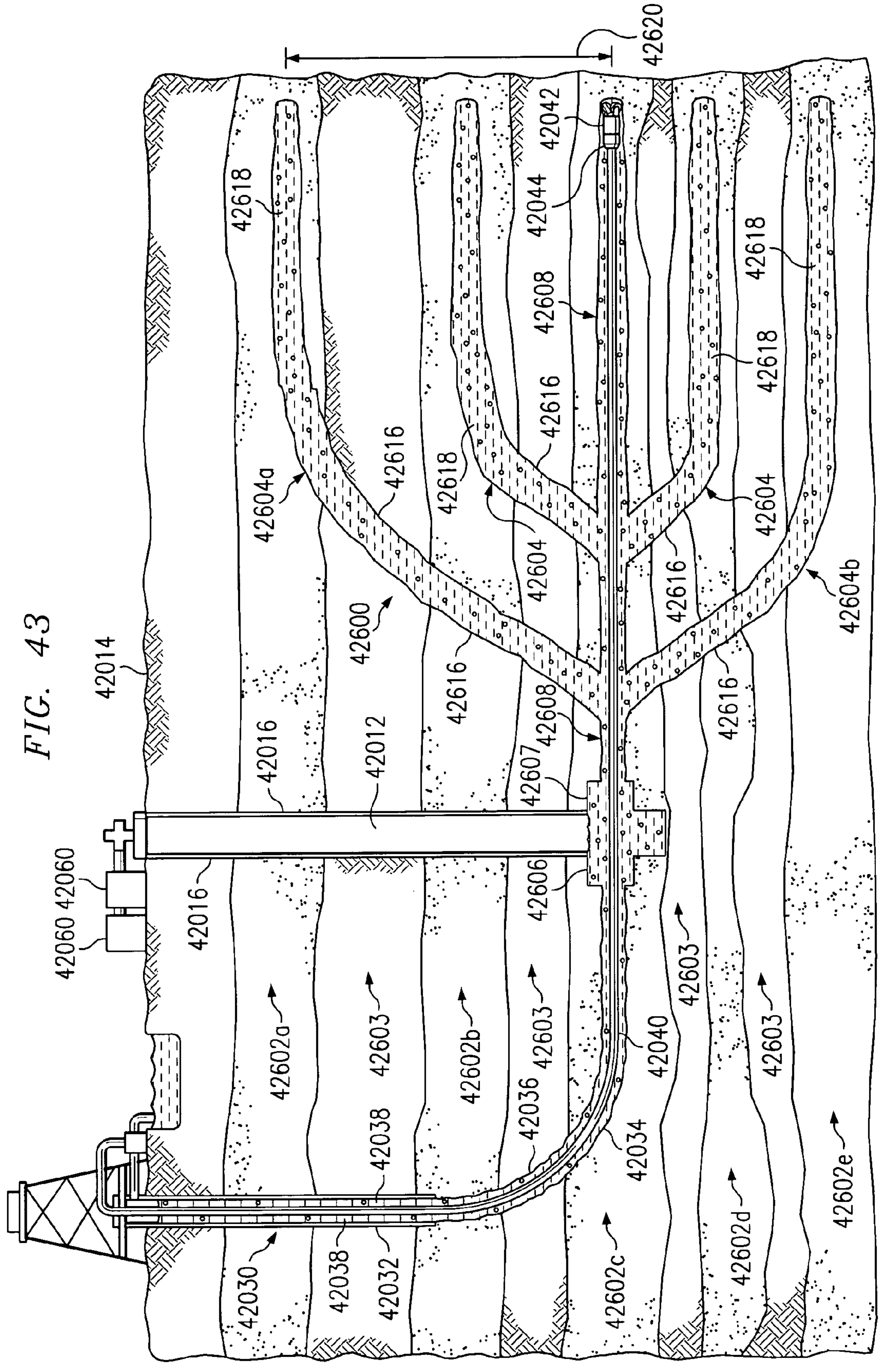
FIG. 43 is a cross-sectional diagram illustrating formation of an example multi-level drainage pattern in multiple layers of subterranean deposits using a single cavity.

FIG. 43 is a cross-sectional diagram illustrating formation of an example multi-level drainage pattern 42600 in multiple layers 42602 of subterranean deposits using a single cavity 42020. Multi-level drainage pattern 42600 may provide uniform access to multiple layers 42602 of subterranean deposits that may be separated by impermeable or low permeability material 42603 such as sandstone, shale, or limestone. In this embodiment, articulated well bore 42030, vertical well bore 42012, main well bore 42608, and secondary well bores 42604 are formed as previously described in connection with FIG. 8.

Main well bore 42608 may be drilled into a target layer 42602*c*. Curving portion 42616 of secondary well bore 42604 may be of a sufficient length and radius of curvature to allow multi-level drainage pattern 42600 to intersect multiple layers 42602 of a coal seam or any other subterranean zone. For example, curving portion 42616 of secondary well bore 42604*a* may extend a desired span 42620 to provide access to an upper layer 42602*a* and any intermediate layers 42602*b*. Similarly, curving portion 42616 of secondary well bore 42604*b* may extend downwardly to provide access to a lower layer 42602*e* and any intermediate layers 602*d*. Although five layers 42602*a-e* are shown in FIG. 43, multi-level drainage pattern 42600 may intersect any appropriate number of layers 42602. For example, upwardly extending secondary well bores 42604 and downwardly extending secondary well bores 42604 may be drilled in a number of layers 42602 separated by multiple layers of impermeable or substantially impermeable material 42603. The orientation and direction of secondary well bores 42604 may be controlled using gamma ray logging tools and conventional MWD devices to direct the well string 42040 to the desired layers 42602. Elongated portion 42618 of secondary well bores 42604 may then lie substantially parallel to main well bore 42608 and extend to the periphery of the area being drained (as with main well bore 42608).

Figure 44:
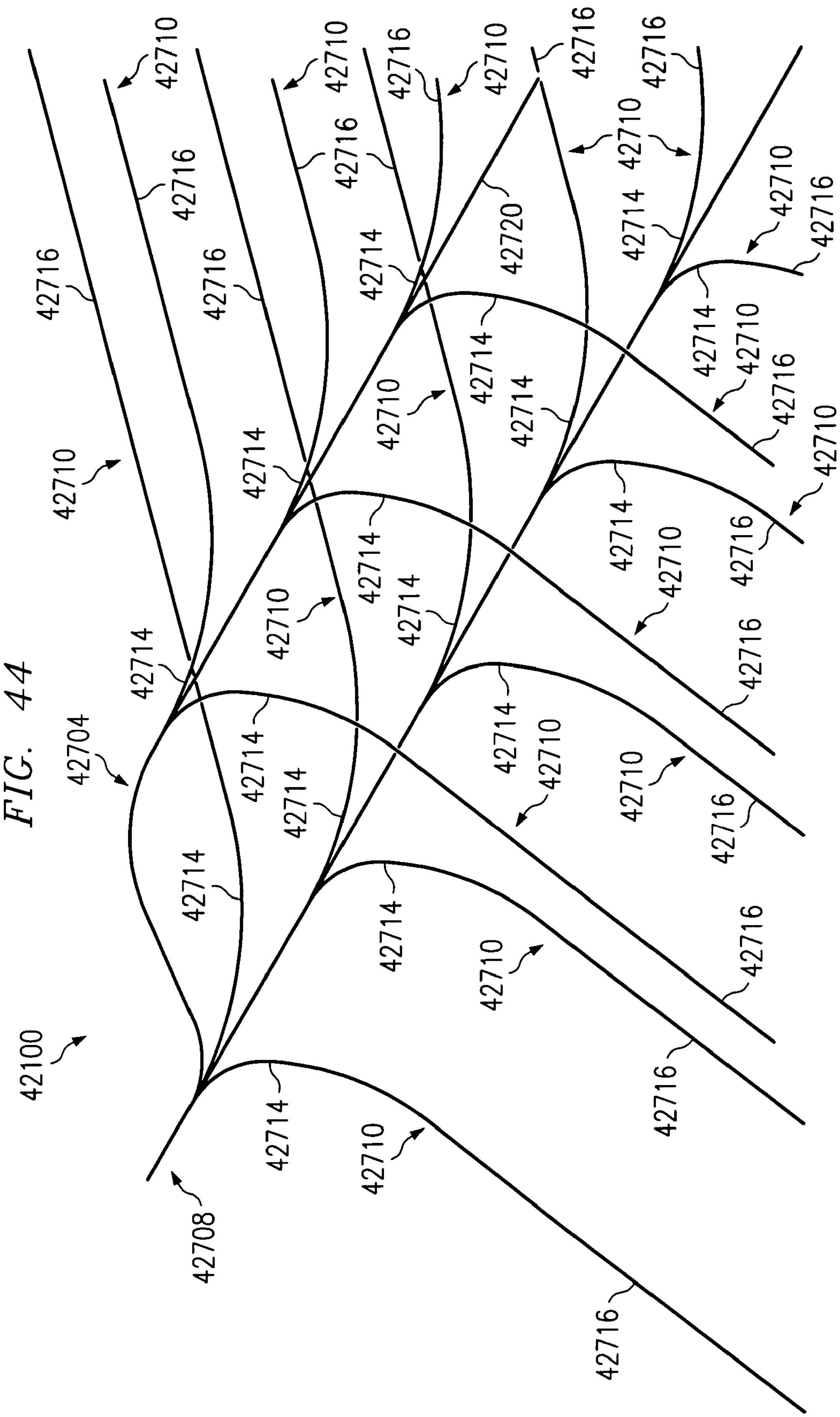
FIG. 44 is an isometric diagram illustrating an example multi-level drainage pattern for accessing deposits in a subterranean zone.

FIG. 44 is an isometric diagram illustrating an example multi-level drainage pattern 42700 for accessing deposits in a subterranean zone. As illustrated, multi-level drainage pattern 42700 includes secondary well bores 42704 extending upwardly from a main well bore 42708. Additionally (but not shown), secondary well bores 42704 may extend downwardly from the main well bore 42708. Secondary well bores 42704 may include a curving portion 42718 that transitions into an elongated portion 42720. Elongated portion 42720 may extend in a substantially horizontal plane that may be parallel to main well bore 42708. As previously described, multi-level drainage pattern 42700 may provide access to a single, thick layer 42502 of subterranean deposits, as was described with regard to FIG. 42. Alternatively, multi-level drainage pattern 42700 may provide access to multiple layers 42602 of subterranean deposits separated by impermeable or substantially impermeable material such as sandstone, shale, or limestone, as was described with regard to FIG. 43.

In addition to secondary well bores 42704, multi-level drainage pattern 42700 may also include multiple lateral well bores 42710 extending from opposite sides of main well bore 42608. Lateral well bores 42710 may extend to a distant point in the area being drained. Thus, a first set of lateral well bores 42710*a* may extend in spaced apart relation to each other from one side of main well bore 42708. Similarly, a second set of lateral well bores 42710*b* may extend in spaced apart relation to each other from an opposite sides of main well bore 42708. The lateral well bores 42710 may mirror each other on opposite side of the main well bore 42708 or may be offset from each other along main well bore 42708. Each lateral well bore may also include a radiused portion 42714 that transitions into an elongated portion 42716. The radiused portion 42714 may connect the lateral well bore 42710 to the main well bore 42708 at a predetermined radius of curvature. The appropriate radius of curvature may be dictated by drilling apparatus capabilities and by the area to be drained by multi-level drainage pattern 42700. Pairs of lateral well bores 42710 may be substantially evenly spaced apart on each side of the main well bore 42708 and may extend from the main well bore 42708 at an angle of approximately 45 degrees.

Although lateral well bores 42710 and secondary well bores 42704 are shown as extending from a common point on main well bore 42708, lateral well bores 42710 and secondary well bores 42704 may extend from uncommon points. For example, although lateral well bores 42710 may be evenly spaced at one hundred foot intervals, the first upwardly extending secondary well bore 42704 may extend from the main well bore a distance of fifty feet from the cavity well. In other embodiments, lateral well bores 42710 may be unevenly spaced such that the distance between the first lateral well bore 42710 and the second lateral well bore 42710 may be one hundred feet, while the distance between the second lateral well bore 42710 and the third lateral well bore 42710 may be fifty feet. Above described interval spacings are merely exemplary. One of ordinary skill in the art may recognize that any appropriate interval spacing may be used to drain the layers of subterranean deposits.

Multi-level drainage pattern 42700 may also include a plurality of lateral well bores 42710 extending from opposite sides of the elongated portion 42720 of one or more secondary well bores 42704. Lateral well bores 42710 that extend from elongated portion 720 may be formed as described above. Thus, lateral well bores 710 may extend from elongated portion 42720 and mirror one another or lateral well bores 42710 may be positioned to offset one another. Additionally, radiused portion 714, which may connect the lateral well bore 42710 to elongated portion 42720, may be formed at a predetermined radius of curvature. The radius of curvature of lateral well bores 42710 extending from elongated portion 42720 may be substantially equal to the radius of curvature for lateral well bores 42710 extending from main well bore 708. Additionally, or alternatively, the radius of curvature of lateral well bores 42710 extending from elongated portion 42720 may be substantially equal to the radius of curvature of curving portion 42718 of secondary well bore 42704.

Thus, multi-level drainage pattern 42700 for removing and/or producing entrained water, hydrocarbons, and other deposits from one or more layers of subterranean deposits may be customized as is appropriate. Multi-level drainage pattern 42700 may also be customized for the remediation or treatment of a contaminated area within the coal seam or the sequestration of gaseous emissions within the pattern. Although FIG. 44 depicts a plurality of upwardly extending secondary well bores 42704 and outwardly extending lateral well bores 42710, multi-level drainage pattern 42700 may include only upwardly extending secondary well bores 42704, only downwardly extending secondary well bores 42704, or both upwardly and downwardly extending well bores 42704. Additionally, multi-level drainage pattern 42700 may or may not include lateral well bores 42710. After drilling of the various well bores is completed, articulated drill string may be removed and the articulated well bore capped as was described above. Because gravity will facilitate drainage of fluids from secondary well bores 42704 extending upwardly, it may be advantageous in particular embodiments to drill only upwardly extending secondary well bores 42704*a*. Fluids from secondary well bores 42704 and lateral well bores 42710 may flow toward the enlarged diameter cavity 42506 and collected therein. Accumulated fluids may be collected from secondary well bores 42504

(and lateral well bores 42710, if appropriate) and removed via a down hole pump disposed in the enlarged diameter cavity 506.

Figure 45:
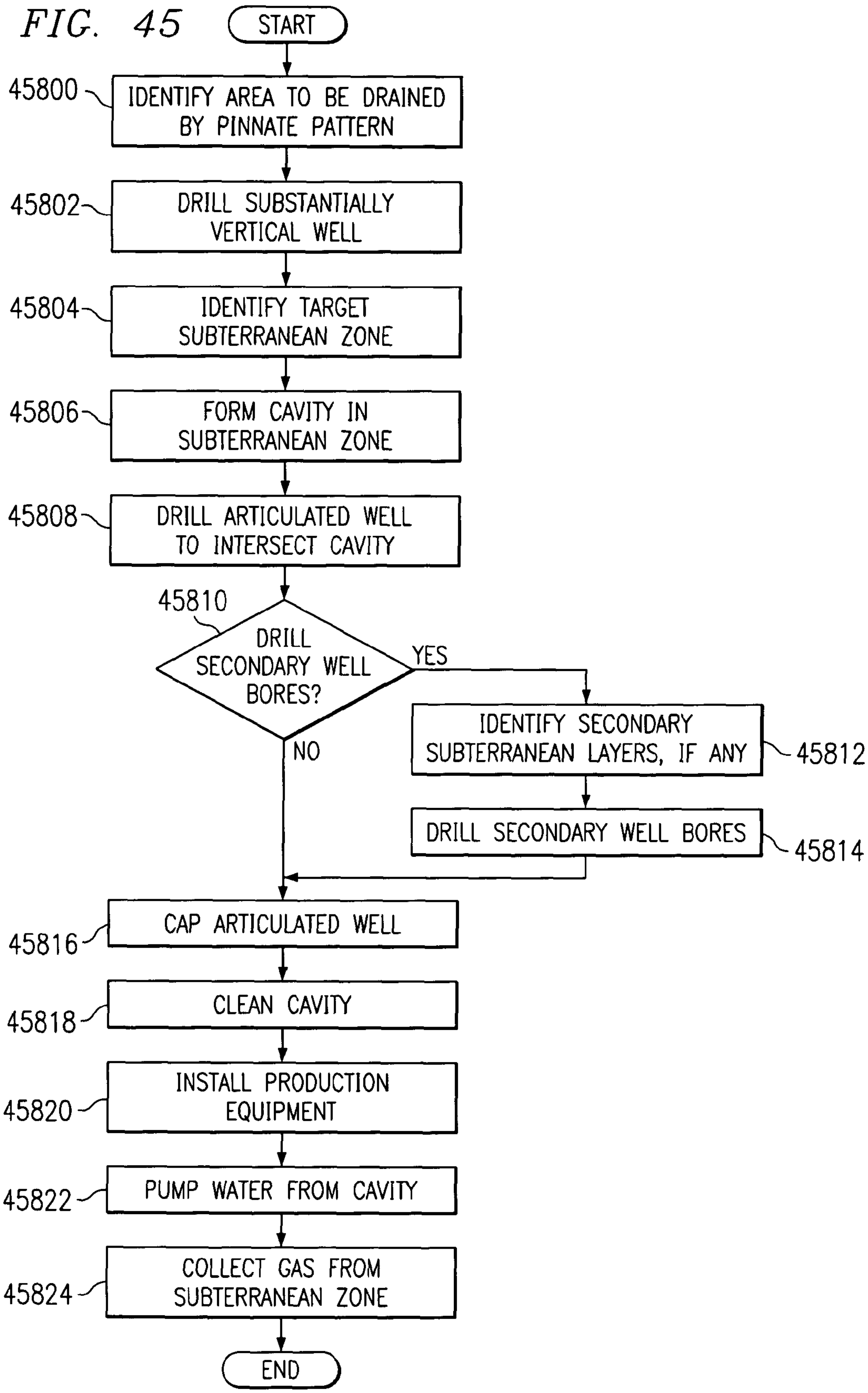
FIG. 45 is a flow diagram illustrating an example method for producing gas from a subterranean zone.

FIG. 45 is a flow diagram illustrating an example method for producing gas from a subterranean zone. In this embodiment, the method begins at step 45800 in which areas to be drained and drainage patterns to be used in the areas are identified. For example, drainage patterns 42,500, 42600, or 42700 may be used to provide optimized coverage for the region. It will be understood that any other suitable patterns may also or alternatively be used to degasify one or more layers of subterranean deposits.

Proceeding to step 45802, the substantially vertical well is drilled from the surface through the subterranean zone. Next, at step 45804, down hole logging equipment is utilized to exactly identify the location of the target layer 42502 or 42602*c* of subterranean deposits in the substantially vertical well bore. At step 45806, the enlarged diameter cavity is formed in the substantially vertical well bore at a location within the target layer 42502 or 42602*c* of subterranean deposits. As previously discussed, the enlarged diameter cavity may be formed by under reaming and other conventional techniques. Next, at step 45808, the articulated well bore is drilled to intersect the enlarged diameter cavity. It should be understood that although the drilling of a dual well system is described in steps 45802-45808, any other appropriate techniques for drilling into subterranean deposits may be used. After the subterranean deposits are reached, a drainage pattern may then be drilled in the deposits, as described below.

At decisional step 45810, a determination is made as to whether secondary well bores 42504 should be drilled. Secondary well bores 42504 may extend upwardly and/or downwardly from the main well bore 42508 to provide access to minerals within a single, thick layer 42502 of subterranean deposits. Alternatively, secondary well bores 42504 may be used to access minerals within multiple layers 42502 of subterranean deposits separated by impermeable or substantially impermeable material 42603 such as limestone, shale, or sandstone. If at decisional step 45810 it is determined that secondary well bores 42504 should not be drilled, steps 45812 through 45814 are skipped and the method proceeds directly to step 45816. If, instead, it is determined at decisional step 45810 that secondary well bores 42504 should be drilled, any secondary layers 42602*a*, 42602*b*, 42602*d*, and 42602*e* of subterranean deposits that are present may be identified at step 45812. At step 45814, secondary well bores 42504 are drilled. Secondary well bores 42504 may include a curving portion 42516 and an elongated portion 518. Elongated portion 42518 may be drilled on a substantially horizontal plane such that elongated portion 42518 and main well bore 42508 are substantially parallel. Secondary well bore 42504 may extend to the periphery of the area being drained by the dual well system (as may be main well bore 42508).

At step 45816, the articulated well bore is capped. Next, at step 45818, the enlarged cavity is cleaned in preparation for installation of downhole production equipment. The enlarged diameter cavity may be cleaned by pumping compressed air down the substantially vertical well bore or by other suitable techniques. At step 45820, production equipment is installed in the substantially vertical well bore. The production equipment may include a sucker rod pump extending down into the cavity. The sucker rod pump may be used to remove water from the layers of subterranean deposits. The removal of water will drop the pressure of the subterranean layers and allow gas to diffuse and be produced up the annulus of the substantially vertical well bore.

Proceeding to step 45822, water that drains from the drainage pattern (main well bore 45508, secondary well bores 42504, and laterals, if any) into the cavity may be pumped to the surface with the rod pumping unit. Water may be continuously or intermittently pumped as needed to remove it from the cavity. Additionally or alternatively, the drainage pattern may be used for environmental remediation purposes to treat or recover underground contaminants posing a danger to the environment. For example, the drainage pattern and cavity may be used to inject a treatment solution into a contaminated coal seam or surrounding area, recover byproducts from the contaminated coal seam or surrounding area, or strip recoverable product from the coal seam. The drainage pattern may also be used for the sequestration of gaseous emissions. For example, gaseous emissions such as carbon dioxide entrained in a carrier medium may be injected into the pattern with the aid of a surface pump. At step 45824, gas diffused from the layers of subterranean deposits is continuously collected at the surface 14. Upon completion of production, the method is completed.

III. Tools

FIGS. 46-60 illustrate various tools that may be used in connection with various embodiments of the invention.

Figure 46A:
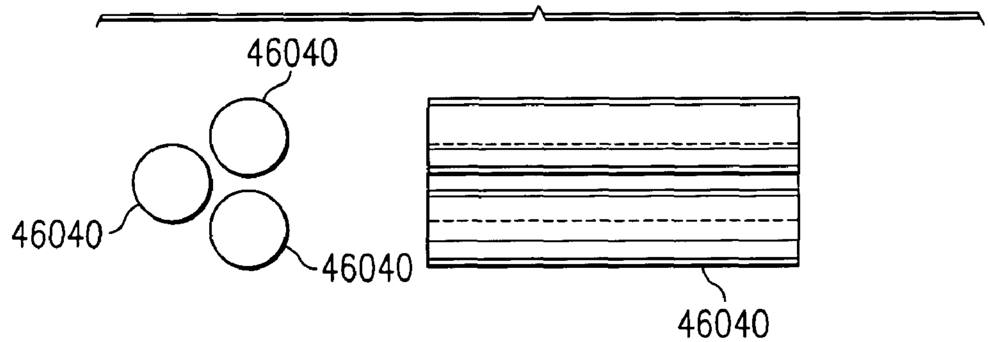
FIGS. 46A-46C illustrate construction of an example guide tube bundle.
Figure 46B:
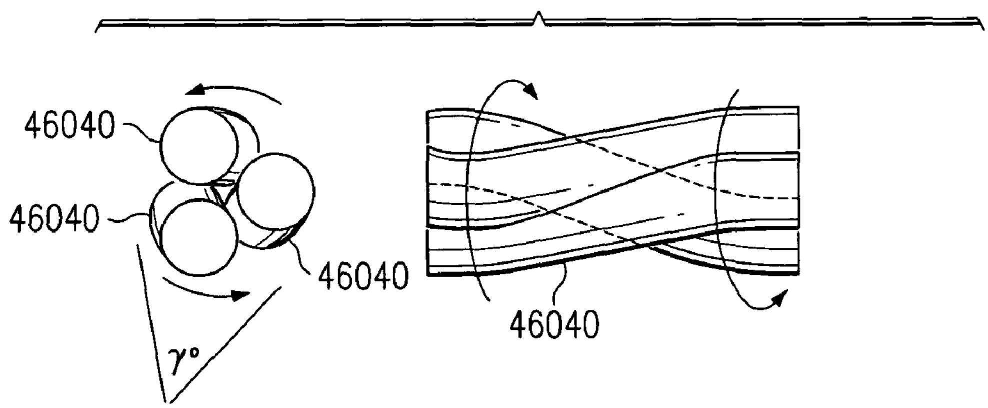
Figure 46C:
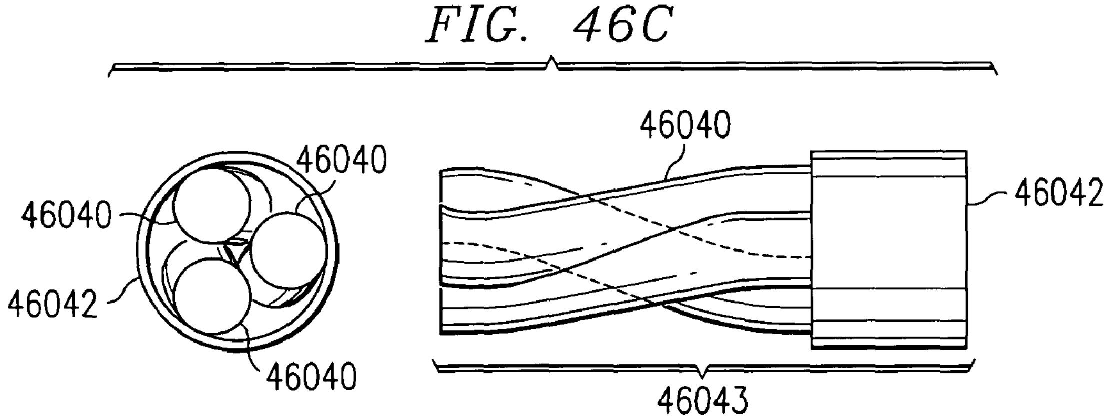

FIGS. 46A, 46B, and 46C illustrate formation of a casing with associated guide tube bundle. Referring to FIG. 46A, three guide tubes 46040 are shown in side view and end view. The guide tubes 46040 are arranged so that they are parallel to one another. In the illustrated embodiment, guide tubes 46040 are 9⅝" joint casings. It will be understood that other suitable materials may be employed.

FIG. 46B illustrates a twist incorporated into guide tubes 46040. The guide tubes 46040 are twisted gamma degrees in relation to one another while maintaining the lateral arrangement to gamma degrees. Guide tubes 46040 are then welded or otherwise stabilized in place. In an example embodiment, gamma is equal to 10 degrees.

FIG. 46C illustrates guide tubes 46040, incorporating the twist, in communication and attached to a casing collar 46042. The guide tubes 46040 and casing collar 46042 together make up the guide tube bundle 46043, which may be attached to a fresh water or other casing sized to fit the length of entry well bore 46015 of FIG. 47 or otherwise suitably configured.

Figure 47:
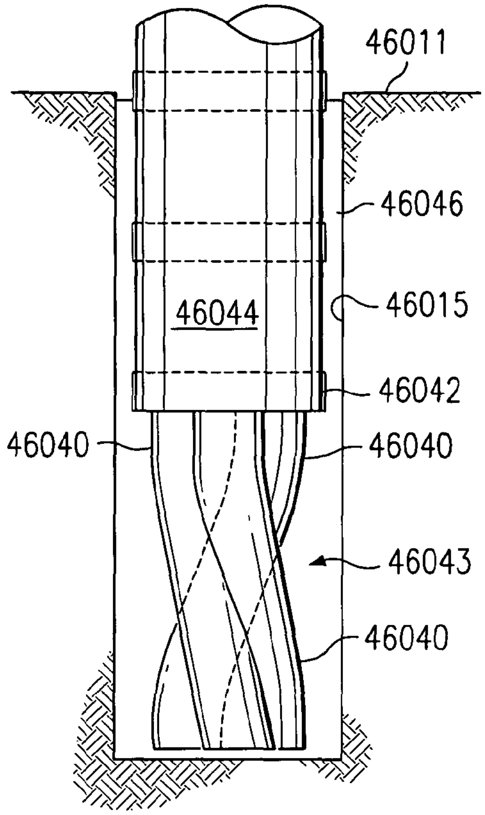
FIG. 47 illustrates an example entry well bore with an installed guide tube bundle.

FIG. 47 illustrates entry well bore 46015 with guide tube bundle 46043 and casing 46044 installed in entry well bore 46015. Entry well bore 46015 is formed from the surface to a target depth of approximately three hundred and ninety feet. Entry well bore 46015, as illustrated, has a diameter of approximately twenty-four inches. Guide tube bundle 46043 (consisting of joint casings 46040 and casing collar 46042) is shown attached to a casing 46044. Casing 46044 may be any fresh water casing or other casing suitable for use in downhole operations.

A cement retainer 46046 is poured or otherwise installed around the casing inside entry well bore 46015. The cement casing may be any mixture or substance otherwise suitable to maintain casing 46044 in the desired position with respect to entry well bore 46015.

Figure 48:
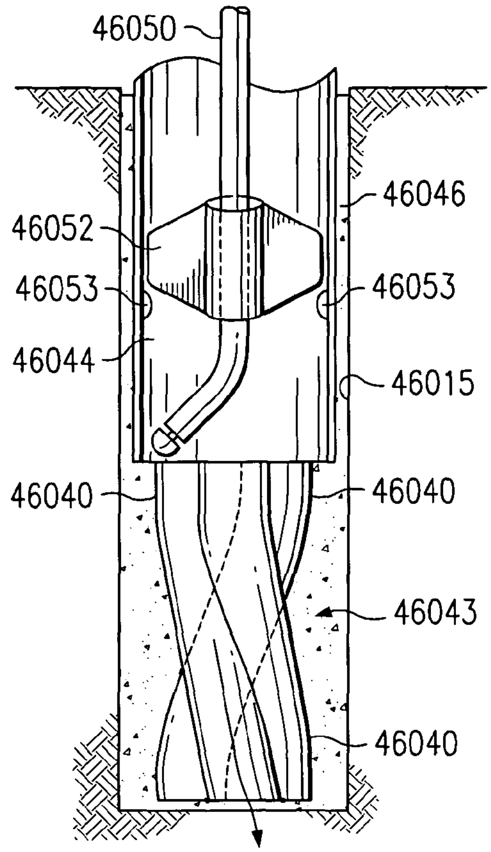
FIG. 48 illustrates the use of an example guide tube bundle in an entry well bore.

FIG. 48 illustrates entry well bore 46015 and casing 46044 with guide tube 46043 in its operative mode as slant wells are about to be drilled. A drill string 46050 is positioned to enter one of the guide tubes 46040 of guide tube bundle 46043. In order to keep drill string 46050 relatively centered in casing 46044, a stabilizer 46052 may be employed. Stabilizer 46052 may be a ring and fin type stabilizer or any other stabilizer suitable to keep drill string 46050 relatively centered. To keep stabilizer 46052 at a desired depth in well bore 15, stop ring 46053 may be employed. Stop ring 46053 may be constructed of rubber or metal or any other foreign down-hole environment material suitable. Drill string 46050 may be inserted randomly into any of a plurality of guide tubes 46040 of guide tube bundle 46043, or drill string 50 may be directed into a selected joint casing 46040.

Figure 49:
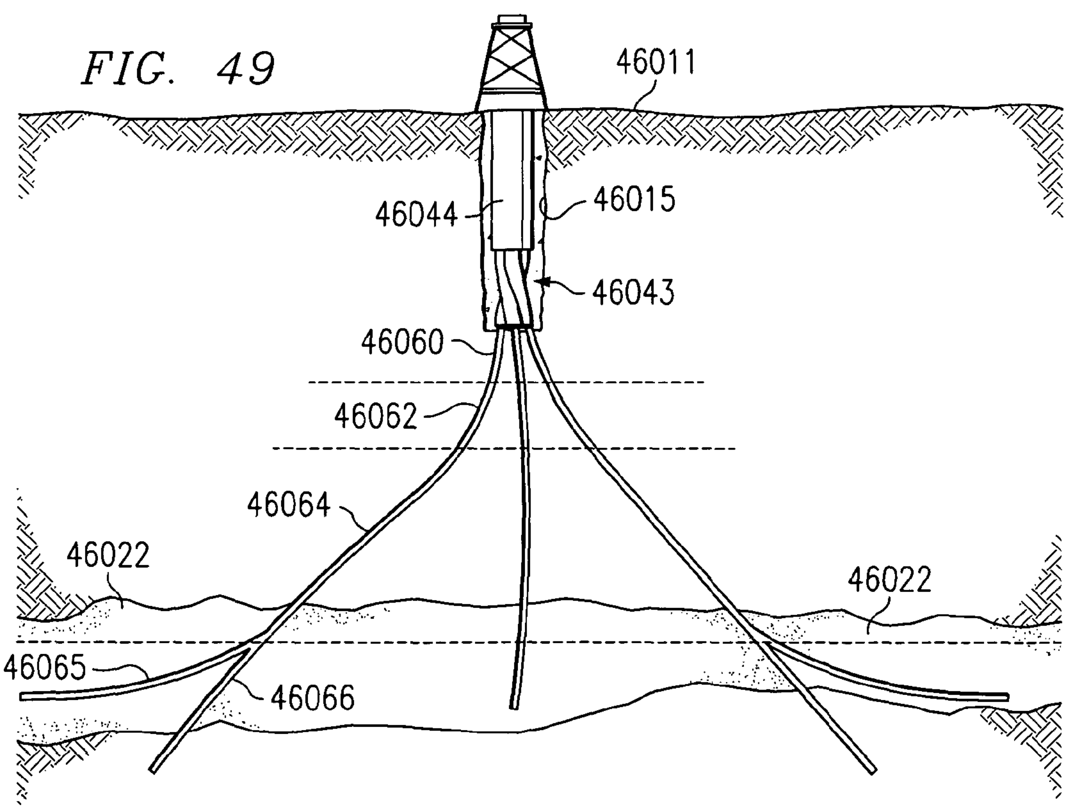
FIG. 49 illustrates an example system of slanted well bores.

FIG. 49 illustrates an example system of slant wells 46020. Tangent well bore 46060 is drilled approximately fifty feet past the end of entry well bore 46015 (although any other appropriate distance may be drilled). Tangent well bore 46060 is drilled away from casing 46044 in order to minimize magnetic interference and improve the ability of the drilling crew to guide the drill bit in the desired direction. A radiused well bore 46062 is drilled to orient the drill bit in preparation for drilling the slant entry well bore 46064. In a particular embodiment, radiused well bore 46062 is curved approximately twelve degrees per one hundred feet (although any other appropriate curvature may be employed).

A slant entry well bore 46064 is drilled from the end of the radius well bore 46062 into and through the subterranean zone 46022. Alternatively, slant well 46020 may be drilled directly from guide tube 46040, without including tangent well bore 46060 or radiused well bore 46062. An articulated well bore 46065 is shown in its prospective position but is drilled later in time than rat hole 46066, which is an extension of slant well 46064. Rat hole 46066 may also be an enlarged diameter cavity or other suitable structure. After slant entry well bore 46064 and rat hole 46066 are drilled, any additional desired slant wells are then drilled before proceeding to installing casing in the slant well.

FIG. 50 is an illustration of the casing of a slant well 46064. For ease of illustration, only one slant well 46064 is shown. A whip stock casing 46070 is installed into the slant entry well bore 46064. In the illustrated embodiment, whip stock casing 46070 includes a whip stock 46072 which is used to mechanically direct a drill string into a desired orientation. It will be understood that other suitable casings may be employed and the use of a whip stock 46072 is not necessary when other suitable methods of orienting a drill bit through slant well 46064 into the subterranean zone 46022 are used.

Casing 46070 is inserted into the entry well bore 46015 through guide tube bundle 46043 and into slant entry well bore 46064. Whip stock casing 46070 is oriented such that whip stock 46072 is positioned so that a subsequent drill bit is aligned to drill into the subterranean zone 46022 at the desired depth.

FIG. 51 illustrates whip stock casing 46070 and slant entry well bore 46064. As discussed in conjunction with FIG. 50, whip stock casing 46070 is positioned within slant entry well bore 46064 such that a drill string 46050 will be oriented to pass through slant entry well bore 46064 at a desired tangent or kick off point 46038. Drill string 46050 is used to drill through slant entry well bore 46064 at tangent or kick off point 46038 to form articulated well bore 46036. In a particular embodiment, articulated well bore 46036 has a radius of approximately seventy-one feet and a curvature of approximately eighty degrees per one hundred feet. In the same embodiment, slant entry well 46064 is angled away from the vertical at approximately ten degrees. In this embodiment, the hydrostatic head generated in conjunction with production is roughly thirty feet. However, it should be understood that any other appropriate radius, curvature, and slant angle may be used.

Figure 52:
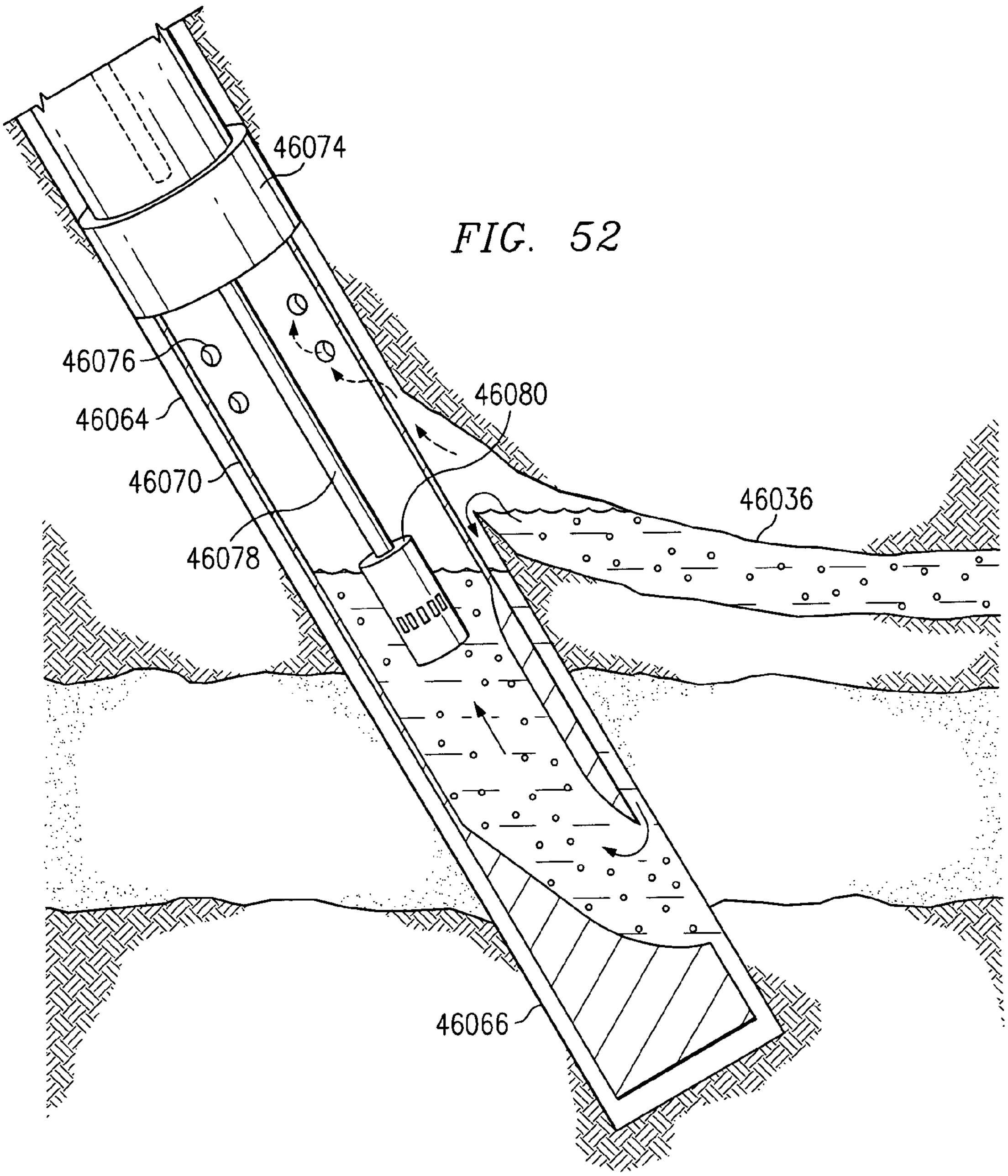
FIG. 52 illustrates production of water and gas in an example slant well system.

FIG. 52 illustrates a slant entry well 42064 and articulated well bore 42036 after drill string 42050 has been used to form articulated well bore 42036. In a particular embodiment, a horizontal well and drainage pattern may then be formed in subterranean zone 46022.

Referring to FIG. 52, whip stock casing 46070 is set on the bottom of rat hole 46066 to prepare for production of oil and gas. A sealer ring 46074 may be used around the whip stock casing 46070 to prevent gas produced from articulated well bore 46036 from escaping outside whip stock casing 46070. Gas ports 46076 allow escaping gas to enter into and up through whip stock casing 46070 for collection at the surface.

A pump string 46078 and submersible pump 46080 is used to remove water and other liquids that are collected from the subterranean zone through articulated well bore 46036. As shown in FIG. 52, the liquids, under the power of gravity and the pressure in subterranean zone 46022, pass through articulated well bore 46036 and down slant entry well bore 46064 into rat hole 46066. From there the liquids travel into the opening in the whip stock 46072 of whip stock casing 46070 where they come in contact with the installed pump string 46078 and submersible pump 46080. Submersible pump 46080 may be a variety of submersible pumps suitable for use in a down-hole environment to remove liquids and pump them to the surface through pump string 46078.

Figure 53:
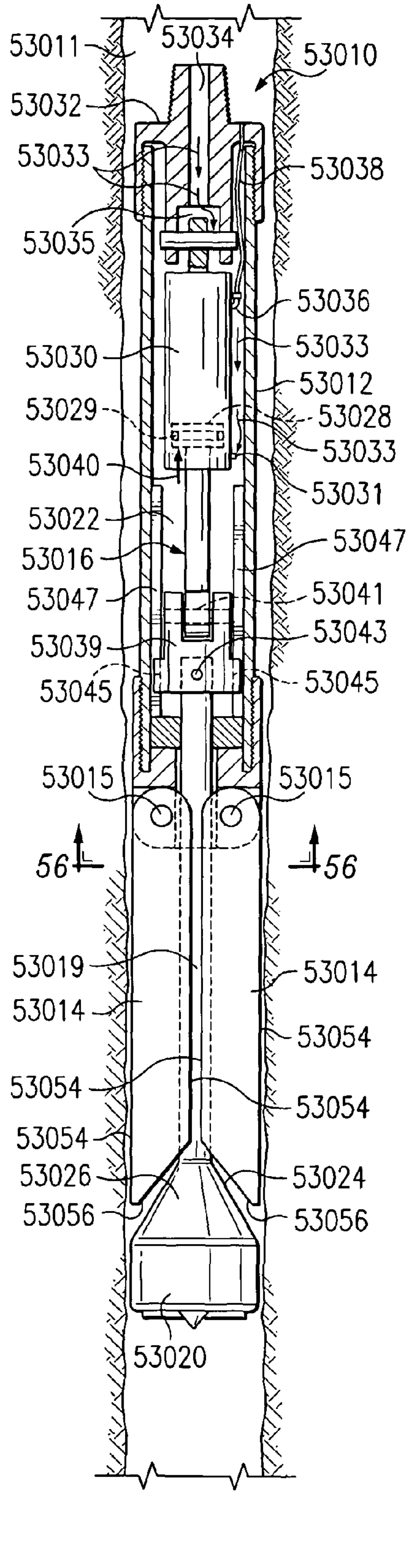
FIG. 53 is a diagram illustrating an underreamer in accordance with an embodiment of the present invention.

FIG. 53 is a diagram illustrating a wedge-activated underreamer in accordance with an embodiment of the present invention. Underreamer 53010 includes a housing 53012 illustrated as being substantially vertically disposed within a well bore 53011. However, it should be understood that underreamer 53010 may also be used in non-vertical cavity forming operations.

Underreamer 53010 includes an actuator 53016 with a portion slidably positioned within a pressure cavity 53022 of housing 53012. Actuator 53016 includes a piston 53018, a connector 53039, a rod 53019 and an enlarged portion 53020. Piston is coupled to connector 53039 using a pin 53041. Connector 53039 is coupled to rod 53019 using a pin 53043. Piston 18 has an enlarged first end 53028 located within a hydraulic cylinder 53030 of housing 53012. Hydraulic cylinder 53030 includes an inlet 53031 which allows a pressurized fluid to enter hydraulic cylinder 53030 from pressure cavity 22. Hydraulic cylinder 53030 also includes an outlet 53036 which is coupled to a vent hose 53038 to provide an exit for the pressurized fluid from hydraulic cylinder 53030. Enlarged portion 53020 is at an end 53026 of rod 53019. Wedge activation of underreamer 53010 is performed by enlarged portion 53020. In this embodiment, enlarged portion 53020 includes a beveled portion 53024. However, in other embodiments, enlarged portion may comprise other angles, shapes or configurations, such as a cubical, spherical, conical or teardrop shape.

Underreamer 53010 also includes cutters 53014 pivotally coupled to housing 53012. In this embodiment, each cutter 53014 is pivotally coupled to housing 53012 via a pin 53015; however, other suitable methods may be used to provide pivotal or rotational movement of cutters 53014 relative to housing 53012. Cutters 53014 are illustrated in a retracted position, nesting around a rod 53019 of actuator 53016. Cutters 53014 may have a length of approximately two to three feet; however, the length of cutters 53014 may be different in other embodiments. The illustrated embodiment shows an underreamer having two cutters 53014; however, other embodiments may include an underreamer having one or more than two cutters 53014. Cutters 53014 are illustrated as having angled ends; however, the ends of cutters 53014 in other embodiments may not be angled or they may be curved, depending on the shape and configuration of enlarged portion 53020.

In the embodiment illustrated in FIG. 53, cutters 53014 comprise side cutting surfaces 53054 and end cutting surfaces 53056. Cutters 53014 may also include tips which may be replaceable in particular embodiments as the tips get worn down during operation. In such cases, the tips may include end cutting surfaces 53056. Cutting surfaces 53054 and 53056 and the tips may be dressed with a variety of different cutting materials, including, but not limited to, polycrystalline diamonds, tungsten carbide inserts, crushed tungsten carbide, hard facing with tube barium, or other suitable cutting structures and materials, to accommodate a particular subsurface formation. Additionally, various cutting surfaces 53054 and 53056 configurations may be machined or formed on cutters 53014 to enhance the cutting characteristics of cutters 53014.

Housing 53012 is threadably coupled to a drill pipe connector 53032 in this embodiment; however other suitable methods may be used to couple drill pipe connector 53032 to housing 12. Drill pipe connector 53032 may be coupled to a drill string that leads up well bore 53011 to the surface. Drill pipe connector 53032 includes a fluid passage 53034 with an end 53035 which opens into pressure cavity 53022 of housing 53012.

In operation, a pressurized fluid is passed through fluid passage 53034 of drill pipe connector 53032. The fluid may be pumped down a drill string and drill pipe connector 53032. In particular embodiments, the pressurized fluid may have a pressure of approximately 500-600 psi; however, any appropriate pressure may be used. The pressurized fluid passes through fluid passage 53034 to cavity 53022 of housing 53012. A nozzle or other mechanism may control the flow of the fluid into cavity 53022. The pressurized fluid flows through cavity 53022 and enters hydraulic cylinder 53030 through inlet 53031. The fluid may flow as illustrated by arrows 53033. Other embodiments of the present invention may include more than one inlet 53031 into hydraulic cylinder 53030 or may provide other ways for the pressurized fluid to enter hydraulic cylinder 53030. Inside hydraulic cylinder 53030, the pressurized fluid exerts a first axial force 53040 upon first end 53028 of piston 53018, thereby causing movement of piston 18 relative to housing 53012. Gaskets 53029 may encircle enlarged first end 53028 to prevent the pressurized fluid from flowing around first end 53028.

The movement of piston 53018 causes enlarged portion 53020 to move relative to housing 53012, since enlarged portion 53020 is coupled to piston 53018. As enlarged portion 53020 moves, beveled portion 53024 comes into contact with cutters 53014. Beveled portion 53024 forces cutters 53014 to rotate about pins 53015 and extend radially outward relative to housing 53012 as enlarged portion 53020 moves relative to housing 53012. Through the extension of cutters 53014 via the movement 53014 of piston 18 and enlarged portion 53020 relative to housing 53012, underreamer 53010 forms an enlarged well bore diameter as cutting surfaces 53054 and 53056 come into contact with the surfaces of well bore 53011.

Connector 53039 includes grooves 53045 which slide along guide rails 53047 when actuator 53016 moves relative to housing 53012. This prevents actuator 53016 from rotating with respect to housing 53012 during such movement.

Housing 53012 may be rotated within well bore 53011 as cutters 53014 extend radially outward to aid in forming cavity 53042. Rotation of housing 53012 may be achieved using a drill string coupled to drill pipe connector 53032; however, other suitable methods of rotating housing 53012 may be utilized. For example, a downhole motor in well bore 53011 may be used to rotate housing 53012. In particular embodiments, both a downhole motor and a drill string may be used to rotate housing 53012. The drill string may also aid in stabilizing housing 53012 in well bore 53011.

Figure 54:
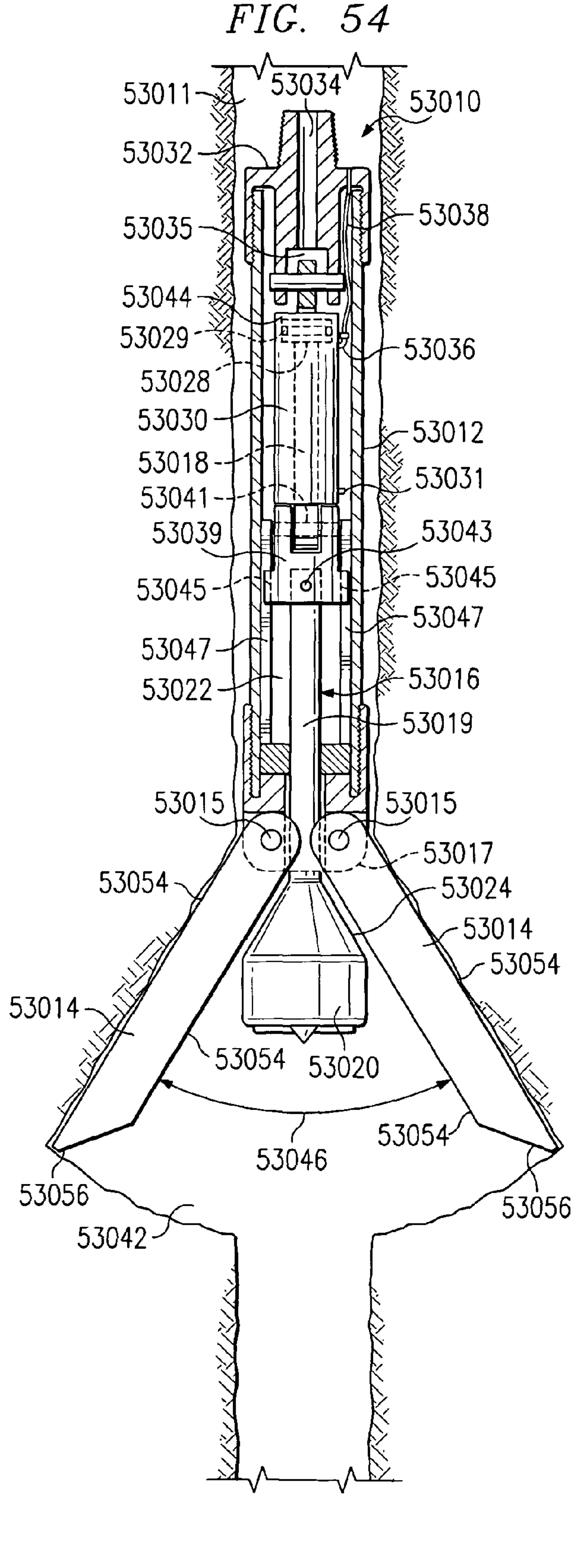
FIG. 54 is a diagram illustrating the underreamer of FIG. 1 in a semi-extended position.

FIG. 54 is a diagram illustrating underreamer 53010 of FIG. 53 in a semi-extended position. In FIG. 54, cutters 53014 are in a semi-extended position relative to housing 53012 and have begun to form an enlarged cavity 53042. When first axial force 53040 (illustrated in FIG. 53) is applied and piston 53018 moves relative to housing 53012, first end 53028 of piston 53018 will eventually reach an end 53044 of hydraulic cylinder 53030. At this point, enlarged portion 53020 is proximate an end 53017 of housing 53012. Cutters 53014 are extended as illustrated and an angle 53046 will be formed between them. In this embodiment, angle 53046 is approximately sixty degrees, but angle 53046 may be different in other embodiments depending on the angle of beveled portion 53024 or the shape or configuration of enlarged portion 53020. As first end 53028 of piston 53018 moves towards end 53044 of hydraulic cylinder 53030, the fluid within hydraulic cylinder 53030 may exit hydraulic cylinder 53030 through outlet 53036. The fluid may exhaust to the well bore through vent hose 53038. Other embodiments of the present invention may include more than one outlet 53036 or may provide other ways for the pressurized fluid to exit hydraulic cylinder 53030.

FIG. 55 is a diagram illustrating underreamer 53010 of FIG. 53 in an extended position. Once enough first axial force 53040 has been exerted on first end 53028 of piston 53018 for first end 53028 to contact end 53044 of hydraulic cylinder 53030 thereby extending cutters 53014 to a semi-extended position as illustrated in FIG. 54, a second axial force 53048 may be applied to underreamer 53010. Second axial force 53048 may be applied by moving underreamer 53010 relative to well bore 53011. Such movement may be accomplished by moving the drill string coupled to drill pipe connector 53032 or by any other technique. The application of second axial force 53048 forces cutters to rotate about pins 53015 and further extend radially outward relative to housing 53012. The application of second axial force 53048 may further extend cutters 53014 to position where they are approximately perpendicular to a longitudinal axis if housing 53012, as illustrated in FIG. 55. Housing 53012 may include a bevel or "stop" in order to prevent cutters 53014 from rotating passed a particular position, such as an approximately perpendicular position to a longitudinal axis of housing 53012 as illustrated in FIG. 55.

Underreamer 53010 may be raised and lowered within well bore 53011 without rotation to further define and shape cavity 53042. Such movement may be accomplished by raising and lowering the drill string coupled to drill pipe connector 53032. Housing 53012 may also be partially rotated to further define and shape cavity 53042. It should be understood that a subterranean cavity having a shape other than the shape of cavity 53042 may be formed with underreamer 53010.

Various techniques may be used to actuate the cutters of underreamers in accordance with embodiments of the present invention. For example, some embodiments may not include the use of a piston to actuate the cutters. For example, a fishing neck may be coupled to an end of the actuator. An upward axial force may be applied to the fishing neck using a fishing tool in order to move enlarged portion 53120 relative to the housing to extend the cutters.

FIG. 56 is a cross-sectional view of FIG. 53 taken along line 56-56, illustrating the nesting of cutters 53014 around rod 53019 while cutters 53014 are in a retracted position, as illustrated in FIG. 53. Cutters 53014 may include cutouts 53050 which may be filled with various cutting materials such as a carbide matrix 53052 as illustrated to enhance cutting performance. It should be understood that nesting configurations other than the configuration illustrated in FIG. 56 may be used. Furthermore, cutters 53014 may have various other cross-sectional configurations other than the configurations illustrated, and such cross-sectional configurations may differ at different locations on cutters 53014. For example, in particular embodiments, cutters 53014 may not be nested around rod 53019.

Figure 57:
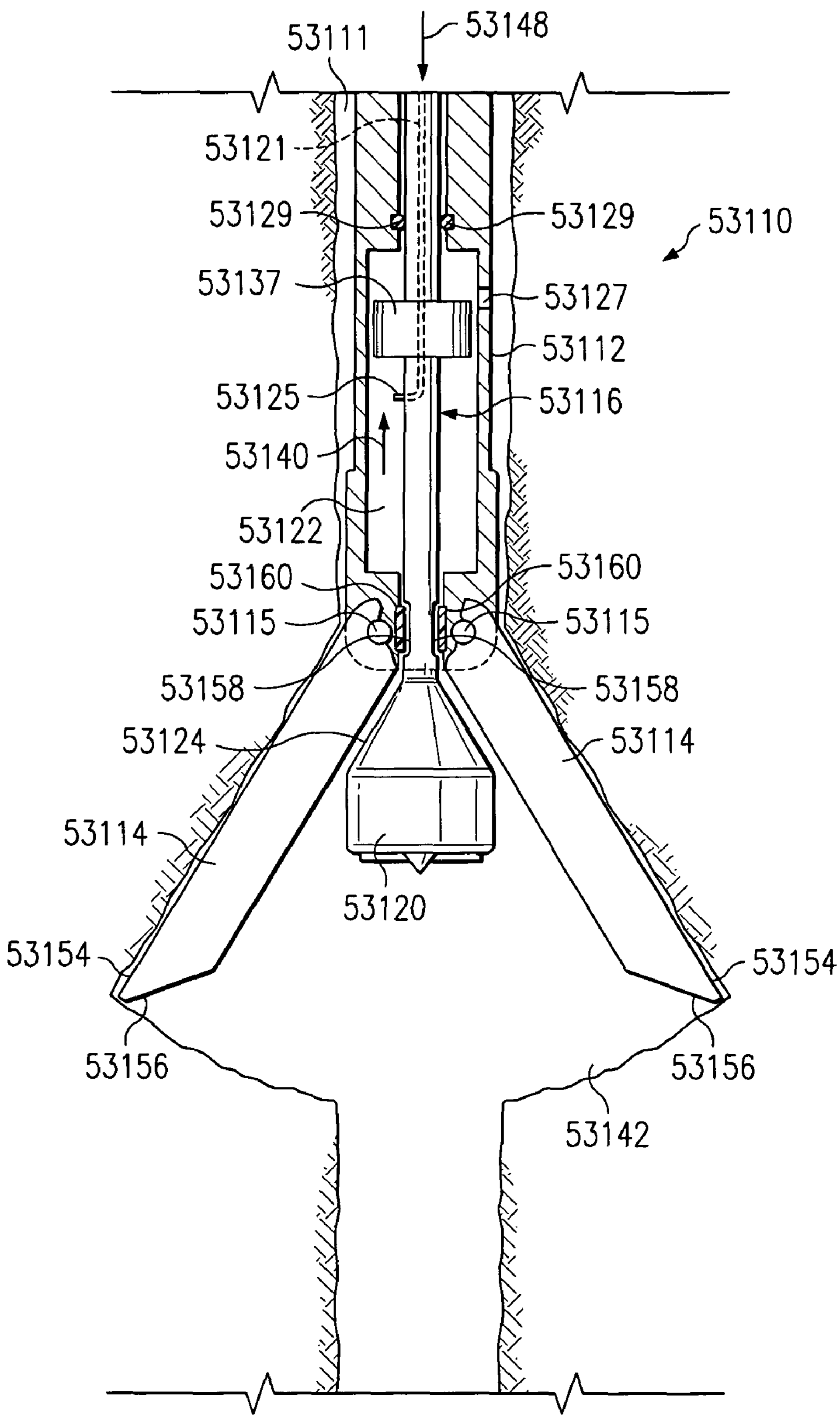
FIG. 57 is a diagram illustrating an underreamer in accordance with another embodiment of the present invention.

FIG. 57 is a diagram illustrating a portion of a wedge activated underreamer 53110 disposed in a well bore 53111 in accordance with another embodiment of the present invention. Underreamer 53110 includes an actuator 53116 slidably positioned within a housing 53112. Actuator 53116 includes a fluid passage 53121. Fluid passage 53121 includes an outlet 53125 which allows fluid to exit fluid passage 53121 into a pressure cavity 53122 of housing 53112. Pressure cavity 53122 includes an exit port 53127 which allows fluid to exit pressure cavity 53122 into well bore 53111. In particular embodiments, exit port 53127 may be coupled to a vent hose in order to transport fluid exiting through exit port 53127 to the surface or to another location. Actuator 53116 includes an enlarged portion 53120 having a beveled portion 53124. Actuator 53116 also includes pressure grooves 53158 which allow fluid to exit pressure cavity 53122 when actuator 53116 is disposed in a position such that enlarged portion 53120 is proximate housing 53112, as described in more detail below with regards to FIGS. 58 and 59. Gaskets 53160 are disposed proximate actuator 53116. Underreamer 53110 includes cutters 53114 coupled to housing 53114 via pins 53115.

In operation, a pressurized fluid is passed through fluid passage 53121 of actuator 53116. Such disposition may occur through a drill pipe connector connected to housing 53112 in a similar manner as described above with respect to underreamer 53010 of FIGS. 53-55. The pressurized fluid flows through fluid passage 53121 and exits the fluid passage through outlet 53125 into pressure cavity 53122. Inside pressure cavity 53122, the pressurized fluid exerts a first axial force 53140 upon an enlarged portion 53137 of actuator 53116. Actuator 53116 is encircled by circular gaskets 53129 in order to prevent pressurized fluid from flowing up out of pressure cavity 53122. The exertion of first axial force 53140 on enlarged portion 53137 of actuator 53116 causes movement of actuator 53116 relative to housing 53112. Such movement causes beveled portion 53124 of enlarged portion 53120 to contact cutters 53114 causing cutters 53114 to rotate about pins 53115 and extend radially outward relative to housing 53112, as described above. Through extension of cutters 53114, underreamer 53110 forms an enlarged cavity 53142 as cutting surfaces 53154 and 53156 of cutters 53114 come into contact with the surfaces of well bore 53111.

Underreamer 53110 is illustrated with cutters 53114 in a semi-extended position relative to housing 53112. Cutters 53114 may move into a more fully extended position through the application of a second axial force in a similar fashion as cutters 5314 of underreamer 5310 illustrated in FIGS. 53-55. Underreamer 53110 may be raised, lowered and rotated to further define and shape cavity 53142.

Figure 58:
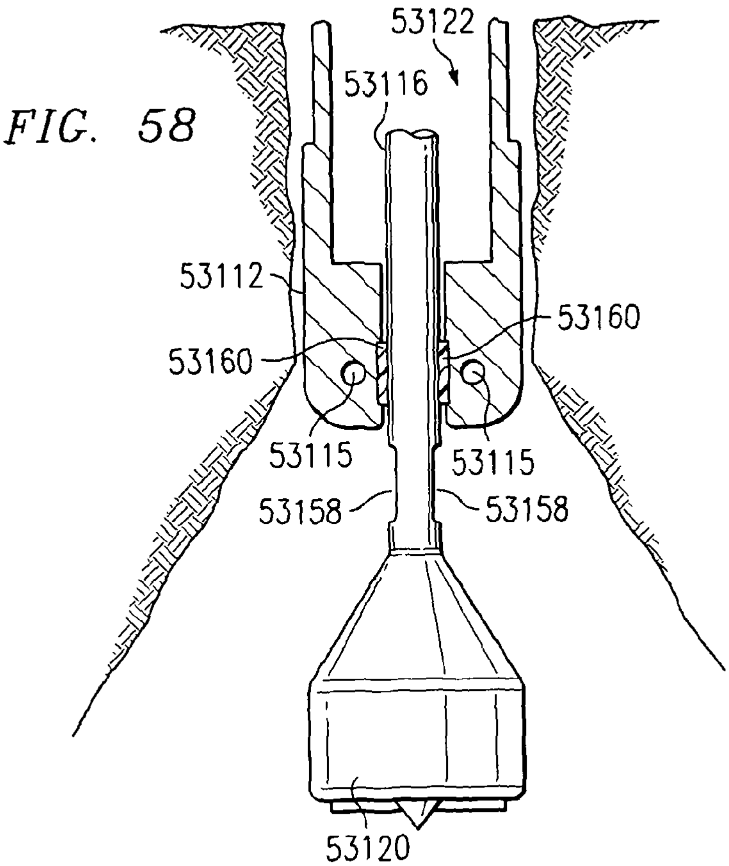
FIG. 58 is a diagram illustrating a portion of the underreamer of FIG. 5 with the actuator in a particular position.
Figure 59:
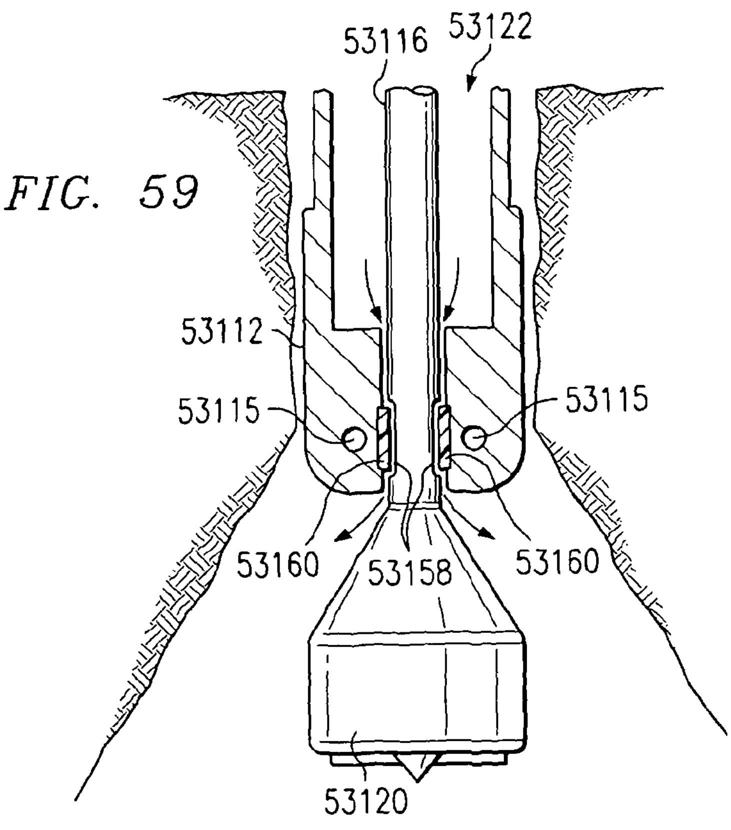
FIG. 59 is a diagram illustrating a portion of the underreamer of FIG. 5 with an enlarged portion of the actuator proximate the housing.

FIGS. 58 and 59 illustrate the manner in which pressure grooves 53158 of actuator 53116 of the underreamer of FIG. 57 allow the pressurized fluid to exit pressure cavity 53122. FIGS. 58 and 59 illustrate only certain portions of the underreamer, including only a portion of actuator 53116. The cutting blades of the underreamer are not illustrated in FIGS. 58 and 59. As illustrated in FIG. 58, when actuator 53116 is disposed such that enlarged portion 53120 is not proximate housing 53112, gaskets 53160 prevent pressurized fluid from exiting pressure cavity 53122. However, when the first axial force is applied and actuator 53116 slides relative to housing 53112, enlarged portion 53120 of actuator 53116 will eventually become proximate housing 53112 as illustrated in FIG. 59. When enlarged portion 53120 is proximate housing 53112, pressurized fluid in pressure cavity 53122 may exit the pressure cavity by flowing through pressure grooves 53158 of actuator 53116 in the general direction illustrated by the arrows in FIG. 59. Pressure grooves 53158 may enable an operator of the underreamer to determine when enlarged portion 53120 is proximate housing 53112 because of the decrease in pressure when the pressurized fluid exits pressure cavity 53122 through pressure grooves 53158. Pressure grooves may be utilized in actuators of various embodiments of the present invention, including the underreamer illustrated in FIGS. 53-56.

Figure 60:
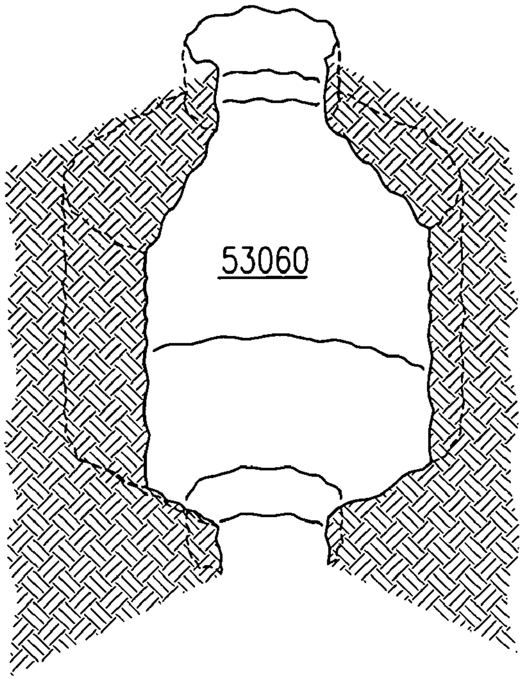
FIG. 60 is an isometric diagram illustrating a cylindrical cavity formed using an underreamer in accordance with an embodiment of the present invention.

FIG. 60 is an isometric diagram illustrating a cylindrical cavity 53060 formed using an underreamer in accordance with an embodiment of the present invention. Cylindrical cavity 53060 has a generally cylindrical shape and may be formed by raising and/or lowering the underreamer in the well bore and by rotating the underreamer.

IV. Additional Techniques

FIGS. 61-103 illustrate additional processing techniques and additional embodiments.

Figure 61:
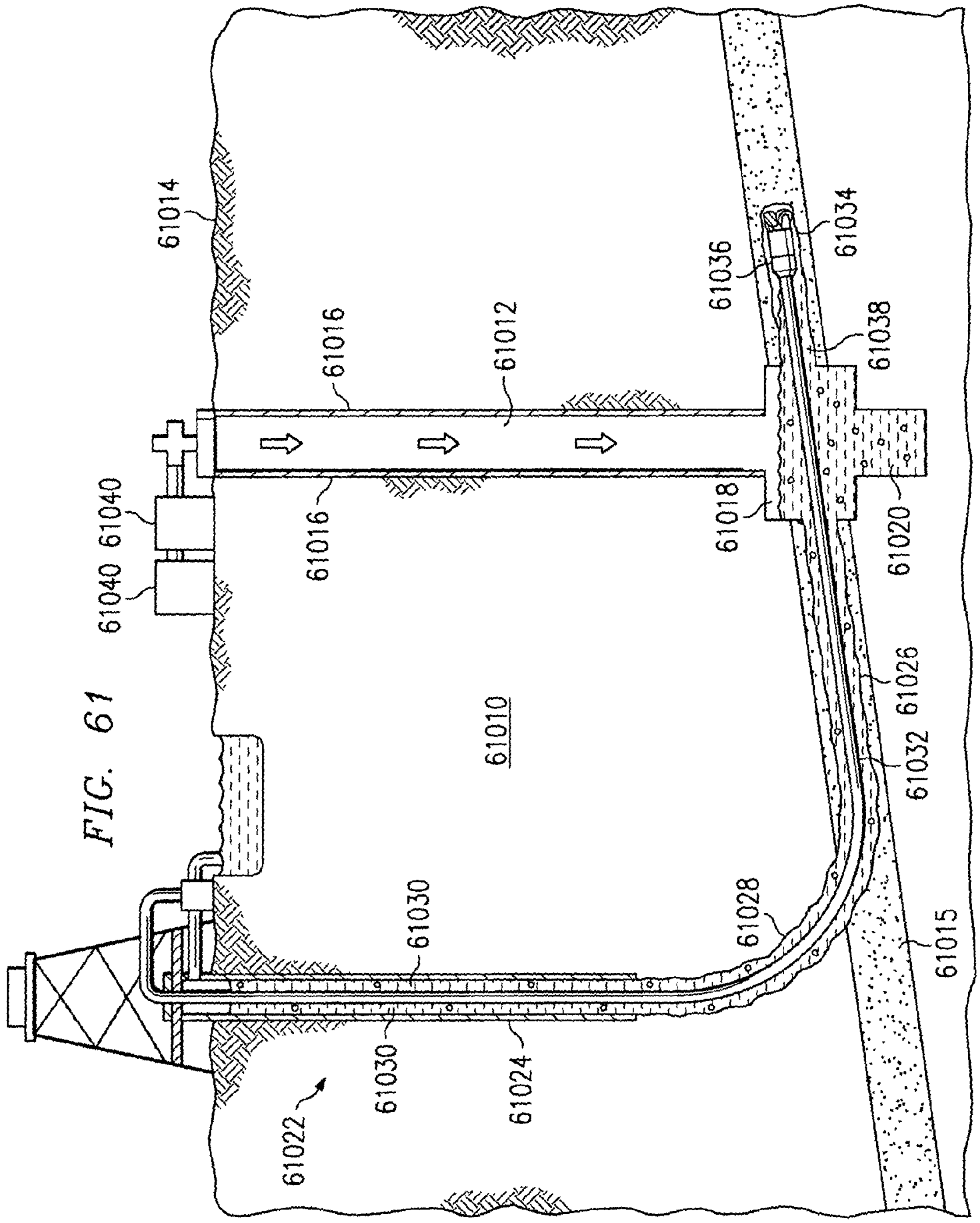
FIG. 61 is a cross-sectional diagram illustrating formation of a drainage pattern in a subterranean zone through an articulated surface well intersecting a vertical cavity well in accordance with one embodiment of the present invention.

FIG. 61 illustrates a well system in a subterranean zone in accordance with one embodiment of the present invention. A subterranean zone may comprise a coal seam, shale layer, petroleum reservoir, aquifer, geological layer or formation, or other at least partially definable natural or artificial zone at least partially beneath the surface of the earth, or a combination of a plurality of such zones. In this embodiment, the subterranean zone is a coal seam having a structural dip of approximately 0-20 degrees. It will be understood that other low pressure, ultra-low pressure, and low porosity formations, or other suitable subterranean zones, can be similarly accessed using the dual well system of the present invention to remove and/or produce water, hydrocarbons and other liquids in the zone, or to treat minerals in the zone. A well system comprises the well bores and the associated casing and other equipment and the drainage patterns formed by bores.

Referring to FIG. 61, a substantially vertical well bore 61012 extends from the surface 61014 to the target coal seam 61015. The substantially vertical well bore 61012 intersects, penetrates and continues below the coal seam 61015. The substantially vertical well bore is lined with a suitable well casing 61016 that terminates at or above the level of the coal seam 61015. It will be understood that slanted or other wells that are not substantially vertical may instead be utilized if such wells are suitably provisioned to allow for the pumping of by-product.

The substantially vertical well bore 61012 is logged either during or after drilling in order to locate the exact vertical depth of the coal seam 61015 at the location of well bore 61012. A dipmeter or similar downhole tool may be utilized to confirm the structural dip of the seam. As a result of these steps, the coal seam is not missed in subsequent drilling operations and techniques used to locate the seam 61015 while drilling need not be employed. An enlarged-diameter cavity 61018 is formed in the substantially vertical well bore 61012 at the level of the coal seam 61015. As described in more detail below, the enlarged-diameter cavity 61018 provides a junction for intersection of the substantially vertical well bore by articulated well bore used to form a substantially dip-parallel drainage pattern in the coal seam 61015. The enlarged-diameter cavity 61018 also provides a collection point for by-product drained from the coal seam 61015 during production operations.

In one embodiment, the enlarged-diameter cavity 61018 has a radius of approximately two to eight feet and a vertical dimension of two to eight feet. The enlarged-diameter cavity 61018 is formed using suitable under-reaming techniques and equipment such as a pantagraph-type cavity forming tool (wherein a slidably mounted coller and two or more jointed arms are pivotally fastened to one end of a longitudinal shaft such that, as the collar moves, the jointed arms extend radially from the centered shaft). A vertical portion of the substantially vertical well bore 61012 continues below the enlarged-diameter cavity 18 to form a sump 61020 for the cavity 61018.

An articulated well bore 61022 extends from the surface 61014 to the enlarged-diameter cavity 61018 of the substantially vertical well bore 61012. The articulated well bore 61022 includes a substantially vertical portion 61024, a dip-parallel portion 61026, and a curved or radiused portion 61028 interconnecting the vertical and dip-parallel portions 61024 and 61026. The dip-parallel portion 61026 lies substantially in the plane of the dipping coal seam 61015 and intersects the large diameter cavity 61018 of the substantially vertical well bore 61012. It will be understood that the path of the dip-parallel portion 61026 need not be straight and may have moderate angularities or bends without departing from the present invention.

The articulated well bore 61022 is offset a sufficient distance from the substantially vertical well bore 61012 at the surface 61014 to permit the large radius curved section 61028 and any desired dip-parallel section 61026 to be drilled before intersecting the enlarged-diameter cavity 61018. To provide the curved portion 61028 with a radius of 100-150 feet, the articulated well bore 61022 is offset a distance of about 300 feet from the substantially vertical well bore 61012. This spacing minimizes the angle of the curved portion 61028 to reduce friction in the bore 61022 during drilling operations. As a result, reach of the drill string drilled through the articulated well bore 61022 is maximized.

The articulated well bore 61022 is drilled using a conventional drill string 61032 that includes a suitable down-hole motor and bit 61034. A measurement while drilling (MWD) device 61036 is included in the drill string 61032 for controlling the orientation and direction of the well bore drilled by the motor and bit 61034 so as to, among other things, intersect with the enlarged-diameter cavity 61018. The substantially vertical portion 61024 of the articulated well bore 61022 is lined with a suitable casing 61030.

After the enlarged-diameter cavity 61018 has been successfully intersected by the articulated well bore 61022, drilling is continued through the cavity 61018 using the drill string 61032 and suitable drilling apparatus (such as a down-hole motor and bit) to provide a substantially dip-parallel drainage pattern 61038 in the coal seam 61015. During this operation, gamma ray logging tools and conventional measurement while drilling devices may be employed to control and direct the orientation of the drill bit to retain the drainage pattern 61038 within the confines of the coal seam 61015 and to provide substantially uniform coverage of a desired area within the coal seam 61015. Further information regarding the drainage pattern is described in more detail below in connection with FIG. 63.

During the process of drilling the drainage pattern 61038, drilling fluid or "mud" is pumped down the drill string 32 and circulated out of the drill string 32 in the vicinity of the bit 61034, where it is used to scour the formation and to remove formation cuttings. The cuttings are then entrained in the drilling fluid which circulates up through the annulus between the drill string 61032 and the well bore walls until it reaches the surface 61014, where the cuttings are removed from the drilling fluid and the fluid is then recirculated. This conventional drilling operation produces a standard column of drilling fluid having a vertical height equal to the depth of the well bore 61022 and produces a hydrostatic pressure on the well bore corresponding to the well bore depth. Because coal seams tend to be porous and fractured, they may be unable to sustain such hydrostatic pressure, even if formation water is also present in the coal seam 61015. Accordingly, if the full hydrostatic pressure is allowed to act on the coal seam 61015, the result may be loss of drilling fluid and entrained cuttings into the formation. Such a circumstance is referred to as an "over balanced" drilling operation in which the hydrostatic fluid pressure in the well bore exceeds the formation pressure. Loss of drilling fluid in cuttings into the formation not only is expensive in terms of the lost drilling fluid, which must be made up, but it tends to plug the pores in the coal seam 61015, which are needed to drain the coal seam of gas and water.

To prevent over balance drilling conditions during formation of the drainage pattern 61038, air compressors 61040 are provided to circulate compressed air down the substantially vertical well bore 61012 and back up through the articulated well bore 61022. The circulated air will admix with the drilling fluids in the annulus around the drill string 61032 and create bubbles throughout the column of drilling fluid. This has the effect of lightening the hydrostatic pressure of the drilling fluid and reducing the down-hole pressure sufficiently that drilling conditions do not become over balanced. Aeration of the drilling fluid reduces down-hole pressure to approximately 150-200 pounds per square inch (psi). Accordingly, low pressure coal seams and other subterranean zones can be drilled without substantial loss of drilling fluid and contamination of the zone by the drilling fluid.

Foam, which may be compressed air mixed with water, may also be circulated down through the drill string 61032 along with the drilling mud in order to aerate the drilling fluid in the annulus as the articulated well bore 61022 is being drilled and, if desired, as the drainage pattern 61038 is being drilled. Drilling of the drainage pattern 61038 with the use of an air hammer bit or an air-powered down-hole motor will also supply compressed air or foam to the drilling fluid. In this case, the compressed air or foam which is used to power the bit or down-hole motor exits the vicinity of the drill bit 61034. However, the larger volume of air which can be circulated down the substantially vertical well bore 61012, permits greater aeration of the drilling fluid than generally is possible by air supplied through the drill string 61032.

Figure 62:
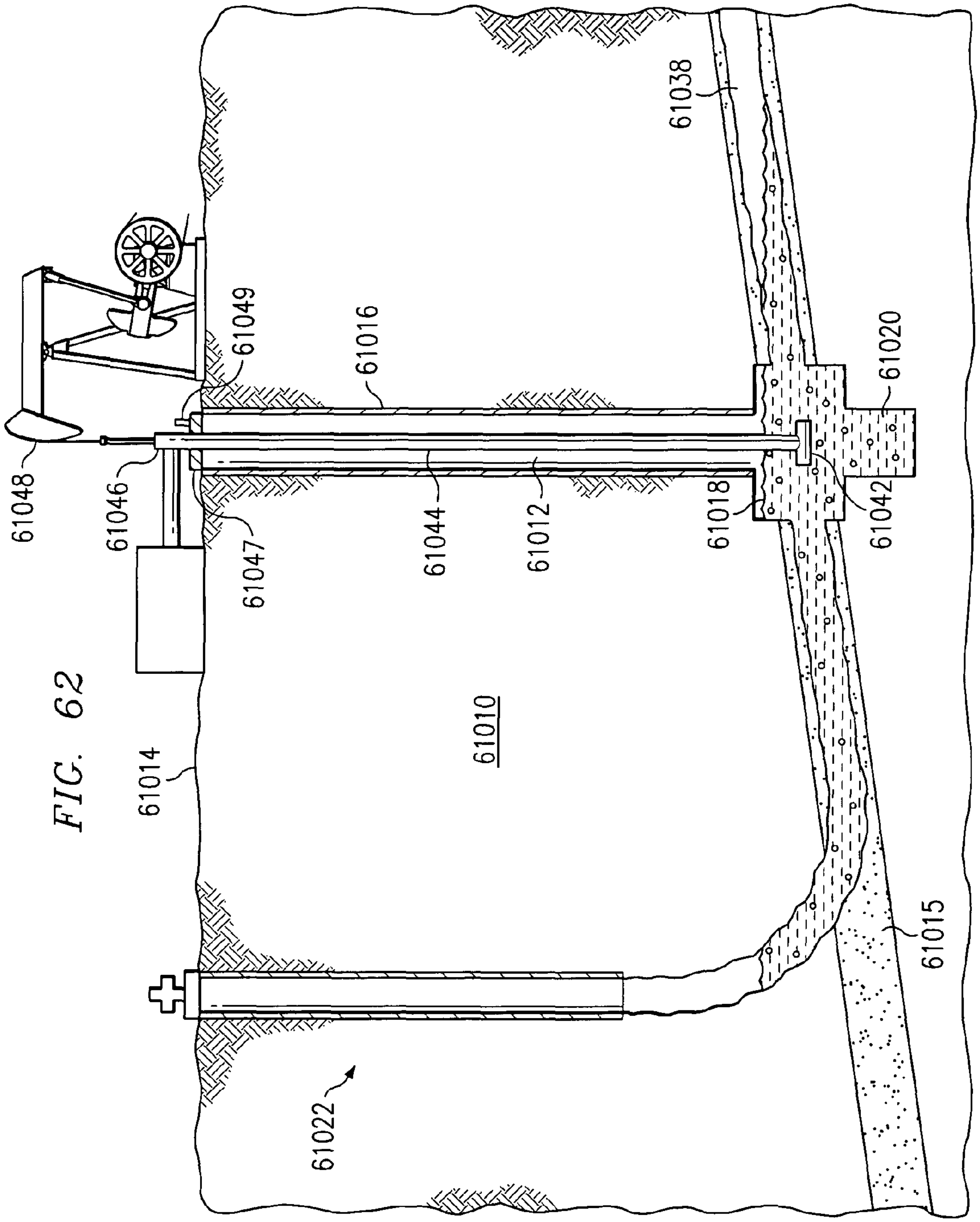
FIG. 62 is a cross-sectional diagram illustrating production of by-product and gas from a drainage pattern in a subterranean zone through a vertical well bore in accordance with one embodiment of the present invention.

FIG. 62 illustrates pumping of by-product from the dip-parallel drainage pattern 61038 in the coal seam 61015 in accordance with one embodiment of the present invention. In this embodiment, after the substantially vertical and articulated well bores 61012 and 61022 as well as drainage pattern 61038 have been drilled, the drill string 61032 is removed from the articulated well bore 61022 and the articulated well bore is capped. Alternatively, the well bore may be left uncapped and used to drill other articulated wells.

Referring to FIG. 62, an inlet 61042 is disposed in the substantially vertical well bore 61012 in the enlarged-diameter cavity 61018. The enlarged-diameter cavity 61018 combined with the sump 61020 provides a reservoir for accumulated by-product allowing intermittent pumping without adverse effects of a hydrostatic head caused by accumulated by-product in the well bore.

The inlet 61042 is connected to the surface 61014 via a tubing string 61044 and may be powered by sucker rods 61046 extending down through the well bore 61012 of the tubing. The sucker rods 61046 are reciprocated by a suitable surface mounted apparatus, such as a powered walking beam pump 61048. The pump 61048 may be used to remove water from the coal seam 61015 via the drainage pattern 61038 and inlet 61042.

When removal of entrained water results in a sufficient drop in the pressure of the coal seam 61015, pure coal seam gas may be allowed to flow to the surface 61014 through the annulus of the substantially vertical well bore 61012 around the tubing string 61044 and removed via piping attached to a wellhead apparatus. A cap 61047 over the well bore 61012 and around the tubing string 61044 may aid in the capture of gas which can then be removed via outlet 61049. At the surface, the methane is treated, compressed and pumped through a pipeline for use as a fuel in a conventional manner. The pump 61048 may be operated continuously or as needed.

As described in further detail below, water removed from the coal seam 61015 may be released on the ground or disposed of off-site. Alternatively, as discussed further below, the water the may be returned to the subsurface and allowed to enter the subterranean zone through previously drilled, down-dip drainage patterns.

Figure 63:
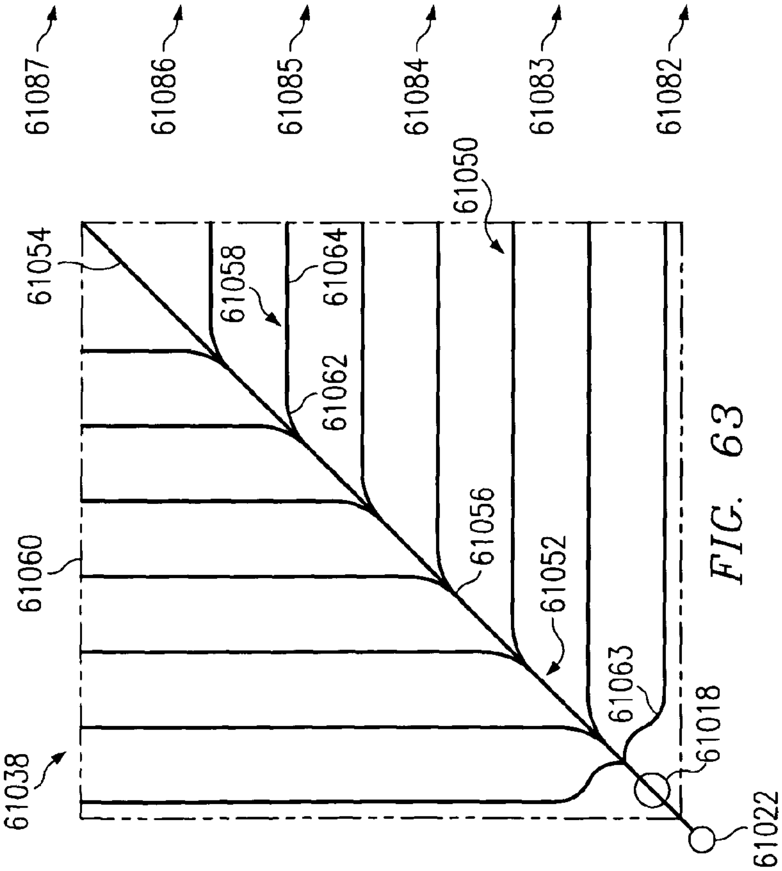
FIG. 63 is a top plan diagram illustrating a pinnate drainage pattern for accessing a subterranean zone in accordance with one embodiment of the present invention.

FIG. 63 a top plan diagram illustrating a substantially dip-parallel, pinnate drainage pattern for accessing deposits in a subterranean zone in accordance with one embodiment of the present invention in accordance with one embodiment of the present invention. In this embodiment, the drainage pattern comprises a pinnate patterns that have a central diagonal with generally symmetrically arranged and appropriately spaced laterals extending from each side of the diagonal. As used herein, the term each means every one of at least a subset of the identified items. The pinnate pattern approximates the pattern of veins in a leaf or the design of a feather in that it has similar, substantially parallel, auxiliary drainage bores arranged in substantially equal and parallel spacing or opposite sides of an axis. The pinnate drainage pattern with its central bore and generally symmetrically arranged and appropriately spaced auxiliary drainage bores on each side provides a uniform pattern for draining by-product from a coal seam or other subterranean formation. With such a pattern, 80% or more of the by-product present in a given zone of a coal seam may be feasibly removable, depending upon the geologic and hydrologic conditions. The pinnate pattern provides substantially uniform coverage of a square, other quadrilateral, or grid area and may be aligned with longwall mining panels for preparing the coal seam 61015 for mining operations. It will be understood that other suitable drainage patterns may be used in accordance with the present invention.

Referring to FIG. 63, the enlarged-diameter cavity 61018 defines a first corner of the area 61050. The pinnate pattern 61038 includes a main well bore 61052 extending diagonally across the area 61050 to a distant corner 61054 of the area 61050. The diagonal bore 61052 is drilled using the drill string 61032 and extends from the enlarged cavity 61018 in alignment with the articulated well bore 61022.

A plurality of lateral well bores 61058 extend from the opposites sides of diagonal bore 61052 to a periphery 61060 of the area 61050. The lateral bores 61058 may mirror each other on opposite sides of the diagonal bore 61052 or may be offset from each other along the diagonal bore 61052. Each of the lateral bores 61058 includes a first radius curving portion 61062 extending from the well bore 61052, and an elongated portion 61064. The first set of lateral well bores 61058 located proximate to the cavity 61018 may also include a second radius curving portion 61063 formed after the first curved portion 61062 has reached a desired orientation. In this set, the elongated portion 61064 is formed after the second curved portion 61063 has reached a desired orientation. Thus, the first set of lateral well bores 61058 kicks or turns back towards the enlarged cavity 61018 before extending outward through the formation, thereby extending the drainage area back towards the cavity 61018 to provide uniform coverage of the area 61050. For uniform coverage of a square area 61050, in a particular embodiment, pairs of lateral well bores 61058 are substantially evenly spaced on each side of the well bore 61052 and extend from the well bore 61052 at an angle of approximately 45 degrees. The lateral well bores 61058 shorten in length based on progression away from the enlarged cavity 61018 in order to facilitate drilling of the lateral well bores 61058.

The pinnate drainage pattern 61038 using a single diagonal bore 61052 and five pairs of lateral bores 61058 may drain a coal seam area of approximately 150-200 acres in size. Where a smaller area is to be drained, or where the coal seam has a different shape, such as a long, narrow shape or due to surface or subterranean topography, alternate pinnate drainage patterns may be employed by varying the angle of the lateral bores 110 to the diagonal bore 61052 and the orientation of the lateral bores 61058. Alternatively, lateral bores 61058 can be drilled from only one side of the diagonal bore 61052 to form a one-half pinnate pattern.

The diagonal bore 61052 and the lateral bores 61058 are formed by drilling through the enlarged-diameter cavity 61018 using the drill string 61032 and appropriate drilling apparatus (such as a downhole motor and bit). During this operation, gamma ray logging tools and conventional measurement while drilling technologies may be employed to control the direction and orientation of the drill bit so as to retain the drainage pattern within the confines of the coal seam 61015 and to maintain proper spacing and orientation of the diagonal and lateral bores 61052 and 61058.

In a particular embodiment, the diagonal bore 61052 is drilled with an inclined hump at each of a plurality of lateral kick-off points 61056. After the diagonal 61052 is complete, the drill string 61032 is backed up to each successive lateral point 61056 from which a lateral bore 61110 is drilled on each side of the diagonal 61052. It will be understood that the pinnate drainage pattern 61038 may be otherwise suitably formed in accordance with the present invention.

Figure 64A:
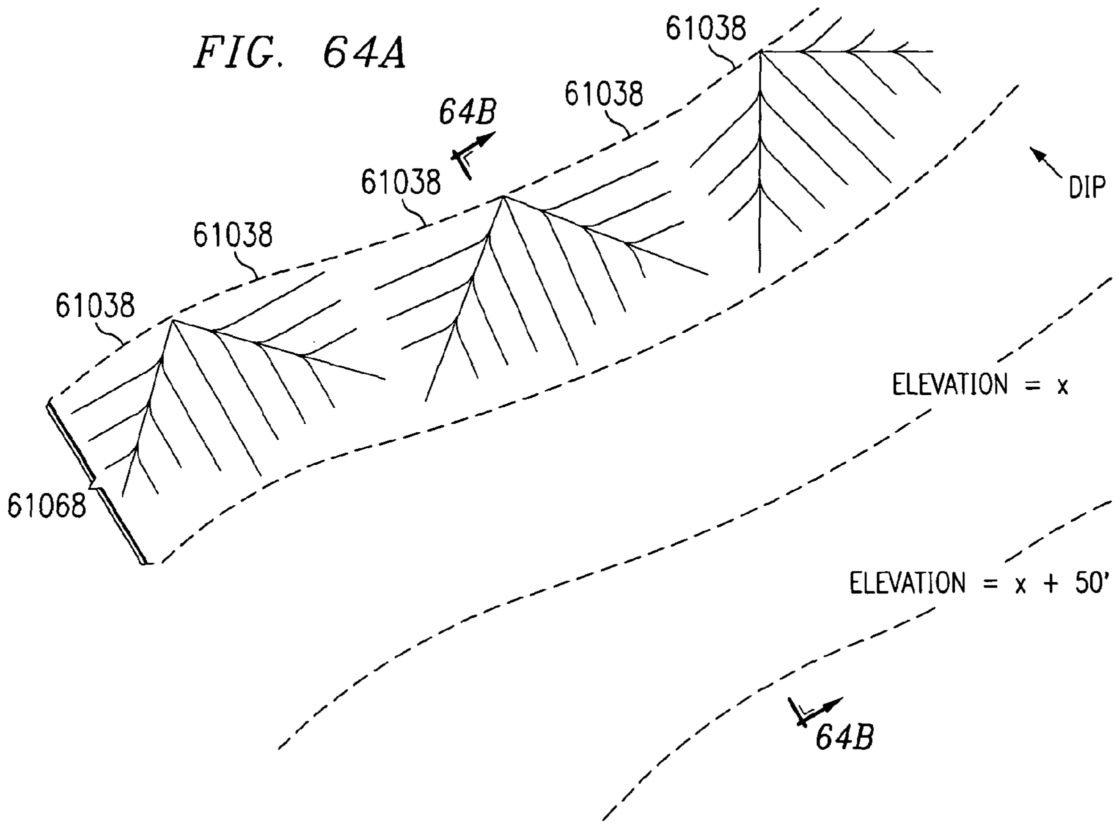
FIGS. 64A-64B illustrate top-down and cross-sectional views of a first set of drainage patters for producing gas from dipping subterranean zone in accordance with one embodiment of the present invention.
Figure 64B:
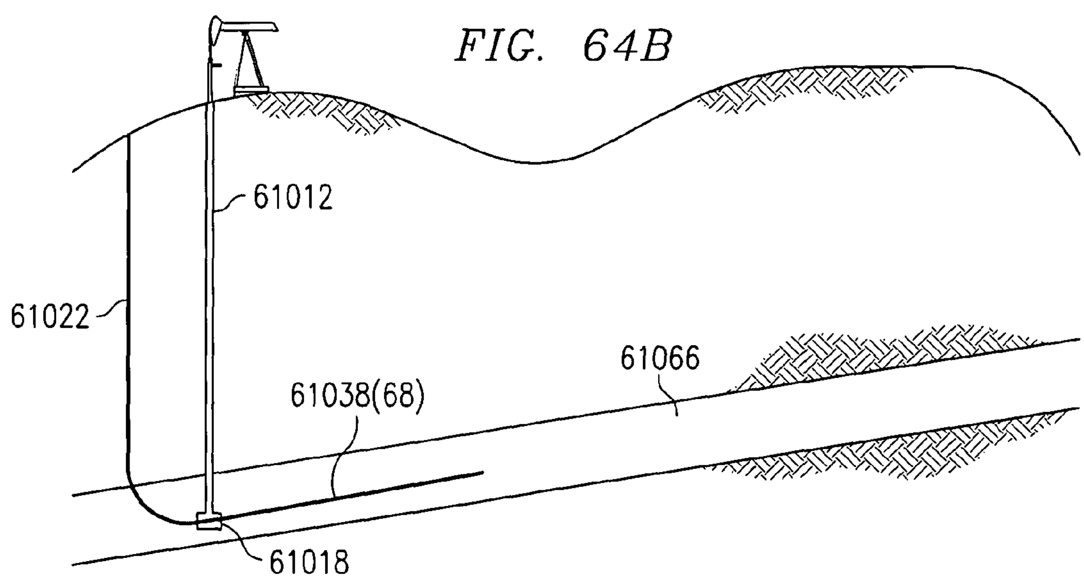

FIGS. 64A-64B illustrate top-down and cross-sectional views of a dipping subterranean zone comprising a coal seam and a first well system at a down-dip point of the subterranean zone at Time (1) in accordance with one embodiment of the present invention.

Referring to FIGS. 64A-64B, the dipping coal seam 61066 is drained by, and gas produced from, a first well system 61068 comprising drainage patterns 61038. It will be understood that the pinnate structure shown in FIG. 63 or other suitable patterns may comprise the drainage patterns 61038. In a particular embodiment, the system 68 is formed with pairs of pinnate drainage patterns 61038 as shown in FIG. 63, each pair having main bores 61056 meeting at a common point downdip. The main bores 61056 extend updip, subparallel to the dip direction, such that one pair of the lateral well bores 61058 runs substantially parallel with the dip direction, and the other set of lateral well bores 61058 runs substantially perpendicular to the dip direction (i.e., substantially parallel to the strike direction). In this way, the drainage patterns 61038 of the series 61068 form a substantially uniform coverage area along the strike of the coal seam.

Water is removed from the coal seam from and around the area covered by the system 61068 through the vertical bores 61012, as described in reference to FIG. 62 or using other suitable means. This water may be released at the surface or trucked off-site for disposal. When sufficient water has been removed to allow for coalbed methane gas production, gas production from the system 61068 progresses through the vertical bore 61012. The wells, cavity drainage pattern and/or pump is/are sized to remove water from the first portion and to remove recharge water from other portions of the coal seam 61066 or other formations. Recharge amounts may be dependent on the angle and permeability of the seam, fractures and the like.

Figure 65A:
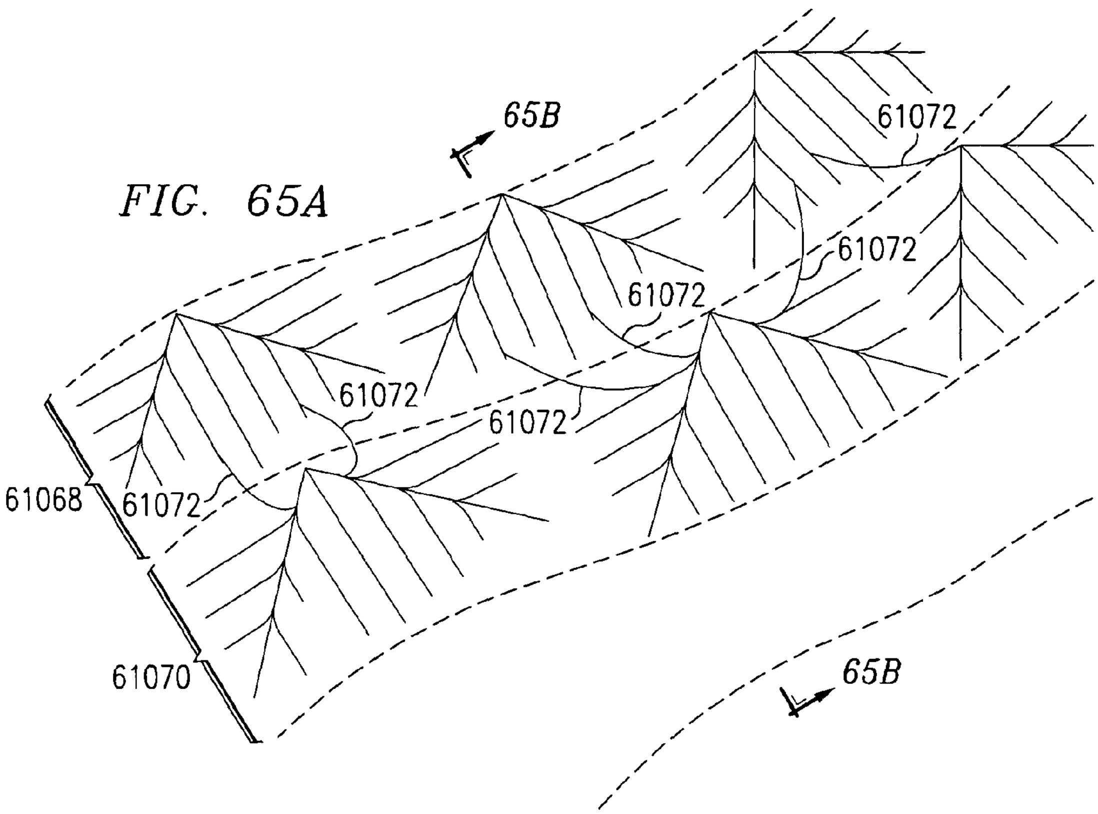
FIGS. 65A-65B illustrate top-down and cross-sectional views of the first set of drainage patterns and a second set of interconnected drainage patterns for producing gas from the dipping subterranean zone of FIGS. 64 at Time (2) in accordance with one embodiment of the present invention.
Figure 65B:
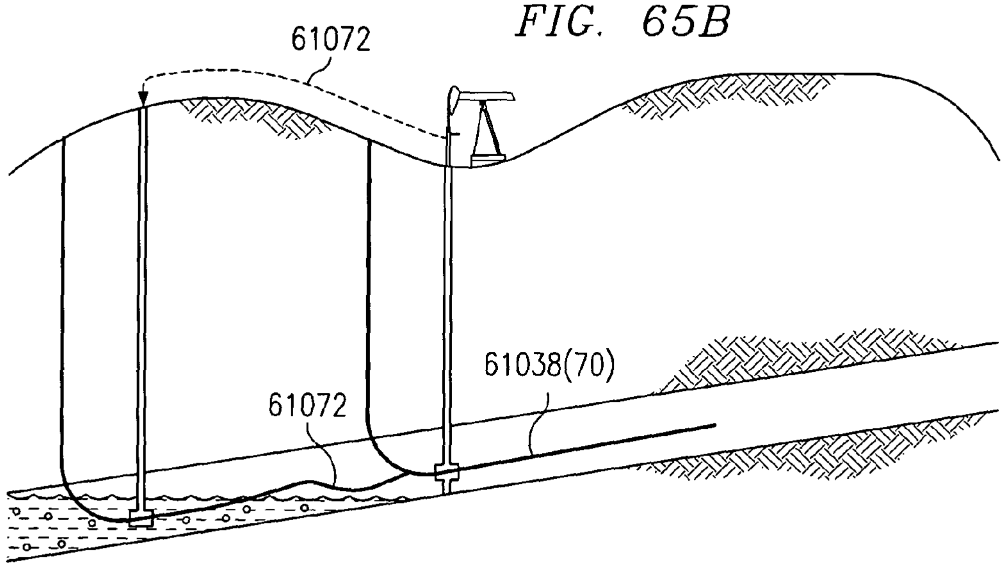

FIGS. 65A-65B illustrate top-down and cross-sectional views of the dipping subterranean zone of FIG. 64 at Time (2) in accordance with one embodiment of the present invention.

Referring to FIG. 65A-65B, the area covered by well series 68 may be depleted of gas. Time (2) may be a year after Time (1), or may represent a greater or lesser interval. A second well system 61070 comprising drainage patterns 61038 is formed updip of the terminus of the system 61068 drainage patterns. The system 61070 is formed in a similar manner as the system 61068, such that the drainage patterns 61038 of the system 61070 form a substantially uniform coverage area along the strike of the coal seam.

A series of subterranean hydraulic connections 61072 may be formed, connecting the system 61068 with the system 61070. The hydraulic connections may comprise piping, well bore segments, mechanically or chemically enhanced faults, fractures, pores, or permeable zones, or other connections allowing water to travel through the subterranean zone. Some embodiments of the present invention may only use surface production and reinjection. In this latter embodiment, the hydraulic connection may comprise piping and storage tanks that may not be continuously connected at any one time.

The hydraulic connection 61072 could be drilled utilizing either the well bores of the system 61068 or the well bores of system 61070. Using the force of gravity, the connection 61072 allows water to flow from the area of system 61070 to the area of system 61068. If such gravity flow did not result in sufficient water being removed from the system 61070 area for gas production from the system 61070 area, pumping could raise additional water to the surface to be returned to the subsurface either immediately or after having been stored temporarily and/or processed. The water would be returned to the subsurface coal seam via the well bores of system 61070, and a portion of that water may flow through the connection 61072 and into the coal seam via the drainage areas of system 61068. When sufficient water has been removed to allow for coalbed methane gas production, gas production from the system 61070 progresses through the vertical bore 61012.

Figure 66A:
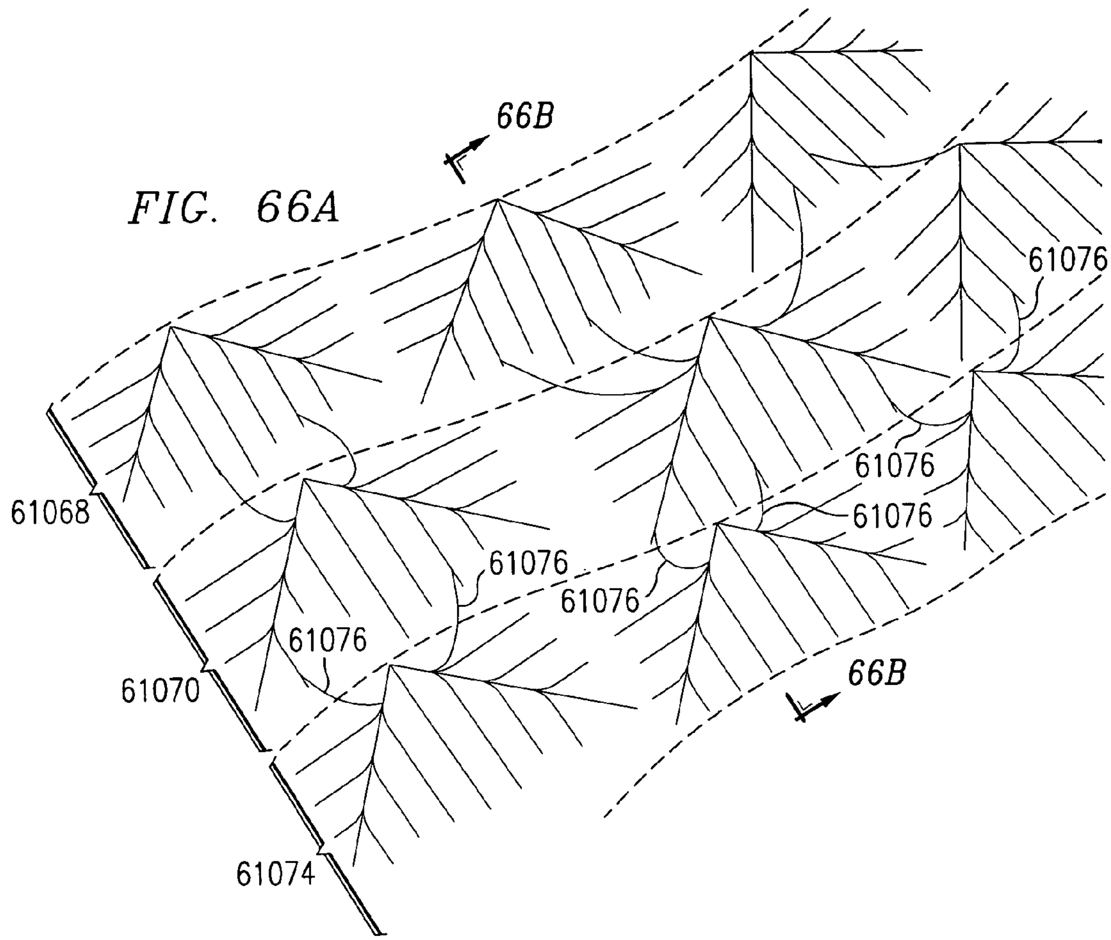
FIGS. 66A-66B illustrate top-down and cross-sectional views of the first and second set of interconnected drainage patterns and a third set of interconnected drainage patterns for providing gas from the dipping subterranean zone of FIG. 64 at Time (3) in accordance with one embodiment of the present invention.
Figure 66B:
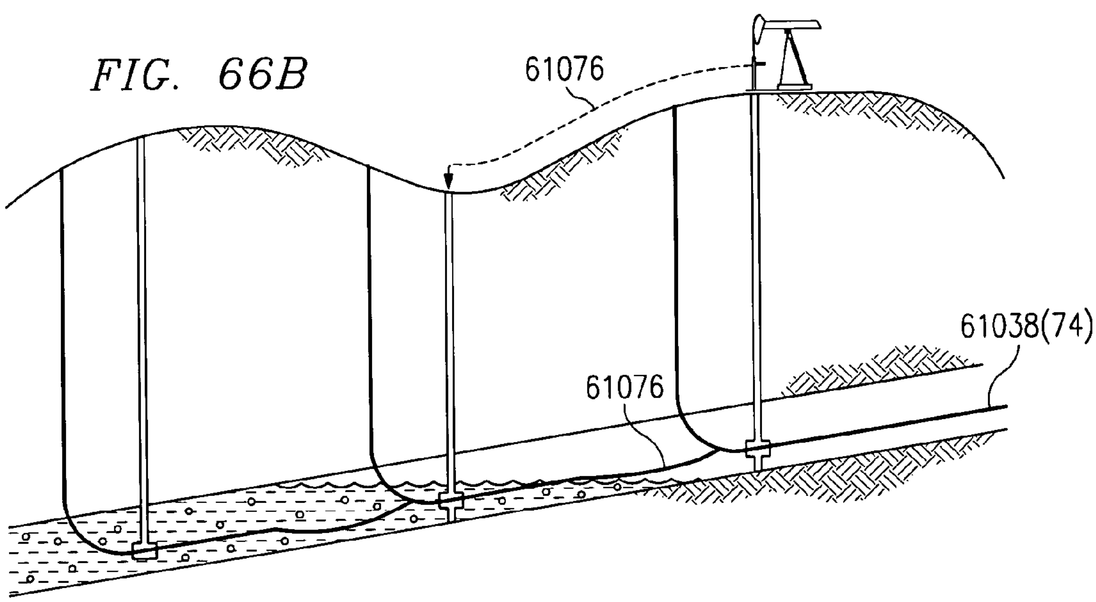

FIGS. 66A-66B illustrate top-down and cross-sectional views of the dipping subterranean zone of FIG. 64 at Time (3) in accordance with one embodiment of the present invention.

Referring to FIGS. 66A-66B, the area covered by the system 61068 and by system 61070 may be depleted of gas. Time (3) may be a year after Time (2), or may represent a greater or lesser interval. A third well system 61074 comprising drainage patterns 61038 is formed updip of the terminus of the system 61070 drainage patterns. The system 61074 is formed in a similar manner as the system 61068 and 61070, such that the drainage patterns 61038 of the system 61074 form a substantially uniform coverage area along the strike of the coal seam.

A series of subterranean hydraulic connections 61076 would be formed, connecting the systems 61068 and 61070 with the system 61074. The connection 61076 could be drilled utilizing either the well bores of the system 61070 or the well bores of system 61074. Assisted by the force of gravity, the connection 61076 would allow water to flow from the area of system 61074 to the area of system 61068 and 61070. If such gravity flow did not result in sufficient water being removed from the system 61074 area for gas production from the system 61074 area, pumping could raise additional water to the surface to be returned to the subsurface either immediately or after having been stored temporarily. The water would be returned to the subsurface coal seam via the well bores of system 61074, and a portion of that water may flow through the connection 61072 and into the coal seam via the drainage areas of systems 61068 and 61070. When sufficient water has been removed to allow for coalbed methane gas production, gas production from the system 61074 progresses through the vertical bores 61012.

Figure 67:
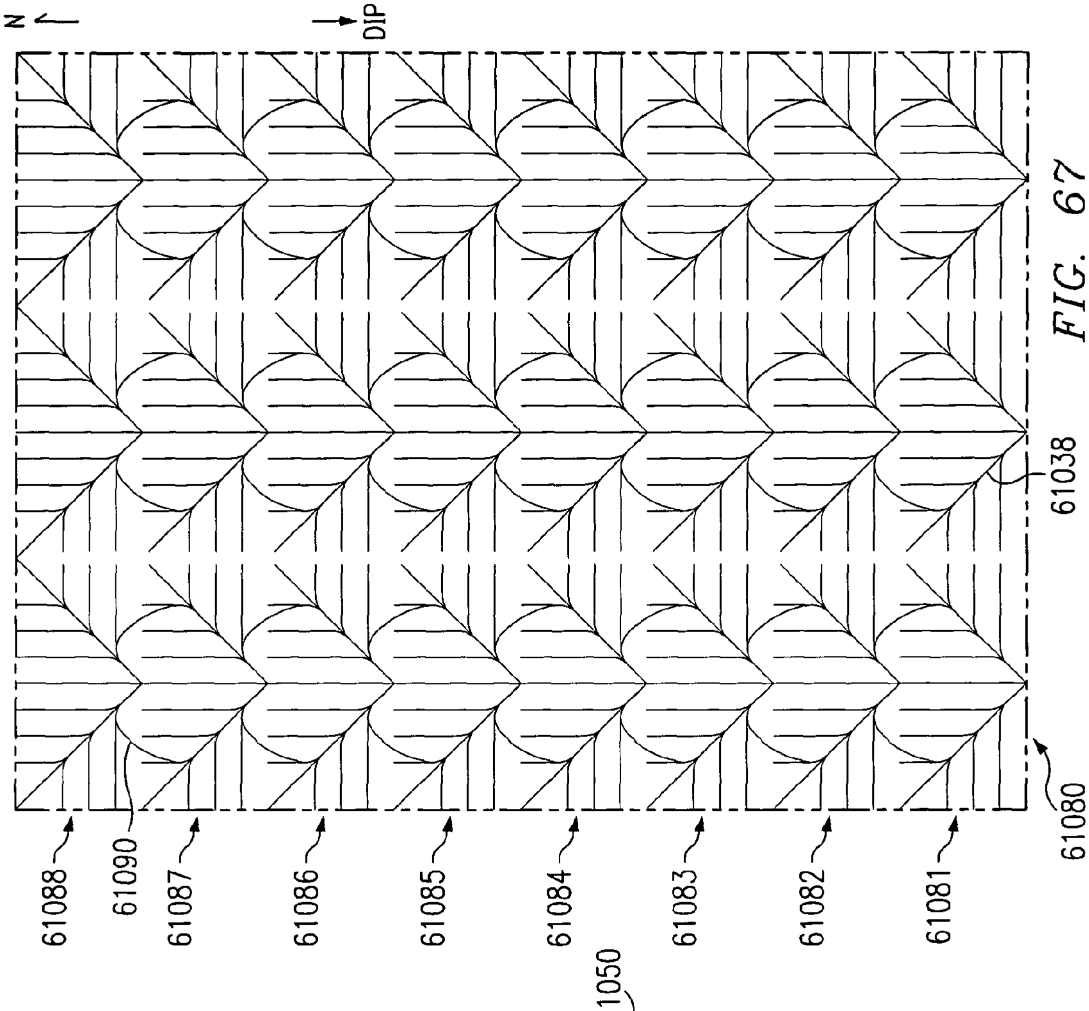
FIG. 67 illustrates top-down view of a field of interconnecting drainage patters for producing gas from a dipping subterranean zone comprising a coal seam in accordance with one embodiment of the present invention.

FIG. 67 illustrates top-down view of a field comprising a dipping subterranean zone comprising a coal seam in accordance with one embodiment of the present invention.

Referring to FIG. 67, coalbed methane gas from the south-dipping coal seam in the field 61080 has been produced from eight well systems 61081, 61082, 61083, 61084, 61085, 61086, 61087, and 61088. The well systems each comprise six drainage patterns 61038, each of which individually cover an area of approximately 150-200 acres. Thus, the field 61080 covers a total area of approximately 7200-9600 acres. In this embodiment, well system 61081 would have been drilled and produced from over the course of a first year of exploitation of the field 61080. Each of the well systems systems 61081, 61082, 61083, 61084, 61085, 61086, 61087, and 61088 may comprise a year's worth of drilling and pumping; thus, the field 80 may be substantially depleted over an eight-year period. At some point or points during the course of each year, connections 61090 are made between the drainage patterns 61038 of the newly drilled well system and those of the down-dip well system to allow water to be moved from the subterranean volume of the newly drilled well system to the subterranean volume of the down-dip will system.

In one embodiment, for a field comprising a plurality of well systems, each of which may comprise a plurality of drainage patterns covering about 150-200 acres, at least about 80% of the gas in the subterranean zone of the field can be produced. After the initial removal and disposal of the by-product from the first well system, the substantially uniform fluid flow and drainage pattern allows for substantially all of the by-product water to be managed or re-injected within the subterranean zone.

Figure 68:
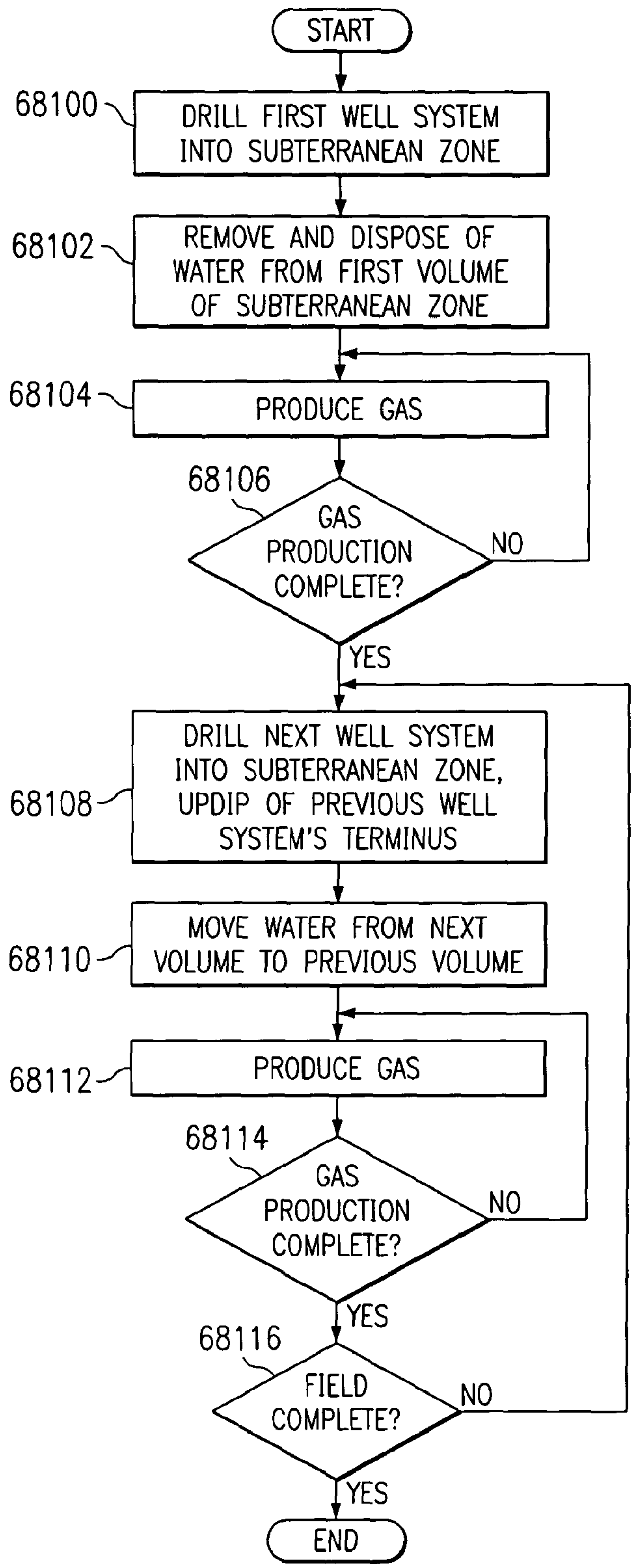
FIG. 68 is a flow diagram illustrating a method for management of by-products from subterranean zones in accordance with one embodiment of the present invention.

FIG. 68 is a flow diagram illustrating a method for management of by-products from subterranean zones in accordance with one embodiment of the present invention.

Referring to FIG. 68, the method begins at step 68100, in which a first well system is drilled into a subterranean zone. The well system may comprise one or more drainage patterns, and may comprise a series of drainage patterns arranged as described in FIGS. 64-66, above. The well system may comprise a dual-well system as described in reference to FIGS. 61-62 or may comprise another suitable well system.

At step 68102, water is removed from a first volume of the subterranean zone via pumping to the surface or other suitable means. The first volume of the subterranean zone may comprise a portion of the volume comprising the area covered by the drainage patterns of the well system multiplied by the vertical height of the subterranean zone (for example, the height of the coal seam) within that area. The water removed at step 68102 may be disposed of in a conventional manner, such as disposing of the water at the surface, if environmental regulations permit, or hauling the water off-site.

At step 68104, gas is produced from the subterranean zone when sufficient water has been removed from the first volume of the subterranean zone. At decisional step 68106, it is determined whether gas production is complete. Completion of gas production may take months or a year or longer. During gas production, additional water may have to be removed from the subterranean zone. As long is gas production continues, the Yes branch of decisional step 68106 returns to step 68104.

When gas production is determined to be complete (or, in other embodiments, during a decline in gas production or at another suitable time), the method proceeds to step 68108 wherein a next well system is drilled into the subterranean zone, updip of the previous well system's terminus. At step 68110, water is moved from the next volume of the subterranean zone via pumping or other means, to the previous zone. The next volume of the subterranean zone may comprise a portion of the volume comprising the area covered by the drainage patterns of newly drilled well system multiplied by the vertical height of the subterranean zone at that area. The moving of the water from the newly drilled volume may be accomplished by forming a hydraulic connection between the well systems. If the hydraulic connection is subsurface (for example, within the subterranean zone), and depending upon the geologic conditions, the movement of the water may occur through subsurface connection due to the force of gravity acting on the water. Otherwise, some pumping or other means may be utilized to aid the water's movement to the previously drained volume. Alternatively, the water from the newly-drilled volume could be pumped to the surface, temporarily stored, and then re-injected into the subterranean zone via one of the well systems. At the surface, pumped water may be temporarily stored and/or processed.

It will be understood that, in other embodiments, the pumped water or other by-product from the next well may be placed in previously drained well systems not down dip from the next well, but instead cross-dip or updip from the next well. For example, it may be appropriate to add water to a previously water-drained well system updip, if the geologic permeability of the subterranean zone is low enough to prevent rapid downdip movement of the re-injected water from the updip well system. In such conditions and in such an embodiment, the present invention would also allow sequential well systems to be drilled in down-dip direction (instead of a sequential up-dip direction as described in reference to FIG. 68) and by-product managed in accordance with the present invention.

At step 68112, gas is produced from the subterranean zone when sufficient water has been removed from the newly drilled volume of the subterranean zone. At decisional step 68114, it is determined whether gas production is complete. Completion of gas production may take months or a year or longer. During gas production, additional water may have to be removed from the subterranean zone. Gas production continues (i.e., the method returns to step 68112) if gas production is determined not to be complete.

If completion of gas production from the newly drilled well system completes the field (i.e., that area of the resource-containing subterranean zone to be exploited), then at decisional step 68116 the method has reached its end. If, updip, further areas of the field remain to be exploited, then the method returns to step 68108 for further drilling, water movement, and gas production.

Figure 69:
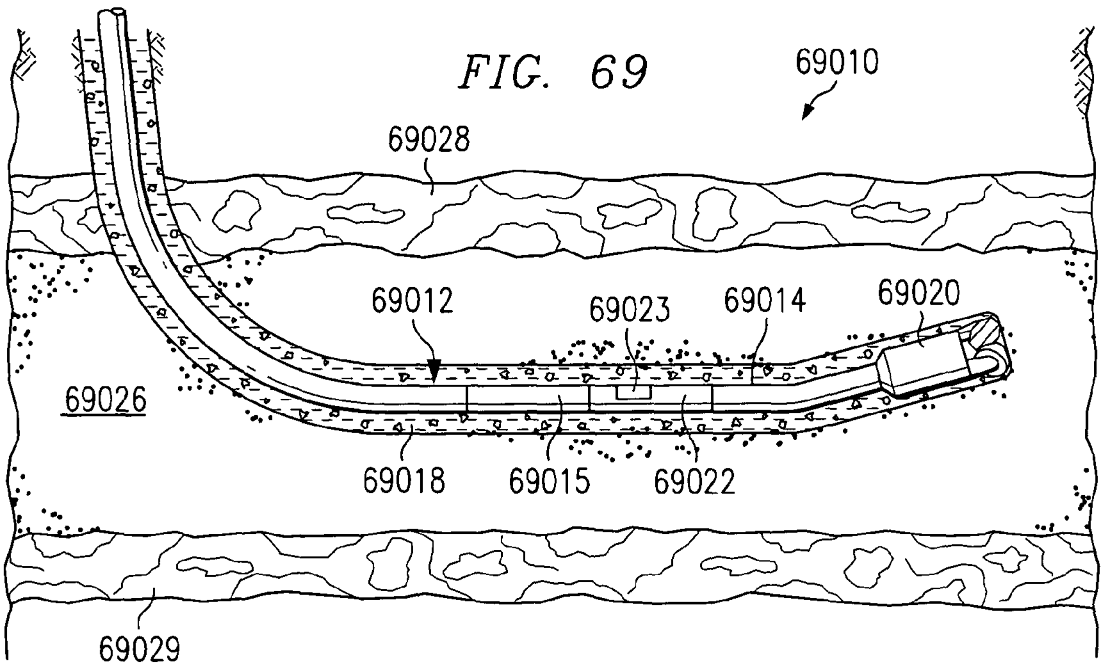
FIG. 69 illustrates a system for guided drilling of a coal seam or other target formation, in accordance with an embodiment of the present invention.

FIG. 69 illustrates a system 69010 for guided drilling in a bounded geologic formation and other suitable formations in accordance with a particular embodiment of the present invention. In this embodiment, the formation is a coal seam having a thickness of less than ten feet. It may be understood that the present invention may be used in connection with drilling other suitable formations, other suitable inclinations and/or formations of other suitable thicknesses.

System 69010 comprises a rotary or other suitable drilling rig at the surface and a drill string 69012 extending from the drilling rig. The drilling rig rotates and otherwise controls drill string 69012 to form a well bore 69018. In one embodiment, drill string 69012 includes a rotary cone drill bit 69020, which cuts through an underground coal seam 69026 to form well bore 69018 when drill string 69012 is rotated. The desired orientation of the well bore is generally parallel to boundaries of the formation being drilled. Drill string 69012 includes a bent sub/motor section 69014, which rotates drill bit 69020 when drilling fluid is circulated. Drilling fluid is pumped down drill string 69012 and discharged out of nozzles in drill bit 69020. The drilling fluid powers the motor and lubricates drill bit 69020, removes formation cuttings and provides a hydrostatic head of pressure in well bore 69018.

Drill string 69012 also includes a sensor section 69022 and a transmitter section 69015, which may include various electronic devices, which may aid in drilling. In a particular embodiment, the sensor section includes a measurement while drilling (MWD) device, one or more logging tools and an acoustic position measurement system 69023. Sensor section 69022 and transmitter section 69015 may be powered by one or more local battery cells or generated power or by a wireline from the surface. Sensor section 69022 and transmitter section 69015 and their components may communicate with the surface through suitable wireline and/or wireless links, such as, for example, mud pulses or radio frequency. Transmitter section 69015 may communicate information to the surface that is compiled, produced or processed by sensor section 69022. In particular embodiments, sensor section 69022 may be operable to communicate such information to the surface.

In the illustrated embodiment, well bore 69018 is drilled in a coal seam 69026. Coal seam 69026 is bounded by an upper boundary layer 69028 and a lower boundary layer 69029. The upper and lower boundary layers 69028 and 69029 may be sandstone, shale, limestone or other suitable rock and/or mineral strata.

Figure 70:
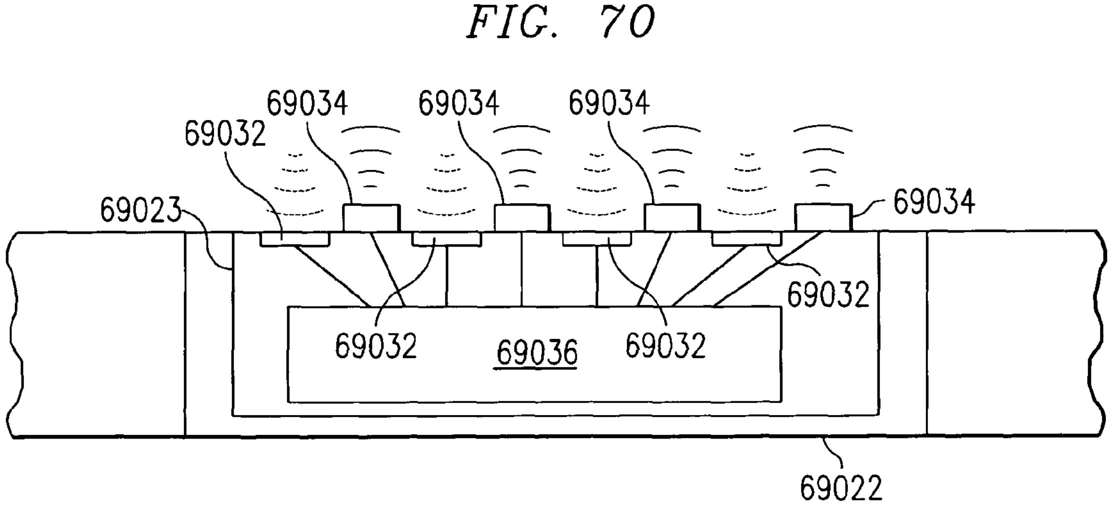
FIG. 70 illustrates an acoustic position measurement system with acoustic transmitters and receivers, in accordance with an embodiment of the present invention.

FIG. 70 illustrates details of acoustic position measurement system 69023 of sensor section 69022 in accordance with a particular embodiment of the present invention. As described in more detail below, acoustic position measurement system 69023 provides positional feedback so that an operator or an automated drill guidance system may maintain drill string 69012 in a desired position within coal seam 69026 and/or to prevent drill string 69012 from leaving coal seam 69026.

Referring to FIG. 70, acoustic position measurement system 69023 includes acoustic transmitters 69034, acoustic transducer receivers 69032 and electronics package 69036. Transmitters 69034 may be mounted and/or located upon sensor section 69022 in various ways. For example, in particular embodiments transmitters 69034 may be flush-mounted upon sensor section 69022. Transmitters 69034 may also be aligned in a row upon sensor section 69022, as illustrated, or may be spaced in line or staggered about the circumference of sensor section 69022. Transmitters 69034 are operable to transmit a sound wave into the wall of the well bore surrounding sensor section 69022. Transmitters 69034 may transmit the sound wave each second, every few seconds or multiple times per second. If drill string 69012 is rotated between successive transmissions of a sound wave, the sound wave will ultimately propagate in directions all around sensor section 69022 (360 degrees around acoustic position measurement system 69023). The interval at which the sound waves are transmitted may depend on the speed of rotation of drill string 69012. The frequency of the sound wave transmitted by transmitters 69034 may be similar to frequencies used in sonic well logging. As an example, sound waves having frequencies ranging between 1.0 hertz and 2.0 megahertz may be used. The sound wave should be discernable in a drilling environment, should propagate well in the formations and should provide a maximum or suitable amplitude reflected signal at the boundary layer. In applications where high resolution is important, higher frequencies may be used. In some embodiments, the transmitters may transmit a sound wave using mechanical means. As used herein, the term “sound wave” may include either one or a plurality of sound waves.

Receivers 69032 of acoustic position measurement system 69023 are flush-mounted upon sensor section 69030 in the illustrated embodiment, but other embodiments may include receivers 69032 mounted and/or located upon sensor section 69030 in other ways. Receivers 69032 may be aligned in a row as discussed earlier with regard to transmitters 69034 so as to receive the reflected sound wave from all directions around acoustic position measurement system 69023 during rotation of drill string 69012. In particular embodiments, the spacing between each receiver 69032 may be some fraction or multiple of a wavelength of the sound wave being generated by transmitters 69034 (e.g., one-half of such wavelength). Receivers 69032 of acoustic position measurement system 69023 may be conventionally combined with transmitters 69034 in some embodiments, using piezoelectrics or other suitable techniques. The sound wave transmitted by transmitters 69034 reflects from boundaries of the coal seam or other target formation (for example, upper and lower boundaries 69028 and 69029 of coal seam 69026 of FIG. 69), and receivers 69032 receive the reflected sound waves from within well bore 69018.

Each receiver 69032 and transmitter 69034 are electrically coupled to an electronics package 69036. As used herein, “each” means any one of at least a sub-set of items. Electronics package 69036 controls transmitters 69034 to transmit acoustic signals in well bore 69018 and processes reflected or return signals to provide positional information of the system in the well bore. In one embodiment, the positional information may be the distance between the acoustic position measurement system 69023 and a boundary, such as upper boundary 69028 or lower boundary 69029 of coal seam 69026 of FIG. 69 as discussed in further detail below. In another embodiment, the positional information may be whether the system is within a specified range of a boundary, such as one or two feet.

Electronics package 69036 may use a combination of analog signal amplification and filtering, and digital signal processing (DSP) or other techniques to make such a determination. Thus, electronics package 69036 may comprise logic encoded in media, such as programmed tasks for carrying out programmed instructions. The media may be a storage medium, a general-purpose processor, a digital signal processor, ASIC, FPGA or the like. Electronics package 69036 may also calculate or process other data, which may help in determining the distance of acoustic position measurement system 69023 to a particular boundary. Electronics package 69036 may also transmit raw data to the surface for processing.

Figure 71:
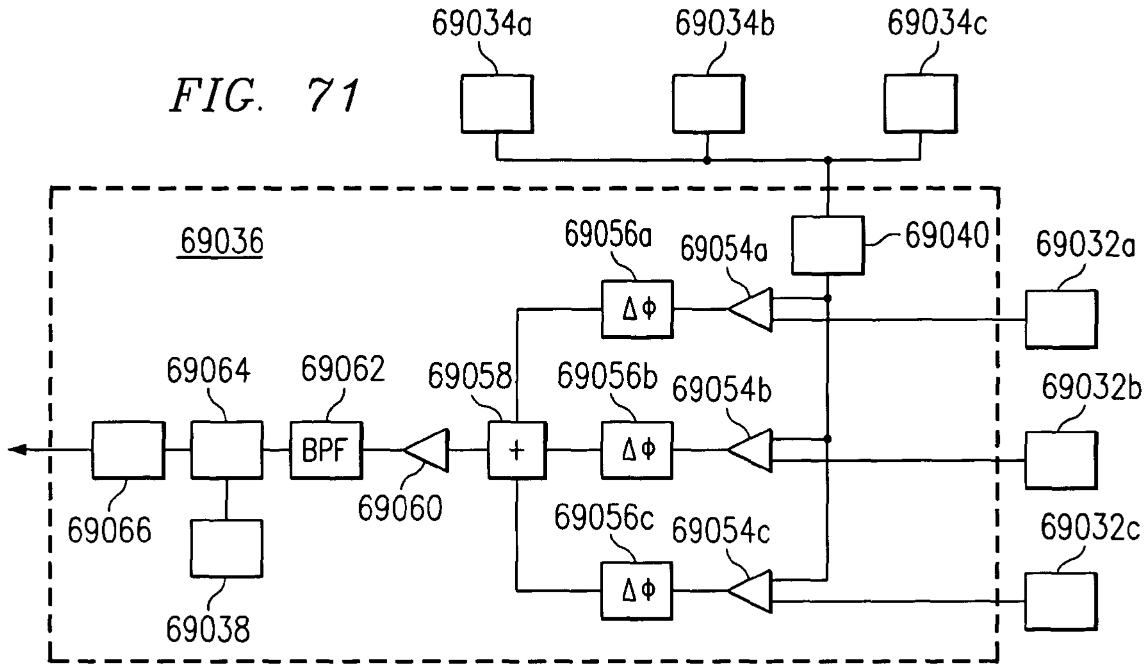
FIG. 71 illustrates an electronics package of an acoustic position measurement system, in accordance with an embodiment of the present invention.

FIG. 71 illustrates an electronics package 69036 for processing a reflected sound wave in accordance with a particular embodiment of the present invention. Electronics package 69036 includes amplifiers 69054, phase shifters 69056, combiner 69058, amplifier 69060, band pass filter 69062, directional sensor 69038, timer 69040, processor 69064 and communication port 69066.

Receivers 69032 receive the reflected sound wave along with other acoustic noise present in the well bore 69018. The combined reflected sound wave plus any received acoustic noise is amplified by amplifiers 69054 and passes to phase shifters 69056. Phase shifters 69056 induce a known amount of phase shift into the sound waves received by receivers 69032. This process can help maximize the reception for a desired signal and can reduce the reception for undesired noise received by receivers 69032.

As an example, a sound wave reflected from a boundary 69028 or 69029 of coal seam 69026 of FIG. 69 may arrive at each receiver 69032 at a different phase angle of the primary sinusoidal component of the received sound wave. When the reflected sound wave arrives at receiver 69032*a*, the primary sinusoidal component of the wave may be at a different phase than when it arrives at receiver 69032*b* (and likewise with respect to receiver 69032*c*). As a result, phase shifters 69056 can induce a known amount of phase shift into the primary sinusoidal component of the wave received by their respective receivers in order to bring all the reflected sound waves into the same phase angle.

Phase shifter 69056*a* may induce a certain amount of phase shift into the primary sinusoidal component of the desired sound wave received by receiver 69032*a*, while phase shifter 69056*b* may induce a different amount of phase shift into the primary sinusoidal component of the sound wave received by receiver 69032*b* to bring the sound waves received by receivers 69032*a* and 69032*b* into the same phase. Accordingly, phase shifter 69056*c* may induce a different amount of phase shift into the primary sinusoidal component of the sound wave received by receiver 69032*c* to bring the primary sinusoidal component of the wave into phase with the primary sinusoidal component of the sound waves shifted by phase shifters 69056*a* and 69056*b*. The difference in the amounts of phase shift induced by phase shifters 69056 may be relative to the distance between their respective receivers 69032 of acoustic position measurement system 69023. The phase shift inducement can increase the reception of the primary sinusoidal component of the reflected sound wave since the wave received by each receiver will now be in phase with the wave received by the other receivers, thus increasing the amplitude of the sum of the primary sinusoidal components of the reflected sound wave. It should be understood that it may not be necessary for one or more phase shifters 69056 to induce a phase shift into a reflected sound wave received by their respective receivers 69032 in order to bring each primary sinusoidal component of the received wave into the same phase.

Combiner 69058 combines the sound waves plus noise received by each respective receiver into one signal after such waves plus noise have passed through amplifiers 69054 and phase shifters 69056. The combined signal is then amplified by amplifier 69060. Band-pass filter (BPF) 69062 filters out undesired frequencies and/or noise picked up by receivers 69032. Such undesired frequencies are typically all frequencies other than the frequency of the primary sinusoidal component of the sound waves transmitted by transmitters 69034. BPF 69062 may be set so that it only passes through this certain desired frequency and attenuates all others to the maximum extent possible.

Other techniques or devices may also be used to reduce or filter out undesired noise received by receivers 69032. For example, the function of the BPF may, instead, be implemented by digitizing the signal in an analog-to-digital converter, and then digitally filtering the resulting data stream by well-known means in a digital signal processor. For another example, the rotation of the drill string may be reduced or stopped while the measurement system is in operation in order to reduce undesired noise in the well bore. The drill bit may also be backed away from the surface being drilled. Furthermore, the circulation of drilling fluid may be reduced or stopped to reduce undesired acoustic noise.

After the signal has passed through BPF 69062, a processor 64 of the electronics package calculates the distance from acoustic position measurement system 69023 to the boundary of the target formation (e.g., boundary 69028 of coal seam 69026 of FIG. 69) based upon the amount of time it took between transmission of the sound wave and the reception of the reflected sound wave received by receivers 69032. Such distance is a product of one-half such amount of time and the average acoustic propagation velocity of the subterranean material through which the transmitted and reflected sound waves have traveled.

The amplitude of the reflected sound wave received by receivers 69032 is, in part, a function of the acoustic attenuation properties of the materials through with the sound wave passes and of the boundary formation from which the sound wave reflects. In addition, the portion of the transmitted energy reflected at the formation boundary is a direct function of the difference in densities between the target formation and the adjacent formation that forms the boundary formation. For example, the density of material immediately forming the boundaries of a coal seam (i.e., shale, sandstone, limestone, etc.) may be approximately 2.6 to 2.8 times the density of water, while the density within the coal seam may be approximately 1.4 times the density of water. This may result in a density ratio between those two areas of approximately 2:1.

Any acoustic properties of these materials which change with acoustic frequency may also be helpful in choosing the frequency of the sound wave to be transmitted by the transmitters of the acoustic position measurement system. The choice of such frequency may, for example, be based on minimizing the acoustic attenuation of the primary sinusoidal component of the sound waves transmitted by transmitters 69034.

Directional sensor 69038 determines a directional reference position for acoustic position measurement system 69023. This determination may, for example, be the rotational position (in terms of degrees measured from the local gravitational vertical) of acoustic position measurement system 69023 or receivers 69032 at a particular time. Directional sensor 69038 also may determine other directional positions, such as the inclination of acoustic position measurement system 69023 in other embodiments. This information, combined with the distance information determined by electronics package 69036 may be communicated to an operator at the surface. Such communication may be made using a wireline, a mud pulse, an electromagnetic pulse or other techniques known by one skilled in the art. Such communication may also be made by a separate transmitter section 69015, as illustrated in FIG. 69. In some embodiments, directional sensor 69038 may be included in a section of drill string 69012 separate from sensor section 69022.

Timer 69040 can activate and deactivate transmitters 69034 and amplifiers 69054 at a particular time to minimize the reception of acoustic noise or false signals, and/or to avoid possible electrical saturation or burnout of transmitters 69034, amplifiers 69054 and other components of electronics portion 69036. For example, timer 69040 may deactivate amplifiers 69054 during and shortly after a time window when a sound wave is being transmitted. Subsequently, amplifiers 69054 may be activated during a window in which the sound wave is expected to be received after being reflected from boundaries 69028 or 69029 of coal seam 69026 of FIG. 69. This process can reduce the potential to amplify and process reflections of the sound wave from other surrounding strata and can also reduce the possibility of electrical saturation and/or burnout of amplifiers 69054 and other components of electronics portion 69036 resulting from amplifying and processing undesired sound waves or noise from within the well bore.

The distance information produced by processor 69064 is combined by processor 69064 with directional information produced by directional sensor 69038. Such information may be communicated to an operator or to an automated drill guidance system through communication port 69066. The information may enable an operator or an automated drill guidance system to keep the drill string at a desired relative position within the target formation. For example, if the operator or automated drill guidance system receives distance and directional information indicating that the drill string is getting closer than desired to a boundary of the target formation, the operator or automated drill guidance system may guide the drill string in another direction to keep it centralized within the target formation.

Distance and directional information may be displayed to an operator at the surface in any of a number of ways. One example of such a display is an analog display showing two numbers—one number representing the rotation position of receivers 69032 of acoustic position measurement system 69023 and another number representing the distance from receivers 69032 at such rotational position to a target formation boundary. An operator can use this information to steer the drilling member in order to maintain a centralized position within the coal seam. The orientation information (i.e. rotation and inclination position) of the acoustic position measurement system may be combined with the distance information and the distance between the acoustic position measurement system and the drill bit to determine how far the drill bit is from a particular boundary of the coal seam. Electronics package 69036 may also send a signal to the surface when the acoustic position measurement system is within a certain range of a boundary of a coal seam. Electronics package 36 may also determine and indicate which boundary formation the acoustic position measurement system is being approached.

Figure 72:
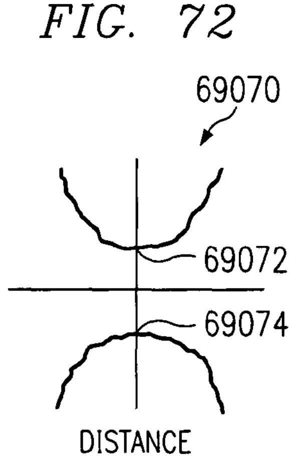
FIG. 72 illustrates a polar distance map of an acoustic position measurement system, in accordance with an embodiment of the present invention.

The directional and distance information may also be used to chart a polar distance map of the surrounding strata. FIG. 72 illustrates a polar distance map 69070 in accordance with a particular embodiment of the present invention. Electronics package 69036 or another device may also be able to chart such a map based on the distance information provided by electronics package 69036 and the directional information provided by directional sensor 69038. The polar distance map may be continuously updated in real-time and may be charted below the surface. It may be displayed on a visual display at the surface, such as a computer display.

Referring to FIG. 72, polar distance map 69070 shows the distance from the acoustic position measurement system of the drill string to a point of closest approach (PCA) 69072 of the target formation boundary in one direction and to a PCA 69074 of the target formation boundary in an opposite direction. If it is desired to maintain a centralized position within the target formation with respect to the directions upon which polar distance map 69070 is based, an operator or automated drill guidance system would want polar distance map 69070 to appear symmetrical (e.g., approximately equal distance to PCA 69072 and to PCA 69074), as illustrated. If a polar distance map shows that the distance to one PCA is less than the distance to another PCA, the operator or automated drill guidance system can steer the drill string away from the direction represented by PCA closer to the drill string in order to centrally position the drill string within the coal seam.

Figure 73:
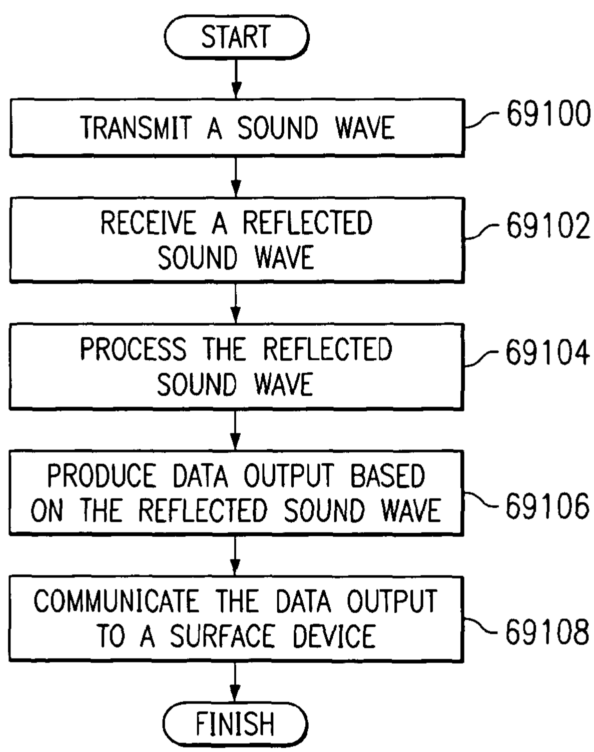
FIG. 73 illustrates an example method for determining a desired position for a drilling member using an acoustic position measurement system, in accordance with an embodiment of the present invention.

FIG. 73 illustrates an example method for determining a desired position for a drilling member using an acoustic position measurement system, in accordance with an embodiment of the present invention. The method begins at step 69100 where a sound wave is transmitted in a target formation, such as a coal seam, using an acoustic transmitter. The sound wave reflects from a boundary formation proximate the target formation, such as boundary layers 69028 and 69029 of FIG. 69. Particular embodiments may include transmitting a plurality of sound waves using a plurality of acoustic transmitters. Step 69102 includes receiving a reflected sound wave using an acoustic receiver. The reflected sound wave may comprise a reflection of the sound wave transmitted in step 69100 from the boundary formation. Particular embodiments may include receiving a plurality of reflected sound waves using a plurality of acoustic receivers.

Step 69104 includes processing the reflected sound wave using an electronics portion coupled to the acoustic receiver. Such processing may comprise amplifying the reflected sound wave using an amplifier coupled to the acoustic receiver. The function of the amplifier may be changed by a timer at specified times and for specified durations after transmission of the sound wave to prevent amplifier saturation by the transmitted wave and "near field" returns, and to otherwise reduce the acoustic noise energy input to the amplifier. In particular embodiments where a plurality of reflected sound waves are received using a plurality of acoustic receivers, the method may include shifting the phase of the primary sinusoidal component of at least one of the reflected sound waves using the electronics portion to bring the primary sinusoidal component of each reflected sound wave into alignment with respect to the primary sinusoidal component of the other reflected sound waves. Such phase shifting may be accomplished using one or more phase shifters of the electronics portion. In some embodiments, the reflected sound waves may be combined to generate a signal. The signal may also be filtered before and/or after amplification using a band-pass filter, digital signal processing and/or other methods to minimize the reception of out-of-band acoustic noise energy.

Step 69106 includes producing data output based on the reflected sound wave. The data output may be indicative of a position of the acoustic position measurement system in the target formation, such as the distance from the acoustic position measurement system to the boundary formation. Particular embodiments may include detecting a directional position of the system using a directional sensor. In such cases, the data output may comprise the directional position and a distance from the system to the boundary formation. Step 69108 includes communicating the data output to a surface device. Such communication may be made through suitable wireline and/or wireless links, such as drilling fluid pressure pulses or electromagnetic transmissions.

Figure 74:
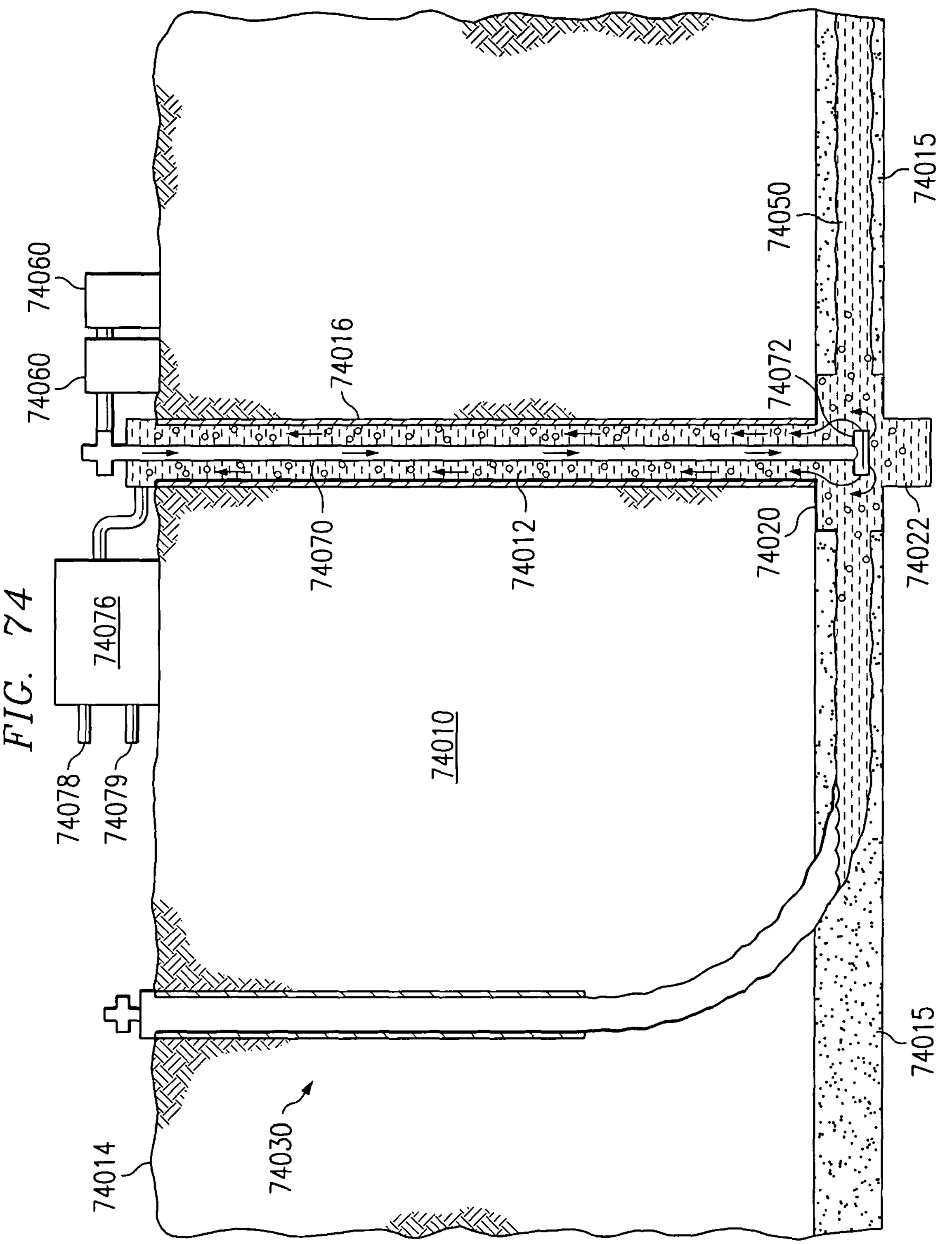
FIG. 74 is cross-sectional diagram illustrating production from the subterranean zone to the surface using the multi-well system in accordance with several embodiments of the present invention.

FIG. 74 illustrates production from a coal seam 74015 to the surface using the multi-well system 74010 in accordance with several embodiments of the present invention. In particular, FIG. 74 illustrates the use of gas lift to produce water from a coal seam 74015. FIG. 74 illustrates the use of a rod pump to produce water from the coal seam 74015. In one embodiment, water production may be initiated by gas lift to clean out the cavity 74020 and kick-off production. After production kick-off, the gas lift equipment may be replaced with a rod pump for further removal of water during the life of the well. Thus, while gas lift may be used to produce water during the life of the well, for economic reasons, the gas lift system may be replaced with a rod pump for further and/or continued removal of water from the cavity 74020 over the life of the well. In these and other embodiments, evolving gas disorbed from coal in the seam 74015 and produced to the surface 74014 is collected at the well head and after fluid separation may be flared, stored or fed into a pipeline.

As described in more detail below, for water saturated coal seams 74015 water pressure may need to be reduced below the initial reservoir pressure of an area of the coal seam 74015 before methane and other gas will start to diffuse or disorb from the coal in that area. For shallow coal beds at or around 1000 feet, the initial reservoir pressure is typically about 300 psi. For undersaturated coals, pressure may need to be reduced well below initial reservoir pressure down to the critical disorbtion pressure. Sufficient reduction in the water pressure for gas production may take weeks and/or months depending on configuration of the well bore pattern 74050, water recharge in the coal seam 74015, cavity pumping rates and/or any subsurface drainage through mines and other man made or natural structures that drain water from the coal seam 74015 without surface lift. From non-water saturated coal seams 74015, reservoir pressure may similarly need to be reduced before methane gas will start to diffuse or disorb from coal in the coverage area. Free and near-well bore gas may be produced prior to the substantial reduction in reservoir pressure or the start of disorbtion. The amount of gas disorbed from coal may increase exponentially or with other non-linear geometric progression with a drop in reservoir pressure. In this type of coal seam, gas lift, rod pumps and other water production equipment may be omitted.

Referring to FIG. 74, after the well bores 74012 and 74030, and well bore pattern 74050 have been drilled, the drill string 74040 is removed from the articulated well bore 74030 and the articulated well bore 74030 is capped. A tubing string 74070 is disposed into well bore 74012 with a port 74072 positioned in the enlarged cavity 74020. The enlarged cavity 74020 provides a reservoir for water or other fluids collected through the drainage pattern 74050 from the coal seam 74015. In one embodiment, the tubing string 74070 may be a casing string for a rod pump to be installed after the completion of gas lift and the port 74072 may be the intake port for the rod pump. In this embodiment, the tubing may be a 2⅞ tubing used for a rod pump. It will be understood that other suitable types of tubing operable to carry air or other gases or materials suitable for gas lift may be used.

At the surface 74014, an air compressor 74074 is connected to the tubing string 74070. Air compressed by the compressor 74074 is pumped down the tubing string 74070 and exits into the cavity 74020 at the port 74072. The air used for gas lift and/or for the previously described under balanced drilling may be ambient air at the site or may be or include any other suitable gas. For example, produced gas may be returned to the cavity and used for gas lift. In the cavity, the compressed air expands and suspends liquid droplets within its volume and lifts them to the surface. In one embodiment, for shallow coal beds 74015 at or around one thousand feet, air may be compressed to three hundred to three hundred fifty psi and provided at a rate of nine hundred cubic feet per minute (CFM). At this rate and pressure, the gas lift system may lift up to three thousand, four thousand or five thousand barrels a day of water to the surface.

At the surface, air and fluids are fed into a fluid separator 74076. Produced gas and lift air may be outlet at air/gas port 74078 and flared while remaining fluids are outlet at fluid port 74079 for transport or other removal, reinjection or surface runoff. It will be understood that water may be otherwise suitably removed from the cavity 74020 and/or drainage pattern 74050 without production to the surface. For example, the water may be reinjected into an adjacent or other underground structure by pumping, directing or allowing the flow of the water to the other structure.

During gas lift, the rate and/or pressure of compressed air provided to the cavity may be adjusted to control the volume of water produced to the surface. In one embodiment, a sufficient rate and/or pressure of compressed air may be provided to the cavity 74020 to lift all or substantially all of the water collected by the cavity 74020 from a coal seam 74015. This may provide for a rapid pressure drop in the coverage area of the coal seam 74015 and allow for kick-off of the well to self-sustaining flow within one, two or a few weeks. In other embodiments, the rate and/or pressure of air provided may be controlled to limit water production below the attainable amount due to limitations in disposing of produced water and/or damage to the coal seam 74015 or equipment by high rates of production. In a particular embodiment, a turbidity meter may be used at the well head to monitor the presence of particles in the produced water. If the amount of particles is over a specified limit, a controller may adjust a flow control valve to reduce the production rate. The controller may adjust the valve to specific flow rates and/or use feedback from the turbidity meter to adjust the flow control valve to a point where the amount of particles in the water is at a specified amount.

Figure 75:
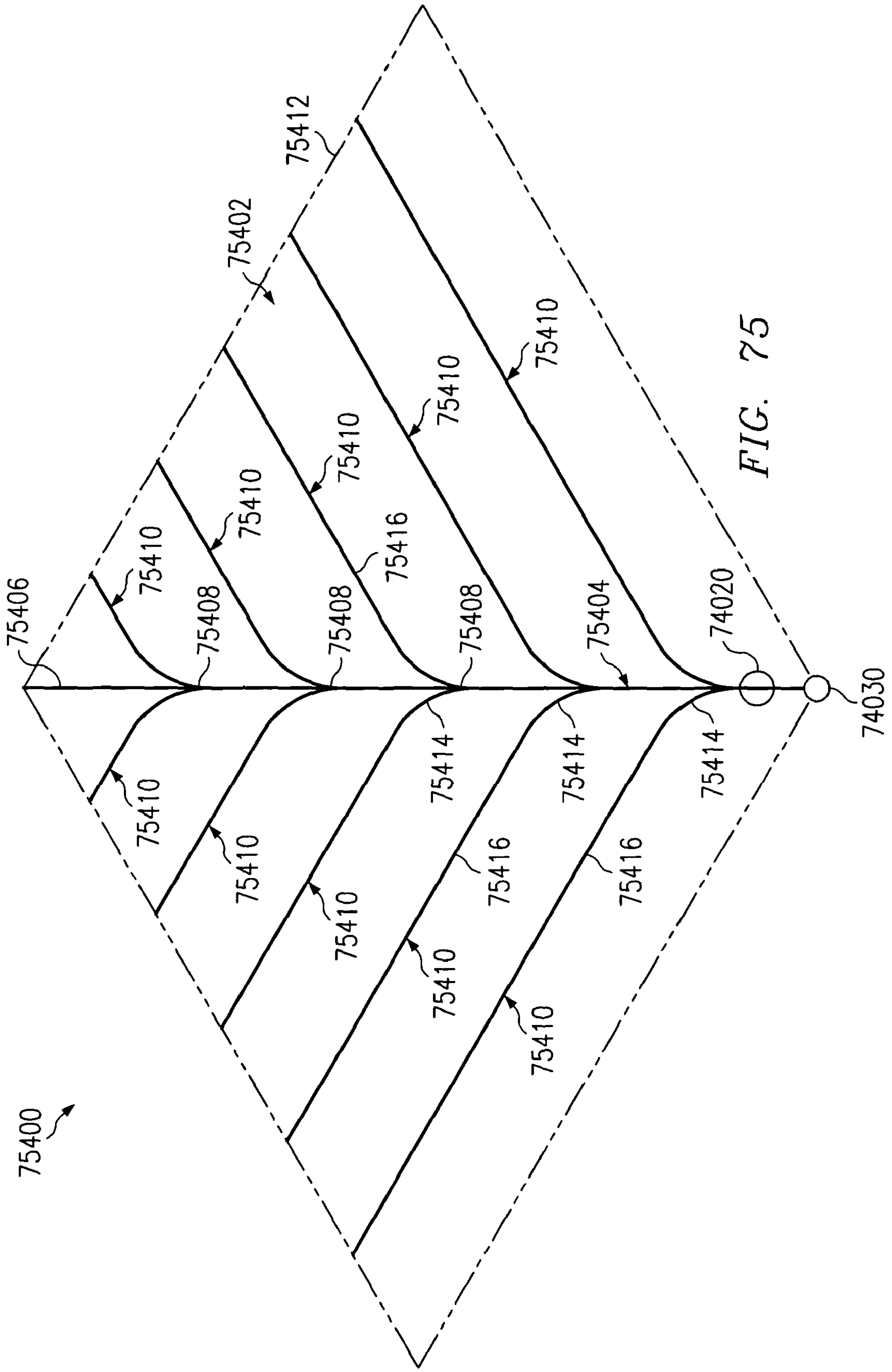
FIG. 75 is a top plan diagram illustrating a pinnate well bore pattern for accessing products in the subterranean zone in accordance with still another embodiment of the present invention.

FIG. 75 illustrates a well bore pattern 75400 in accordance with still another embodiment of the present invention. In this embodiment, the well bore pattern 75400 provides access to a substantially diamond or parallelogram-shaped area 75402 of a subterranean resource. A number of the well bore patterns 75400 may be used together to provide uniform access to a large subterranean region.

Referring to FIG. 75 the articulated well bore 74030 defines a first corner of the area 75402. The well bore pattern 75400 includes a main well bore 75404 extending diagonally across the area 75402 to a distant corner 75406 of the area 75402. For drainage applications, the well bores 74012 and 74030 may be positioned over the area 75402 such that the well bore 75404 is drilled up the slope of the coal seam 74015. This may facilitate collection of water, gas, and other fluids from the area 75402. The well bore 75404 is drilled using the drill string 74040 and extends from the enlarged cavity 74020 in alignment with the articulated well bore 74030.

A plurality of lateral well bores 75410 extend from the opposite sides of well bore 75404 to a periphery 75412 of the area 75402. The lateral well bores 75410 may mirror each other on opposite sides of the well bore 75404 or may be offset from each other along the well bore 75404. Each of the lateral well bores 75410 includes a radius curving portion 75414 extending from the well bore 75404 and an elongated portion 75416 formed after the curved portion 75414 has reached a desired orientation. For uniform coverage of the area 75402, pairs of lateral well bores 75410 may be substantially equally spaced on each side of the well bore 75404 and extend from the well bore 75404 at an angle of approximately 60 degrees. The lateral well bores 75410 shorten in length based on progression away from the enlarged diameter cavity 74020. As with the other pinnate patterns, the quantity and spacing of lateral well bores 75410 may be varied to accommodate a variety of resource areas, sizes and well bore requirements. For example, lateral well bores 75410 may be drilled from a single side of the well bore 75404 to form a one-half pinnate pattern.

Figure 76:
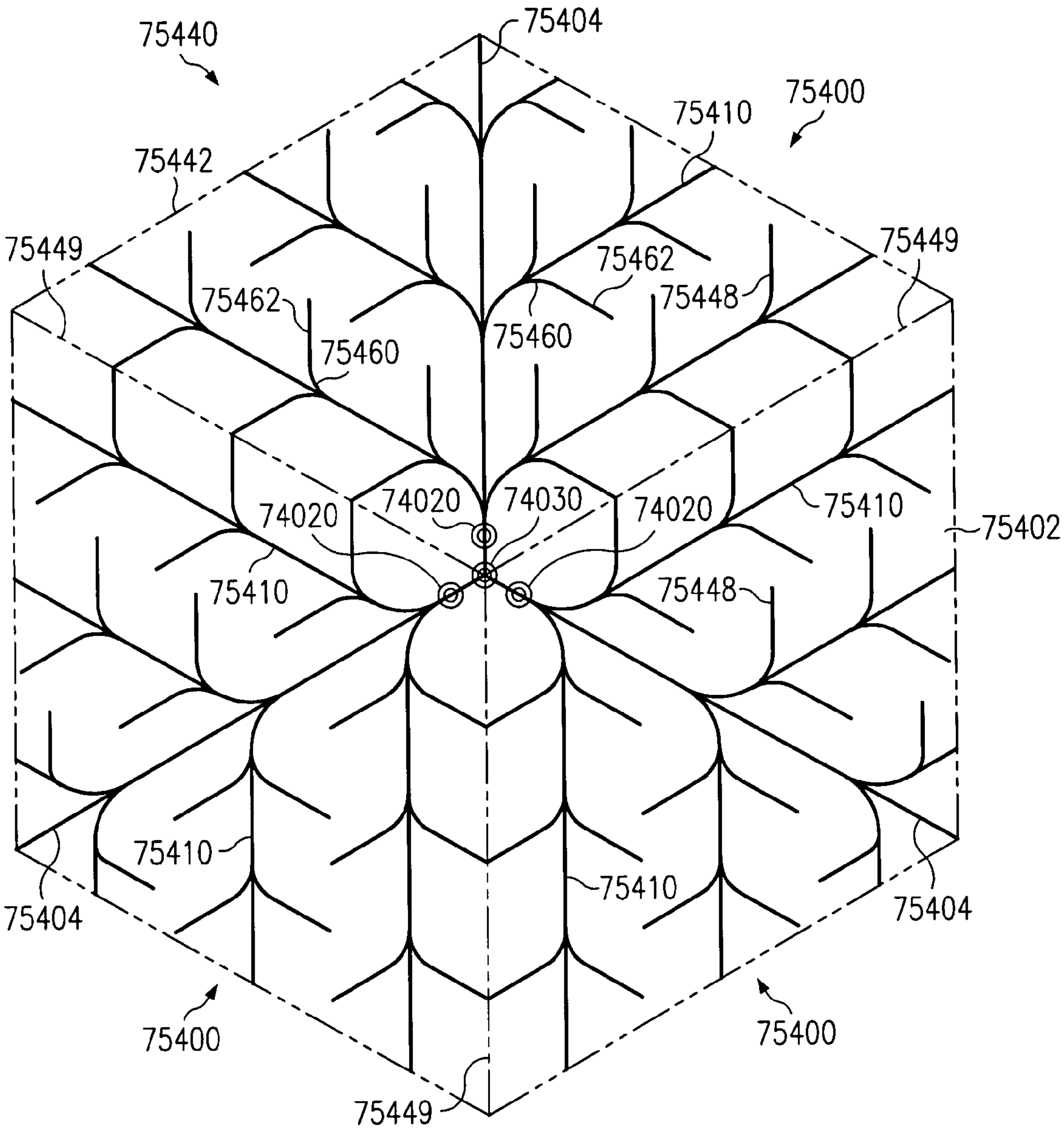
FIG. 76 is a top plan diagram illustrating a tri-pinnate well bore pattern for accessing products in the subterranean zone in accordance with one embodiment of the present invention.

FIG. 76 illustrates a tri-pinnate well bore pattern 75440 in accordance with one embodiment of the present invention. The tri-pinnate well bore pattern 75440 includes three discrete well bore patterns 75400 each draining a portion of a region 75442 covered by the well bore pattern 75440. Each of the well bore patterns 75400 includes a well bore 75404 and a set of lateral well bores 75410 extending from the well bore 75404. In the tri-pinnate pattern embodiment illustrated in FIG. 76, each of the well bores 75404 and 75410 are drilled from a common articulated well bore 74030 and fluid and/or gas may be removed from or introduced into the subterranean zone through a cavity 74020 in communication with each well bore 75404. This allows tighter spacing of the surface production equipment, wider coverage of a well bore pattern and reduces drilling equipment and operations.

Each well bore 75404 is formed at a location relative to other well bores 75404 to accommodate access to a particular subterranean region. For example, well bores 75404 may be formed having a spacing or a distance between adjacent well bores 75404 to accommodate access to a subterranean region such that only three well bores 75404 are required. Thus, the spacing between adjacent well bores 75404 may be varied to accommodate varied concentrations of resources of a subterranean zone. Therefore, the spacing between adjacent well bores 75404 may be substantially equal or may vary to accommodate the unique characteristics of a particular subterranean resource. For example, in the embodiment illustrated in FIG. 76, the spacing between each well bore 75404 is substantially equal at an angle of approximately 120 degrees from each other, thereby resulting in each well bore pattern 75400 extending in a direction approximately 120 degrees from an adjacent well bore pattern 75400. However, other suitable well bore spacing angles, patterns or orientations may be used to accommodate the characteristics of a particular subterranean resource. Thus, as illustrated in FIG. 76, each well bore 75404 and corresponding well bore pattern 75400 extends outwardly from well bore 75444 in a different direction, thereby forming a substantially symmetrical pattern. As will be illustrated in greater detail below, the symmetrically formed well bore patterns may be positioned or nested adjacent each other to provide substantially uniform access to a subterranean zone.

In the embodiment illustrated in FIG. 76, each well bore pattern 75400 also includes a set of lateral well bores 75448 extending from lateral well bores 75410. The lateral well bores 75448 may mirror each other on opposite sides of the lateral well bore 75410 or may be offset from each other along the lateral well bore 75410. Each of the lateral well bores 75448 includes a radius curving portion 75460 extending from the lateral well bore 75410 and an elongated portion 75462 formed after the curved portion 75460 has reached a desired orientation. For uniform coverage of the region 75442, pairs of lateral well bores 75448 may be disposed substantially equally spaced on each side of the lateral well bore 75410. Additionally, lateral well bores 75448 extending from one lateral well bore 75410 may be disposed to extend between or proximate lateral well bores 75448 extending from an adjacent lateral well bore 75410 to provide uniform coverage of the region 75442. However, the quantity, spacing, and angular orientation of lateral well bores 75448 may be varied to accommodate a variety of resource areas, sizes and well bore requirements.

As described above in connection with FIG. 75, each well bore pattern 75400 generally provides access to a quadrilaterally shaped area or region 75402. In FIG. 75, the region 75402 is substantially in the form of a diamond or parallelogram. As illustrated in FIG. 76, the well bore patterns 75400 may be arranged such that sides 75449 of each quadrilaterally shaped region 75448 are disposed substantially in common with each other to provide uniform coverage of the region 75442.

Figure 77:
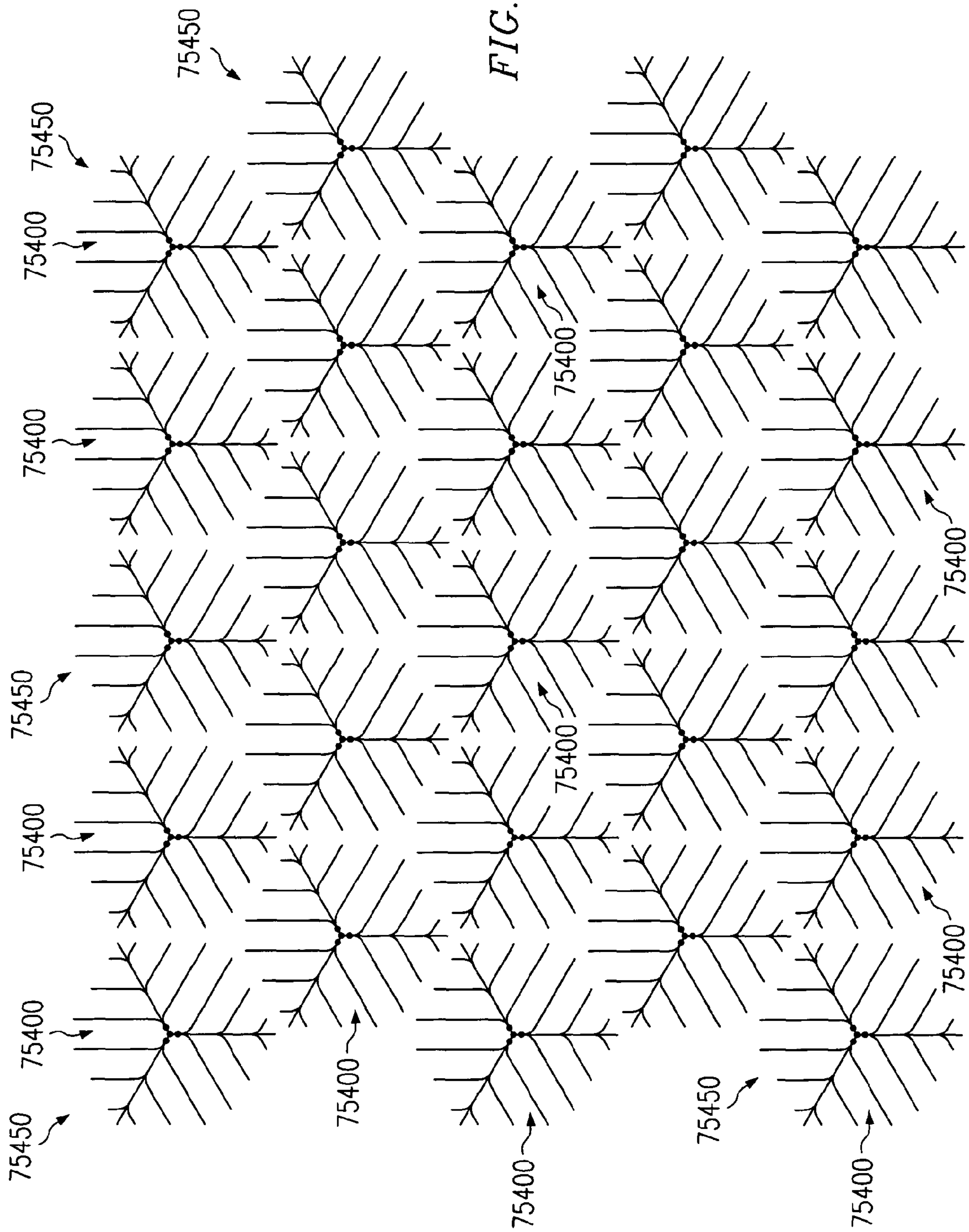
FIG. 77 is a top plan diagram illustrating an alignment of tri-pinnate well bore patterns in the subterranean zone in accordance with one embodiment of the present invention.

FIG. 77 illustrates an alignment or nested arrangement of well bore patterns within a subterranean zone in accordance with an embodiment of the present invention. In this embodiment, three discreet well bore patterns 75400 are used to form a series of generally hexagonally configured well bore patterns 75450, for example, similar to the well bore pattern 75440 illustrated in FIG. 76. Thus, the well bore pattern 75450 comprises a set of well bore sub-patterns, such as well bore patterns 75400, to obtain a desired geometrical configuration or access shape. The well bore patterns 75450 may be located relative to each other such that the well bore patterns 75450 are nested in a generally honeycomb-shaped arrangement, thereby maximizing the area of access to a subterranean resource using fewer well bore patterns 75450. Prior to mining of the subterranean resource, the well bore patterns 75450 may be drilled from the surface to degasify the subterranean resource well ahead of mining operations.

The quantity of discreet well bore patterns 75400 may also be varied to produce other geometrically-configured well bore patterns such that the resulting well bore patterns may be nested to provide uniform coverage of a subterranean resource. For example, in FIGS. 76-77, three discreet well bore patterns 75400 are illustrated in communication with a central well bore 75404, thereby forming a six-sided or hexagonally configured well bore pattern 75440 and 75450. However, greater or fewer than three discreet well bore patterns 75400 may also be used in communication with a central well bore 75404 such that a plurality of the resulting multi-sided well bore patterns may be nested together to provide uniform coverage of a subterranean resource and/or accommodate the geometric characteristics of a particular subterranean resource. For example, the pinnate and quad-pinnate patterns may be nested to provide uniform coverage of a subterranean field.

Figure 78:
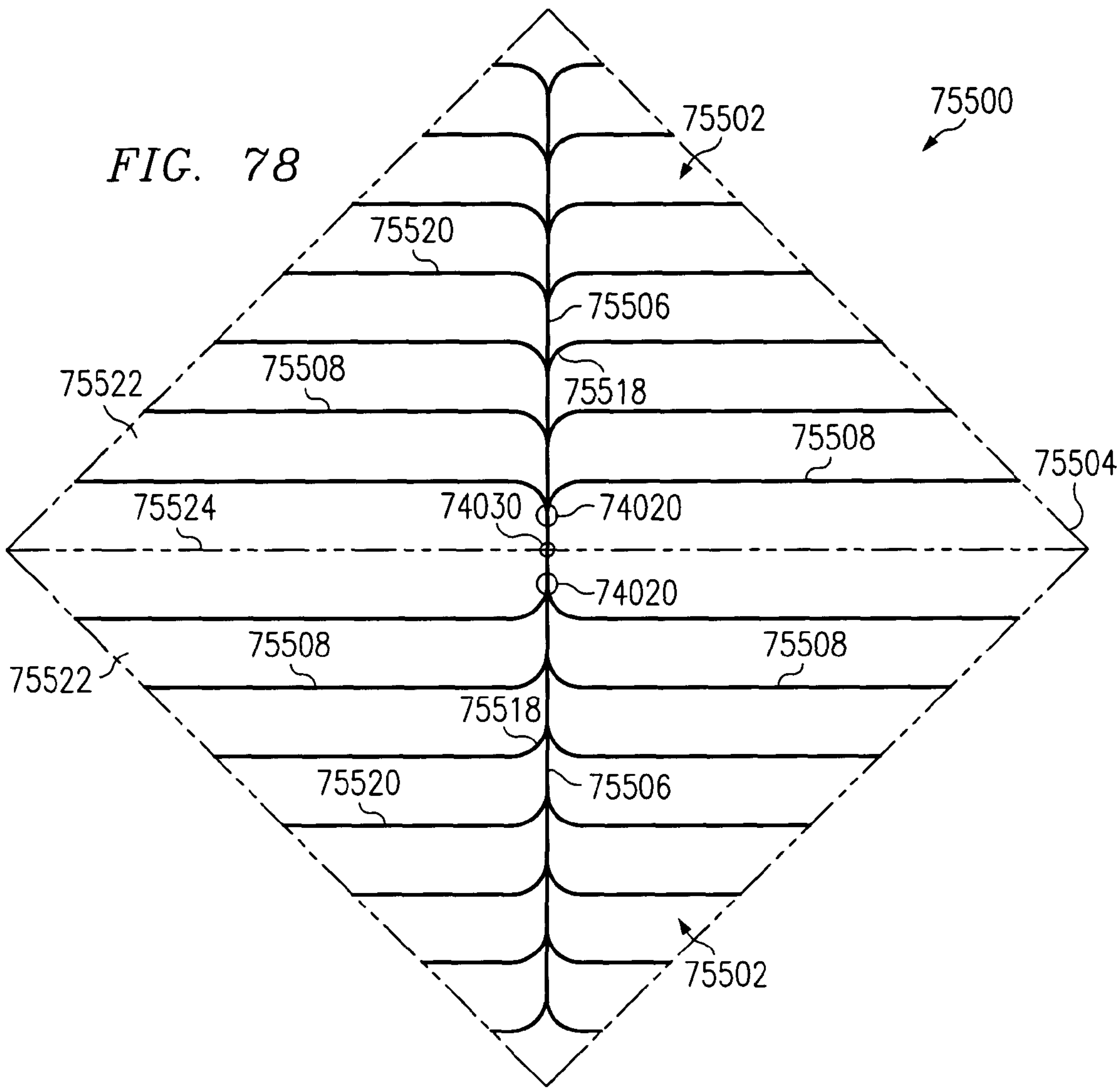
FIG. 78 is a top plan diagram illustrating a pinnate well bore pattern for accessing products in the subterranean zone in accordance with still another embodiment of the present invention.

FIG. 78 illustrates a well bore pattern 75500 in accordance with an embodiment of the present invention. In this embodiment, well bore pattern 75500 comprises two discreet well bore patterns 75502 each providing access to a portion of a region 75504 covered by the well bore pattern 75500. Each of the well bore patterns 75502 includes a well bore 75506 and a set of lateral well bores 75508 extending from the well bore 75506. In the embodiment illustrated in FIG. 78, each of the well bores 75506 and 75508 are drilled from a common articulated well bore 74030 and fluid and/or gas may be removed from or introduced into the subterranean zone through the cavity 74020 of well bore 74012 in communication with each well bore 75506. In this embodiment, the well bores 74020 and 74030 are illustrated offset from each other; however, it should be understood that well bore pattern 75500 as well as other suitable pinnate patterns may also be formed using a common surface well bore configuration with the wells slanting or otherwise separating beneath the surface. This may allow tighter spacing of the surface production equipment, wider coverage of a well bore pattern and reduce drilling equipment and operations.

Referring to FIG. 78, the well bores 75506 are disposed substantially opposite each other at an angle of approximately 180 degrees, thereby resulting in each well bore pattern 75502 extending in an opposite direction. However, other suitable well bore spacing angles, patterns or orientations may be used to accommodate the characteristics of a particular subterranean resource. In the embodiment illustrated in FIG. 78, each well bore pattern 75502 includes lateral well bores 75508 extending from well bores 75506. The lateral well bores 75508 may mirror each other on opposite sides of the well bores 75506 or may be offset from each other along the well bores 75506. Each of the lateral well bores 75508 includes a radius curving portion 75518 extending from the well bore 75506 and an elongated portion 75520 formed after the curved portion 75518 has reached a desired orientation. For uniform coverage of the region 75504, pairs of lateral well bores 75508 may be disposed substantially equally spaced on each side of the well bore 75506. However, the quantity, spacing, and angular orientation of lateral well bores 75508 may be varied to accommodate a variety of resource areas, sizes and well bore requirements. As described above, the lateral well bores 75508 may be formed such that the length of each lateral well bore 75508 decreases as the distance between each respective lateral well bore 75508 and the well bores 74020 or 74030 increases. Accordingly, the distance from the well bores 74020 or 74030 to a periphery of the region 75504 along each lateral well bore 75508 is substantially equal, thereby providing ease of well bore formation.

In this embodiment, each well bore pattern 75502 generally provides access to a triangular shaped area or region 75522. The triangular shaped regions 75522 are formed by disposing the lateral well bores 75508 substantially orthogonal to the well bores 75506. The triangular shaped regions 75522 are disposed adjacent each other such that each region 75522 has a side 75524 substantially in common with each other. The combination of regions 75522 thereby forms a substantially quadrilateral shaped region 75504. As described above, multiple well bore patterns 75500 may be nested together to provide substantially uniform access to subterranean zones.

Figure 79:
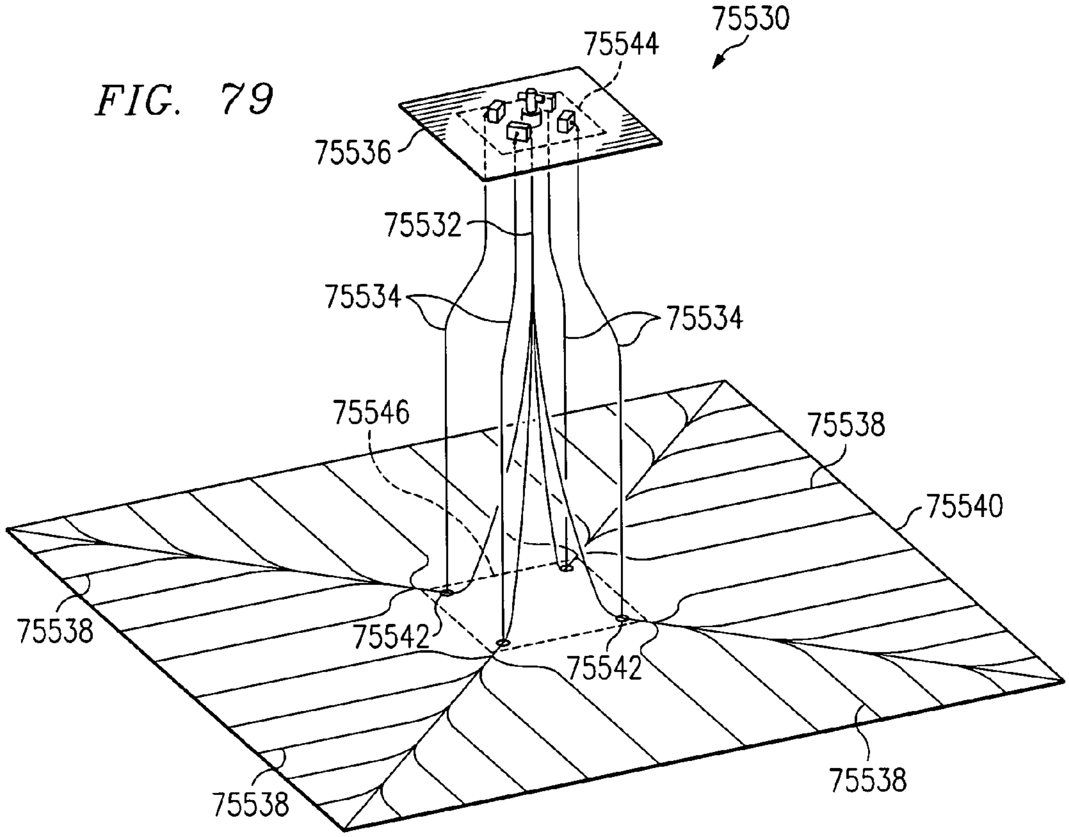
FIG. 79 is a diagram illustrating a multi-well system for accessing a subterranean zone from a limited surface area in accordance with one embodiment of the present invention.

FIG. 79 illustrates a multi-well system for accessing a subterranean zone from a limited surface area in accordance with one embodiment of the present invention. In this embodiment, a small surface well bore area 75544 bounding the wells at the surface allows a limited drilling and production pad 75536 size at the surface and thus may minimize or reduce environmental disturbance in the drilling and production site and/or allows accessing a large subterranean area from a roadside or other small area in steep or other terrain. It will be understood that other suitable multi-well systems may be used for accessing a subterranean zone from a limited or other surface area without departing from the scope of the present invention. For example, wells slanting in whole or in part from the surface with horizontal and/or other suitable patterns drilled off the slant may be used in connection with the present invention without intersection of disparate surface wells. In this embodiment, water or other fluids from one or more horizontal patterns overflow into the slanted well where it is collected in a cavity or other bottom hole location and removed by gas lift or pumping to the surface or by diversion to another area or subterranean formation.

Referring to FIG. 79, a central surface well bore 75532 is disposed offset relative to a pattern of well bores 75534 at the surface 75536 and intersects each of the well bores 75534 below the surface. In this embodiment, the well bores 75532 and 75534 are disposed in a substantially non-linear pattern in close proximity to each other to reduce or minimize the area required for the well bores 75532 and 75534 on the surface 75536. It will be understood that the well bores 75534 may be otherwise positioned at the surface relative to each other and the central articulating surface bore 75532. For example, the bores may have inline configuration.

Well bore patterns 75538 are formed within target zone 75540 exiting from cavities 75542 located at the intersecting junctions of the well bores 75532 and 75534. Well bore patterns 75538 may comprise pinnate patterns as described above, or may include other suitable patterns for accessing the zone 75540.

As illustrated by FIG. 79, the well bores 75532 and 75534 may be disposed in close proximity to each other at the surface while providing generally uniform access to a large area of the target zone 75540. For example, well bores 75532 and 75534 may each be disposed within approximately thirty feet of another well and/or within two hundred feet, one hundred feet or less of every other well at the surface site while providing access to three hundred, five hundred, seven hundred fifty, one thousand or even twelve hundred or more acres in the zone 75540. Further, for example, the well bores 75532 and 75534 may be disposed in a surface well bore area 75544 less than two thousand, one thousand, seven hundred fifty, or even five hundred square feet, thereby reducing or minimizing the footprint required on the surface. The surface well bore area 75544 is a smallest quadrilateral that bounds the wells at the surface and may have the dimensions of thirty-two feet by thirty-two feet and form a substantial square or may have the dimensions of fifty feet by two hundred feet and form a substantial rectangle. The drilling pad 75536 may have an area of three-quarters of an acre for a tight well spacing at the surface with each well being within approximately thirty feet of at least one other well at the site. In another embodiment, the surface pad 75536 may have an area of two acres with three-quarters of an acre for the center articulated well and one-quarter of an acre for each of four substantially vertical wells offset by about three hundred feet at the surface from the center well. The drilling pad 75536 may be a square or other suitable quadrilateral and may include small areas that jut out and/or in of the quadrilateral, polygonal or other shape of the pad. In addition, one or more sides may be non-linear and/or one or more corners may be non-congruent.

Beneath the surface, well bore junctions or cavities 75542 in wells 75534 may be horizontally displaced or outward of the surface location of the wells such that a subsurface well bore junction area 75546 bounding the junctions is substantially larger in size than the surface well bore area. This junction placement is due to, or allows, large radius curves for formation of the horizontal pattern, which improves or optimizes the subsurface reach of drilling equipment to form the horizontal drainage pattern. In a particular embodiment the subsurface junction area is the smallest quadrilateral to include all the cavities formed from this site and, in this and other embodiments, may be between four and five acres. As previously described, the coverage, or drainage area may be still substantially larger covering three hundred, five hundred or more acres in the zone 75540. Thus, the multi-well system provides a vertical profile with a minimal or limited surface area and impact; enlarged, optimized or maximized subsurface drainage area; and an intermediate subsurface junction area to which fluids from the drainage pattern flow for collection and production to the surface.

Figure 80:
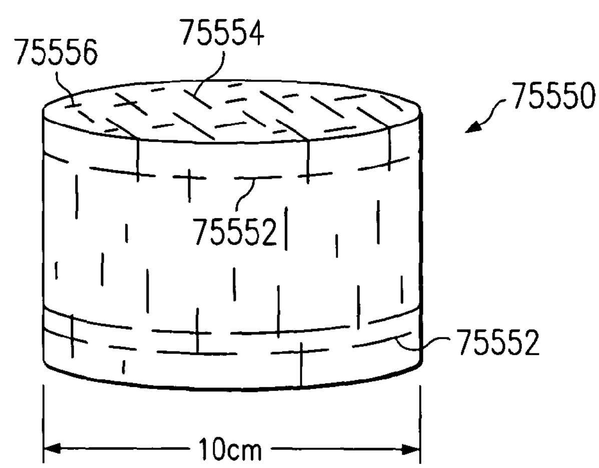
FIG. 80 is a diagram illustrating the matrix structure of coal in accordance with one embodiment of the present invention.

FIG. 80 illustrates the matrix structure 75550 of coal in the seam 74015 in accordance with one embodiment of the present invention. The coal may be bright banded coal with closely spaced cleats, dull banded coal with widely spaced cleats and/or other suitable types of coals.

Referring to FIG. 80, the coal structure 75550 includes bedding planes 75552, face, or primary, cleats 75554, and butt, or secondary, cleats 75556. The face and butt cleats 75554 and 75556 are perpendicular to the bedding plane 75552 and to each other. In one embodiment, the face and butt cleats 75554 and 75556 may have a spacing between cleavage planes of one-eighth to one half of an inch.

In accordance with the present invention, the coal structure 75550 has a medium effective permeability between three and ten millidarcies or a low effective permeability of below three millidarcies. In particular embodiments, the coal structure 75550 may have an ultra low effective permeability below one millidarcy. Permeability is the capacity of a matrix to transmit a fluid and is the measure of the relative ease of fluid flow under an equal pressure drop. Effective permeability is a permeability of the coal or other formation matrix to gas or water and may be determined by well testing and/or long-term trends. For example, effective permeability may be determined by insitu slug tests, injection or draw down tests or other suitable direct or indirect well testing methods. Effective permeability may also be determined based on suitable data and modeling. The effective permeability is the matrix or formation permeability and may change during the life of a well. As used herein, the effective permeability of a formation and/or area of a formation is the median or mean effective permeability at substantially continuous flow conditions or simulated substantially continuous flow conditions of a formation or area over the life of the well, or over the period during which a majority of gas in the area is produced. The coal structure 75550 may also have a medium absolute permeability between three and millidarcies or a low absolute permeability below three millidarcies. Absolute permeability is the ability of the matrix to conduct a fluid, such as a gas or liquid at one hundred percent saturation of that fluid. The relative permeability of the formation is the relationship between the permeability to gas versus the permeability to water.

As water is removed from the coal structure 75550 through the pinnate or other multi-branching pattern at an accelerated rate, the large area pressure reduction of the coverage area affects a large rock volume. The bulk coal matrix 75550 may shrink as it releases methane and causes an attendant increase in the width of the face and/or butt cleats 75554 and 75556. The increase in cleat width may increase permeability, which may further accelerate removal of water and gas from the coal seam 74015.

Figure 81:
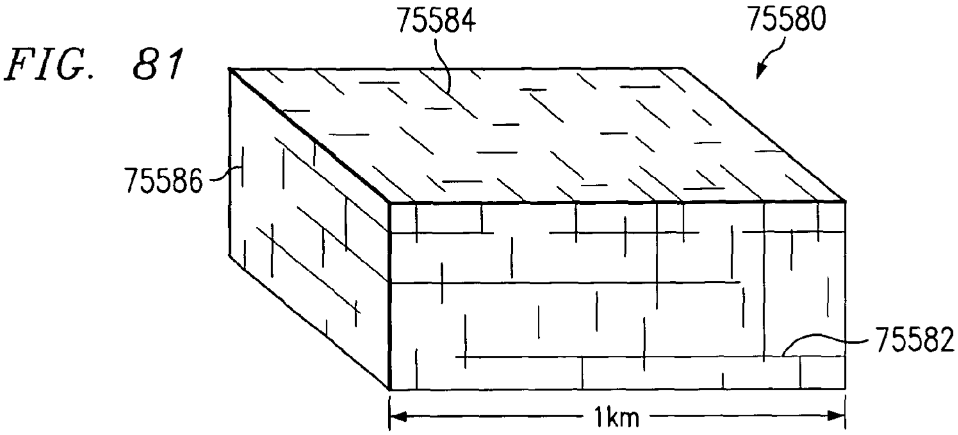
FIG. 81 is a diagram illustrating natural fractures in a coal seam in accordance with one embodiment of the present invention.

FIG. 81 illustrates the structure 75580 of an area of the coal seam 74015 in accordance with one embodiment of the present invention. The coal bed structure 75580 includes natural fractures 75582, 75584 and 75586. The natural fractures may be interconnected bedding planes, face cleats and/or butt cleats. Thus, the natural fractures may have one or more primary orientations in the coal seam that are perpendicular to each other and may hydraulically connect a series of smaller scale cleats. The natural fractures form high capacity pathways, may increase system permeability by an order of magnitude and thus may not suffer large reductions in permeability through relative permeability effects in medium and low permeability coals.

During production, as water and/or reservoir pressure is dropped in the coal seam 74015, gas evolves from the coal matrix 75550. The presence of gas in two-phase flow with the water may, for example, reduce the relative permeability of the coal matrix 75550 relative to gas down to less than five percent of the absolute permeability. In other embodiments, the relative permeability of the coal matrix relative to gas may be reduced down to between three and twenty percent of absolute permeability or down to between eighteen and thirty percent of absolute permeability. As water saturation and/or pressure in the seam 74015 is further reduced, the relative permeability may increase up to about twelve percent of absolute permeability at an irreducible water saturation. The irreducible water saturation may be at about seventy to eighty percent of full saturation. Travel of gas and water through natural cleats or fractures, however, may not be affected or not significantly affected by the relative permeability of the matrix 75550. Thus, gas and water may be collected from the coal seam 74015 through the natural fractures despite a relatively low relative permeability of the coal matrix 75550 due to two-phase flow of gas and water.

Figure 82:
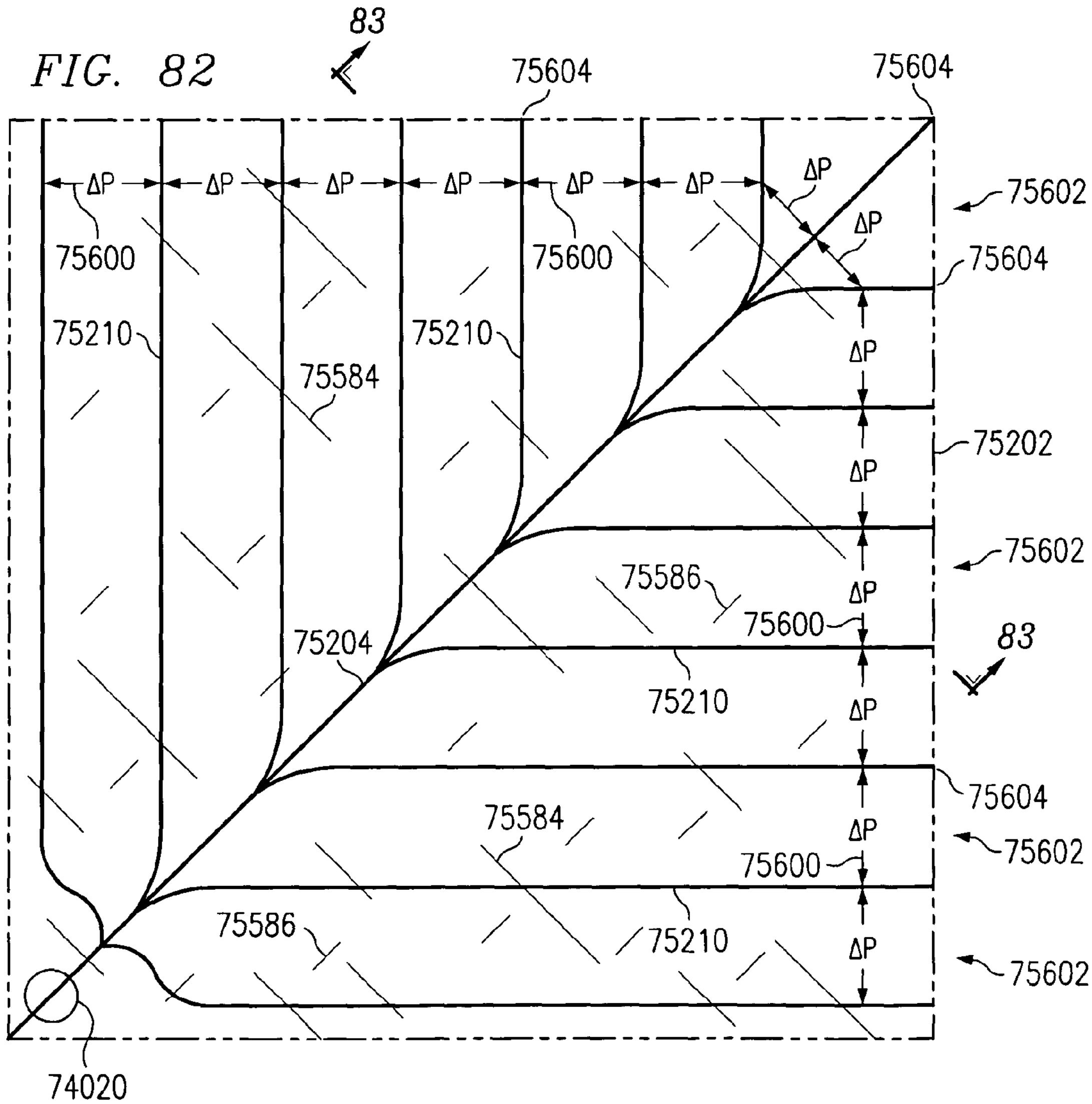
FIG. 82 is a top plan diagram illustrating pressure drop in the subterranean zone across a coverage area of the pinnate well bore pattern of FIG. 8 during production of gas and water in accordance with one embodiment of the present invention.
Figure 83:
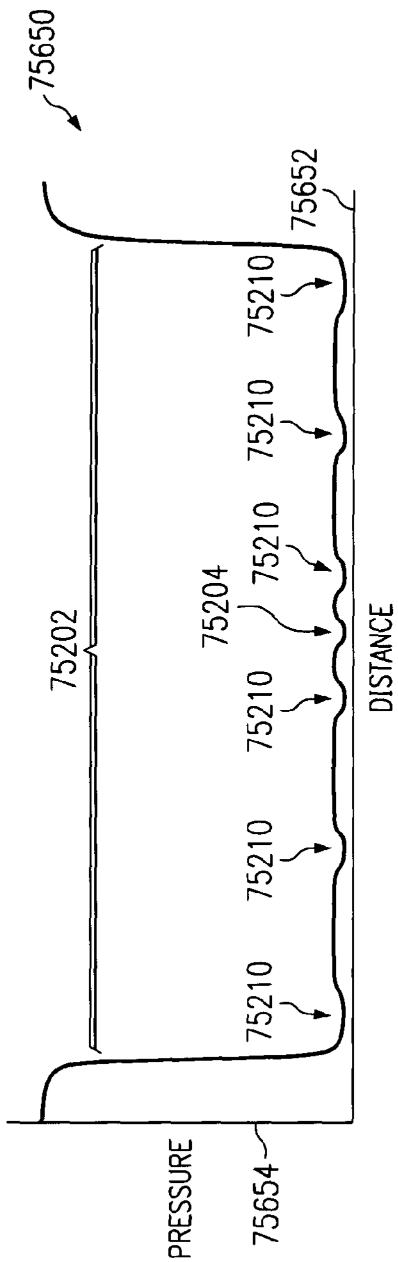
FIG. 83 is a chart illustrating pressure drop in the subterranean zone across line 83-83 of FIG. 82 in accordance with one embodiment of the present invention.

FIGS. 82-83 illustrate provision of a well bore pattern 7550 in a coal seam 74015 and pressure drop across a coverage area of the pattern 7550 in accordance with one embodiment of the present invention. In this embodiment, the well bore pattern 7550 is the pinnate pattern 75200 described in connection with FIG. 8. It will be understood that the other pinnate and suitable multi-branching patterns may generate a similar pressure drop across the coverage area.

Referring to FIG. 82, the pinnate pattern 75200 is provided in the coal seam 74015 by forming the pattern in the coal seam 74015, having the pattern formed, or using a preexisting pattern. The pinnate pattern 75200 includes the main bore 75204 and a plurality of equally spaced laterals 75210. Laterals 75210 are substantially perpendicular to each other and offset from the main bore by forty-five degrees. As a result, the pattern 75200 is omni-directional in that significant portions of bore length have disparate orientations. The omni-directional nature of the pinnate pattern 75200 may allow the pattern to intersect a substantial or other suitable percentage of the natural fractures 75582, 75584 and 75586 of the coal seam 74015 regardless of the orientation of the pattern in the seam magnifying the effective well bore radius. During production operations, such intensive coverage of natural fractures by the well bore pattern may allow for otherwise trapped water and gas to use the nearest natural fracture and easily drain to the well bore. In this way, high initial gas production rates realized. In a particular embodiment, the natural fractures may carry a majority or other suitable portion of gas and water from the coal seam 74015 into the pinnate pattern 75200 for collection at the cavity 74020 and production to the surface 74014.

In one embodiment, the pinnate pattern 75200 may cover an area of two hundred fifty acres, have a substantially equal width to length ratio and have the laterals 75210 each spaced approximately eight hundred feet apart. In this embodiment, a substantial portion of the coverage area 75202 may be within four hundred feet from the main and/or lateral bores 75204 and 75210 with over fifty percent of the coverage area 75202 being more than one hundred fifty to two hundred feet away from the bores. The pattern 75200, in conjunction with a pump, may be operable to expose and drain five hundred barrels per day of water, of which about ninety percent may be non recharge water. In gas lift and other embodiments, up to and/or over four thousand or five thousand barrels per day of water may be removed.

Opposing bores 75204 and/or 75210 of the pinnate pattern 75200 cooperate with each other to drain the intermediate area of the formation and thus reduce pressure of the formation. Typically, in each section of the formation between the bores 75204 and/or 75210, the section is drained by the nearest bore 75204 and/or 75210 resulting in a uniform drop in pressure between the bores. A pressure distribution 75600 may be steadily reduced during production.

The main and lateral well bores 75204 and 75210 effectively increase well-bore radius with the large surface area of the lateral bores 75210 promoting high flow rates with minimized skin damage effects. In addition, the trough pressure production of the bores 75204 and 75210 affects an extended area of the formation. Thus, essentially all the formation in the coverage are 75202 is exposed to a drainage point and continuity of the flow unit is enhanced. As a result, trap zones of unrecovered gas are reduced.

Under virgin or drilled-in reservoir conditions for a thousand feet deep coal bed, formation pressure may initially be three hundred psi. Thus, at the time the pinnate pattern 75200 is formed, the pressure at the bores 75204 and 75210 and at points equal distance between the bores 75204 and 75210 may be at or close to the initial reservoir pressure.

During water and/or gas production, water is continuously or otherwise drained from the coverage area 75202 to the bores 75204 and 75210 and collected in the cavity 74020 for removal to the surface. Influx water 75602 from surrounding formations is captured at the tips of 75604 of the main and lateral bores 75204 and 75210 to prevent recharge of the coverage area and thus allow continued pressure depletion. Thus, the coverage area is shielded from the surrounding formation with ninety percent or more of produced water being non recharge water. Water pressure may be steadily and substantially uniformly reduced across or throughout the coverage area 75202 until a minimal differential is obtained. In one embodiment, for a mature well, the differential may be less than or equal to 20 to 7550 psi within, for example, three to eight years in a medium or low pressure well. In a particular embodiment, the pressure differential may be less than 10 psi.

During dewatering, water saturation in the drainage or coverage area may be reduced by ten to thirty percent within one to three years. In a particular embodiment, water saturation may be reduced by ten percent within two years of the start of water production and thirty percent within three years of the start of water production. Reduction to an irreducible level may be within three, five or eight or more years of the start of water production.

As reservoir and/or water pressure decreases in the coverage area 75202, methane gas is diffused from the coal and produced through the cavity 74020 to the surface 74014. In accordance with one embodiment of the present invention, removal of approximately 75500 barrels a day or other suitable large volume of water from a 200-250 acre area of the coal seam 74015, in connection with the pinnate or other pattern 75200 and/or a substantial uniform pressure drop in the coverage area 75202, initiates kick-off of the well, which includes the surface or production bore or bores as well as the hydraulically connected drainage bore or bores in the target zone. Removal volumes for kick-off may be about one tenth of the original water volume, or in a range of one eighth to one twelfth, and may suitably vary based on reservoir conditions. Early gas release may begin within one to two months of pumping operations. Early gas release and kick-off may coincide or be at separate times.

Upon early gas release, gas may be produced in two-phase flow with the water. The inclusion of gas in two-phase flow may lower the hydrostatic specific gravity of the combined stream below that of water thereby further dropping formation pressure in the area of two-phase flow and accelerating production from the formation. Moreover, the gas release may act as a propellant for two-phase flow production. In addition, the pressure reduction may affect a large rock volume causing a coal or other formation matrix to shrink and further accelerate gas release. For the coal seam 74015, the attendant increase in cleat width may increase formation permeability and may thereby further expedite gas production from the formation. During gas release, kick off occurs when the rate of gas produced increases sharply and/or abruptly and gas production may then become self-sustaining.

FIG. 83 illustrates pressure differential in the coal seam 74015 across line 82-82 of FIG. 81 in accordance with one embodiment of the present invention. In this embodiment, the well is in a relatively shallow, water saturated, 1000 feet deep coal seam 74015. The lateral bores 75210 are spaced approximately 800 feet apart.

Referring to FIG. 83, distance across the coverage area 75202 is shown on the X axis 75652 with pressure on the Y axis 75654. Pressure differential, excepting blockage and friction, is in a particular embodiment at or substantially near 3 psi at the lateral bores 75210 and the main bore 75204. In the coverage area between the bores 75204 and 75210, the pressure differential, which does not include pressure due to blockage, friction and the like is less than or equal to 7 psi. Thus, substantially all the formation in the coverage area is exposed to a drainage point, continuity of the flow unit is maintained and water pressure and saturation is reduced through the coverage area. Trap zones of unrecovered gas are minimized. Pressure outside the coverage area may be at an initial reservoir pressure of 300 psi. The pressure increase gradiant may be steep as shown or more gradual.

A substantially uniform pressure gradiant within the coverage area 75202 may be obtained within three months of the start of water production using gas lift and within six to nine months using rod pumps. Under continued substantially continuous flow conditions, the pressure differential may be maintained throughout the life of the well. It will be understood that the pressure may increase due to recharge water and gas if the well is shut in for any appreciable period of time. In this case, the water may again be removed using gas lift or rod pumps. It will be further understood that water may be otherwise suitably removed without production to the surface by down hole reinjection, a subsurface system of circuits, and the like. In some areas, a pressure differential of ten psi may be obtained in one or more years. In these and other areas, the pressure may be about seventy percent of the drilled-in pressure within three months.

Figure 84:
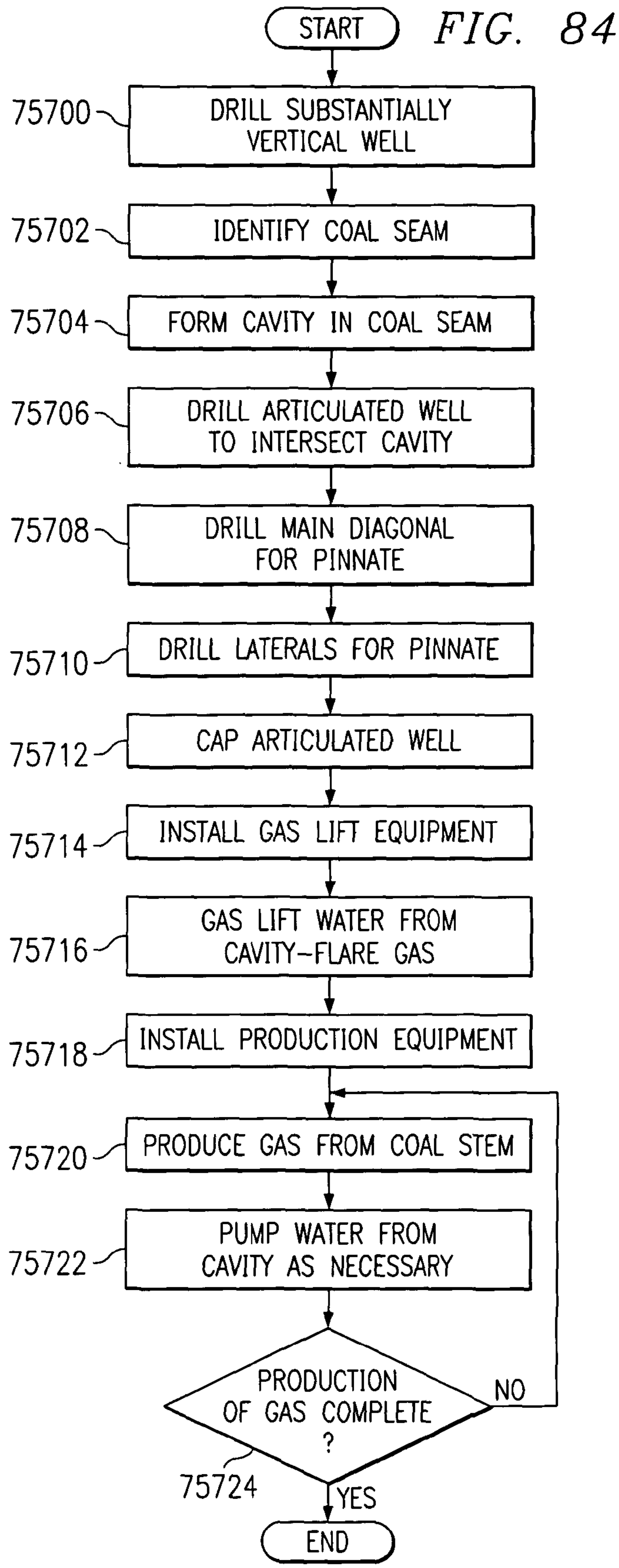
FIG. 84 is a flow diagram illustrating a method for surface production of gas from the coverage area of the subterranean zone in accordance with embodiment of the present invention.

FIG. 84 is a flow diagram illustrating a method for surface production of gas from a subterranean zone in accordance with one embodiment of the present invention. In this embodiment, the subterranean zone is a coal seam with a medium to low effective permeability and a multi-well system with a cavity is used to produce the coal seam. It will be understood that the subterranean zone may comprise gas bearing shales and other suitable formations.

Referring to FIG. 84, the method begins after the region to be drained and the type of drainage patterns 74050 for the region have been determined. Any suitable pinnate, other substantially uniform pattern providing less than ten or even five percent trapped zones in the coverage area, omni-directional or multi-branching pattern may be used to provide coverage for the region.

At step 75700, in an embodiment in which dual intersecting wells are used, the substantially vertical well 74012 is drilled from the surface 74014 through the coal seam 74015. Slant and other single well configurations may instead be used. In a slant well configuration, the drainage patterns may be formed off of a slant well or a slanting portion of a well with a vertical or other section at the surface.

Next, at step 75702, down hole logging equipment is utilized to exactly identify the location of the coal seam 74015 in the substantially well bore 74012. At step 75704, the enlarged diameter or other cavity 74020 is formed in the substantially vertical well bore 74012 at the location of the coal seam 74015. As previously discussed, the enlarged diameter cavity 74020 may be formed by underreaming and other suitable techniques. For example, the cavity may be formed by fracing.

Next, at step 75706, the articulated well bore 74030 is drilled to intersect the enlarged diameter cavity 74020. At step 75708, the main well bore for the pinnate drainage pattern is drilled through the articulated well bore 74030 into the coal seam 74015. As previously described, lateral kick-off points, or bumps may be formed along the main bore during its formation to facilitate drilling of the lateral bores. After formation of the main well bore, lateral bores for the pinnate drainage pattern are drilled at step 75710.

At step 75712, the articulated well bore 74030 is capped. Next, at step 75714, gas lift equipment is installed in preparation for blow-down of the well. At step 75716, compressed air is pumped down the substantially vertical well bore 74012 to provide blow-down. The compressed air expands in the cavity 74020, suspends the collected fluids within its volume and lifts the fluid to the surface. At the surface, air and produced methane or other gases are separated from the water and flared. The water may be disposed of as runoff, reinjected or moved to a remote site for disposal. In addition to providing gas lift, the blow-down may clean the cavity 74020 and the vertical well 74012 of debris and kick-off the well to initiate self-sustaining flow. In a particular embodiment, the blow-down may last for one, two or a few weeks and produce 3000, 4000, or 5000 or more barrels a day of water.

At step 75718, production equipment is installed in the substantially vertical well bore 74012 in place of the gas lift equipment. The production equipment may include a well head and a sucker rod pump extending down into the cavity 74020 for removing water from the coal seam 74015. If the well is shut in for any period of time, water builds up in the cavity 74020 or self-sustaining flow is otherwise terminated, the pump may be used to remove water and drop the pressure in the coal seam 74015 to allow methane gas to continue to be diffused and to be produced up the annulus of the substantially vertical well bore 74012.

At step 75720, methane gas diffused from the coal seam 74015 is continuously produced at the surface 74014. Methane gas may be produced in two-phase flow with the water or otherwise produced with water and/or produced after reservoir pressure has been suitably reduced. As previously described, the removal of large amounts of water from and/or rapid pressure reduction in the coverage area of the pinnate pattern may initiate and/or kick-off early gas release and allow the gas to be produced based on an accelerated production curve. Proceeding to step 75722, water that drains through the drainage pattern into the cavity 74020 that is not lifted by the produced gas is pumped to the surface with the rod pumping unit. Water may be continuously or intermittently pumped as needed for removal from the cavity 74020. In one embodiment, to accelerate gas production, water may be initially removed at a rate of 75500 barrels a day or greater.

Next, at decisional step 75724 it is determined whether the production of gas from the coal seam 74015 is complete. In a particular embodiment, approximately seventy-five percent of the total gas in the coverage area of the coal seam may be produced at the completion of gas production. The production of gas may be complete after the cost of the collecting the gas exceeds the revenue generated by the well. Alternatively, gas may continue to be produced from the well until a remaining level of gas in the coal seam 74015 is below required levels for mining or other operations. If production of the gas is not complete, the No branch of decisional step 75724 returns to steps 75720 and 75722 in which gas and/or water continue to be removed from the coal seam 74015.

Upon completion of production, the Yes branch of decisional step 75724 leads to the end of the process by which gas production from a coal seam has been expedited. The expedited gas production provides an accelerated rate of return on coal bed methane and other suitable gas production projects.

Particularly, the accelerated production of gas allows drilling and operating expenses for gas production of a field to become self-sustaining within a year or other limited period of time as opposed to a typical three to five-year period. As a result, capital investment per field is reduced. After the completion of gas production, water, other fluids or gases may be injected into the coal seam 74015 through the pattern 74050.

Figure 85:
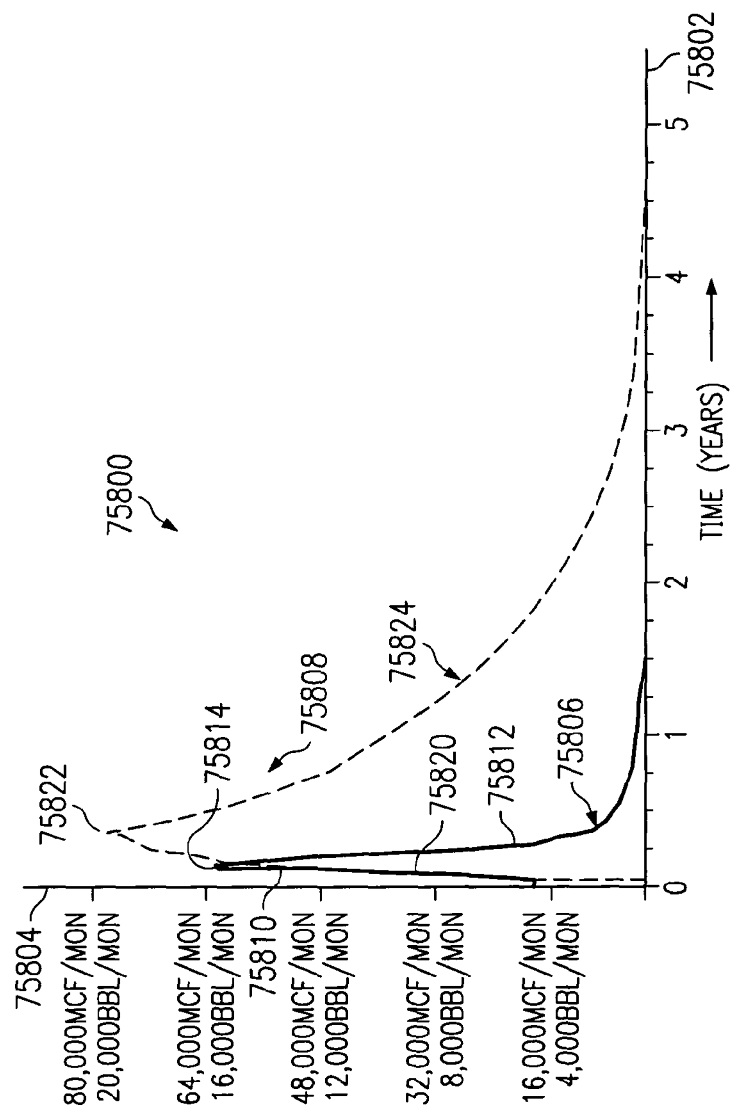
FIG. 85 is a graph illustrating production curves for gas and water from the coverage area of the subterranean zone in accordance with one embodiment of the present invention.

FIG. 85 illustrates a production chart 75800 for an area of coal seam 74015 having a medium to low effective permeability in accordance with one embodiment of the present invention. In this embodiment, water and gas are drained to the cavity 74020 through a uniform pinnate pattern and produced to the surface 74014. It will be understood that water and gas may be collected from the coal seam 74015 in other suitable subsurface structures such as a well bore extending below the well bore pattern 7550 so as to prevent pressure buildup and continued drainage of the coverage area. In addition, it will be understood that reservoir pressure may be suitably reduced without the use of a cavity, rat hole or other structure or equipment. For example, the use of a volume control pump operable to prevent the buildup of a hydrostatic pressure head that would inhibit and/or shut down drainage from the coverage area may be used.

Referring to FIG. 85, the chart 75800 includes time in months along the X axis 75802 and production along the Y axis 75804. Gas production is in thousand cubic feet per month (MCF/mon) while water production is in barrels per month (BBL/mon). It will be understood that actual production curves may vary due to operating conditions and parameters as well as formation and operating irregularities and equipment sensitivity and reliability. A water production curve 75806 and a gas production curve 75808 are based on an initial one to two week blow-down and on production under substantially continuous flow conditions. Flow conditions are continuous when the well is not shut in, when production is continuous and/or when gas is produced without pressure build up at the well head. Flow conditions are substantially continuous when flow interruptions are limited to shut-ins for routine maintenance and/or shut-ins for less than twenty or even ten or five percent of a production time period. The production curves wells produced under conditions that are not substantially continuous may be normalized and/or suitably adjusted to provide gas and water production curves of the well under substantially continuous flow conditions. Thus, production curves, production amounts, production times as well as formation parameters such as absolute, relative or effective permeability may be actually measured, determined based on modeling, estimated based on standardized equations and/or trends or otherwise suitably determined.

The water production curve 75806 reaches a peak within a first or second month from the start of water production with a majority of removable water being removed from the coverage area within three months to one year of the start of water production. Water production 75806 may have a fixed flow volume for dewatering prior to kick-off and thereafter a steep and substantially linear incline 75810 and decline 75812 with a sharp peak 75814.

The gas production curve 75808 may have a steep incline 75820 followed by a peak 75822. Under substantially continuous flow conditions the peak may occur within one month or a year from the start of water production. The peak 75822 may have a substantially exponential or other decline 75824 that does not reach one-third or one-quarter of the peak rate until after twenty-five percent, a third or even a majority of the total gas volume in the coverage area has been produced. It will be understood that more than the specified amount of gas may be produced within the specified period. In tight or other coals, the production curve may have a hyperbolic decline. A peak has or is followed by a decline when the decline tapers directly off from that peak.

The value produced is represented by the area under the production curve. Thus, under substantially continuous flow conditions, the majority of the gas is produced at or toward the beginning of the production time period rather than a gradual increase in gas rates with a peak occurring at the middle or toward the end of a complete gas production cycle. In this way, production is front-loaded. It will be understood that free or near well-bore gas in the immediate vicinity of the well bores may be released during drilling or the very beginning of production may have a separate peak. Thus, with production curves may include several peaks which are each a tapering, projecting point with substantial declines on both sides of the point. Such free gas, however, accounts for about two to five percent of the total gas in the coverage area of the coal seam 74015.

Gas production may kick-off at approximately one week and proceeds at a self-sustaining rate for an extended period of time. The rate may be self-sustaining when water no longer needs to be removed to the surface by the provision of compressed air or by a pump. Gas production may peak before the end of the third month in medium permeability seams or take nine months, twelve months, eighteen months or two to three years in low and ultra low permeability seams. During the life of the well, the effective permeability of coal in the coverage area may vary based on water and gas saturations and relative permeability.

After the peak 75822, gas production may thereafter decline over the next three to five years until completed. On the decline, at least part of the production may be self-sustaining. Thus, gas from a corresponding area of the coal seam 74015 may be produced within one, two, three or five years with half the gas produced within a 12 to 18 month period. At kick-off, pressure may be at 200 to 250 psi, down from an initial 300 psi and thereafter drop sharply.

The gas production time may be further reduced by increasing water removal from the coal seam 74015 and may be extended by reducing water production. In either case, kick-off time may be based on relative water removal and the decline curves may have substantially the same area and profile. In one embodiment, the amount of water collected in the cavity 74020 and thus that can be removed to the surface 74014 may be controlled by the configuration of the drainage pattern 74050 and spacing of the lateral bores. Thus, for a given coal seam 74015 having a known or estimated permeability, water pressure and/or influx, lateral spacing may be determined to drain a desired volume of water to the cavity 74020 for production to the surface 74014 and thus set the gas production curve 75806. In general, lateral spacing may be increased with increasing permeability and may be decreased with decreasing permeability or increasing reservoir or water pressure or influx. In a particular embodiment, drilling expenses may be weighed against the rate of returns and a suitably optimized pattern and/or lateral spacing determine. In this way, commercially viable fields for methane gas production are increased. A Coal Gas simulator by S. A. Holditch or other suitable simulator may be used for determining desired lateral spacing.

Figure 86:
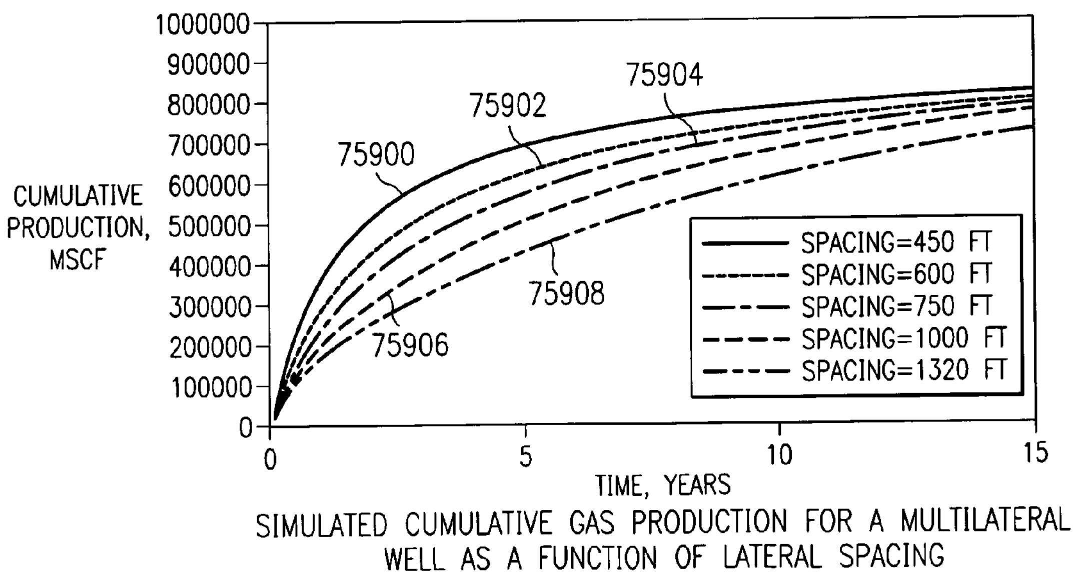
FIG. 86 is a graph illustrating simulated cumulative gas production curves for a multi-lateral well as a function of lateral spacing in accordance with one embodiment of the present invention.

FIG. 86 illustrates a simulated cumulative gas production chart for a multi-lateral well as a function of lateral spacing in accordance with one embodiment of the present invention. In this embodiment, the baseline reservoir properties used for the simulation models is a coal bed with a thickness of 5.5 feet, an initial pressure of 390 psia, an ash content of 9.3%, a moisture content of 2.5%, a Langmuir volume of 1,032 scf/ton, a Langmuir pressure 490 psia, a sorption time of a hundred days, a horizontal well diameter of 4.75 inches, a horizontal well skin factor of zero and a well FBHP of 20 psia. Total laterals for the simulated wells as a function of lateral spacing is twenty-two thousand, six hundred feet of total lateral for a lateral spacing of four hundred fifty feet, seventeen thousand, five hundred feet of total lateral for a six hundred foot lateral spacing, fourteen thousand, eight hundred feet of total lateral for seven hundred fifty foot lateral spacing, twelve thousand three hundred feet of total lateral for a one thousand foot lateral spacing and ten thousand four hundred feet of total lateral for one thousand three hundred and twenty foot lateral spacing. Permeability for the coal seam was 0.45 millidarcies.

Referring to FIG. 85, a cumulative gas production curve 75900 for a lateral spacing of four hundred fifty feet is illustrated over a fifteen year production time. Cumulative gas production curves 75902, 75904, 75906 and 75908 are also illustrated for lateral spacings of six hundred feet, seven hundred fifty feet, one thousand feet and one thousand three hundred twenty feet, respectively. Other suitable lateral spacings less than, greater than or between the illustrated spacings may be used and suitably varied based on the permeability and type of the coal seam as well as rate of return and other economic factors.

Figure 87:
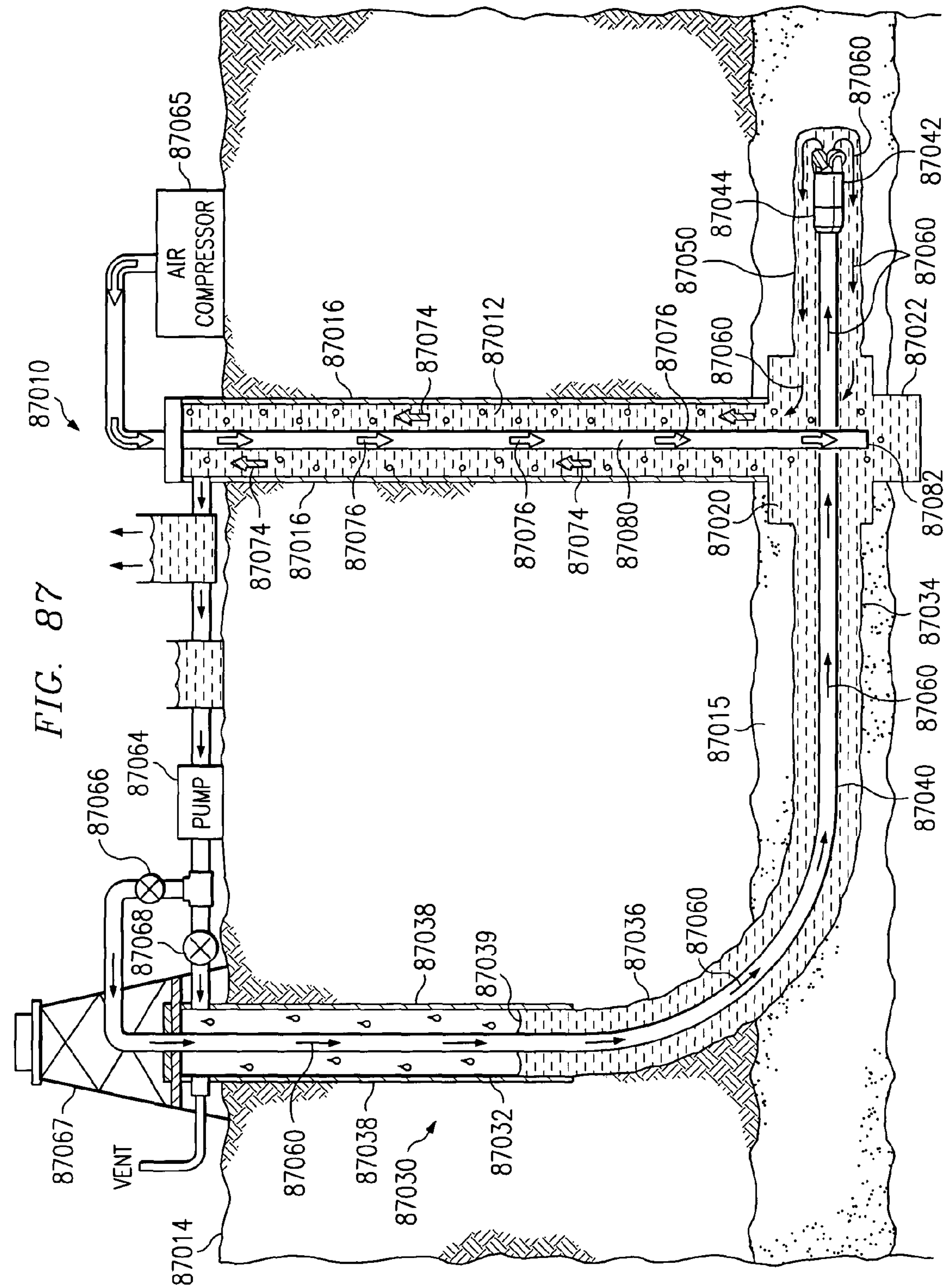
FIG. 87 illustrates the circulation of fluid in a well system in which a fluid is provided down a substantially vertical well bore through a tubing, in accordance with an embodiment of the present invention.

FIG. 87 illustrates the circulation of fluid in a well system 87010. The well system includes a subterranean zone that may comprise a coal seam. It will be understood that other subterranean zones can be similarly accessed using the dual well system of the present invention to remove and/or produce water, hydrocarbons, gas and other fluids in the subterranean zone and to treat minerals in the subterranean zone prior to mining operations.

Referring to FIG. 87, a substantially vertical well bore 87012 extends from a surface 87014 to a target layer subterranean zone 87015. Substantially vertical well bore 87012 intersects and penetrates subterranean zone 87015. Substantially vertical well bore 87012 may be lined with a suitable well casing 87016 that terminates at or above the level of the coal seam or other subterranean zone 87015.

An enlarged cavity 87020 may be formed in substantially vertical well bore 87012 at the level of subterranean zone 87015. Enlarged cavity 87020 may have a different shape in different embodiments. Enlarged cavity 87020 provides a junction for intersection of substantially vertical well bore 87012 by an articulated well bore used to form a drainage bore in subterranean zone 87015. Enlarged cavity 87020 also provides a collection point for fluids drained from subterranean zone 87015 during production operations. A vertical portion of substantially vertical well bore 87012 continues below enlarged cavity 87020 to form a sump 87022 for enlarged cavity 87020.

An articulated well bore 87030 extends from the surface 87014 to enlarged cavity 87020 of substantially vertical well bore 87012. Articulated well bore 87030 includes a substantially vertical portion 87032, a substantially horizontal portion 87034, and a curved or radiused portion 87036 interconnecting vertical and horizontal portions 87032 and 87034. Horizontal portion 87034 lies substantially in the horizontal plane of subterranean zone 87015 and intersects enlarged cavity 87020 of substantially vertical well bore 87012. In particular embodiments, articulated well bore 87030 may not include a horizontal portion, for example, if subterranean zone 87015 is not horizontal. In such cases, articulated well bore 87030 may include a portion substantially in the same plane as subterranean zone 87015.

Articulated well bore 87030 may be drilled using an articulated drill string 87040 that includes a suitable down-hole motor and drill bit 87042. A drilling rig 87067 is at the surface. A measurement while drilling (MWD) device 87044 may be included in articulated drill string 87040 for controlling the orientation and direction of the well bore drilled by the motor and drill bit 87042. The substantially vertical portion 87032 of the articulated well bore 87030 may be lined with a suitable casing 87038.

After enlarged cavity 87020 has been successfully intersected by articulated well bore 87030, drilling is continued through enlarged cavity 87020 using articulated drill string 87040 and appropriate horizontal drilling apparatus to drill a drainage bore 87050 in subterranean zone 87015. Drainage bore 87050 and other such well bores include sloped, undulating, or other inclinations of the coal seam or subterranean zone 87015.

During the process of drilling drainage bore 87050, drilling fluid (such as drilling "mud") is pumped down articulated drill string 87087040 using pump 87064 and circulated out of articulated drill string 87040 in the vicinity of drill bit 87042, where it is used to scour the formation and to remove formation cuttings. The drilling fluid is also used to power drill bit 87042 in cutting the formation. The general flow of the drilling fluid through and out of drill string 87040 is indicated by arrows 87060.

System 87010 includes a valve 87066 and a relief valve 87068 in the piping between articulated well bore 87030 and pump 87064. When drilling fluid is pumped down articulated drill string 87040 during drilling, valve 87066 is open. While connections are being made to articulated drill string 87040, during tripping of the drill string or in other cases when desirable, valve 87066 is closed and relief valve 87068 opens to allow drilling fluid to be pumped by pump 87064 down articulated well bore 87030 outside of articulated drill string 87040, in the annulus between articulated drill string 87040 and the surfaces of articulated well bore 87030. Pumping drilling fluid down articulated well bore 87030 outside of articulated drill string 87040 while active drilling is not occurring, such as during connections and tripping of the drill string, enables an operator to maintain a desired bottom hole pressure of articulated well bore 87030. Moreover, fluids may be provided through both valve 87066 and relief valve 87068 at the same time if desired. In the illustrated embodiment, relief valve 87068 is partially open to allow fluid to fall through articulated well bore 87030.

When pressure of articulated well bore 87030 is greater than the pressure of subterranean zone 87015 (the "formation pressure"), the well system is considered over-balanced. When pressure of articulated well bore 87030 is less than the formation pressure, the well system is considered under-balanced. In an over-balanced drilling situation, drilling fluid and entrained cuttings may be lost into subterranean zone 87015. Loss of drilling fluid and cuttings into the formation is not only expensive in terms of the lost drilling fluids, which must be made up, but it tends to plug the pores in the subterranean zone, which are needed to drain the zone of gas and water.

A fluid, such as compressed air or another suitable gas, may be provided down substantially vertical well bore 87012 through a tubing 87080. In the illustrated embodiment, gas is provided through tubing 87080; however it should be understood that other fluids may be provided through tubing 87080 in other embodiments. The gas may be provided through the tubing using an air compressor 87065, a pump or other means.

The flow of the gas is generally represented by arrows 87076. The tubing has an open end 87082 at enlarged cavity 87020 such that the gas exits the tubing at enlarged cavity 87020.

The flow rate of the gas or other fluid provided down substantially vertical well bore 87012 may be varied in order to change the bottom hole pressure of articulated well bore 87030. Furthermore, the composition of gas or other fluid provided down substantially vertical well bore 87012 may also be changed to change the bottom hole pressure. By changing the bottom hole pressure of articulated well bore 87030, a desired drilling condition such as under-balanced, balanced or over-balanced may be achieved.

The drilling fluid pumped through articulated drill string 87040 mixes with the gas or other fluid provided through tubing 87080 forming a fluid mixture. The fluid mixture flows up substantially vertical well bore 87012 outside of tubing 87080. Such flow of the fluid mixture is generally represented by arrows 87074 of FIG. 87. The fluid mixture may also comprise cuttings from the drilling of subterranean zone 87015 and fluid from subterranean zone 87015, such as water or methane gas. Drilling fluid pumped through articulated well bore 87030 outside of articulated drill string 87040 may also mix with the gas to form the fluid mixture flowing up substantially vertical well bore 87012 outside of tubing 87080.

Articulated well bore 87030 also includes a level 87039 of fluid. Level 87039 of fluid may be formed by regulating the fluid pump rate of pump 87064 and/or the injection rate of air compressor 87065. Such level of fluid acts as a fluid seal to provide a resistance to the flow of formation fluid, such as poisonous formation gas (for example, hydrogen sulfide), up articulated well bore 87030. Such resistance results from a hydrostatic pressure of the level of fluid in articulated well bore 87030. Thus, rig 87067 and rig personnel may be isolated from formation fluid, which may include poisonous gas, flowing up and out of articulated well bore 87030 at the surface. Furthermore, a larger annulus in substantially vertical well bore 87012 will allow for the return of cuttings to the surface at a lower pressure than if the cuttings were returned up articulated well bore 87030 outside of articulated drill string 87040.

A desired bottom hole pressure may be maintained during drilling even if additional collars of articulated drill string 87040 are needed, since the amount of gas pumped down substantially vertical well bore 87012 may be varied to offset the change in pressure resulting from the use of additional drill string collars.

Figure 88:
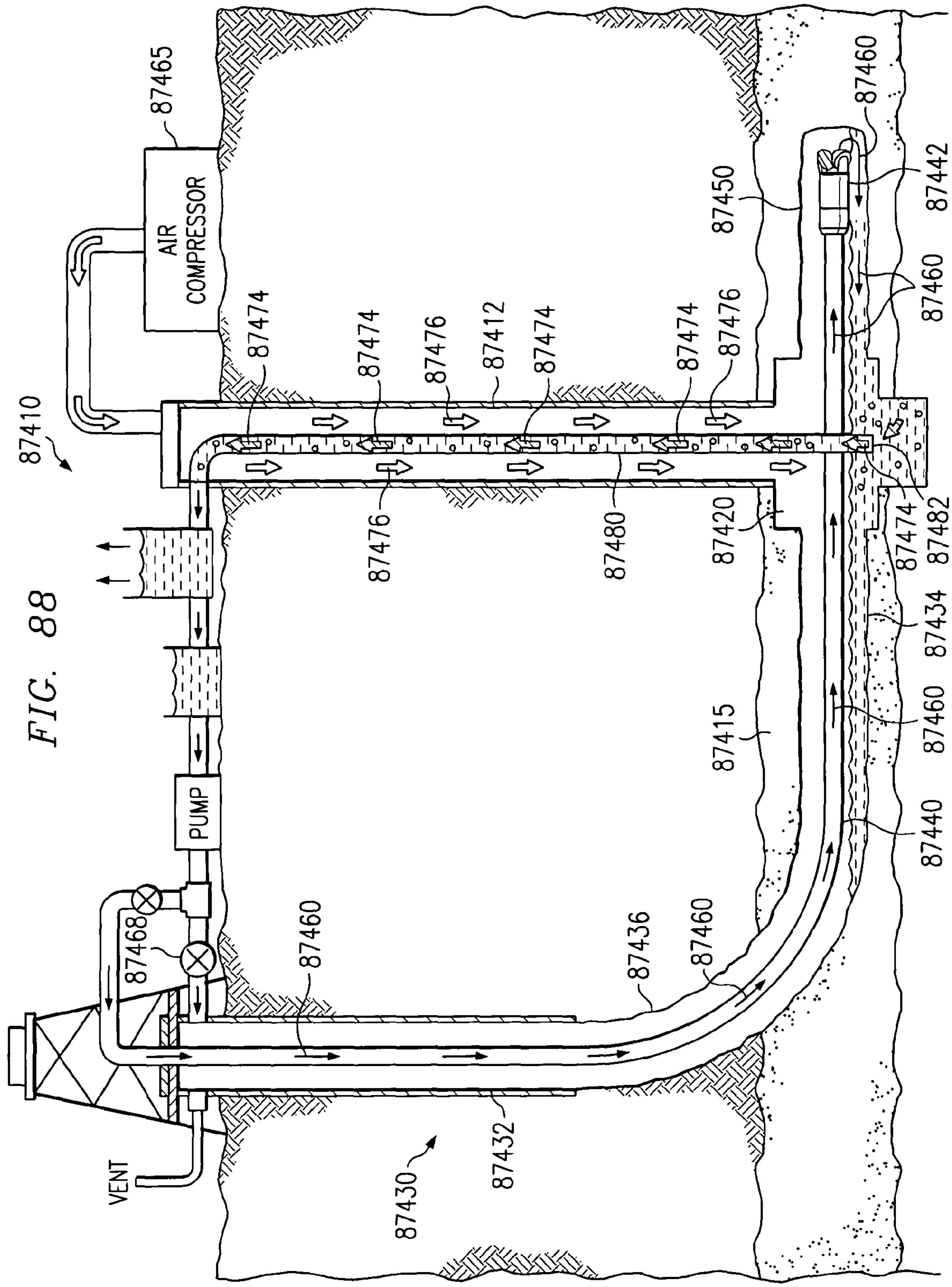
FIG. 88 illustrates the circulation of fluid in a well system in which a fluid is provided down a substantially vertical well bore, and a fluid mixture is returned up the well bore through a tubing, in accordance with an embodiment of the present invention.

FIG. 88 illustrates the circulation of fluid in a well system 87410 in accordance with an embodiment of the present invention. System 87410 is similar in many respects to system 87010 of FIG. 87, however the circulation of fluid in system 87410 differs from the circulation of fluid in system 87010. System 87410 includes a substantially vertical well bore 87412 and an articulated well bore 87430. Articulated well bore 87430 intersects substantially vertical well bore 87412 at an enlarged cavity 87420. Articulated well bore 87430 includes a substantially vertical portion 87432, a curved portion 87436 and a substantially horizontal portion 87434. Articulated well bore intersects an enlarged cavity 87420 of substantially vertical well bore 87412. Substantially horizontal portion 87434 of articulated well bore 87430 is drilled through subterranean zone 87415. Articulated well bore 87430 is drilled using an articulated drill string 87440 which includes a down-hole motor and a drill bit 87442. A drainage bore 87450 is drilled using articulated drill string 87440.

A drilling fluid is pumped through articulated drill string 87440 as described above with respect to FIG. 87. The general flow of such drilling fluid is illustrated by arrows 87460. The drilling fluid may mix with fluid and/or cuttings from subterranean zone 87450 after the drilling fluid exits articulated drill string 87440. Using relief valve 87468, fluids may be provided down articulated well bore 87430 outside of articulated drill string 87440 during connection or tripping operations or otherwise when desirable, such as the falling fluid illustrated in FIG. 87.

A fluid, such as compressed air, may be provided down substantially vertical well bore 87412 in the annulus between a tubing 87480 and the surface of substantially vertical well bore 87412. In the illustrated embodiment, gas is provided down substantially vertical well bore 87412 outside of tubing 87480; however it should be understood that other fluids may be provided in other embodiments. The gas or other fluid may be provided using an air compressor 87465, a pump or other means. The flow of the gas is generally represented by arrows 87476.

The flow rate of the gas or other fluid provided down substantially vertical well bore 87412 may be varied in order to change the bottom hole pressure of articulated well bore 87430. Furthermore, the composition of gas or other fluid provided down substantially vertical well bore 87412 may also be changed to change the bottom hole pressure. By changing the bottom hole pressure of articulated well bore 87430, a desired drilling condition such as under-balanced, balanced or over-balanced may be achieved.

The drilling fluid pumped through articulated drill string 87440 mixes with the gas or other fluid provided down substantially vertical well bore 87412 outside of tubing 87480 to form a fluid mixture. The fluid mixture enters an open end 87482 of tubing 87480 and flows up substantially vertical well bore 87412 through tubing 87480. Such flow of the fluid mixture is generally represented by arrows 87474. The fluid mixture may also comprise cuttings from the drilling of subterranean zone 87415 and fluid from subterranean zone 87415, such as water or methane gas. Drilling fluid pumped through articulated well bore 87430 outside of articulated drill string 87440 may also mix with the gas to form the fluid mixture flowing up substantially vertical well bore 87412 outside of tubing 87480.

Figure 89:
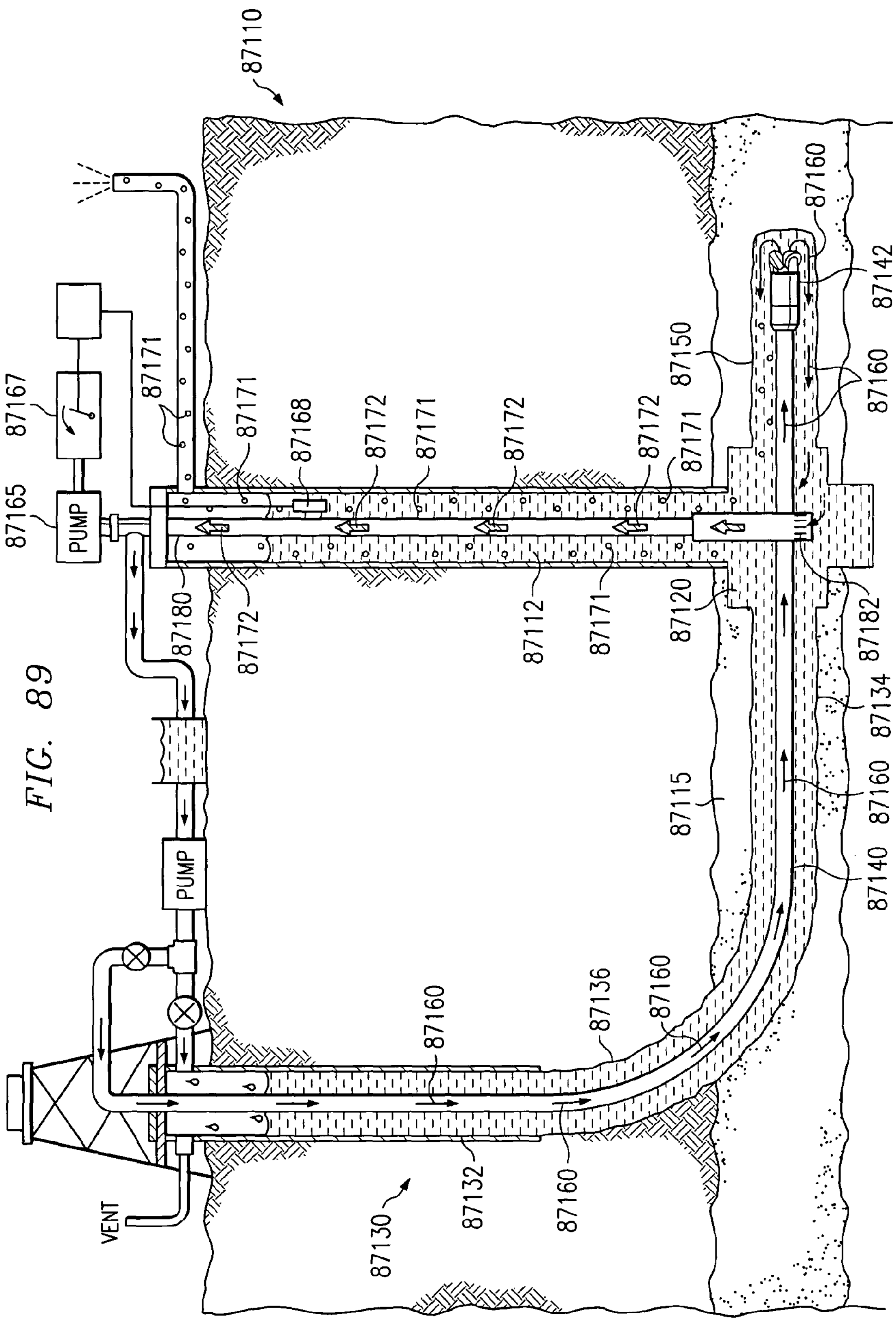
FIG. 89 illustrates the circulation of fluid in a well system in which a fluid mixture is pumped up a substantially vertical well bore through a pump string, in accordance with an embodiment of the present invention.

FIG. 89 illustrates the circulation of fluid in a well system 87110 in accordance with an embodiment of the present invention. System 87110 includes a substantially vertical well bore 87112 and an articulated well bore 87130. Articulated well bore 87130 intersects substantially vertical well bore 87112 at an enlarged cavity 87120. Articulated well bore 87130 includes a substantially vertical portion 87132, a curved portion 87136 and a substantially horizontal portion 87134. Articulated well bore intersects an enlarged cavity 87120 of substantially vertical well bore 87112. Substantially horizontal portion 87134 of articulated well bore 87130 is drilled through subterranean zone 87115. Articulated well bore 87130 is drilled using an articulated drill string 87140 which includes a down-hole motor and a drill bit 87142. A drainage bore 87150 is drilled using articulated drill string 87140.

Substantially vertical well bore 87112 includes a pump string 87180 which comprises a pump inlet 87182 located at enlarged cavity 87120. A drilling fluid is pumped through articulated drill string 87140 as described above with respect to FIG. 87. The general flow of such drilling fluid is illustrated by arrows 87160. The drilling fluid may mix with fluid and/or cuttings from subterranean zone 87150 to form a fluid mixture after the drilling fluid exits articulated drill string 87140.

The fluid mixture is pumped up through substantially vertical well bore 87112 through pump inlet 87182 and pump string 87180 using pump 87165, as generally illustrated by arrows 87172. Formation gas 87171 from subterranean zone 87115 flows up substantially vertical well bore 87112 to areas of lower pressure, bypassing pump inlet 87182. Thus, particular embodiments of the present invention provide a manner for pumping fluid out of a dual well system through a pump string and limiting the amount of formation gas pumped through the pump string. Formation gas 87171 may be flared as illustrated or recovered.

The speed of the pumping of the fluid mixture up substantially vertical well bore 87112 through pump string 87180 may be varied to change the fluid level and bottom hole pressure of system 87110. By changing the fluid level and bottom hole pressure, a desired drilling condition such as under-balanced, balanced or over-balanced may be achieved. Substantially vertical well bore 87112 includes a pressure sensor 87168 operable to detect a pressure in substantially vertical well bore 87112. Pressure sensor 87168 may be electrically coupled to an engine 87167 of pump 87165 to automatically change the speed of pump 87165 based on the pressure at a certain location in system 87110. In other embodiments, the speed of pump 87165 may be varied manually to achieve a desired drilling condition.

While connections are being made to articulated drill string 87140, during tripping of the drill string or in other cases when desirable, drilling fluid may be pumped through articulated well bore 87130 outside of articulated drill string 87140. Such drilling fluid may mix with fluid and/or cuttings from subterranean zone 87150 to form the fluid mixture pumped up substantially vertical well bore 87112 through pump string 87180.

Figure 90:
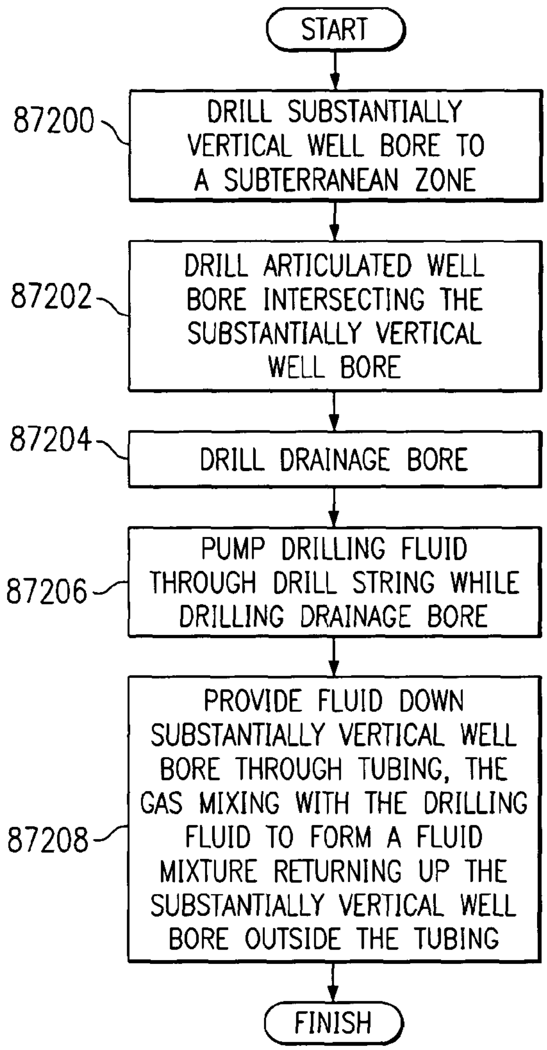
FIG. 90 is a flow chart illustrating an example method for circulating fluid in a well system in which a fluid is provided down a substantially vertical well bore through a tubing, in accordance with an embodiment of the present invention.

FIG. 90 is a flowchart illustrating an example method for circulating fluid in a well system in accordance with an embodiment of the present invention. The method begins at step 87200 where a substantially vertical well bore is drilled from a surface to a subterranean zone. In particular embodiments, the subterranean zone may comprise a coal seam or a hydrocarbon reservoir. At step 87202 an articulated well bore is drilled from the surface to the subterranean zone. The articulated well bore is drilled using a drill string. The articulated well bore is horizontally offset from the substantially vertical well bore at the surface and intersects the substantially vertical well bore at a junction proximate the subterranean zone. The junction may be at an enlarged cavity.

Step 87204 includes drilling a drainage bore from the junction into the subterranean zone. At step 87206, a drilling fluid is pumped through the drill string when the drainage bore is being drilled. The drilling fluid may exit the drill string proximate a drill bit of the drill string.

At step 87208, gas, such as compressed air, is provided down the substantially vertical well bore through a tubing. In other embodiments, other fluids may be provided down the substantially vertical well bore through the tubing. The tubing includes an opening at the junction such that the gas exits the tubing at the junction. In particular embodiments, the gas mixes with the drilling fluid to form a fluid mixture that returns up the substantially vertical well bore outside of the tubing. The fluid mixture may also include fluid and/or cuttings from the subterranean zone. The flow rate or composition of the gas or other fluid provided down the substantially vertical well bore may be varied to control a bottom hole pressure of the system to achieve a desired drilling condition, such as an over-balanced, under-balanced or balanced drilling condition.

Figure 91:
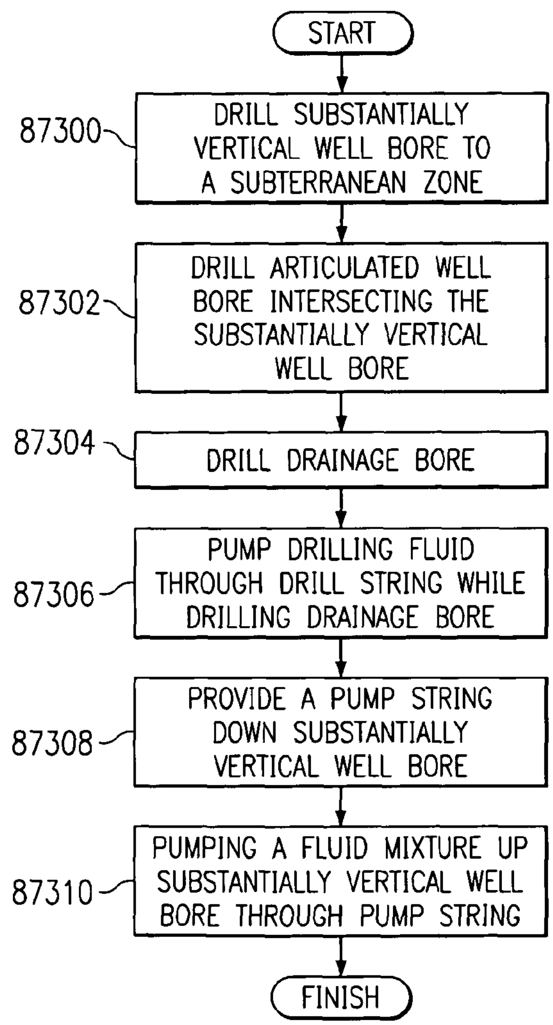
FIG. 91 is a flow chart illustrating an example method for circulating fluid in a well system in which a fluid mixture is pumped up a substantially vertical well bore through a pump string, in accordance with an embodiment of the present invention.

FIG. 91 is a flowchart illustrating an example method for circulating fluid in a well system in accordance with an embodiment of the present invention. The method begins at step 87300 where a substantially vertical well bore is drilled from a surface to a subterranean zone. In particular embodiments, the subterranean zone may comprise a coal seam or a hydrocarbon reservoir. At step 87302 an articulated well bore is drilled from the surface to the subterranean zone. The articulated well bore is drilled using a drill string. The articulated well bore is horizontally offset from the substantially vertical well bore at the surface and intersects the substantially vertical well bore at a junction proximate the subterranean zone. The junction may be at an enlarged cavity.

Step 87304 includes drilling a drainage bore from the junction into the subterranean zone. At step 87306, a drilling fluid is pumped through the drill string when the drainage bore is being drilled. The drilling fluid may exit the drill string proximate a drill bit of the drill string. At step 87308, a pump string is provided down substantially vertical well bore. The pump string includes a pump inlet proximate the junction. At step 87310, a fluid mixture is pumped up substantially vertical well bore through the pump string. The fluid mixture enters the pumps string at the pump inlet. The fluid mixture may comprise the drilling fluid after the drilling fluid exits the drill string, fluid from the subterranean zone and/or cuttings from the subterranean zone. The speed of the pumping of the fluid mixture up the substantially vertical well bore through the pump string may be varied to control a bottom hole pressure to achieve a desired drilling condition, such as an over-balanced, under-balanced or balanced drilling condition.

Figure 92:
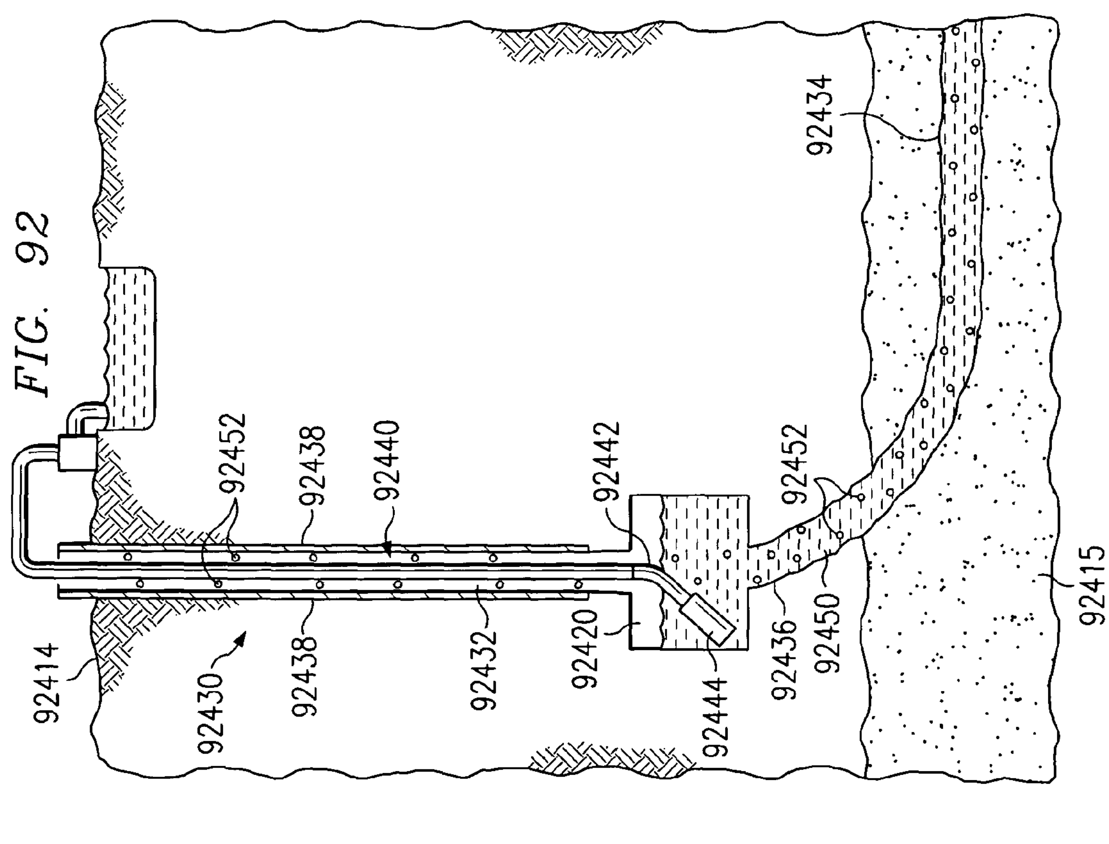
FIG. 92 illustrates an example well system for removing fluid from a subterranean zone utilizing an enlarged cavity in a substantially vertical portion of an articulated well bore, in accordance with an embodiment of the present invention.

FIG. 92 illustrates an example well system for removing fluid from a subterranean zone. An articulated well bore 92430 extends from surface 92414 to subterranean zone 92415. In this embodiment, subterranean zone 92415 comprises a coal seam, however subterranean zones in accordance with other embodiments may comprise other compositions, such as shale.

Articulated well bore 92430 includes a substantially vertical portion 92432, a substantially horizontal portion 92434 and a curved or radiused portion 92436 interconnecting vertical and horizontal portions 92432 and 92434. Horizontal portion 92434 lies substantially in the horizontal plane of subterranean zone 92415. In particular embodiments, articulated well bore 92430 may not include a horizontal portion, for example, if subterranean zone 92415 is not horizontal. In such cases, articulated well bore 92430 may include a portion substantially in the same plane as subterranean zone 92415. Articulated well bore 92430 may be drilled using an articulated drill string. Articulated well bore 92430 may be lined with a suitable casing 92438.

Articulated well bore 92430 also includes an enlarged cavity 92420 formed in substantially vertical portion 92432. In this embodiment, enlarged cavity 92420 comprises a generally cylindrical shape; however, enlarged cavities in accordance with other embodiments may comprise other shapes. Enlarged cavity 92420 may be formed using suitable underreaming techniques and equipment, as described in further detail below with respect to FIGS. 96-98. Articulated well bore 92430 includes fluids 92450. Fluids 92450 may comprise drilling fluid and/or drilling mud used in connection with drilling articulated well bore 92430, water, gas, for example methane gas released from subterranean zone 92415, or other liquids and/or gases. In the illustrated embodiment, methane gas 92452 is released from subterranean zone 92415 after articulated well bore 92430 is drilled.

Enlarged cavity 92420 acts as a chamber for the separation of gas and liquid since the cross-sectional area of enlarged cavity 92420 is larger than the cross-sectional area of other portions of articulated well bore 92430. This allows gas 92452 to flow through and up the articulated well bore 92430 while liquid separates out from the gas and remains in the enlarged cavity for pumping. Such separation occurs because the velocity of the gas flowing up through the articulated well bore decreases at enlarged cavity 92420 below a velocity at which the gas can entrain liquid, thus allowing for the separation of the gas and liquid at enlarged cavity 92420. This decrease in velocity results from the larger cross-sectional area of enlarged cavity 92420 relative to the cross-sectional area of other portions of articulated well bore 92430 through which the gas flows. An enlarged cavity having a larger cross-sectional area may lead to a greater reduction in velocity of the gas flowing up and through the well bore.

A pumping unit 92440 is disposed within articulated well bore 92430. In this embodiment, pumping unit 92440 includes a bent sub section 92442 and a pump inlet 92444 disposed within enlarged cavity 92420. Pumping unit 92440 is operable to drain liquid, entrained coal fines and other fluids from articulated well bore 92430. As discussed above, such liquid separates from the flow of gas 92452 through articulated well bore 92430 at enlarged cavity 92420. Bent sub section 92442 of pumping unit 92440 enables pump inlet 92444 to be disposed within enlarged cavity 92420 at a position that is horizontally offset from the flow of gas 92452 through articulated well bore 92430 at enlarged cavity 92420. In this embodiment, pump inlet 92444 is horizontally offset from the longitudinal axis of vertical portion 92432 of articulated well bore 92430. This position decreases the amount of gas 92452 pumped through pump inlet 92444 because gas 92452 may bypass pump inlet 92444 when it releases from subterranean zone 92430 and flows through and up articulated well bore 92430 where it may be flared, released or recovered. If pump inlet 92444 was not horizontally offset from the flow of gas 92452 through articulated well bore 92430 at enlarged cavity 92420, gas 92452 may flow into pump inlet 92444 when it released from subterranean zone 92450. In that case the pump efficiency of the system would be reduced.

Thus, forming enlarged cavity 92420 of articulated well bore 92430 enables liquid of fluids 92450 to separate out from the flow of gas 92452 through the well bore. Enlarged cavity 92420 also enables a user to position pump inlet 92444 offset from the flow of gas 92452 through articulated well bore 92430 at enlarged cavity 92420. Thus, the fluids and entrained coal fines pumped from subterranean zone 92415 through articulated well bore 92430 will contain less gas, resulting in greater pump efficiency.

Figure 93:
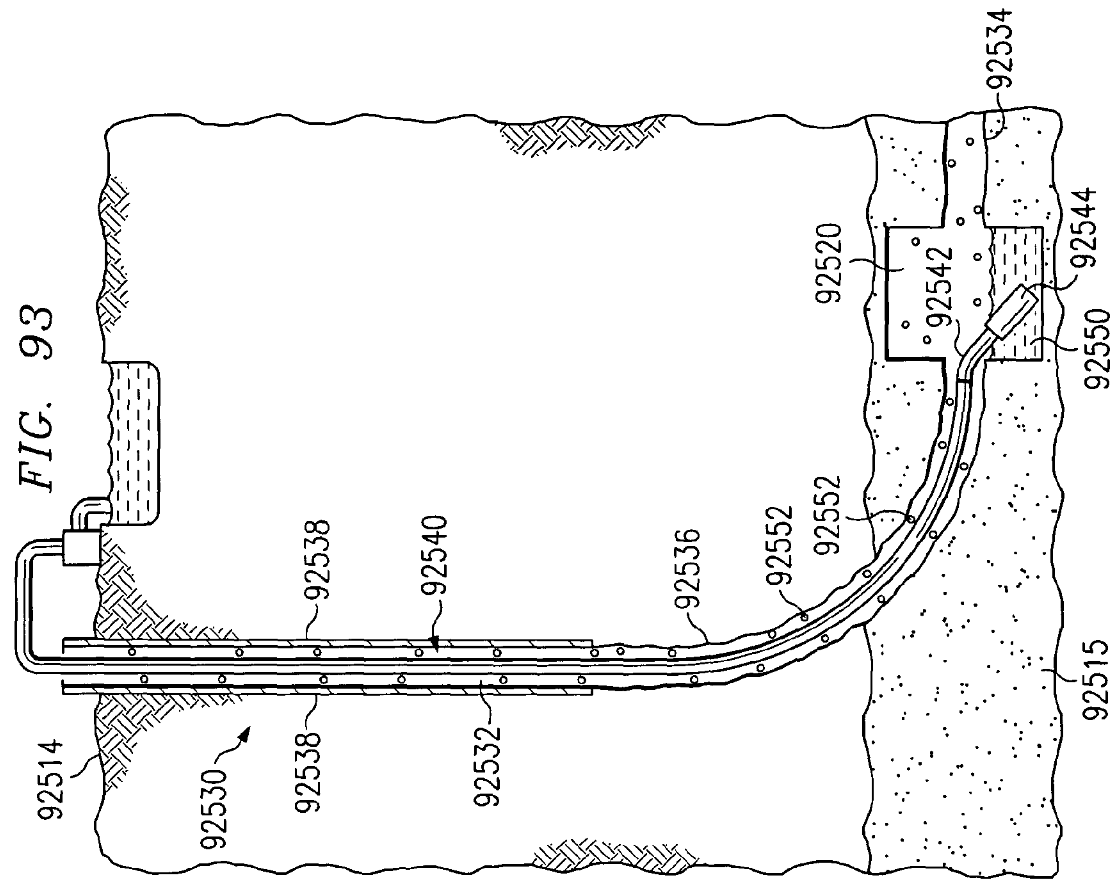
FIG. 93 illustrates an example well system for removing fluid from a subterranean zone utilizing an enlarged cavity in a substantially horizontal portion of an articulated well bore, in accordance with an embodiment of the present invention.

FIG. 93 illustrates another example well system for removing fluid from a subterranean zone. An articulated well bore 92530 extends from surface 92514 to subterranean zone 92515. Articulated well bore 92530 includes a substantially vertical portion 92532, a substantially horizontal portion 92534 and a curved portion 92536 interconnecting vertical and horizontal portions 92532 and 92534. Articulated well bore 92530 is lined with a suitable casing 92538. Articulated well bore 92530 also includes an enlarged cavity 92520 formed in substantially horizontal portion 92534.

Articulated well bore 92530 includes fluids 92550. Fluids 92550 may comprise drilling fluid and/or drilling mud used in connection with drilling articulated well bore 92530, water, gas, for example methane gas released from subterranean zone 92515, or other liquids and/or gases. In the illustrated embodiment, methane gas 92552 is released from subterranean zone 92515 after articulated well bore 92530 is drilled. Enlarged cavity 92520 acts as a chamber for the separation of gas and liquid much like enlarged cavity 92420 of FIG. 92 discussed above.

A pumping unit 92540 is disposed within articulated well bore 92530. In this embodiment, pumping unit 92540 includes a bent sub section 92542 and a pump inlet 92544 disposed within enlarged cavity 92520. Pumping unit 92540 is operable to drain liquid, entrained coal fines and other fluid from articulated well bore 92530. As discussed above, such liquid separates from the flow of gas 92552 through articulated well bore 92530 at enlarged cavity 92520. Bent sub section 92542 of pumping unit 92540 enables pump inlet 92544 to be disposed within enlarged cavity 92520 at a position that is vertically offset from the flow of gas 92552 through articulated well bore 92530 at enlarged cavity 92520. In this embodiment, pump inlet 92544 is vertically offset from the longitudinal axis of horizontal portion 92534 of articulated well bore 92530. This position decreases the amount of gas 92552 pumped through pump inlet 92544 because gas 92552 may bypass pump inlet 92544 when it releases from subterranean zone 92530 and flows through and up articulated well bore 92530. If pump inlet 92544 was not vertically offset from the flow of gas 92552 through articulated well bore 92530 at enlarged cavity 92520, gas 92552 would likely flow into pump inlet 92544 when it released from subterranean zone 92550. In that case the pump efficiency of the system would be reduced.

Enlarged cavity 92520 also enables a user to position pump inlet 92544 offset from the flow of gas 92552 through articulated well bore 92530 at enlarged cavity 92520. Thus, the fluids and entrained coal fines pumped from subterranean zone 92515 through articulated well bore 92530 will contain less gas, resulting in greater pump efficiency.

Figure 94:
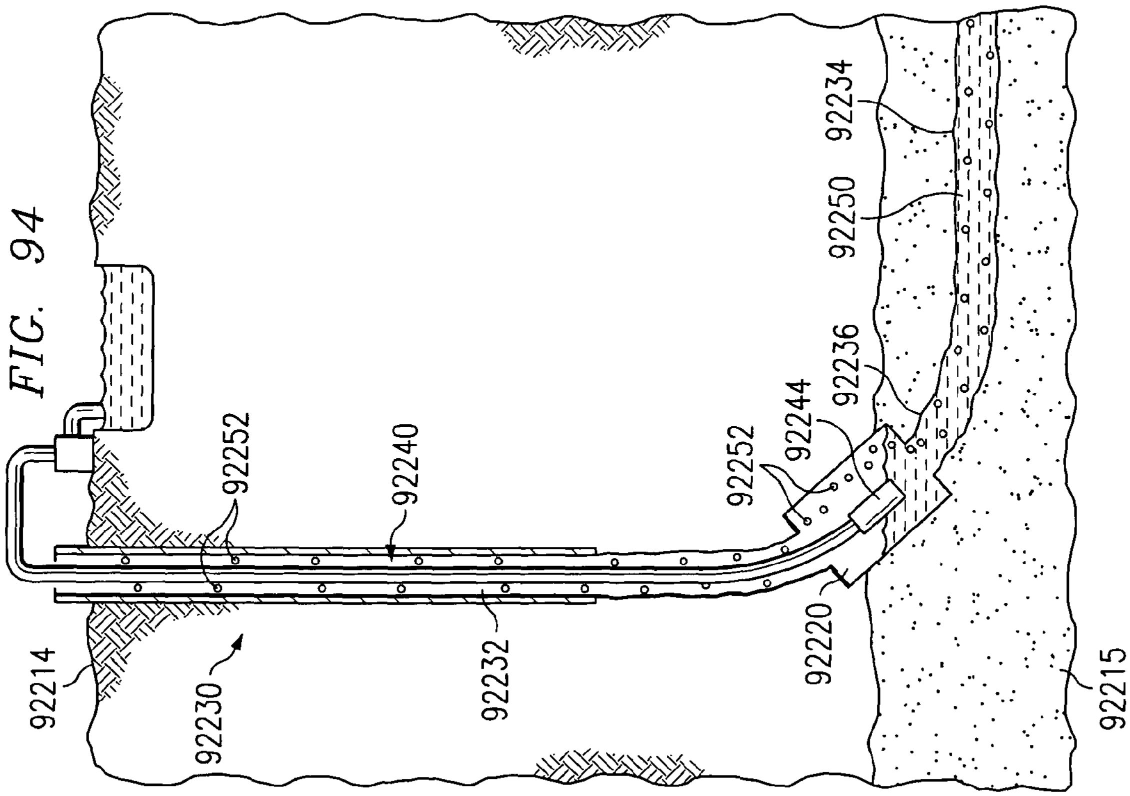
FIG. 94 illustrates an example well system for removing fluid from a subterranean zone utilizing an enlarged cavity in a curved portion of an articulated well bore, in accordance with an embodiment of the present invention.

FIG. 94 illustrates another example well system for removing fluid from a subterranean zone. An articulated well bore 92230 extends from surface 92214 to subterranean zone 92215. Articulated well bore 92230 includes a substantially vertical portion 92232, a substantially horizontal portion 92234 and a curved portion 92236 interconnecting vertical and horizontal portions 92232 and 92234.

Articulated well bore 92230 includes an enlarged cavity 92220 formed in curved portion 92236. Articulated well bore 92230 includes fluids 92250. Fluids 92250 may comprise drilling fluid and/or drilling mud used in connection with drilling articulated well bore 92230, water, gas, for example methane gas released from subterranean zone 92215, or other liquids and/or gases. In the illustrated embodiment, methane gas 92252 is released from subterranean zone 92215 after articulated well bore 92230 is drilled. Enlarged cavity 92220 acts as a chamber for the separation of gas and liquid much like enlarged cavity 92420 of FIG. 92 discussed above.

A pumping unit 92240 is disposed within articulated well bore 92230. Pumping unit 92240 includes a pump inlet 92244 disposed within enlarged cavity 92220. Pumping unit 92240 is operable to drain liquid, entrained coal fines and other fluids from articulated well bore 92230. As discussed above, such liquid separates from the flow of gas 92252 through articulated well bore 92230 at enlarged cavity 92220. As illustrated, pump inlet 92244 is offset from the flow of gas 92252 through articulated well bore 92230 at enlarged cavity 92220. This decreases the amount of gas 92252 pumped through pump inlet 92244 because gas 92252 may bypass pump inlet 92244 when it releases from subterranean zone 92230 and flows through and up articulated well bore 92230.

Thus, forming enlarged cavity 92220 of articulated well bore 92230 enables liquids of fluids 92250 to separate out from the flow of gas 92252 through the well bore. Enlarged cavity 92220 also enables a user to position pump inlet 92244 offset from the flow of gas 92252 through articulated well bore 92230 at enlarged cavity 92220. Thus, the fluids and entrained coal fines pumped from subterranean zone 92215 through articulated well bore 92230 will contain less gas, resulting in greater pump efficiency.

Figure 95:
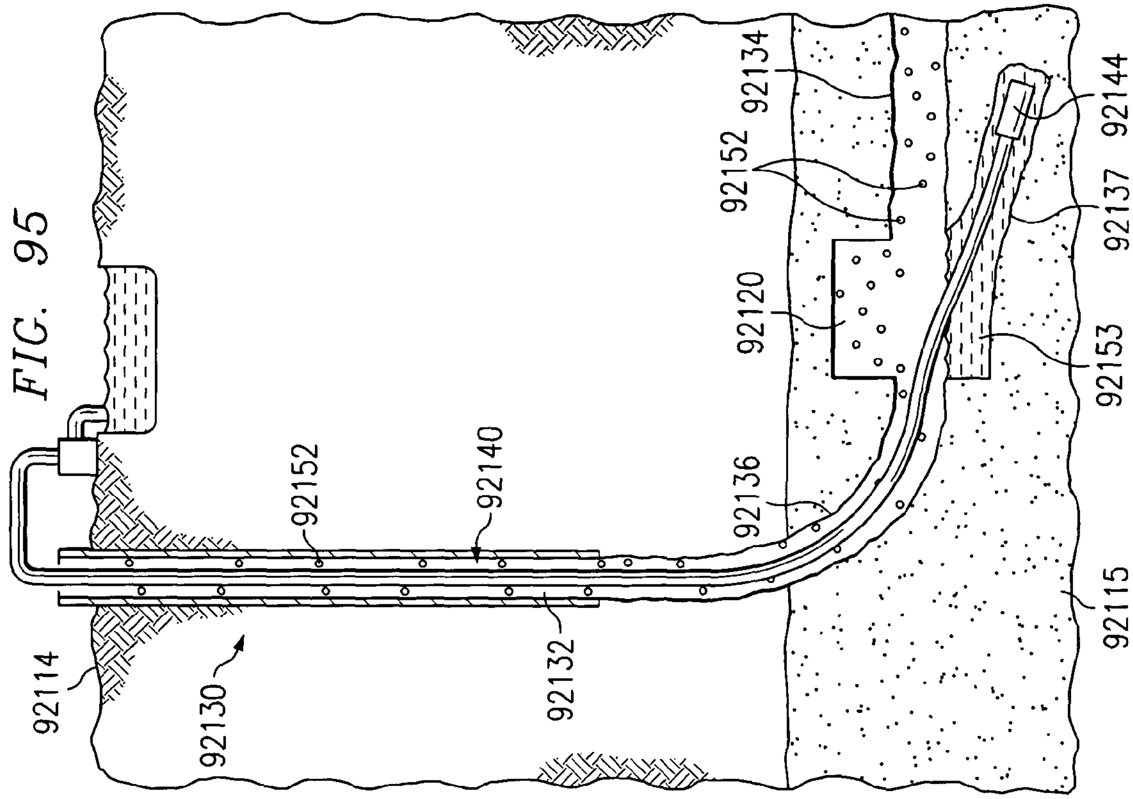
FIG. 95 illustrates an example well system for removing fluid from a subterranean zone utilizing an enlarged cavity and a branch sump of an articulated well bore, in accordance with an embodiment of the present invention.

FIG. 95 illustrates another example well system for removing fluid from a subterranean zone. An articulated well bore 92130 extends from surface 92114 to subterranean zone 92115. Articulated well bore 92130 includes a substantially vertical portion 92132, a substantially horizontal portion 92134, a curved portion 92136 interconnecting vertical and horizontal portions 92132 and 92134, and a branch sump 92137.

Articulated well bore 92130 includes an enlarged cavity 92120. Enlarged cavity 92220 acts a chamber for the separation of gas 92152 and liquid 92153 which are included in fluids released from subterranean zone 92115 after articulated well bore 92130 is drilled. This allows gas 92152 to flow through and up the articulated well bore 92130 while liquid 92153 separates out from the gas and remains in enlarged cavity 92120 and branch sump 92137 for pumping. Branch sump 92137 provides a collection area from which liquid 92153 may be pumped.

A pumping unit 92140 is disposed within articulated well bore 92130. Pumping unit 92140 includes a pump inlet 92144 disposed within branch sump 92137. Pumping unit 92140 is operable to drain liquid 92153 and entrained coal fines from articulated well bore 92130. As discussed above, such liquid 92153 separates from the flow of gas 92152 through articulated well bore 92130. Thus, forming enlarged cavity 92120 of articulated well bore 92130 enables liquid 92153 to separate out from the flow of gas 92152 through the well bore. Thus, the fluids and entrained coal fines pumped from subterranean zone 92115 through articulated well bore 92130 will contain less gas, resulting in greater pump efficiency.

As described above, FIGS. 92-95 illustrate enlarged cavities formed in a substantially vertical portion, a substantially horizontal portion and a curved portion of an articulated well bore. It should be understood that embodiments of this invention may include an enlarged cavity formed in any portion of an articulated well bore, any portion of a substantially vertical well bore, any portion of a substantially horizontal well bore or any portion of any other well bore, such as a slant well bore.

Figure 96:
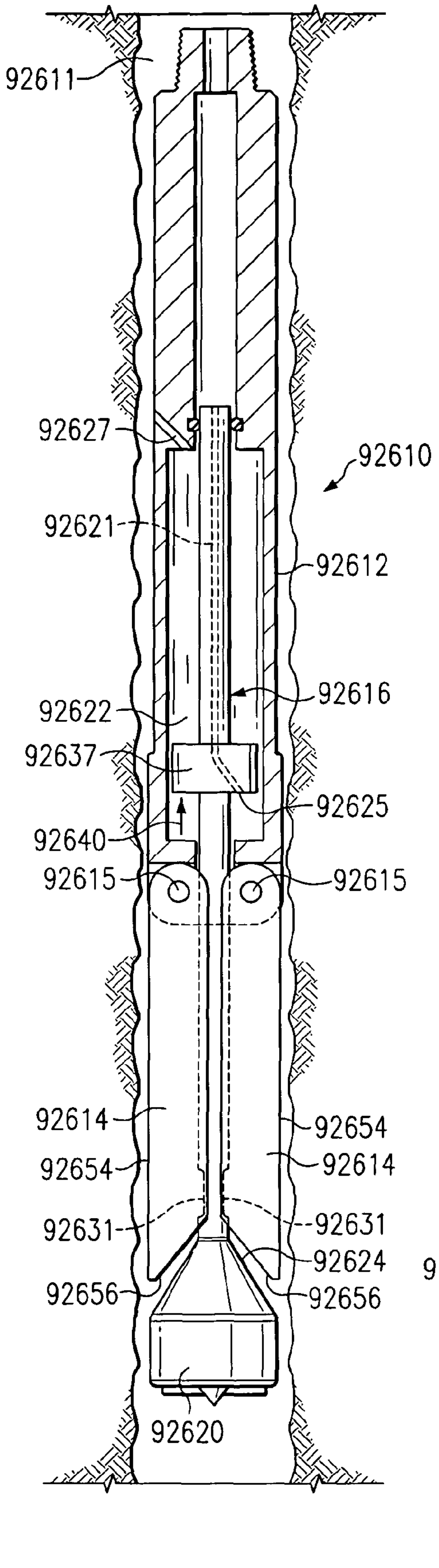
FIG. 96 illustrates an example underreamer used to form an enlarged cavity, in accordance with an embodiment of the present invention.

FIG. 96 illustrates an example underreamer 92610 used to form an enlarged cavity, such as enlarged cavity 92420 of FIG. 92. Underreamer 92610 includes two cutters 92614 pivotally coupled to a housing 92612. Other underreamers which may be used to form enlarged cavity 92420 may have one or more than two cutters 92614. In this embodiment, cutters 92614 are coupled to housing 92612 via pins 92615; however, other suitable methods may be used to provide pivotal or rotational movement of cutters 92614 relative to housing 92612. Housing 92612 is illustrated as being substantially vertically disposed within a well bore 92611; however, underreamer 92610 may form an enlarged cavity while housing 92612 is disposed in other positions as well. For example, underreamer 92610 may form an enlarged cavity such as enlarged cavity 92520 of FIG. 93 while in a substantially horizontal position.

Underreamer 92610 includes an actuator 92616 with a portion slidably positioned within a pressure cavity 92622 of housing 92612. Actuator 92616 includes a fluid passage 92621. Fluid passage 92621 includes an outlet 92625 which allows fluid to exit fluid passage 92621 into pressure cavity 92622 of housing 92612. Pressure cavity 92622 includes an exit vent 92627 which allows fluid to exit pressure cavity 92622 into well bore 92611. In particular embodiments, exit vent 92627 may be coupled to a vent hose in order to transport fluid exiting through exit vent 92627 to the surface or to another location. Actuator 92616 also includes an enlarged portion 92620 which, in this embodiment, has a beveled portion 92624. However, other embodiments may include an actuator having an enlarged portion that comprises other angles, shapes or configurations, such as a cubical, spherical, conical or teardrop shape. Actuator 92616 also includes pressure grooves 92631.

Cutters 92614 are illustrated in a retracted position, nesting around actuator 92616. Cutters 92614 may have a length of approximately two to three feet; however the length of cutters 92614 may be different in other embodiments. Cutters 92614 are illustrated as having angled ends; however, the ends of cutters 92614 in other embodiments may not be angled or they may be curved, depending on the shape and configuration of enlarged portion 92620. Cutters 92614 include side cutting surfaces 92654 and end cutting surfaces 92656. Cutters 92614 may also include tips which may be replaceable in particular embodiments as the tips get worn down during operation. In such cases, the tips may include end cutting surfaces 92656. Cutting surfaces 92654 and 92656 and the tips may be dressed with a variety of different cutting materials, including, but not limited to, polycrystalline diamonds, tungsten carbide inserts, crushed tungsten carbide, hard facing with tube barium, or other suitable cutting structures and materials, to accommodate a particular subsurface formation. Additionally, various cutting surfaces 92654 and 92656 configurations may be machined or formed on cutters 92614 to enhance the cutting characteristics of cutters 92614.

In operation, a pressurized fluid is passed through fluid passage 92621 of actuator 92616. Such disposition may occur through a drill pipe connector connected to housing 92612. The pressurized fluid flows through fluid passage 92621 and exits the fluid passage through outlet 92625 into pressure cavity 92622. Inside pressure cavity 92622, the pressurized fluid exerts a first axial force 92640 upon an enlarged portion 92637 of actuator 92616. Enlarged portion 92637 may be encircled by circular gaskets in order to prevent pressurized fluid from flowing around enlarged portion 92637. The exertion of first axial force 92640 on enlarged portion 92637 of actuator 92616 causes movement of actuator 92616 relative to housing 92612. Such movement causes beveled portion 92624 of enlarged portion 92620 to contact cutters 92614 causing cutters 92614 to rotate about pins 92615 and extend radially outward relative to housing 92612. Through the extension of cutters 92614, underreamer 92610 forms an enlarged cavity as cutting surfaces 92654 and 92656 of cutters 92614 come into contact with the surfaces of well bore 92611.

Housing 92612 may be rotated within well bore 92611 as cutters 92614 extend radially outward to aid in forming an enlarged cavity 92642. Rotation of housing 92612 may be achieved using a drill string coupled to the drill pipe connector; however, other suitable methods of rotating housing 92612 may be utilized. For example, a downhole motor in well bore 92611 may be used to rotate housing 92612. In particular embodiments, both a downhole motor and a drill string may be used to rotate housing 92612. The drill string may also aid in stabilizing housing 92612 in well bore 92611.

Figure 97:
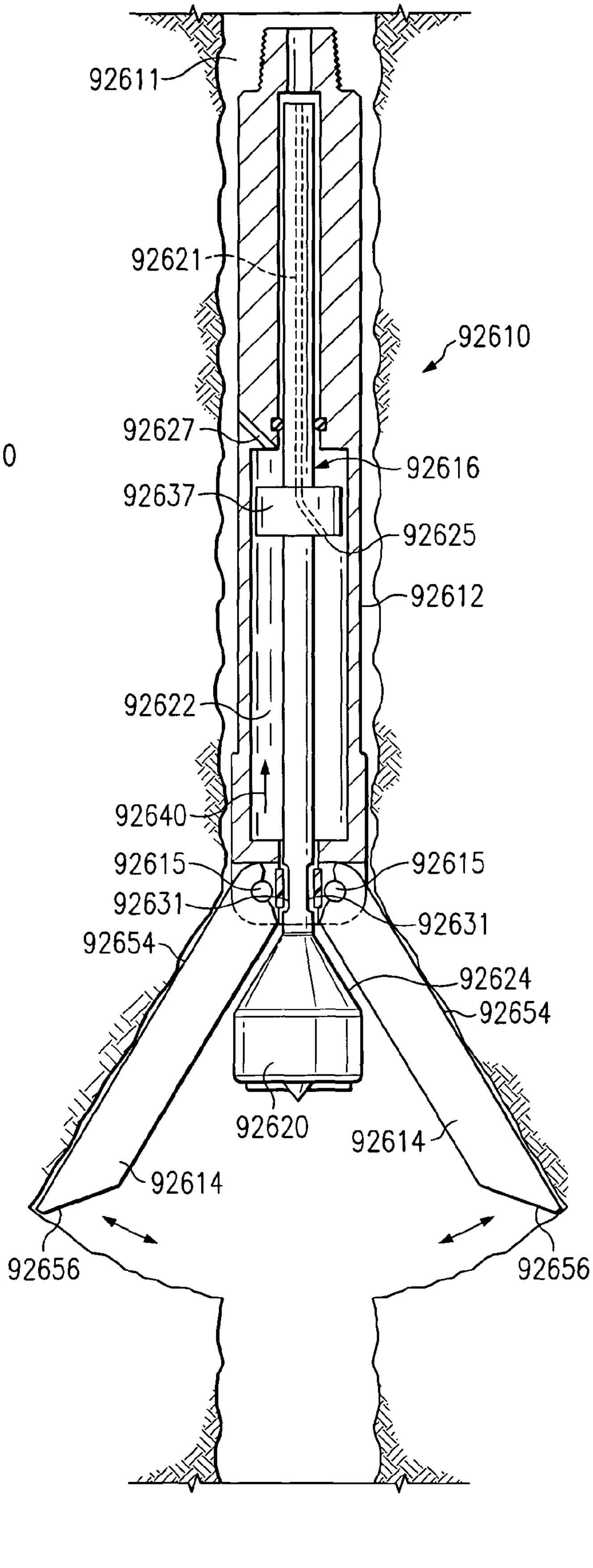
FIG. 97 illustrates the underreamer of FIG. 96 with cutters in a semi-extended position, in accordance with an embodiment of the present invention.

FIG. 97 is a diagram illustrating underreamer 92610 of FIG. 96 in a semi-extended position. In FIG. 97, cutters 92614 are in a semi-extended position relative to housing 92612 and have begun to form an enlarged cavity 92642. When first axial force 92640 (illustrated in FIG. 96) is applied and actuator 92616 moves relative to housing 92612, enlarged portion 92637 of actuator 92616 will eventually reach an end 92644 of pressure cavity 92622. At this point, enlarged portion 92620 is proximate an end 92617 of housing 92612. Cutters 92614 are extended as illustrated and an angle 92646 will be formed between them. In this embodiment, angle 92646 is approximately sixty degrees, but angle 92646 may be different in other embodiments depending on the angle of beveled portion 92624 or the shape or configuration of enlarged portion 92620. As enlarged portion 92637 of actuator 92616 reaches end 92644 of pressure cavity 92622, the fluid within pressure cavity 92622 may exit pressure cavity 92622 into well bore 92611 through pressure grooves 92631. Fluid may also exit pressure cavity 92622 through exit vent 92627. Other embodiments of the present invention may provide other ways for the pressurized fluid to exit pressure cavity 92622.

Figure 98:
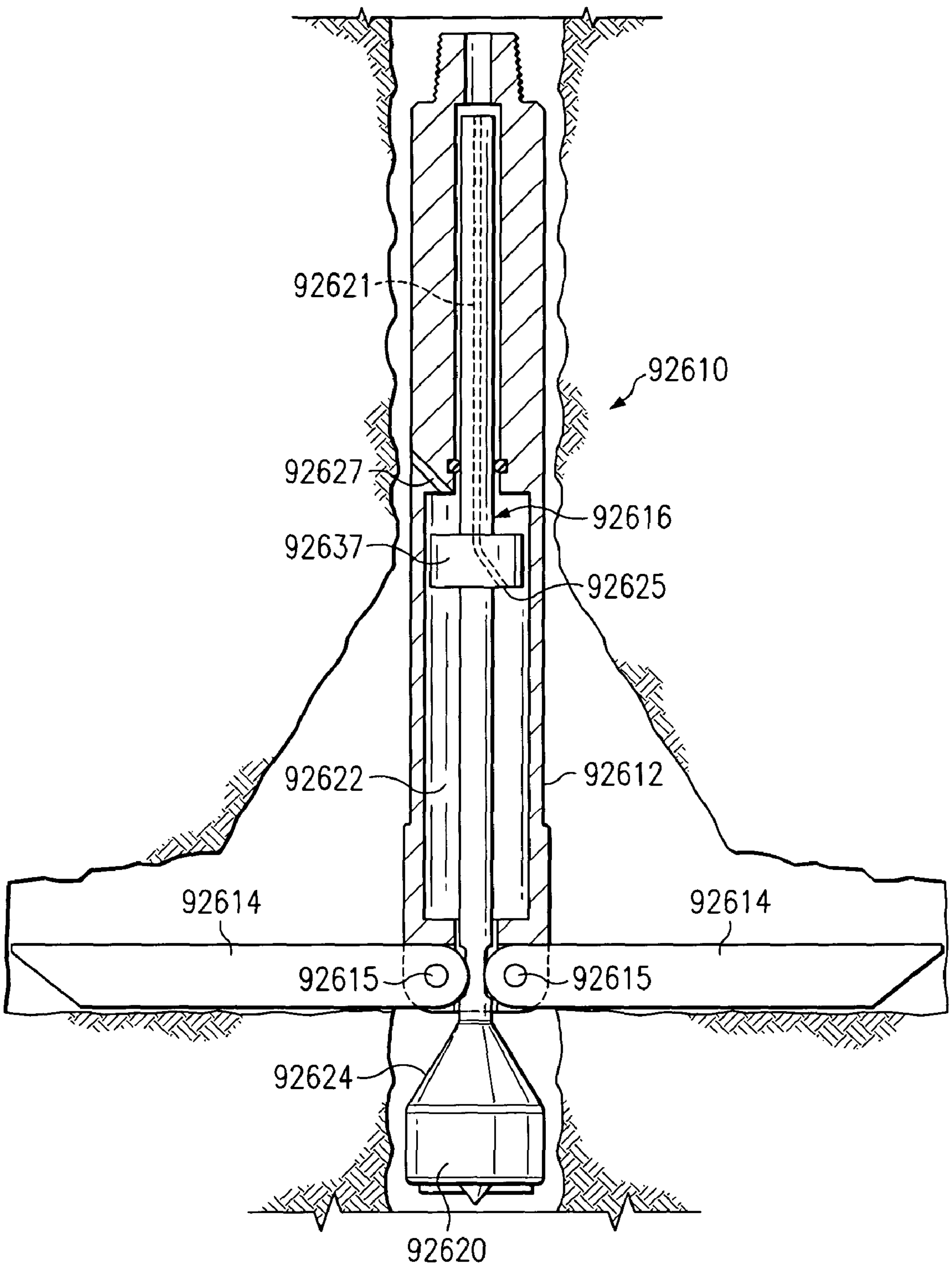
FIG. 98 illustrates the underreamer of FIG. 96 with cutters in an extended position, in accordance with an embodiment of the present invention.

FIG. 98 is a diagram illustrating underreamer 92610 of FIG. 97 in an extended position. Once enough first axial force 92640 has been exerted on enlarged portion 92637 of actuator 92616 for enlarged portion 92637 to contact end 92644 of pressure cavity 92622 thereby extending cutters 92614 to a semi-extended position as illustrated in FIG. 97, a second axial force 92648 may be applied to underreamer 92610. Second axial force 92648 may be applied by moving underreamer 92610 relative to well bore 92611. Such movement may be accomplished by moving the drill string coupled to the drill pipe connector or by any other technique. The application of second axial force 92648 forces cutters 92614 to rotate about pins 92615 and further extend radially outward relative to housing 92612. The application of second axial force 92648 may further extend cutters 92614 to a position where they are approximately perpendicular to a longitudinal axis of housing 92612, as illustrated in FIG. 98. Housing 92612 may include a bevel or "stop" in order to prevent cutters 92614 from rotating passed a particular position, such as an approximately perpendicular position to a longitudinal axis of housing 92612 as illustrated in FIG. 98.

As stated above, housing 92612 may be rotated within well bore 92611 when cutters 92614 are extended radially outward to aid in forming enlarged cavity 92642. Underreamer 92610 may also be raised and lowered within well bore 92611 to further define and shape cavity 92642. It should be understood that a subterranean cavity having a shape other than the shape of cavity 92642 may be formed with underreamer 92610.

Figure 99:
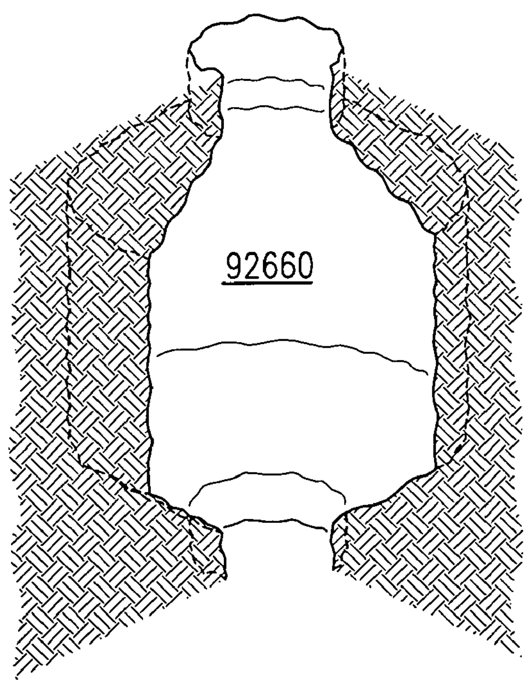
FIG. 99 is an isometric diagram illustrating an enlarged cavity having a generally cylindrical shape, in accordance with an embodiment of the present invention.

FIG. 99 is an isometric diagram illustrating an enlarged cavity 92660 having a generally cylindrical shape which may be formed using underreamer 92610 of FIGS. 96-98. Enlarged cavity 92660 may be formed by raising and/or lowering the underreamer in the well bore and by rotating the underreamer. Enlarged cavity 92660 is also an example of cavity 92420 of FIG. 92.

Although enlarged cavities having a generally cylindrical shape have been illustrated, it should be understood that an enlarged cavity having another shape may be used in accordance with particular embodiments of the present invention. Furthermore, an enlarged cavity may be formed by using an underreamer as described herein or by using other suitable techniques or methods, such as blasting or solution mining.

Figure 100:
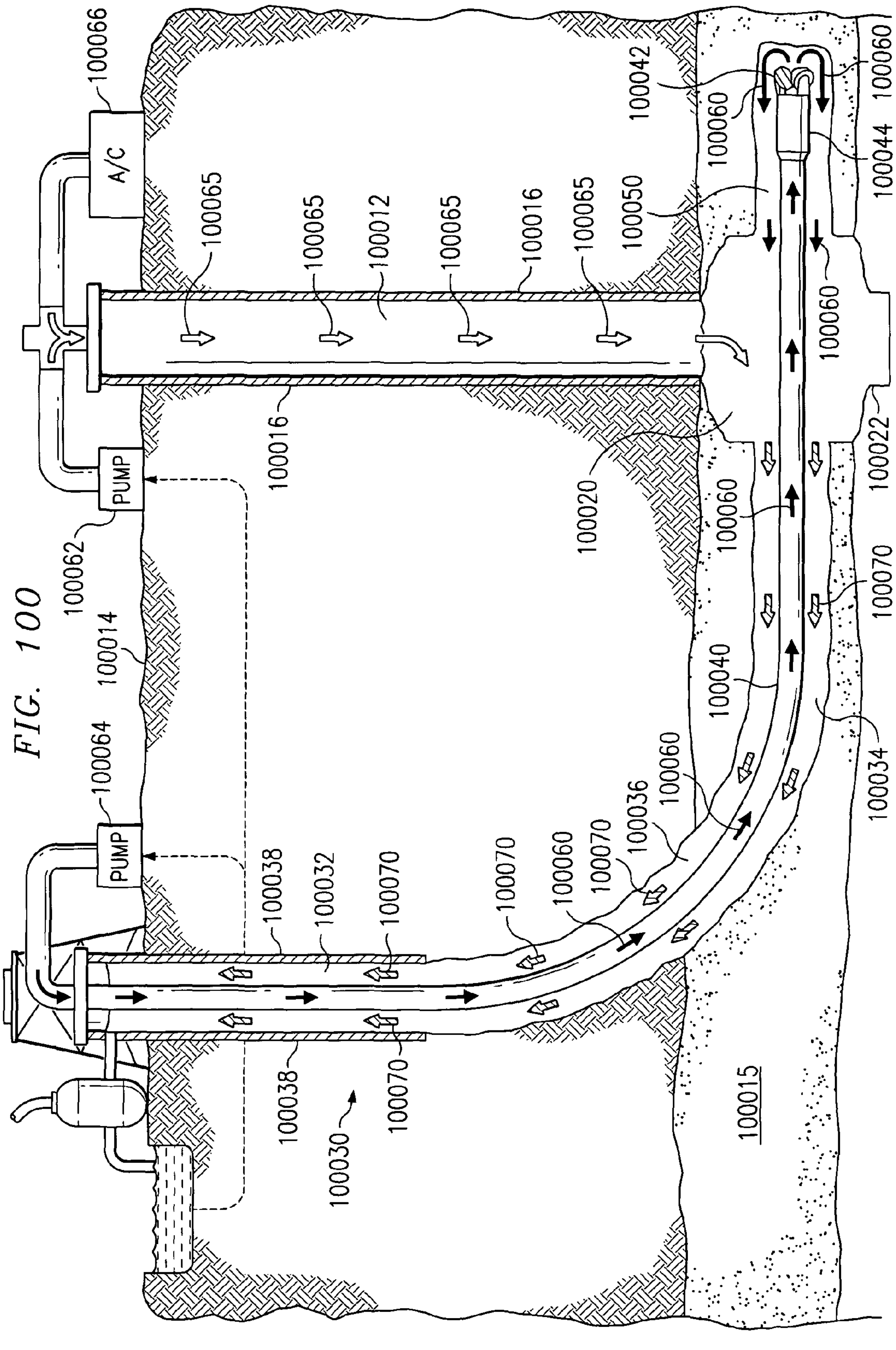
FIG. 100 illustrates an example system for controlling pressure in a dual well drilling operation in which a pressure fluid is pumped down a substantially vertical well bore in accordance with an embodiment of the present invention.

FIG. 100 illustrates an example dual well system 100010 for accessing a subterranean zone from the surface. In one embodiment, the subterranean zone may comprise a coal seam. It will be understood that other subterranean zones, such as oil or gas reservoirs, can be similarly accessed using the dual well system of the present invention to remove and/or produce water, hydrocarbons and other fluids in the subterranean zone and to treat minerals in the subterranean zone prior to mining operations.

Referring to FIG. 100, a substantially vertical well bore 100012 extends from a surface 100014 to a target layer subterranean zone 100015. Substantially vertical well bore 12 intersects and penetrates subterranean zone 15. Substantially vertical well bore 100012 may be lined with a suitable well casing 100016 that terminates at or above the level of the coal seam or other subterranean zone 100015.

Substantially vertical well bore 100012 may be logged either during or after drilling in order to locate the exact vertical depth of the target subterranean zone 100015. As a result, subterranean zone 100015 is not missed in subsequent drilling operations, and techniques used to locate zone 100015 while drilling need not be employed. An enlarged cavity 100020 may be formed in substantially vertical well bore 100012 at the level of subterranean zone 100015. Enlarged cavity 100020 may have a different shape in different embodiments. For example, in particular embodiments enlarged cavity 100020 may have a generally cylindrical shape or a substantially non-circular shape. Enlarged cavity 100020 provides a junction for intersection of substantially vertical well bore 100012 by an articulated well bore used to form a drainage bore in subterranean zone 100015. Enlarged cavity 100020 also provides a collection point for fluids drained from subterranean zone 100015 during production operations. Enlarged cavity 100020 is formed using suitable underreaming techniques and equipment. A vertical portion of substantially vertical well bore 100012 continues below enlarged cavity 20 to form a sump 100022 for enlarged cavity 100020.

An articulated well bore 100030 extends from the surface 100014 to enlarged cavity 100020 of substantially vertical well bore 100012. Articulated well bore 100030 includes a substantially vertical portion 100032, a substantially horizontal portion 100034, and a curved or radiused portion 100036 interconnecting vertical and horizontal portions 100032 and 100034. Horizontal portion 100034 lies substantially in the horizontal plane of subterranean zone 100015 and intersects enlarged cavity 100020 of substantially vertical well bore 100012. In particular embodiments, articulated well bore 100030 may not include a horizontal portion, for example, if subterranean zone 100015 is not horizontal. In such cases, articulated well bore 100030 may include a portion substantially in the same plane as subterranean zone 100015.

Articulated well bore 100030 is offset a sufficient distance from substantially vertical well bore 100012 at surface 14 to permit curved portion 100036 and any desired horizontal portion 100034 to be drilled before intersecting enlarged cavity 100020. In one embodiment, to provide curved portion 100036 with a radius of 1000-150 feet, articulated well bore 100030 is offset a distance of about 300 feet from substantially vertical well bore 100012. As a result, reach of the articulated drill string drilled through articulated well bore 100030 is maximized.

Articulated well bore 100030 may be drilled using an articulated drill string 100040 that includes a suitable downhole motor and drill bit 100042. A measurement while drilling (MWD) device 100044 may be included in articulated drill string 100040 for controlling the orientation and direction of the well bore drilled by the motor and drill bit 100042. The substantially vertical portion 100032 of the articulated well bore 100030 may be lined with a suitable casing 100038.

After enlarged cavity 100020 has been successfully intersected by articulated well bore 100030, drilling is continued through enlarged cavity 100020 using articulated drill string 100040 and appropriate horizontal drilling apparatus to drill a drainage bore 100050 in subterranean zone 100015. Drainage bore 100050 and other such well bores include sloped, undulating, or other inclinations of the coal seam or subterranean zone 100015. During this operation, gamma ray or acoustic logging tools and other MWD devices may be employed to control and direct the orientation of the drill bit to retain the drainage bore 100050 within the confines of subterranean zone 100015 and to provide substantially uniform coverage of a desired area within the subterranean zone 100015.

During the process of drilling drainage bore 100050, drilling fluid (such as drilling "mud") is pumped down articulated drill string 100040 using pump 100064 and circulated out of articulated drill string 100040 in the vicinity of drill bit 100042, where it is used to scour the formation and to remove formation cuttings. The drilling fluid is also used to power drill bit 100042 in cutting the formation. The general flow of the drilling fluid through and out of drill string 100040 is indicated by arrows 100060.

Foam, which in certain embodiments may include compressed air mixed with water, may be circulated down through articulated drill string 100040 with the drilling mud in order to aerate the drilling fluid in articulated drill string 100040 and articulated well bore 100030 as articulated well bore 100030 is being drilled and, if desired, as drainage bore 100050 is being drilled. Drilling of drainage bore 100050 with the use of an air hammer bit or an air-powered down-hole motor will also supply compressed air or foam to the drilling fluid. In this case, the compressed air or foam which is used to power the drill bit or down-hole motor exits the vicinity of drill bit 100042.

A pressure fluid may be pumped down substantially vertical well bore 100012 using pump 100062 as indicated by arrows 100065. The pressure fluid pumped down substantially vertical well bore 100012 may comprise nitrogen gas, water, air, drilling mud or any other suitable materials. The pressure fluid enters enlarged cavity 100020 where the fluid mixes with the drilling fluid which has been pumped through articulated drill string 100040 and has exited articulated drill string 100040 proximate drill bit 100042. The mixture of the pressure fluid pumped down substantially vertical well bore 100012 and the drilling fluids pumped through articulated drill string 100040 (the "fluid mixture") flows up articulated well bore 100030 in the annulus between articulated drill string 100040 and the surface of articulated well bore 100030. Such flow of the fluid mixture is generally represented by arrows 100070 of FIG. 1000. The flow of the fluid up articulated well bore 100030 creates a frictional pressure in the well bore system. The frictional pressure and the hydrostatic pressure in the well bore system resist fluids from subterranean zone 100015 ("subterranean zone fluid"), such as water or methane gas contained in subterranean zone 100015, from flowing out of subterranean zone 100015 and up articulated well bore 100030. The frictional pressure may also maintain the bottom hole equivalent circulating pressure of the well system.

In this embodiment, pumps 100062 and 100064 pump the drilling fluid and the pressure fluid into the system; however, in other embodiments other suitable means or techniques may be used to provide the drilling fluid and the pressure fluid into the system.

When the hydrostatic and frictional pressure in articulated well bore 100030 is greater than the formation pressure of subterranean zone 100015, the well system is considered over-balanced. When the hydrostatic and frictional pressure in articulated well bore 100030 is less than the formation pressure of subterranean zone 100015, the well system is considered under-balanced. In an over-balanced drilling situation, drilling fluid and entrained cuttings may be lost into subterranean zone 100015. Loss of drilling fluid and cuttings into the formation is not only expensive in terms of the lost drilling fluids, which must be made up, but it tends to plug the pores in the subterranean zone, which are needed to drain the zone of gas and water.

In particular embodiments, the pressure fluid pumped down substantially vertical well bore 100012 may include compressed gas provided by an air compressor 100066. Using compressed gas within the fluid pumped down vertical well bore 100012 will lighten the pressure of the pressure fluid thus lightening the frictional pressure of the fluid mixture flowing up articulated well bore 100030. Thus, the composition of the pressure fluid (including the amount of compressed gas or other fluids making up the pressure fluid) may be varied in order to vary or control the frictional pressure resulting from the flow of the fluid mixture up articulated well bore 100030. For example, the amount of compressed gas pumped down vertical well bore 100012 may be varied to yield over-balanced, balanced or under-balanced drilling conditions. Another way to vary the frictional pressure in articulated well bore 100030 is to vary flow rate of the pressure fluid by varying the speeds of pumps 100062 and 100064. The frictional pressure may be changed in real time and very quickly, as desired, using the methods described herein.

The frictional pressure may be varied for any of a variety of reasons, such as during a blow out from the pressure of fluids in subterranean zone 100015. For example, drill bit 100042 may hit a pocket of high-pressured gas in subterranean zone 100015 during drilling. At this point the speed of pump 100062 may be increased so as to maintain a desired relationship between the frictional pressure in articulated well bore 100030 and the increased formation pressure from the pocket of high-pressured gas. By varying the frictional pressure, low pressure coal seams and other subterranean zones can also be drilled without substantial loss of drilling fluid and contamination of the zone by the drilling fluid.

Fluid may also be pumped down substantially vertical well bore 100012 by pump 100062 while making connections to articulated drill string 100040, while tripping the drill string or in other situations when active drilling is stopped. Since drilling fluid is typically not pumped through articulated drill string 100040 during drill string connecting or tripping, one may increase the pumping rate of fluid pumped down substantially vertical well bore 100012 by a certain volume to make up for the loss of drilling fluid flow through articulated drill string 100040. For example, when articulated drill string 100040 is removed from articulated well bore 100030, pressure fluid may be pumped down vertical well bore 100012 and circulated up articulated well bore 100030 between articulated drill string 100040 and the surface of articulated well bore 100030. This fluid may provide enough frictional and hydrostatic pressure to prevent fluids from subterranean zone 100015 from flowing up articulated well bore 100030. Pumping an additional amount of fluid down substantially vertical well bore 100012 during these operations enables one to maintain a desired pressure condition on the system when not actively drilling.

Figure 101:
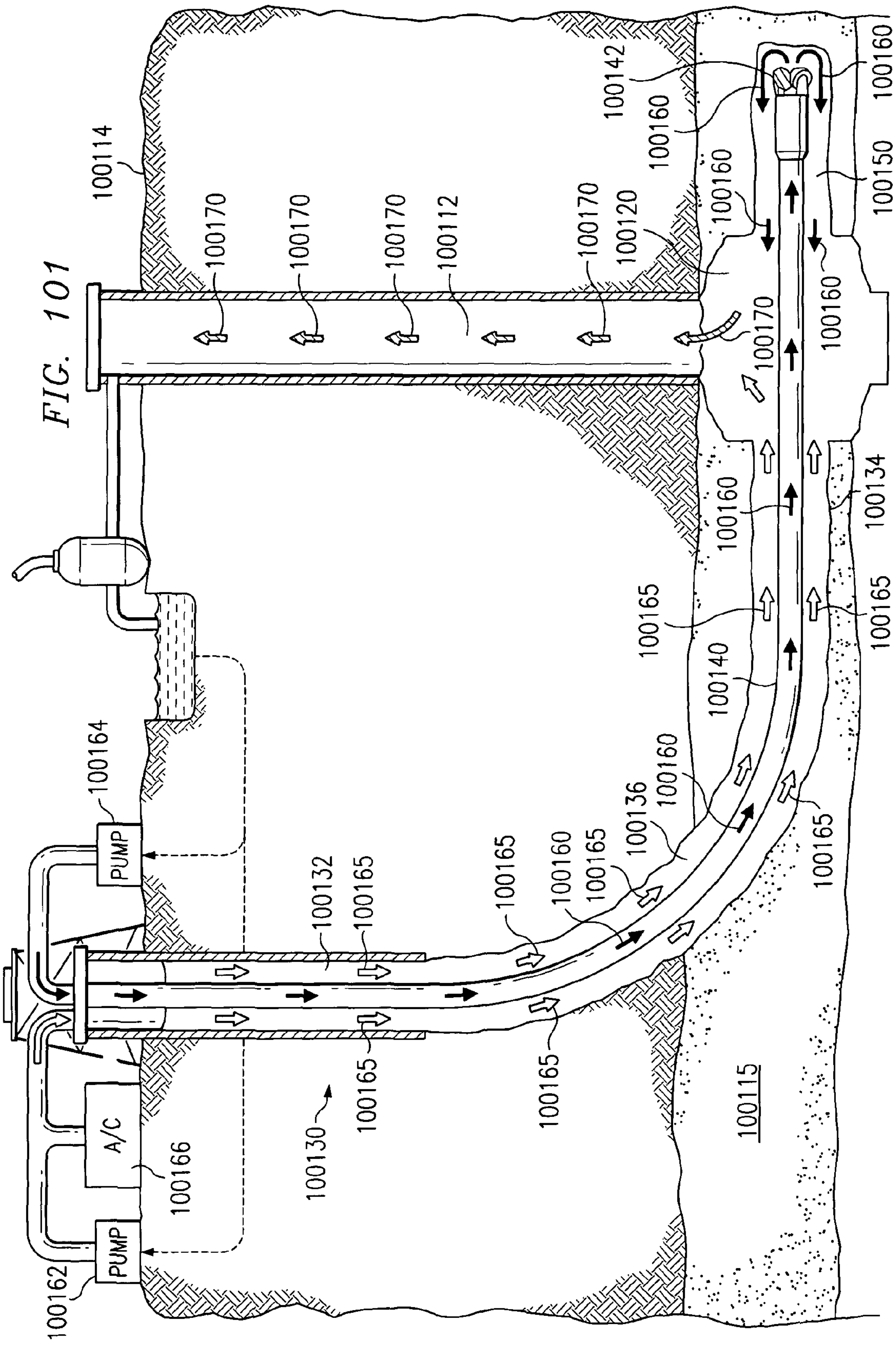
FIG. 101 illustrates an example system for controlling pressure in a dual well drilling operation in which a pressure fluid is pumped down an articulated well bore in accordance with another embodiment of the present invention.

FIG. 101 illustrates an example dual well system 100110 for accessing a subterranean zone from the surface. System 100110 includes a substantially vertical well bore 100112 and an articulated well bore 100130. Articulated well bore 100130 includes a substantially vertical portion 100132, a curved portion 100136 and a substantially horizontal portion 100134. Articulated well bore intersects an enlarged cavity 100120 of substantially vertical well bore 100112. Substantially horizontal portion 100134 of articulated well bore 100130 is drilled through subterranean zone 100115. Articulated well bore 100130 is drilled using an articulated drill string 100140 which includes a down-hole motor and a drill bit 100142. A drainage bore 100150 is drilled using articulated drill string 100140.

Dual well system 100110 is similar in operation to dual well system 100010 of FIG. 100. However, in dual well system 100110, the pressure fluid is pumped down articulated well bore 100130 in the annulus between articulated drill string 100140 and the surface of articulated well bore 100130 using pump 100162. The general flow of this pressure fluid is represented on FIG. 101 by arrows 100165. Drilling fluid is pumped down articulated drill string 100140 during drilling of drainage bore 100150 using pump 100164 as described in FIG. 100. Drilling fluid drives drill bit 100142 and exits articulated drill string 100140 proximate drill bit 100142. The general flow of the drilling fluid through and out of articulated drill string 100140 is represented by arrows 100160.

After the drilling fluid exits articulated drill string 100140, it generally flows back through drainage bore 100150 and mixes with the pressure fluid which has been pumped down articulated well bore 100130. The resulting fluid mixture flows up substantially vertical well bore 100112. The general flow of the resulting fluid mixture is represented by arrows 100170. The flow of the pressure fluid down articulated well bore 100130 and fluid mixture up substantially vertical well bore 100112 creates a frictional pressure in dual well system 100110. This frictional pressure, combined with the hydrostatic pressure from the fluids, provides a resistance to formation fluids from subterranean zone 100115 from leaving the subterranean zone. The amount of frictional pressure provided may be varied to yield over-balanced, balanced or under-balanced drilling conditions.

The pressure fluid pumped down articulated well bore 100130 may include compressed gas provided by air compressor 100166. Compressed gas may be used to vary the frictional pressure discussed above provided in the system. The speed of pumps 100162 and 100164 may also be varied to control the pressure in the system, for example, when a pocket of high-pressured gas is encountered in subterranean zone 100115. An additional amount of pressure fluid may be pumped down articulated well bore 100130 during connections of articulated drill string 100140, tripping, other operations or when drilling is otherwise stopped in order to maintain a certain frictional pressure on subterranean zone 100115.

Figure 102:
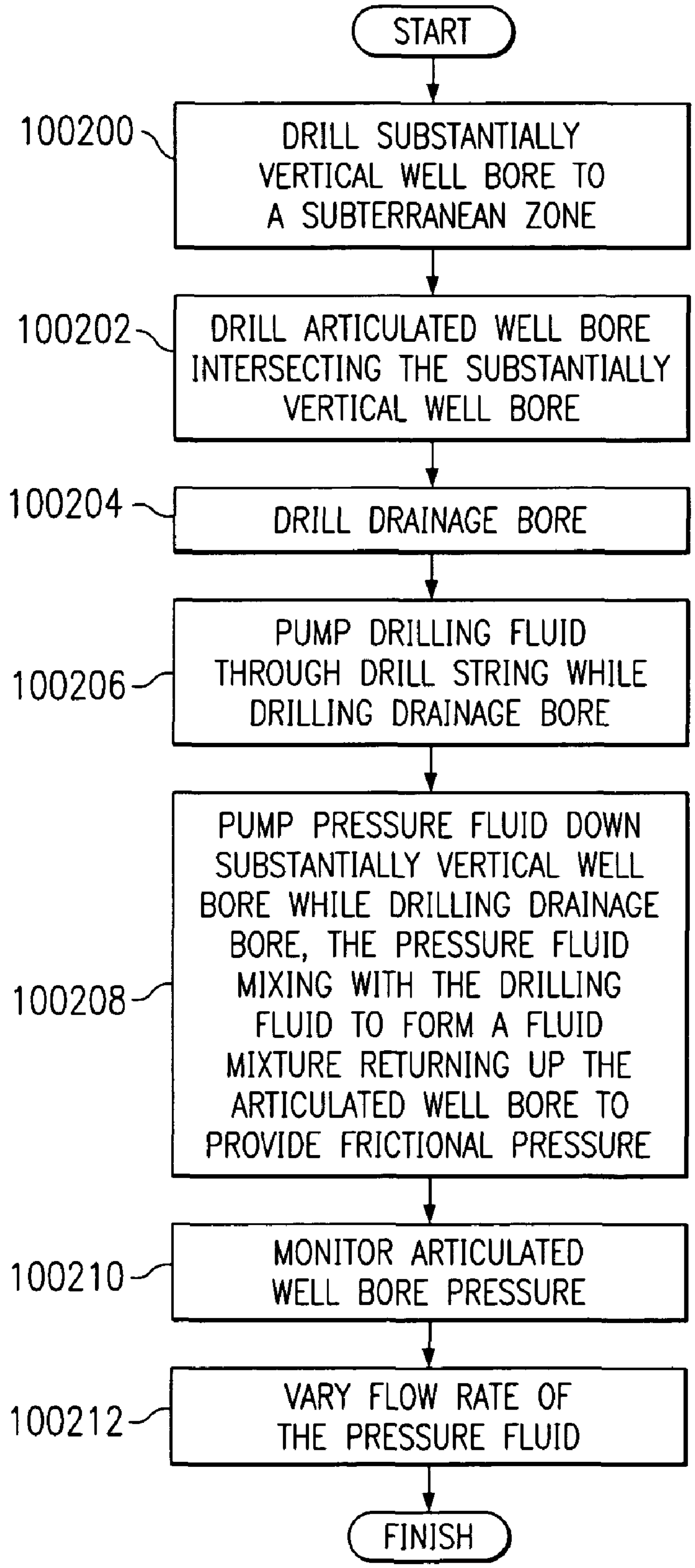
FIG. 102 is a flow chart illustrating an example method for controlling pressure of a dual well system in accordance with an embodiment of the present invention.

FIG. 102 is a flowchart illustrating an example method for controlling pressure of a dual well system in accordance with an embodiment of the present invention. The method begins at step 100200 where a substantially vertical well bore is drilled from a surface to a subterranean zone. In particular embodiments, the subterranean zone may comprise a coal seam, a gas reservoir or an oil reservoir. At step 100202 an articulated well bore is drilled from the surface to the subterranean zone. The articulated well bore is drilled using a drill string. The articulated well bore is horizontally offset from the substantially vertical well bore at the surface and intersects the substantially vertical well bore at a junction proximate the subterranean zone.

Step 100204 includes drilling a drainage bore from the junction into the subterranean zone. At step 100206, a drilling fluid is pumped through the drill string when the drainage bore is being drilled. The drilling fluid may exit the drill string proximate a drill bit of the drill string. At step 100208, a pressure fluid is pumped down the substantially vertical well bore when the drainage bore is being drilled. In particular embodiments the pressure fluid may comprise compressed gas. The pressure fluid mixes with the drilling fluid to form a fluid mixture returning up the articulated well bore. The fluid mixture returning up the articulated well bore forms a frictional pressure that may resist flow of fluid from the subterranean zone. The well system includes a bottom hole pressure that comprises the frictional pressure. The bottom hole pressure may also comprise hydrostatic pressure from fluids in the articulated well bore. The bottom hole pressure may be greater than, less than or equal to a pressure from subterranean zone fluid.

At step 100210, the bottom hole pressure is monitored. At step 100212, the flow rate of the pressure fluid pumped down the substantially vertical well bore is varied in order to vary the frictional pressure. The composition of the pressure fluid may also be varied to vary the frictional pressure. Variation in the frictional pressure results in a variation of the bottom hole pressure.

Figure 103:
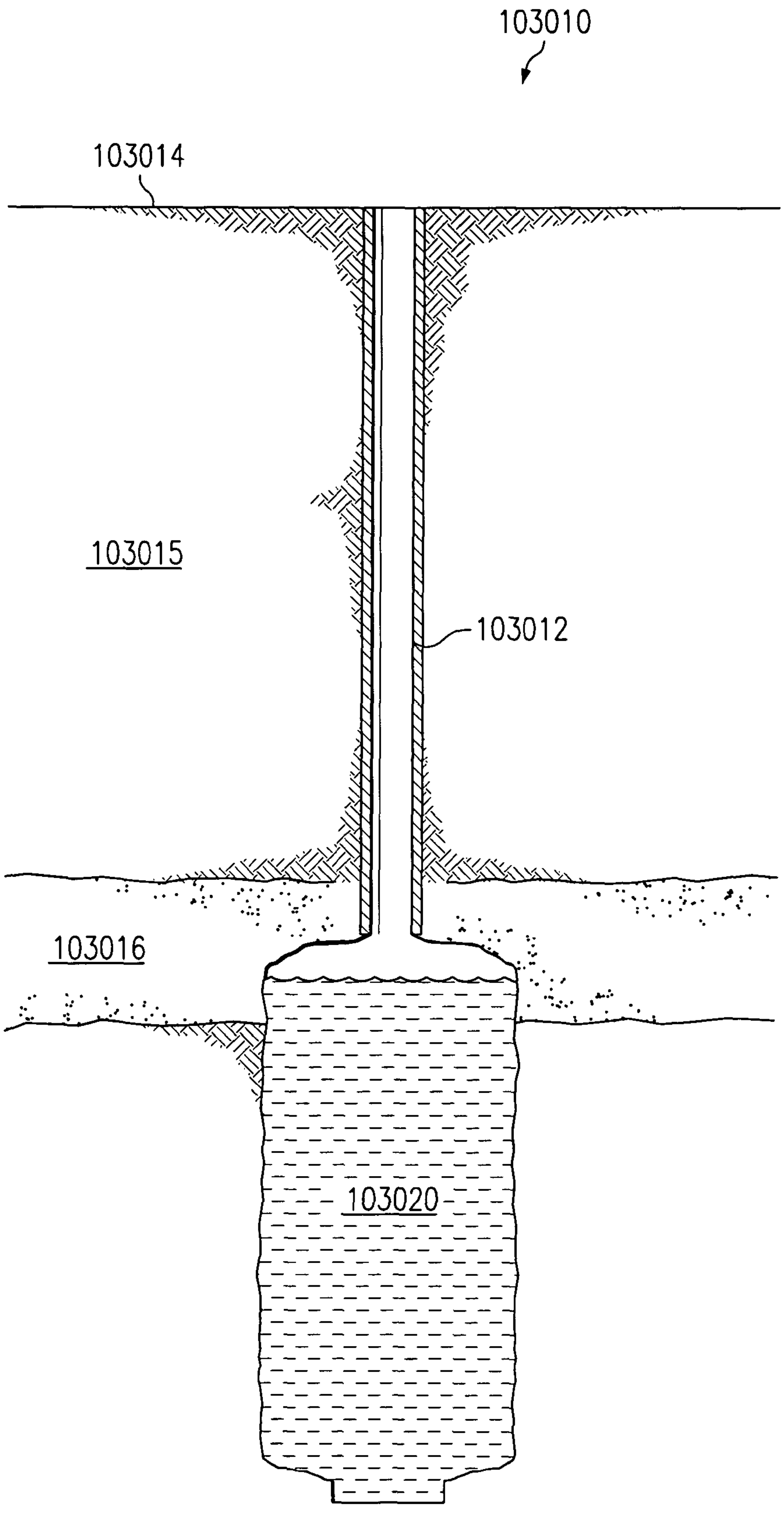
FIG. 103 illustrates an example well reservoir system 103010 according to yet another embodiment of the present invention.

FIG. 103 illustrates an example well reservoir system 103010 according to yet another embodiment of the present invention. Reservoir system 103010 includes a well bore 103012 that extends from a surface 103014 into a subterranean zone 103015. Well bore 103012 may be a substantially vertical well bore or a slant well bore drilled at any appropriate angle from surface 103014. Reservoir system 103010 further includes a cavity 103020 formed by enlarging well bore 103012 at an appropriate depth in subterranean zone 103015. Cavity 103020 may be generally cylindrical or non-cylindrical depending on the technique used to form cavity 103020. Any appropriate technique may be used to form cavity 103020, including underreaming tools, water-jet cutting tools, blasting techniques, or any other method of enlarging well bore 103012 in subterranean zone 103015.

Although not shown in FIG. 103, well bore 103012 may be used as appropriate to replace any of the substantially vertical well bores or slant well bores described above. For example, well bore 103012 and cavity 103020 may replace the vertical well bore and cavity of the dual well system described with reference to FIG. 1. In such a case, cavity 103020 may provide a junction for the intersection of well bore 103012 by an articulated well bore. More particularly, cavity 103020 may be formed at least partially in a coal seam 103016 or other deposit of resources such that cavity 103020 also provides a collection point for fluids drained from the coal seam or other resource deposit using a drainage pattern coupled to cavity 103020.

Well bore 103012 and cavity 103020 may also be used to replace one or more of the slant wells described above. In this case, one or more generally horizontal lateral well bores may be drilled from well bore 103012 into one or more resource deposits such that fluids may be produced from the deposit and drain into cavity 103020. Furthermore, as an alternative to being used as a replacement for a previously-described well bore, well bore 103012 and cavity 103020 may be drilled alone, as depicted in FIG. 103.

In any other these potential uses of well bore 103012 and cavity 103020, cavity 103020 may be used as a reservoir to collect and store appropriate fluids. For example, if well bore 103012 and cavity 103020 are used as a part of a dual well or slant well system for producing resources from a coal seam, cavity 103020 may be used to collect and store water that is drained from the coal seam. As compared to the cavity formed in the example dual well system of FIG. 1 (and the other cavities illustrated above), cavity 103020 is designed and formed to contain greater quantities of the produced water and thus provides the ability to store a large amount of water for future purposes. This increased capacity of cavity 103020 may be accomplished by increasing the diameter and/or the length (height) of the cavities included in the various embodiments previously described. For example, although the cavity of FIG. 1 is illustrated as being formed in the target coal seam, cavity 103020 of FIG. 103 extends well below coal seam 103016. This additional length of cavity 103020 provides an increased fluid storage capacity.

Although this greater fluid storage capacity may not be required for the production of resources from coal seam 103016 (or other deposit of resources), the increased capacity cavity 103020 may provide environmental and economic benefits after the production of resources is completed. For example, instead of disposing of large amounts of water produced during the production of methane from a coal bed, as described above, this water may be stored in cavity 103020. This reduces water run-off and other problems associated with water disposal. Furthermore, this stored water may then be used as needed in the surrounding area. For example, the water may be used to fight fires or water crops. The water may also be used as drinking water, if appropriate. Therefore, by increasing the capacity of the cavity that may already be used in a resource production project, the environmental benefits of the systems described above can be further increased.

Although embodiments of the invention and their advantages are described in detail, a person skilled in the art could make various alterations, additions, and omissions without departing from the spirit and scope of the present invention, as defined by the appended claims.

What is claimed is:

1. A method for drilling a well in a coal seam, comprising:
- pumping a drilling fluid comprising a liquid down a drill string to a bit drilling a substantially horizontal well bore in a coal seam;
- pumping the drilling fluid down the drill string during drilling a plurality of lateral well bores in the coal seam off of the substantially horizontal well bore; and
- reducing downhole pressure exerted by the drilling fluid by reducing a weight of drilling fluid in the well bore.

2. The method of claim 1, further comprising reducing down-hole pressure exerted by the drilling fluid by lightening the hydrostatic pressure of the drilling fluid.

3. The method of claim 1, further comprising reducing down-hole pressure exerted by the drilling fluid by aerating the drilling fluid.

4. The method of claim 1, further comprising reducing down-hole pressure exerted by the drilling fluid by circulating compressed air and mixing the air with the drilling fluid.

5. The method of claim 1, further comprising reducing down-hole pressure to nearly zero.

6. The method of claim 1, further comprising reducing down-hole pressure below over balanced conditions.

7. The method of claim 1, further comprising reducing down-hole pressure to approximately 150-200 pounds per square inch.

8. A method of forming a well in a coal seam, comprising:
- drilling a well including a horizontal bore and a horizontal drainage pattern extending from the horizontal bore in a coal seam using a drilling fluid comprising liquid; and
- reducing the down-hole pressure sufficiently that drilling conditions are not over balanced for drilling of the horizontal bore by reducing a weight of drilling fluid in the well.

9. The method of claim 8, further comprising reducing the down-hole pressure sufficiently that drilling conditions are under balanced for drilling of the horizontal drainage pattern.

10. The method of claim 8, wherein the coal seam is porous and fractured.

11. A method for producing gas from a coal seam, comprising:
- drilling, using a drilling fluid comprising liquid with drilling conditions that are not over balanced, a horizontal drainage pattern extending from a horizontal well bore in a coal seam; and
- producing gas collected by the horizontal well bore to the surface.

12. A method for accessing a coal seam from the surface, comprising:
- drilling a well bore in a coal seam; and
- during drilling, pumping drilling fluid comprising liquid and cuttings from the well bore to the surface;
- wherein drilling the well bore comprises drilling a main horizontal bore and a plurality of lateral bores extending from the main horizontal bore.

13. The method of claim 12, whereby hydrostatic pressure on the subterranean zone is reduced during drilling.

14. The method of claim 12, wherein the well bore comprises a first well bore, further comprising pumping drilling fluid and cuttings from the well bore to the surface through a second well bore.

15. The method of claim 14, wherein the second well bore comprises a substantially vertical well bore.

16. The method of claim 14, wherein the first well bore comprises an articulated well bore.

17. The method of claim 12, wherein the coal seam comprises a pressure below 150 pounds per square inch (psi).

18. The method of claim 12, further comprising pumping drilling fluid and cuttings from the well bore to the surface using a downhole pump.

19. The method of claim 12, further comprising pumping drilling fluid and cuttings from the well bore to the surface using gas lift.

20. The method of claim 12, whereby drilling is accomplished without loss of drilling fluids into the subterranean zone and plugging the subterranean zone.

21. The method of claim 14, the first and second well bores intersecting one another at a junction, further comprising pumping drilling fluid and cuttings from proximate to the junction of the first and second well bores to the surface.

22. The method of claim 21, wherein the junction comprises a cavity.

23. A method for underbalanced drilling of a coal seam, comprising:
- drilling a substantially horizontal well bore in the coal seam;
- during drilling of the substantially horizontal well bore in the coal formation, pumping drilling fluid comprising liquid and cuttings from the substantially horizontal well bore to the surface;
- drilling a plurality of lateral well bores extending from the substantially horizontal well bore; and
- during drilling of the plurality of lateral well bores, pumping drilling fluid comprising liquid and cuttings from the substantially horizontal well bore to the surface.

24. A method for accessing a subterranean coal formation from the surface, comprising:
- drilling a substantially horizontal well bore in the coal formation;
- during drilling of the substantially horizontal well bore in the coal formation, reducing the weight of drilling fluids, the drilling fluids comprising liquid;
- drilling a plurality of lateral well bores from the substantially horizontal well bore; and during drilling of the plurality of lateral well bores, lightening hydrostatic pressure exerted by drilling fluids on the coal formation.

25. The method of claim 24, further comprising lightening hydrostatic pressure exerted by the drilling fluids by pumping the drilling fluids from the substantially horizontal well bore to the surface.

26. The method of claim 25, further comprising pumping the drilling fluids using gas lift.

27. The method of claim 25, further comprising pumping drilling fluids from the substantially horizontal well bore to the surface through a second well bore intercepting the substantially horizontal well bore.

28. The method of claim 3 wherein pumping a drilling fluid comprising a liquid down a drill string comprises pumping a drilling mud down the drill string.

29. The method of claim 8 wherein drilling a well including a horizontal bore in a coal seam using a drilling fluid comprising liquid comprises using a drilling mud.

30. The method of claim 12 wherein pumping drilling fluid comprising liquid comprises pumping drilling mud.

31. The method of claim 24 wherein lightening hydrostatic pressure exerted by drilling fluids comprises lightening hydrostatic pressure exerted by drilling mud.

32. The method of claim 23, whereby hydrostatic pressure on the subterranean zone is reduced during drilling.

33. The method of claim 23, wherein the well bore comprises a first well bore, further comprising pumping drilling fluid and cuttings from the first well bore to the surface through a second well bore.

34. The method of claim 33, wherein the second well bore comprises a substantially vertical well bore.

35. The method of claim 33, wherein the first well bore comprises an articulated well bore.

36. The method of claim 23, wherein the coal seam comprises a pressure below 150 pounds per square inch (psi).

37. The method of claim 23, further comprising pumping drilling fluid and cuttings from the well bore to the surface using a downhole pump.

38. The method of claim 23, further comprising pumping drilling fluid and cuttings from the well bore to the surface using gas lift.

39. The method of claim 23, whereby drilling is accomplished without plugging the coal seam.

40. The method of claim 33, the first and second well bores intersecting one another at a junction, further comprising pumping drilling fluid and cuttings from proximate to the junction of the first and second well bores to the surface.

41. The method of claim 40, wherein the junction comprises a cavity.

42. The method of claim 1, further comprising drilling the substantially horizontal well bore through a well bore having a radiused portion.

43. The method of claim 1, wherein the drilling fluid comprises foam.

44. The method of claim 1, further comprising drilling the substantially horizontal well bore through a well bore having a radiused portion.

45. The method of claim 8, wherein drilling the horizontal drainage pattern comprises drilling a plurality of lateral well bores in the coal seam off the horizontal well bore.

46. The method of claim 8, further comprising drilling the substantially horizontal bore through a bore having a radiused portion.

47. The method of claim 8, wherein the drilling fluid comprises foam.

48. The method of claim 45, further comprising drilling a substantially horizontal bore through a bore having a radiused portion.

49. The method of claim 24, further comprising drilling the substantially horizontal well bore through a well bore having a radiused portion.

50. The method of claim 24, wherein the drilling fluid comprises foam.

51. The method of claim 24, further comprising drilling the substantially horizontal well bore through a well bore having a radiused portion.

52. A method for accessing a subterranean coal formation from the surface, comprising:

drilling through a well bore having a radiused portion a substantially horizontal well bore in a coal formation;

drilling through the well bore having a radiused portion and the substantially horizontal well bore a plurality of lateral well bores in the coal formation; and during drilling of the substantially horizontal well bore in the coal formation and the plurality of lateral well bores, using a drilling fluid comprising foam.

53. The method of claim 52, wherein drilling conditions are not overbalanced during drilling of the horizontal well bore and the plurality of lateral well bores.

54. The method of claim 52, further comprising producing gas and water collected by the substantially horizontal well bore and the plurality of lateral well bores to the surface.

55. The method of claim 52, further comprising:

conducting water and gas from the coal formation to a well bore junction, the well bore junction coupled to a fluid collection area at least partially disposed below the substantially horizontal well bore;

collecting water in the fluid collection area from the substantially horizontal well bore and the plurality of lateral well bores for production to the surface;

pumping water from the fluid collection area to the surface; and producing gas to the surface.

56. A method for drilling a well in a coal seam, comprising:

drilling a substantially horizontal bore in a coal seam using a drilling fluid;

drilling through the substantially horizontal well bore a plurality of lateral well bores in the coal formation; and lifting drilling fluid to the surface using a pump system having an inlet downhole.

57. The method of claim 56, wherein the inlet of the pump is proximate to the coal seam.

58. The method of claim 57, wherein the inlet of the pump is in the coal seam.

* * * * *